(12) United States Patent
Kim et al.

(10) Patent No.: US 11,035,583 B2
(45) Date of Patent: *Jun. 15, 2021

(54) AIR CONDITIONER AND METHOD OF CONTROLLING THE SAME

(71) Applicant: Samsung Electronics Co., Ltd., Suwon-si (KR)

(72) Inventors: Young-Jin Kim, Suwon-si (KR); Ju-Hyun Kang, Suwon-si (KR); Young-Jae Kim, Yongin-si (KR); Byung Yul So, Incheon (KR); Yong-Gak Kim, Yongin-si (KR); In-Jung Baek, Seoul (KR); Na Yeong Byeon, Suwon-si (KR); Moo Gyo Seo, Hwaseong-si (KR); Hyeong Joon Seo, Suwon-si (KR); Seung Cheon Yu, Yongin-si (KR); Sang Woo Lee, Hwaseong-si (KR); Hyo Kyu Lee, Seoul (KR); Jin Ho Lim, Suwon-si (KR); Min-Gi Cho, Suwon-si (KR); Hyeong Kyu Cho, Suwon-si (KR); Jun Hwang, Suwon-si (KR); Do Yeon Kim, Uiwang-si (KR); Hyun Ah Kim, Suwon-si (KR); Yong Ho Seo, Hwaseong-si (KR); Woo Seog Song, Yongin-si (KR); Hyun-Joo Song, Seongnam-si (KR); Young Sun Shin, Seoul (KR); Joon-Ho Yoon, Suwon-si (KR); Bu Youn Lee, Hwaseong-si (KR); Jung Dae Lee, Seoul (KR); Chang Seon Lee, Suwon-si (KR); Min Gu Jeon, Suwon-si (KR); Hee Jae Jeong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

This patent is subject to a terminal disclaimer.

(21) Appl. No.: 15/992,699

(22) Filed: May 30, 2018

(65) Prior Publication Data

US 2018/0347839 A1   Dec. 6, 2018

Related U.S. Application Data

(63) Continuation of application No. 15/145,218, filed on May 3, 2016, now Pat. No. 10,352,580.

(30) Foreign Application Priority Data

Sep. 30, 2015 (KR) ........................ 10-2015-0138017
Oct. 23, 2015 (KR) ........................ 10-2015-0147676
(Continued)

(51) Int. Cl.
*F24F 11/30* (2018.01)
*F24F 1/0047* (2019.01)
(Continued)

(52) U.S. Cl.
CPC ............ *F24F 11/30* (2018.01); *F24F 1/0011* (2013.01); *F24F 1/0022* (2013.01);
(Continued)

(58) Field of Classification Search
CPC .. F24F 11/30; F24F 11/44; F24F 11/46; F24F 1/0057; F24F 1/0049; F24F 1/0011;
(Continued)

(56) References Cited

U.S. PATENT DOCUMENTS 2,431,726 A   12/1947   Bechtler
4,570,532 A   2/1986   Labelle
(Continued)

FOREIGN PATENT DOCUMENTS

CN   103574775   2/2014
CN   203571921   4/2014
(Continued)

OTHER PUBLICATIONS

Australian Office Action dated Jul. 3, 2018 in Australian Patent Application No. 2016329913.
(Continued)

*Primary Examiner* — Kenneth J Hansen
*Assistant Examiner* — Dana K Tighe
(74) *Attorney, Agent, or Firm* — Staas & Halsey LLP

(57) ABSTRACT

An air conditioner includes a housing having a suction port and a discharge port, a main fan configured to draw air into (Continued)

the housing through the suction port and discharge air from the housing through the discharge port, an auxiliary fan configured to draw, into the housing, air discharged by the main fan and a controller configured to control a rotational speed of the auxiliary fan to change a direction in which air is discharged from the housing.

19 Claims, 79 Drawing Sheets

(30) Foreign Application Priority Data

| | | | |
|---|---|---|---|
| Oct. 23, 2015 | (KR) | ........................ | 10-2015-0147677 |
| Oct. 23, 2015 | (KR) | ........................ | 10-2015-0147732 |
| Mar. 25, 2016 | (KR) | ........................ | 10-2016-0036177 |

(51) Int. Cl.

| | |
|---|---|
| *F24F 1/0057* | (2019.01) |
| *F24F 11/79* | (2018.01) |
| *F24F 11/77* | (2018.01) |
| *F24F 1/0011* | (2019.01) |
| *F24F 1/0022* | (2019.01) |
| *F24F 1/0033* | (2019.01) |
| *F24F 13/24* | (2006.01) |
| *F24F 13/28* | (2006.01) |
| *F24F 110/00* | (2018.01) |
| *F24F 110/10* | (2018.01) |
| *F24F 120/12* | (2018.01) |
| *F24F 11/65* | (2018.01) |
| *F24F 11/41* | (2018.01) |
| *F24F 11/52* | (2018.01) |

(52) U.S. Cl.
CPC .......... *F24F 1/0033* (2013.01); *F24F 1/0047* (2019.02); *F24F 1/0057* (2019.02); *F24F 11/77* (2018.01); *F24F 11/79* (2018.01); *F24F 13/24* (2013.01); *F24F 13/28* (2013.01); *F24F 11/41* (2018.01); *F24F 11/52* (2018.01); *F24F 11/65* (2018.01); *F24F 2110/00* (2018.01); *F24F 2110/10* (2018.01); *F24F 2120/12* (2018.01); *F24F 2221/28* (2013.01)

(58) Field of Classification Search
CPC ........ F24F 1/0022; F24F 1/0033; F24F 13/24; F24F 13/28; F24F 11/41; F24F 11/52; F24F 11/65; F24F 11/77; F24F 11/79; F24F 1/0047; F24F 2120/12; F24F 2110/00; F24F 2110/10; F24F 2221/28
USPC ....................................................... 454/234
See application file for complete search history.

(56) References Cited

U.S. PATENT DOCUMENTS

| | | |
|---|---|---|
| 5,436,547 A | 7/1995 | Nagai |
| 5,572,876 A | 11/1996 | Um |
| 5,938,527 A | 8/1999 | Oshima et al. |
| 6,606,866 B2 | 8/2003 | Bell |
| 7,178,344 B2 | 2/2007 | Bell |
| 7,836,877 B2 | 11/2010 | Gagas |
| 7,971,451 B2 | 7/2011 | Yabu |
| 8,011,114 B2 | 9/2011 | Johnson |
| 8,303,677 B2 | 11/2012 | Okada |
| RE44,272 E | 6/2013 | Bell |
| 8,516,648 B2 | 8/2013 | Sakashita |
| 8,523,969 B2 | 9/2013 | Sakashita |
| 8,529,653 B2 | 9/2013 | Sakashita |
| 8,707,719 B2 | 4/2014 | Yamada |
| 8,721,779 B2 | 5/2014 | Jeong |
| 8,734,553 B2 | 5/2014 | Sakashita |
| 8,834,242 B2 | 9/2014 | Uenaka |
| 9,022,734 B2 | 5/2015 | Li |
| 9,091,456 B2 | 7/2015 | Sakashita |
| 9,266,049 B2 | 2/2016 | Jun |
| 9,726,384 B2 * | 8/2017 | Taira ..................... F24F 1/0057 |
| 9,791,160 B2 | 10/2017 | Yamaguchi |
| 10,029,289 B2 | 7/2018 | Wendorski |
| 10,041,689 B2 | 8/2018 | Kymissis |
| 10,061,330 B2 | 8/2018 | Douglas |
| 2005/0279120 A1 | 12/2005 | Lee |
| 2006/0042288 A1 | 3/2006 | Downs |
| 2008/0242214 A1 | 10/2008 | Sung |
| 2009/0114377 A1 | 5/2009 | Zheng |
| 2009/0247064 A1 | 10/2009 | Chen |
| 2010/0070086 A1 | 3/2010 | Harrod |
| 2011/0039491 A1 | 2/2011 | Khalifa |
| 2011/0120155 A1 | 5/2011 | Lingrey |
| 2011/0120170 A1 | 5/2011 | Sakashita |
| 2012/0031983 A1 | 2/2012 | Shirota |
| 2013/0167578 A1 | 7/2013 | Ikeda |
| 2015/0022996 A1 | 1/2015 | Kang |

FOREIGN PATENT DOCUMENTS

| | | |
|---|---|---|
| CN | 104296240 | 1/2015 |
| CN | 104896590 | 9/2015 |
| CN | 104896591 | 9/2015 |
| CN | 104903655 | 9/2015 |
| CN | 205323497 | 6/2016 |
| CN | 106560659 | 10/2019 |
| EP | 1884718 | 2/2008 |
| EP | 1710517 | 10/2016 |
| JP | 2007-101171 | 4/2007 |
| JP | 2013-050239 | 3/2013 |
| JP | 2014-129956 | 7/2014 |
| JP | 2014-145561 | 8/2014 |
| KR | 1999-0016577 | 3/1999 |
| KR | 10-2000-0055145 | 9/2000 |
| KR | 10-0273353 | 4/2001 |
| KR | 10-2007-0056422 | 6/2007 |
| KR | 10-2009-0081915 | 7/2009 |
| KR | 10-2012-0022248 | 3/2012 |
| KR | 10-2004-0092952 | 7/2014 |
| KR | 10-2015-0009359 | 1/2015 |
| KR | 10-2015-0009362 | 1/2015 |
| KR | 10-2015-0082969 | 7/2015 |

OTHER PUBLICATIONS

Korean Office Action dated Apr. 13, 2018 in Korean Patent Application No. 10-2017-0015916.
Russian Decision to Grant dated Nov. 30, 2018 in Russian Patent Application No. 2018111223.
Australian Notice of Acceptance dated Nov. 1, 2018 in Australian Patent Application No. 2016329913.
U.S. Office Action dated Apr. 5, 2018 issued in U.S. Appl. No. 15/145,218.
U.S. Advisory Action dated Sep. 11, 2017 issued in U.S. Appl. No. 15/145,218.
U.S. Office Action dated Jun. 5, 2017 issued in U.S. Appl. No. 15/145,218.
U.S. Office Communication dated Mar. 1, 2017 issued in U.S. Appl. No. 15/145,218.
U.S. Office Action dated Nov. 18, 2016 issued in U.S. Appl. No. 15/145,218.
Korean Office Action dated Jun. 3, 2016 in Korean Patent Application No. 10-2016-0036177.
International Search Report dated Aug. 16, 2016 in International Patent Application No. PCT/KR2016/004725.
Korean Notice of Allowance dated Feb. 2, 2017 in Korean Patent Application No. 10-2016-0036177.
Extended European Search Report dated Jan. 26, 2017 in European Patent Application No. 16168419.6.

(56) References Cited

OTHER PUBLICATIONS

U.S. Appl. No. 15/145,218, filed May 3, 2016, Young-Jin Kim, Samsung Electronics Co., Ltd.
U.S. Notice of Allowance dated Mar. 20, 2019 in U.S. Appl. No. 15/145,218.
Extended European Search Report dated Jul. 2, 2019 in European Patent Application No. 19165112.4.
European Communication under Rule 71(3) dated Jul. 12, 2019 in European Patent Application No. 16168419.6.
Korean Notice of Allowance dated Aug. 21, 2018 in Korean Patent Application No. 10-2017-0015916.
Chinese Office Action dated Oct. 21, 2019 in Chinese Patent Application No. 201910284511.3.
Chinese Office Action dated Nov. 22, 2019 in Chinese Patent Application No. 201910285011.1.
Indian Office Action dated May 5, 2020 in Indian Patent Application No. 201817002390.
U.S. Office Action dated Dec. 28, 2018 in U.S. Appl. No. 15/145,218.
Chinese Office Action dated Dec. 5, 2018 in Chinese Patent Application No. 201610334967.2.
European Office Action dated Jun. 16, 2020 in European Patent Application No. 19165112.4.
Brazilian Office Action dated Jul. 7, 2020 in Brazilian Patent Application No. BR112018000342-5.

* cited by examiner (AP1: 230, 260)

FIG. 17A

| VARIABLE CONTROL OF RPM | INITIAL STAGE | #1 | #2 | #3 | ... |
|---|---|---|---|---|---|
| AUXILIARY FAN A | OFF | FIRST RPM (D1) | THIRD RPM (D3) | SECOND RPM (D2) | #1→#2→#3 REPEAT |
| AUXILIARY FAN B | OFF | SECOND RPM (D2) | FIRST RPM (D1) | THIRD RPM (D3) | |
| AUXILIARY FAN C | OFF | THIRD RPM (D3) | SECOND RPM (D2) | FIRST RPM (D1) | |

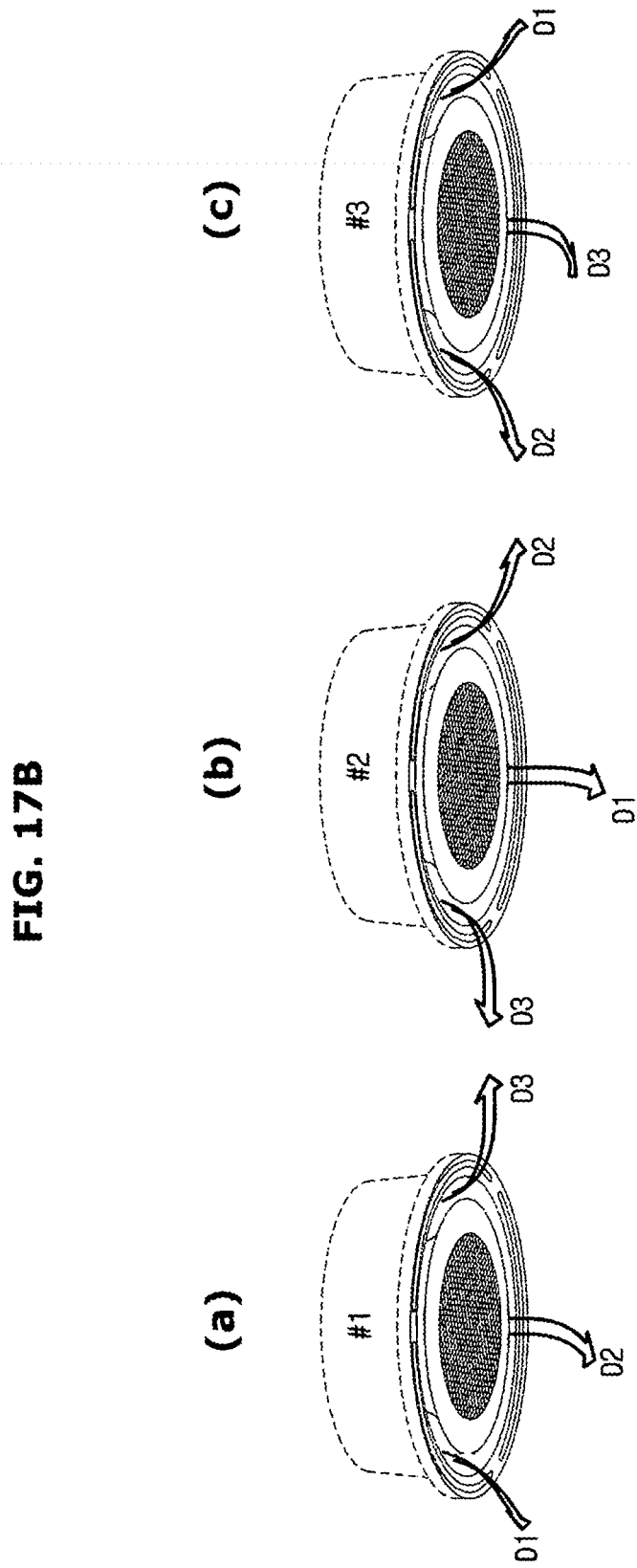

FIG. 18A

| ON/OFF VARIABLE CONTROL | INITIAL STAGE | #1 | #2 | #3 | ... |
|---|---|---|---|---|---|
| AUXILIARY FAN A | OFF | ON (On) | OFF | OFF | #1→#2→#3 REPEAT |
| AUXILIARY FAN B | OFF | OFF | ON (On) | OFF | |
| AUXILIARY FAN C | OFF | OFF | OFF | ON (On) | |

(AP3: 230, 260)

(a) OPENED (b) CLOSED (c) FIXED (d) SWING

FIG. 37A

| SWING/FIXED VARIABLE CONTROL | INITIAL STAGE | #1 | #2 | #3 | #4 | ... |
|---|---|---|---|---|---|---|
| BLADE A | CLOSED | SWING | FIXED | FIXED | FIXED | #1→#2→#3→#4 REPEAT |
| BLADE B | CLOSED | FIXED | SWING | FIXED | FIXED | |
| BLADE C | CLOSED | FIXED | FIXED | SWING | FIXED | |
| BLADE D | CLOSED | FIXED | FIXED | FIXED | SWING | |

FIG. 38A

| SWING/FIXED VARIABLE CONTROL | INITIAL STAGE | #1 | #2 | #3 | #4 | ... |
|---|---|---|---|---|---|---|
| BLADE A | CLOSED | OPENED | CLOSED | CLOSED | CLOSED | #1→#2→#3→#4 REPEAT |
| BLADE B | CLOSED | CLOSED | OPENED | CLOSED | CLOSED | |
| BLADE C | CLOSED | CLOSED | CLOSED | OPENED | CLOSED | |
| BLADE D | CLOSED | CLOSED | CLOSED | CLOSED | OPENED | |

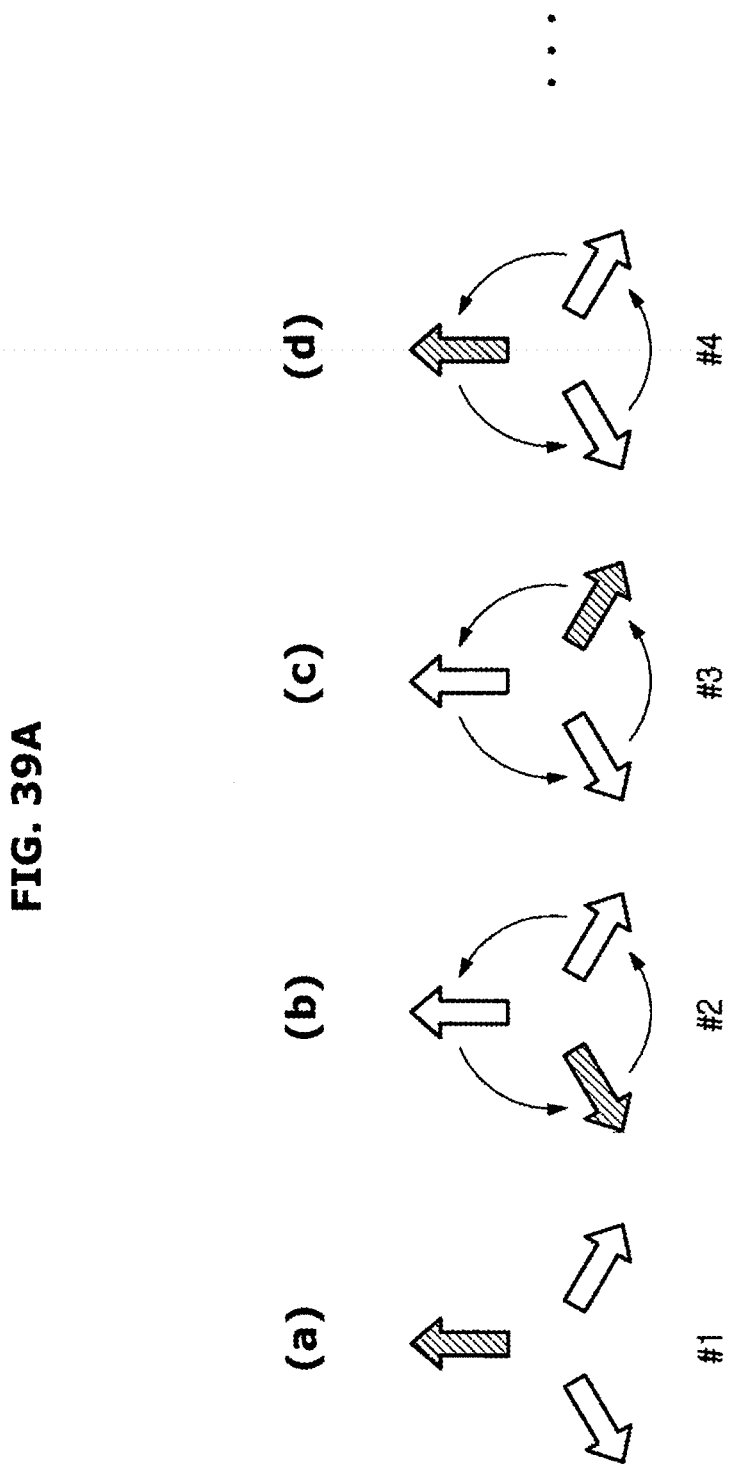

AIR CONDITIONER AND METHOD OF CONTROLLING THE SAME

CROSS-REFERENCE TO RELATED APPLICATIONS

This application is a continuation of U.S. patent application Ser. No. 15/145,218, filed on May 3, 2016, which claims priority to and the benefit of Korean Patent Application Nos. 10-2015-0138017 filed on Sep. 30, 2015, 10-2015-0147676 filed on Oct. 23, 2015, 10-2015-0147677 filed on Oct. 23, 2015, 10-2015-0147732 filed on Oct. 23, 2015, and 10-2016-0036177 filed on Mar. 25, 2016 in the Korean Intellectual Property Office, the disclosures of which are incorporated herein by reference.

BACKGROUND

1. Field

The following description relates to an air conditioner and a method of controlling the same for controlling a discharged airflow for each operation mode.

2. Description of the Related Art

Generally, an air conditioner is an apparatus that uses transfer of heat generated in a process of evaporating and condensing refrigerant to cool, heat, or purify drawn air and discharge the air in order to condition air of an indoor space.

The air conditioner performs a cooling operation of discharging indoor heat to the outside in summer and performs a heating operation of a heat pump that circulates refrigerant in the opposite way from that of a cooling cycle to supply heat indoors in winter.

When performing the cooling operation or the heating operation, the air conditioner rotates a fan provided near an indoor heat exchanger to draw indoor air, heat-exchanges the drawn air in the indoor heat exchanger, and discharges the heat-exchanged air to the indoor space while operating a blade provided at a discharge portion to adjust a direction of the discharged airflow in order to condition the air of the indoor space.

SUMMARY

Additional aspects and/or advantages will be set forth in part in the description which follows and, in part, will be apparent from the description, or may be learned by practice of the disclosure.

It is an aspect of the present disclosure to provide an air conditioner and a method of controlling the same in which a revolution per minute (RPM) of each of a plurality of fans is controlled based on airflow speed information and airflow direction information.

It is an aspect of the present disclosure to provide an air conditioner and a method of controlling the same in which an RPM of each of a plurality of fans is controlled based on a normal mode, a high speed mode, or a defrosting mode.

It is an aspect of the present disclosure to provide an air conditioner and a method of controlling the same for controlling an RPM of a fan based on whether dust is detected or a person is detected at a suctioning side.

It is an aspect of the present disclosure to provide an air conditioner and a method of controlling the same in which opening and closing of a flow passage is controlled for repeating heat exchange or discharge of air being discharged.

It is an aspect of the present disclosure to control an airflow discharged from an indoor unit of an air conditioner to an air-conditioned space in various forms.

It is an aspect of the present disclosure to control an airflow discharged from an indoor unit to circulate such that an effect of rotating the indoor unit may be achieved even without rotating the indoor unit.

It is an aspect of the present disclosure to provide an air conditioner capable of firmly fixing a display unit to a housing.

It is an aspect of the present disclosure to provide an air conditioner capable of firmly fixing a display unit to a housing using the fewest possible number of separate fixing members.

It is an aspect of the present disclosure to provide an air conditioner capable of facilitating maintenance and repair of a display unit by allowing the display unit to be easily detached from a housing.

It is an aspect of the present disclosure to provide an air conditioner capable of controlling an airflow direction without a blade.

It is an aspect of the present disclosure to provide a method of controlling an air conditioner capable of visually expressing an airflow direction of an air conditioner without a blade.

It is an aspect of the present disclosure to provide an air conditioner and a method of controlling the same in which a visually expressed airflow direction may be checked in accordance with a user's manipulation.

It is an aspect of the present disclosure to provide an air conditioner and a method of controlling the same capable of visually expressing not only the direction of an airflow but also the strength of the airflow and an operation state, etc.

According to an aspect, an air conditioner includes an outdoor unit and an indoor unit, wherein the indoor unit includes a housing having a suction portion and a discharge portion, a heat exchanger disposed in the housing and configured to exchange heat with surrounding air, a main fan to draw air of an indoor space through the suction portion and to discharge the air heat-exchanged in the heat exchanger through the discharge portion, an auxiliary fan to draw some of the air discharged through the discharge portion, a flow passage portion to guide flow of the air drawn by the auxiliary fan, and a control unit to control revolution per minute (RPM) of the auxiliary fan based on RPM of the main fan so that the direction of the airflow discharged through the discharge portion is adjusted.

According to the aspect, the air conditioner may further include a case to accommodate the auxiliary fan, and the flow passage portion may include an inlet portion through which air is introduced by the auxiliary fan, an outlet portion through which the introduced air is discharged to the outside, and a flow passage connected to the case and configured to guide the air introduced through the inlet portion to the outlet portion.

According to the aspect, the air conditioner may further include an input unit to receive at least one piece of information on airflow speed and information on airflow direction, and the control unit may include controlling the RPM of the main fan based on the information on airflow speed and controlling the RPM of the auxiliary fan based on the RPM of the main fan and the information on airflow direction.

According to the aspect, when a high speed mode is received, the control unit of the air conditioner may include controlling the RPM of the main fan to be a preset RPM and controlling the RPM of the auxiliary fan to be cyclically changed.

According to the aspect, the air conditioner may further include an indoor temperature detection unit to detect the temperature of an indoor space, and the control unit may include controlling the RPM of the auxiliary fan to be a preset RPM when the temperature of the indoor space is a target temperature.

According to the aspect, the air conditioner may further include a detection unit to detect a human boy, and when the high speed mode is received, the control unit may include controlling the RPM of the main fan to be a preset RPM, checking the position of the human body based on the detected information on the human body, and controlling the RPM of the auxiliary fan based on the checked position and the RPM of the main fan.

According to the aspect, when the operation mode is the heating operation, the control unit of the air conditioner may include determining a start point of a defrosting operation, controlling the main fan to be stopped when the start point of the defrosting operation is reached, and controlling the RPM of the auxiliary fan to be a preset RPM.

According to the aspect, when the operation mode is the heating operation, the control unit of the air conditioner may include determining the start point of the defrosting operation, controlling the main fan to be stopped when the start point of the defrosting operation is reached, and controlling the RPM of the auxiliary fan based on the RPM of the main fan during the heating operation.

According to the aspect, the air conditioner may further include a filter portion disposed at the suction portion and a dust detection unit to detect an amount of dust in the filter portion, and the control unit may include controlling the RPM of the auxiliary fan to be compensated based on the amount of dust in the filter portion.

According to the aspect, the air conditioner may further include a first motor to apply a driving force to the main fan and a current detection unit to detect a current of the first motor, and the control unit may include controlling the RPM of the auxiliary fan to be compensated based on the detected current.

According to the aspect, the air conditioner may further include the first motor to apply a driving force to the main fan, and the control unit may include controlling the RPM of the auxiliary fan to be compensated based on a first duty ratio for rotating the first motor by the maximum RPM and a second duty ratio for rotating the first motor by the maximum RPM during the operation.

According to the aspect, the air conditioner may further include the case to accommodate the auxiliary fan, and the flow passage portion may include the inlet portion through which air is introduced by the auxiliary fan, a first outlet portion disposed at a side of the discharge portion and configured to discharge the introduced air to the outside, a second outlet portion disposed at a side of the heat exchanger and configured to discharge the introduced air to the heat exchanger, a flow passage connected to the case and configured to guide the air introduced through the inlet portion to the first outlet portion or the second outlet portion, a first opening-and-closing member disposed in the flow passage to open and close the first outlet portion, and a second opening-and-closing member disposed in the flow passage to open and close the second outlet portion.

According to the aspect, the control unit of the air conditioner may include controlling the first opening-and-closing member to be open and the second opening-and-closing member to be closed when the working mode is the normal mode and controlling the first opening-and-closing member to be closed and the second opening-and-closing member to be open when the working mode is the high speed mode.

According to the aspect, the control unit of the air conditioner may include controlling the RPM of the auxiliary fan to be compensated when the working mode is the high speed mode.

According to an aspect of the present disclosure, an air conditioner includes an outdoor unit and an indoor unit, wherein the indoor unit includes a housing having a suction portion and a discharge portion, a heat exchanger disposed in the housing and configured to exchange heat with surrounding air, a main fan to draw air of an indoor space through the suction portion and to discharge the heat-exchanged air in the heat exchanger through the discharge portion, an auxiliary fan to draw some of the air discharged through the discharge portion, a flow passage portion having an inlet portion disposed adjacent to the discharge portion, a first outlet portion disposed adjacent to the heat exchanger, and a second outlet portion disposed adjacent to the discharge portion, and configured to guide the air introduced through the inlet portion to the first outlet portion or the second outlet portion, and a control unit to control RPM of the auxiliary fan based on RPM of the main fan so that the direction of the airflow discharged through the discharge portion is adjusted and to control the first outlet portion and the second outlet portion to be open and closed based on the working mode.

According to the aspect, the flow passage portion of the air conditioner may include a flow passage to connect the inlet portion, the first outlet portion, and the second outlet portion, a first opening-and-closing member disposed in the flow passage to open and close the first outlet portion, and a second opening-and-closing member disposed in the flow passage to open and close the second outlet portion.

According to the aspect, the control unit of the air conditioner may include controlling the first opening-and-closing member to be open and the second opening-and-closing member to be closed when the working mode is the normal mode and controlling the first opening-and-closing member to be closed and the second opening-and-closing member to be open when the working mode is the high speed mode.

According to an aspect, an air conditioner includes an outdoor unit and an indoor unit, wherein the indoor unit includes a housing having a suction portion and a discharge portion, a heat exchanger disposed in the housing and configured to exchange heat with surrounding air, a main fan to draw air of an indoor space through the suction portion and to discharge the air heat-exchanged in the heat exchanger through the discharge portion, an auxiliary fan to draw some of the air discharged through the discharge portion, a flow passage portion to guide a flow of the air drawn by the auxiliary fan, an indoor temperature detection unit to detect the temperature of an indoor space, and a control unit to control RPM of the main fan to be a preset RPM and control RPM of the auxiliary fan to be cyclically changed when the working mode is the high speed mode and to control the RPM of the auxiliary fan to be maintained at a preset RPM when the temperature of the indoor space is a target temperature.

According to the aspect, when controlling the RPM of the auxiliary fan to be cyclically changed, the control unit of the air conditioner may include controlling the auxiliary fan to be cyclically turned on and off.

According to an aspect, a method of controlling an air conditioner having an outdoor unit and an indoor unit includes operating a compressor disposed in the outdoor unit when an operation command is input, rotating a main fan disposed in the indoor unit, and operating an auxiliary fan disposed in the indoor unit based on the RPM of the main fan, wherein the operating of the auxiliary fan may include suctioning in some of the discharged air so that the direction of air discharged through a discharge portion of the indoor unit is adjusted.

According to the aspect, the method of controlling the air conditioner may further include controlling the RPM of the main fan based on information on airflow speed when at least one piece of the information on airflow speed and information on airflow direction is input and controlling the RPM of the auxiliary fan based on the RPM of the main fan and the information on airflow direction.

According to the aspect, the method of controlling the air conditioner may further include controlling the RPM of the main fan to be a preset RPM and controlling the RPM of the auxiliary fan to be cyclically changed when the working mode is the high speed mode and controlling the RPM of the auxiliary fan to be a preset RPM when the temperature of an indoor space is a target temperature.

According to the aspect, the method of controlling the air conditioner may further include controlling the RPM of the main fan to be a preset RPM when the working mode is the high speed mode, detecting a human body in the indoor space, and controlling the RPM of the auxiliary fan based on the detected position of the human body and the RPM of the main fan.

According to the aspect, the method of controlling the air conditioner may further include determining a start point of a defrosting operation when an operation mode is a heating operation, controlling the main fan to be stopped when the current time point is the start point of the defrosting operation, and controlling the RPM of the auxiliary fan to be a preset RPM. The determining of the start point of the defrosting operation may include determining the start point of the defrosting operation based on the temperature of an outdoor heat exchanger disposed in the outdoor unit and the outdoor temperature.

According to the aspect, the method of controlling the air conditioner may further include determining an end point of the defrosting operation during a defrosting operation and controlling the main fan and the auxiliary fan to be stopped when the current time point is the end point of the defrosting operation. The determining of the end point of the defrosting operation may include determining the end point of the defrosting operation based on the temperature of the outdoor heat exchanger disposed in the outdoor unit and the outdoor temperature. The determining of the end point of the defrosting operation may include determining the end point of the defrosting operation based on the time duration of the defrosting operation.

According to the aspect, the method of controlling the air conditioner may further include detecting an amount of dust in a filter portion disposed at a suction portion of the indoor unit and controlling the RPM of the auxiliary fan to be compensated based on the amount of dust in the filter portion.

According to the aspect, the method of controlling the air conditioner may further include checking the output of a first motor that applies a driving force to the main fan and controlling the RPM of the auxiliary fan to be compensated based on the checked output of the first motor.

According to the aspect, the method of controlling the air conditioner may further include checking the current of the first motor that applies a driving force to the main fan and controlling the RPM of the auxiliary fan to be compensated based on the checked current of the first motor.

According to the aspect, the method of controlling the air conditioner may include guiding the air drawn by the auxiliary fan toward the discharge portion of the indoor unit when the working mode is the normal mode and guiding the air drawn by the auxiliary fan toward the heat exchanger of the indoor unit when the working mode is the high speed mode.

According to the aspect, the method of controlling the air conditioner may include controlling the RPM of the auxiliary fan to be compensated based on the number of rotation of the main fan when the working mode is the high speed mode.

According to an aspect, an air conditioner includes a housing having a suction portion and a plurality of discharge portions, an airflow generation unit to generate a discharged airflow by discharging air drawn through the suction portion through the plurality of discharge portions, a plurality of airflow switching units disposed to change a state of the discharged airflow, and a control unit to control the state of a discharged airflow generated from at least one of the plurality of discharge portions to be differentiated from the states of the discharged airflows generated from remaining discharge portions while controlling the plurality of airflow switching units such that a position of the discharge portion from which the differentiated discharged airflow is generated cycles among the plurality of discharge portions.

According to the aspect, in the air conditioner, the plurality of airflow switching units may be formed with a plurality of fans that draw some of the air of the discharged airflows to change the direction of the discharged airflows.

According to the aspect, in the air conditioner, the controlling of the plurality of airflow switching units may be controlling the on/off state of at least one of the plurality of fans to be differentiated from that of each of the remaining fans.

According to the aspect, in the air conditioner, the controlling of the plurality of airflow switching units may control the RPM of at least one of the plurality of fans to be differentiated from that of each of the remaining fans.

According to the aspect, in the air conditioner, the controlling of the plurality of airflow switching units is controlling the on/off state and the RPM of at least one of the plurality of fans to be differentiated from those of the remaining fans.

According to the aspect, in the air conditioner, the plurality of airflow switching units may be a plurality of blades each installed at the plurality of discharge portions to have angles thereof adjusted within a predetermined range between an open state and a closed state to switch the direction of a discharged airflow in accordance with the adjusted angles.

According to the aspect, in the air conditioner, the controlling of the plurality of airflow switching units may be controlling the open/closed state of at least one of the plurality of blades to be differentiated from that of each of the remaining blades.

According to the aspect, in the air conditioner, the controlling of the plurality of airflow switching units may be controlling the fixed/swing state of at least one of the plurality of blades to be differentiated from that of each of the remaining blades.

According to the aspect, in the air conditioner, the controlling of the plurality of airflow switching units may be controlling the open/closed state and the fixed/swing state of at least one of the plurality of blades to be differentiated from those of each of the remaining blades.

According to the aspect, the air conditioner may further include a heat exchanger disposed in the housing to exchange heat with the air drawn through the suction portion, and the airflow generation unit may be disposed to discharge the air heat-exchanged by the heat exchanger through the plurality of discharge portions.

According to an aspect, a method of controlling an air conditioner includes generating a discharged airflow by discharging air drawn through a suction portion through a plurality of discharge portions using an airflow generation unit, changing the state of the discharged airflow using a plurality of airflow switching units, and controlling the state of a discharged airflow generated from at least one of the plurality of discharge portions to be differentiated from that of the discharged airflows generated from each of the remaining discharge portions while the plurality of airflow switching units are controlled such that a position of the discharge portion from which the differentiated discharged airflow is generated cycles among the plurality of discharge portions.

According to the aspect, in the method of controlling the air conditioner, the plurality of airflow switching units may be formed with a plurality of fans that change the direction of a discharged airflow by suctioning in some of the air of the discharged airflow.

According to the aspect, in the method of controlling the air conditioner, the controlling of the plurality of airflow switching units may be controlling the on/off state of at least one of the plurality of fans to be differentiated from that of each of the remaining fans.

According to the aspect, in the method of controlling the air conditioner, the controlling of the plurality of airflow switching units may be controlling RPM of at least one of the plurality of fans to be differentiated from that of each of the remaining fans.

According to the aspect, in the method of controlling the air conditioner, the controlling of the plurality of airflow switching units may be controlling the on/off state and RPM of at least one of the plurality of fans to be differentiated from those of each of the remaining fans.

According to the aspect, in the method of controlling the air conditioner, the plurality of airflow switching units may be a plurality of blades respectively installed at the plurality of discharge portions to have angles thereof adjusted within a predetermined range between an open state and a closed state to switch the direction of a discharged airflow in accordance with the adjusted angles.

According to the aspect, in the method of controlling the air conditioner, the controlling of the plurality of airflow switching units may be controlling the open/closed state of at least one of the plurality of blades to be differentiated from that of each of the remaining blades.

According to the aspect, in the method of controlling the air conditioner, the controlling of the plurality of airflow switching units may be controlling the fixed/swing state of at least one of the plurality of blades to be differentiated from that of each of the remaining blades.

According to the aspect, in the method of controlling the air conditioner, the controlling of the plurality of airflow switching units may be controlling the open/closed state and the fixed/swing state of at least one of the plurality of blades to be differentiated from those of each of the remaining blades.

According to the aspect, the method of controlling the air conditioner may further include exchanging heat with the air drawn through the suction portion by a heat exchanger, and the airflow generation unit may be disposed to discharge the air heat-exchanged by the heat exchanger through the plurality of discharge portions.

According to an aspect, an air conditioner includes a housing having a suction portion and a plurality of discharge portions, a first fan to generate a discharged airflow by discharging air drawn through the suction portion through the plurality of discharge portions, a plurality of second fans disposed to change the direction of the discharged airflow discharged through the plurality of discharge portions by suctioning in some of the air discharged through the plurality of discharge portions, and a control unit to control the direction of the discharged airflow generated from at least one of the plurality of discharge portions to be differentiated from directions of discharged airflows generated from the remaining discharge portions while controlling the plurality of second fans such that the position of the discharge portion from which the differentiated discharged airflow is generated cycles among the plurality of discharge portions.

According to an aspect, an air conditioner includes a housing having a suction portion and a plurality of discharge portions, a first fan to generate a discharged airflow by discharging air drawn through the suction portion through the plurality of discharge portions, a plurality of blades disposed to change the direction of the discharged airflow discharged through the plurality of discharge portions by suctioning in some of the air discharged through the plurality of discharge portions, and a control unit to control the direction of a discharged airflow generated from at least one of the plurality of discharge portions to be differentiated from the directions of discharged airflows generated from the remaining discharge portions while controlling the plurality of blades such that the position of the discharge portion from which the differentiated discharged airflow is generated cycles among the plurality of discharge portions.

According to an aspect, a method of controlling an air conditioner includes generating a discharged airflow by discharging air drawn through a suction portion through a plurality of discharge portions using an airflow generation unit, changing the state of the discharged airflow using a plurality of airflow switching units, controlling the airflow generation unit and each of the plurality of airflow switching units to be in one preset state when in a first mode, and, when in a second mode, controlling the state of a discharged airflow generated from at least one of the plurality of discharge portions to be differentiated from that of the discharged airflows generated from the remaining discharge portions while the plurality of airflow switching units are controlled such that the position of a discharge portion from which a differentiated discharged airflow is generated cycles among the plurality of discharge portions.

According to the aspect, in the method of controlling the air conditioner, the plurality of airflow switching units may be formed with a plurality of fans that change the direction of a discharged airflow by suctioning in some of the air of the discharged airflow.

According to the aspect, in the method of controlling the air conditioner, the controlling of the plurality of airflow switching units may be controlling the on/off state of at least one of the plurality of fans to be differentiated from that of each of the remaining fans.

According to the aspect, in the method of controlling the air conditioner, the controlling of the plurality of airflow switching units may be controlling RPM of at least one of the plurality of fans to be differentiated from that of each of the remaining fans.

According to the aspect, in the method of controlling the air conditioner, the controlling of the plurality of airflow switching units may be controlling the on/off state and RPM of at least one of the plurality of fans to be differentiated from those of each of the remaining fans.

According to the aspect, in the method of controlling the air conditioner, the plurality of airflow switching units may be a plurality of blades each installed at the plurality of discharge portions to have angles thereof adjusted within a predetermined range between an open state and a closed state to switch the direction of a discharged airflow in accordance with the adjusted angles.

According to the aspect, in the method of controlling the air conditioner, the controlling of the plurality of airflow switching units may be controlling an open/closed state of at least one of the plurality of blades to be differentiated from that of each of the remaining blades.

According to the aspect, in the method of controlling the air conditioner, the controlling of the plurality of airflow switching units may be controlling a fixed/swing state of at least one of the plurality of blades to be differentiated from that of each of the remaining blades.

According to the aspect, in the method of controlling the air conditioner, the controlling of the plurality of airflow switching units may be controlling the open/closed state and the fixed/swing state of at least one of the plurality of blades to be differentiated from those of each of the remaining blades.

According to the aspect, the method of controlling the air conditioner may further include exchanging heat with the air drawn through the suction portion by a heat exchanger, and the airflow generation unit may be disposed to discharge the air heat-exchanged by the heat exchanger through the plurality of discharge portions.

According to an aspect, an air conditioner includes a housing having a suction portion and a plurality of discharge portions, an airflow generation unit to generate a discharged airflow by discharging air drawn through the suction portion through the plurality of discharge portions, a plurality of airflow switching units disposed to change the direction of the discharged airflow, and a control unit to control the airflow generation unit and the plurality of airflow switching units, wherein the control unit controls the airflow generation unit and each of the plurality of airflow switching units to be in one preset state when in a first mode and controls the state of a discharged airflow generated from at least one of the plurality of discharge portions to be differentiated from the states of the discharged airflows generated from the remaining discharge portions while controlling the plurality of airflow switching units such that the position of the discharge portion from which the differentiated discharged airflow is generated cycles among the plurality of discharge portions when in a second state.

According to an aspect, an air conditioner includes a housing supported from a ceiling, a discharge cover disposed at a lower portion of the housing and configured to form a suction port and a circular discharge port disposed adjacent to the suction port, a heat exchanger disposed in the housing, a main fan disposed to draw air through the suction port, pass the air through the heat exchanger to heat-exchange the air, and discharge the heat-exchanged air through the discharge port, and a display unit disposed on the discharge port and configured to have one portion thereof disposed at an upper portion of the discharge cover to be supported by the discharge cover.

According to the aspect, the housing of the air conditioner may further include a bridge disposed adjacent to the discharge port and configured to extend along the circumferential direction of the discharge port, and the display unit may be disposed at a lower portion of the bridge.

According to the aspect, the display unit of the air conditioner may include a display disposed at the lower portion of the bridge and configured to display information and a display cover disposed at a lower portion of the display to encompass the lower portion of the display and configured to have one portion disposed at the upper portion of the discharge cover to be supported by the discharge cover.

According to the aspect, the one portion of the display cover of the air conditioner may be formed in a shape corresponding to that of an outer circumferential surface of the discharge cover.

According to the aspect, a portion of the discharge cover that supports the display cover of the air conditioner may be formed to be bent toward a radial outer portion of the discharge port.

According to the aspect, a portion of the display cover of the air conditioner on which the display is seated may include a fixing groove in which the display is seated and fixed.

According to the aspect, from one portion of the display unit of the air conditioner, the other portion on opposite side may be fixed to the housing by a fixing member.

According to the aspect, the other portion of the display unit of the air conditioner may be fixed to the housing by screw coupling.

According to the aspect, the other portion of the display unit of the air conditioner may be fixed to the housing by snap fitting.

According to the aspect, the discharge cover of the air conditioner may be fixed to the housing.

According to the aspect, the air conditioner may further include an airflow control unit to draw air around the discharge port of the air conditioner to control an airflow of air discharged through the discharge port, the airflow control unit may include an inlet to draw the air around the discharge port and an outlet to discharge the air drawn through the inlet, and the other portion of the display unit may be inserted into one portion of the inlet and fixed by snap fitting.

According to the aspect, the housing of the air conditioner may include an upper housing, a middle housing disposed at a lower portion of the upper housing, and a lower housing disposed at a lower portion of the middle housing, and the other portion of the display unit may be coupled to the lower housing and the middle housing by screw coupling.

According to the aspect, the display unit of the air conditioner may include a curved guide surface portion to guide the air discharged through the discharge port to be spread along the circumferential direction of the discharge port.

According to the aspect, the display unit of the air conditioner may further include a communication unit capable of transmitting and receiving information to and from an external device.

According to the aspect, the display unit of the air conditioner may further include an input unit through which a user may input a command.

According to an aspect, an air conditioner may include an upper housing supported from a ceiling, a lower housing disposed at a lower portion of the upper housing, a discharge cover disposed at a lower portion of the lower housing to form a suction port and a circular discharge port disposed adjacent to the suction port together with the lower housing, a heat exchanger disposed in the upper housing, a main fan disposed to draw air through the suction port, pass the air through the heat exchanger to heat-exchange the air, and discharge the heat-exchanged air through the discharge port, and a display disposed on the discharge port and configured to display information, wherein a display cover extending in the radial direction of the discharge port to surround a portion of a lower portion of the display may be integrally formed with the discharge cover.

According to the aspect, the radial outer portion of the discharge port of the display cover of the air conditioner may be fixed to the lower housing by screw coupling.

According to the aspect, the radial outer portion of the discharge port of the display cover of the air conditioner may be fixed to the lower housing by snap fitting.

According to an aspect, an air conditioner includes a housing supported from a ceiling, a discharge cover disposed at a lower portion of the housing and configured to form a suction port and a circular discharge port disposed adjacent to the suction port together with the housing, a heat exchanger disposed in the housing, a main fan disposed to draw air through the suction port, pass the air through the heat exchanger to heat-exchange the air, and discharge the heat-exchanged air through the discharge port, and a display unit disposed on the discharge port and configured to display information, wherein one portion of the display unit may be formed in a shape corresponding to that of the outer circumferential surface of the discharge cover to be supported by the discharge cover, and the other portion of the display unit may be fixed to the lower portion of the housing by screw coupling.

According to the aspect, a portion of the outer circumferential surface of the discharge cover of the air conditioner may be formed to be bent to support the display unit.

According to an aspect, an air conditioner includes a housing configured to form an exterior of an indoor unit and have a suction port and a discharge port, a heat exchanger disposed in the housing, a main fan disposed to draw air through the suction port, heat-exchange the drawn air in the heat exchanger, and discharge the heat-exchanged air through the discharge port, an auxiliary fan to draw air around the discharge port to control a direction of a discharged airflow, and a control unit to display the direction of the discharged airflow through a display portion.

According to the aspect, the control unit of the air conditioner may further include controlling the driven speed of the auxiliary fan to control the direction of the discharged airflow and displaying the controlled direction of the discharged airflow on the display portion.

According to the aspect, the display portion of the air conditioner may display the direction of the discharged airflow using a plurality of optical patterns, and the control unit may selectively turn on the plurality of optical patterns to display the state in which the direction of the discharged airflow is controlled to be vertical, horizontal, or in the middle.

According to the aspect, the optical patterns of the air conditioner may Include a plurality of light-emitting units formed in the shape of a circular band, and the plurality of light-emitting units may include a first light-emitting unit to display a state in which the direction of the discharged airflow is controlled to be vertical, a second light-emitting unit to display a state in which the direction of the discharged airflow is controlled to be horizontal, and a third light-emitting unit to display a state in which the direction of the discharged airflow is controlled to be in the middle which is the middle between the vertical airflow and the horizontal airflow.

According to the aspect, the optical patterns of the air conditioner may include a plurality of light-emitting units formed in the shape of a rod-like band, and the plurality of light-emitting units may include a first light-emitting unit to display a state in which the direction of the discharged airflow is controlled to be vertical, a second light-emitting unit to display a state in which the direction of the discharged airflow is controlled to be horizontal, and a third light-emitting unit to display a state in which the direction of the discharged airflow is controlled to be in the middle which is the middle between the vertical airflow and the horizontal airflow.

According to the aspect, the control unit of the air conditioner may sequentially turn on the first light-emitting unit to the third light-emitting unit to display a state in which the direction of the discharged airflow is controlled to be automatic.

According to the aspect, preferably, the air conditioner includes a plurality of discharge ports, and the display portion is disposed at at least one of the plurality of discharge ports.

According to the aspect, the display portion of the air conditioner may be disposed at one portion of the discharge port and may display the direction of the discharged airflow using the plurality of optical patterns.

According to the aspect, the air conditioner may further include an input device to input a user command for setting an operation of the air conditioner, and the control unit may control the driven speed of the auxiliary fan according to the set operation in order to control the direction of the discharged airflow.

According to the aspect, the air conditioner may further include the input device to input a user command for setting an operation of the air conditioner, and the control unit may change the direction of the discharged airflow displayed on the display portion according to the set operation.

According to the aspect, the air conditioner may further include the input device to input a user command for setting an operation of the air conditioner, and the display portion may display the direction of the discharged airflow changed according to the set operation.

According to the aspect, the control unit of the air conditioner may further include controlling a driven speed of the main fan to control the strength of the discharged airflow and displaying the controlled strength of the discharged airflow on the display portion.

According to the aspect, the display portion of the air conditioner may display the strength of the discharged airflow using a plurality of light sources, and the control unit may selectively turn on the plurality of light sources to display a state in which the strength of the discharged airflow is controlled to be strong, medium, or weak.

According to the aspect, the plurality of light sources of the air conditioner may form arc-shaped optical patterns.

According to the aspect, the plurality of light sources of the air conditioner may form optical patterns in the shape of a rod-like band.

According to the aspect, the air conditioner may further include the input device to input a user command for setting an operation of the air conditioner, and the control unit may control the driven speed of the main fan according to the set operation in order to control the strength of the discharged airflow.

According to the aspect, the air conditioner may further include the input device to input a user command for setting an operation of the air conditioner, and the control unit may change the strength of the discharged airflow displayed on the display portion according to the set operation.

According to the aspect, the air conditioner may further include the input device to input a user command for setting an operation of the air conditioner, and the display portion may display the strength of the discharged airflow changed according to the set operation.

According to an aspect, a method of controlling an air conditioner that includes a housing having a suction port and a discharge port, a heat exchanger disposed in the housing, a main fan disposed to draw air through the suction port, heat-exchange the drawn air in the heat exchanger, and discharge the heat-exchanged air through the discharge port, and an auxiliary fan to draw air around the discharge port to control a direction of a discharged airflow, the method including receiving an operation command for setting a direction of a discharged airflow, controlling the driven speed of the auxiliary fan according the input operation command to control the direction of the discharged airflow, and displaying the controlled direction of the discharged airflow through a display portion.

According to the aspect, the method may further include receiving an operation command for changing the direction of the discharged airflow and changing the direction of the discharged airflow displayed on the display portion according to the input operation command.

According to the aspect, the displaying of the direction of the discharged airflow of the method may be selectively turning on a plurality of optical patterns disposed on the discharge port to display a state in which the direction of the discharged airflow is controlled to be vertical, horizontal, or in the middle.

According to the aspect, the method may further include receiving an operation command for setting the strength of a discharged airflow, controlling a driven speed of the main fan according the input operation command to control the strength of the discharged airflow, and displaying the controlled strength of the discharged airflow on the display portion.

According to the aspect, the method may further include receiving an operation command for changing the strength of the discharged airflow and changing the strength of the discharged airflow displayed on the display portion according to the input operation command.

According to the aspect, the displaying of the strength of the discharged airflow of the method may be selectively turning on a plurality of light sources disposed on the discharge port to display a state in which the strength of the discharged airflow is controlled to be strong, medium, or weak.

BRIEF DESCRIPTION OF THE DRAWINGS

These and/or other aspects of the present disclosure will become apparent and more readily appreciated from the following description of the embodiments, taken in conjunction with the accompanying drawings of which:

FIGS. 17A and 17B part (a) to part (c) are views illustrating an embodiment of forming various airflow patterns by variably controlling RPM of a plurality of second fans disposed in an indoor unit of an air conditioner;

FIGS. 18A and 18B part (a) to part (c) are views illustrating an embodiment of forming variable airflow patterns by variably controlling turning on or off a plurality of second fans disposed in an indoor unit of an air conditioner;

FIGS. 37A and 37B part (a) to part (d) are views illustrating an embodiment of forming variable airflow patterns by variably controlling swinging/fixing of a plurality of blades disposed in an indoor unit of an air conditioner;

FIGS. 38A and 38B part (a) to part (d) are views illustrating an embodiment of forming variable airflow patterns by variably controlling opening/closing of a plurality of blades disposed in an indoor unit of an air conditioner;

DETAILED DESCRIPTION

Figure 1:
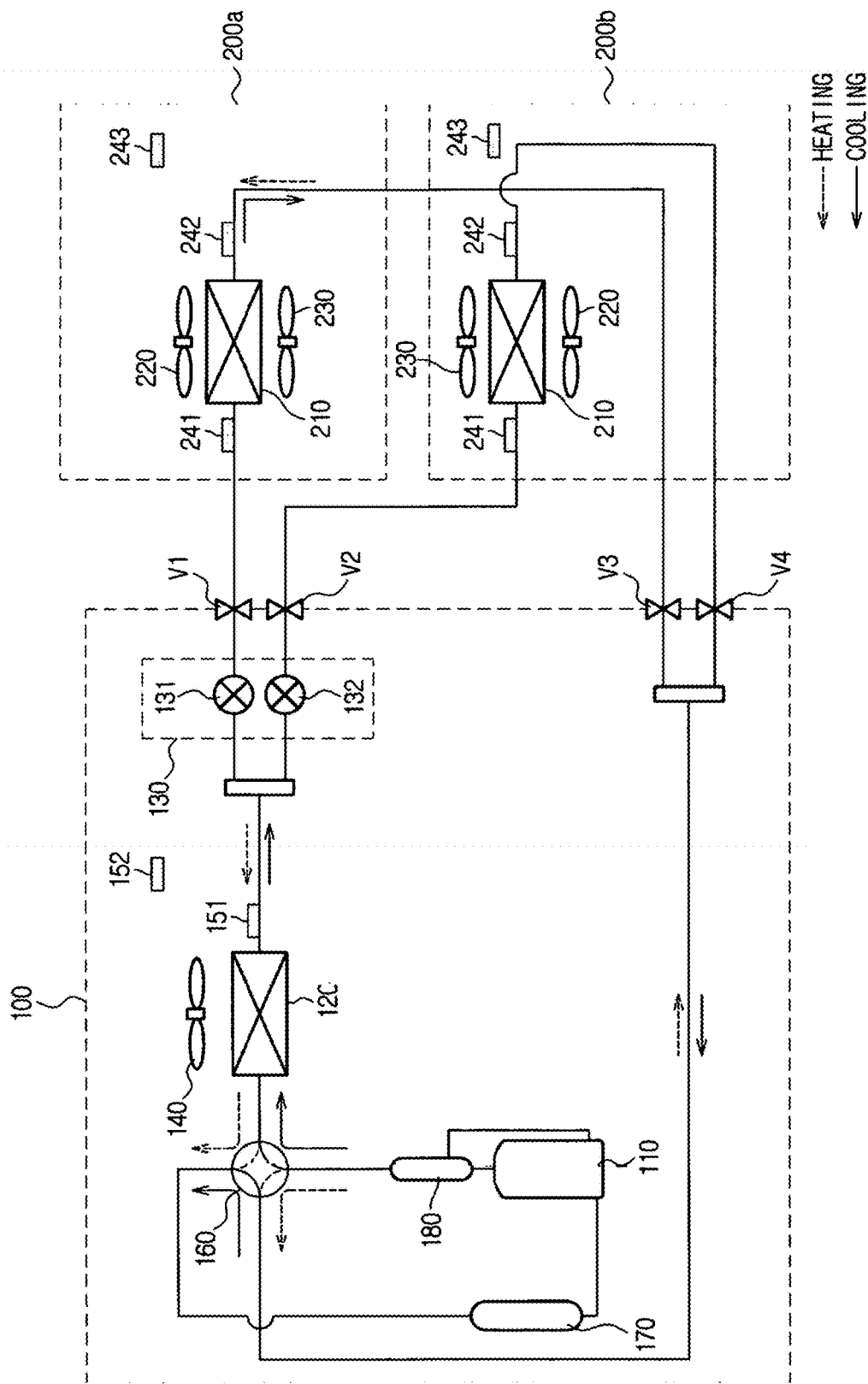
FIG. 1 is a block diagram of a refrigeration cycle of an air conditioner that performs a cooling operation and a heating operation.

Reference will now be made in detail to the embodiments, examples of which are illustrated in the accompanying drawings, wherein like reference numerals refer to like elements throughout. The embodiments are described below to explain the present disclosure by referring to the figures.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Figure 66:
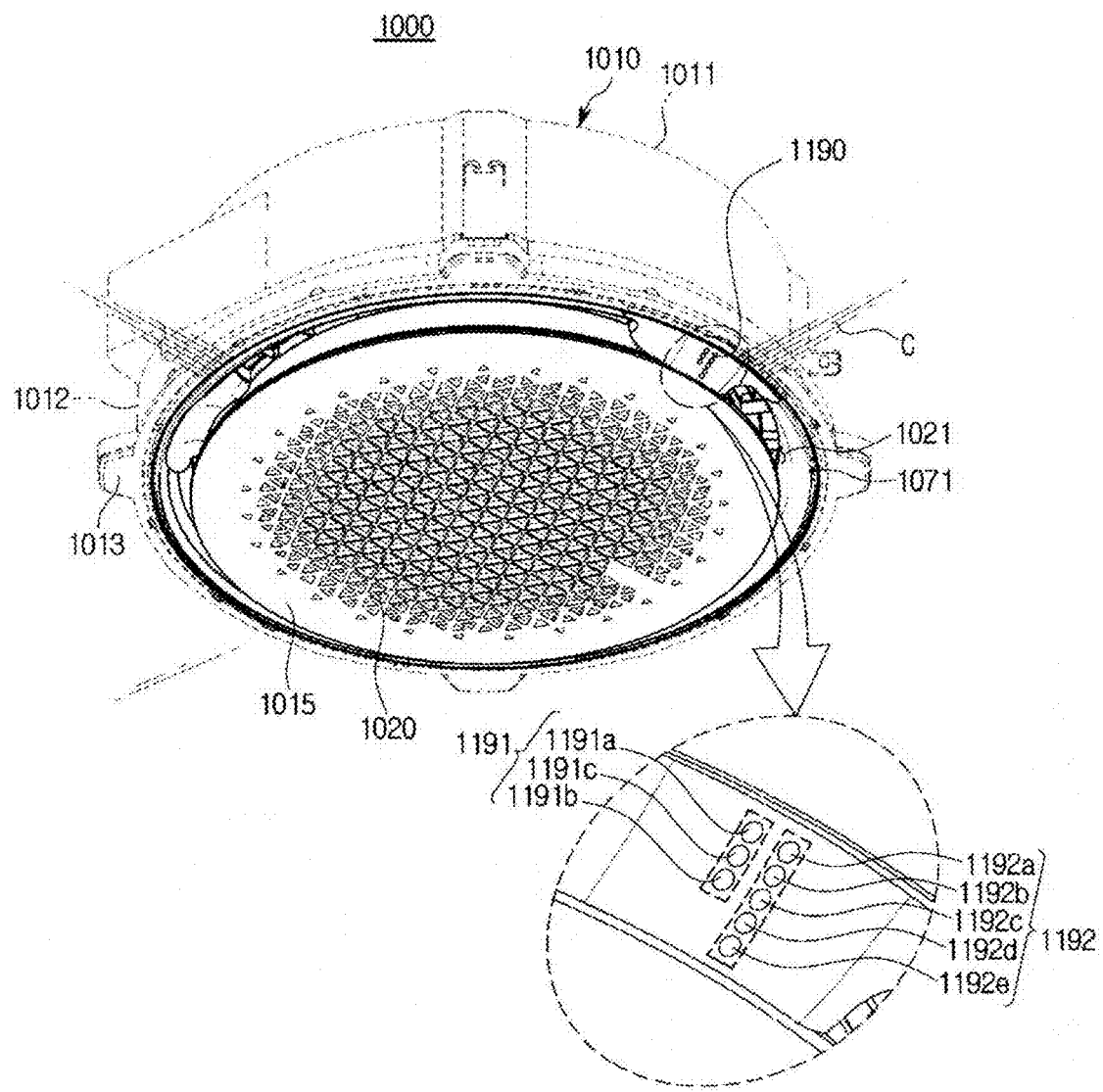
FIG. 66 is a perspective view illustrating an indoor unit of an air conditioner according to an embodiment.

FIGS. 1 through 66, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged washing machine technologies. Hereinafter, an embodiment of the present disclosure will be described in detail with reference to the accompanying drawings.

FIG. 1 is a block diagram of a refrigeration cycle of an air conditioner that performs a cooling operation and a heating operation.

As illustrated in FIG. 1, an air conditioner 1 is an apparatus capable of both a cooling operation for cooling a plurality of air-conditioned spaces and a heating operation for heating the plurality of air-conditioned spaces. The air conditioner 1 includes at least one outdoor unit 100 and a plurality of indoor units 200a and 200b.

The outdoor unit 100 includes a compressor 110, an outdoor heat exchanger 120, an expansion valve 130, an outdoor fan 140, a first detection unit 150, a four-way valve 160, an accumulator 170, and an oil separator 180. The plurality of indoor units 200a and 200b each include an indoor heat exchanger 210, a main fan 220, an auxiliary fan 230, and a second detection unit 240. Refrigerant tubes connect the outdoor unit 100 to the indoor units 200a and 200b, and refrigerant circulates through the refrigerant tubes.

The compressor 110 compresses refrigerant and discharges the compressed refrigerant in a high-temperature, high-pressure gaseous state. For example, during a cooling operation, the compressor 110 discharges the refrigerant in a high-temperature, high-pressure gaseous state to the outdoor heat exchanger 120.

The outdoor heat exchanger 120 performs a heat exchange between the refrigerant and outdoor air. For example, during a cooling operation, the outdoor heat exchanger 120 condenses refrigerant introduced from the compressor 110 by emitting heat. Here, the phase of the refrigerant a high-temperature, high-pressure gaseous state is converted to become refrigerant in a high-temperature, high-pressure liquid state.

The expansion valve 130 includes a first expansion valve 131 and a second expansion valve 132.

The first expansion valve 131 and the second expansion valve 132 distribute refrigerant supplied from the outdoor heat exchanger 120 through a first distribution tube to supply the distributed refrigerant to the first indoor unit 200a and the second indoor unit 200b, respectively. Here, the first expansion valve 131 and the second expansion valve 132 may also serve as a flow control valve whose opening may be controlled for controlling the flow of the refrigerant supplied to the first indoor unit 200a and the second indoor unit 200b. The first expansion valve 131 may connect the outdoor heat exchanger 120 to the indoor heat exchanger 210 of the first indoor unit 200a to control the flow of the refrigerant supplied to the first indoor unit 200a, and the second expansion valve 132 may connect the outdoor heat exchanger 120 to the indoor heat exchanger 210 of the second indoor unit 200b to control the flow of the refrigerant supplied to the second indoor unit 200b.

During a cooling operation, the expansion valve 130 drops the pressure and the temperature of the refrigerant introduced from the outdoor heat exchanger 120. In other words, the refrigerant that has passed through the expansion valve 130 is changed from the high-temperature, high-pressure liquid state to a low-temperature, low-pressure liquid state. The expansion action of the expansion valve 130 allows the refrigerant to be easily evaporated in the indoor heat exchangers 210 of the plurality of indoor units 200a and 200b. Also, the refrigerant with the pressure and the temperature thereof dropped is transferred to the indoor heat exchangers 210. Here, the expansion valve 130 may also be implemented using a capillary tube.

The outdoor fan 140 is provided at one portion of the outdoor heat exchanger 120 and rotates by a fan motor to assist in heat-exchanging in order to forcibly blow air around the outdoor heat exchanger 120.

The first detection unit 150 includes a first temperature detection unit 151 to detect the temperature of the outdoor heat exchanger 120 and a second temperature detection unit 152 to detect an outdoor temperature around the outdoor unit 100. Here, the first temperature detection unit 151 may be disposed at an output side of the outdoor heat exchanger 120, may also be disposed at an input side of the outdoor heat exchanger 120, and may also be disposed at the middle between the outdoor heat exchanger 120.

The outdoor unit 100 further includes a second distribution tube to gather the refrigerant supplied from each of the first indoor unit 200a and the second indoor unit 200b and supply the refrigerant to the compressor 110. Here, a distributor having a valve may also be used instead of the first distribution tube and the second distribution tube.

The four-way valve 160 is a flow switching valve to switch the direction of a refrigerant flow depending on the operation, cooling or heating. During the heating operation, the four-way valve 160 may guide the high-temperature, high-pressure refrigerant discharged from the compressor 110 to the first indoor unit 200a and the second indoor unit 200b and guide the low-temperature, low-pressure refrigerant of the outdoor heat exchanger 120 to the accumulator 170. Here, the outdoor heat exchanger 120 serves as an evaporator, and the first indoor heat exchanger 210 of the first indoor unit 200a and the second indoor heat exchanger 210 of the second indoor unit 200b serve as a condenser.

In addition, during the cooling operation, the four-way valve 160 may guide the high-temperature, high-pressure refrigerant discharged from the compressor 110 to the outdoor heat exchanger 120 and guide the low-temperature, low-pressure refrigerant of the first indoor unit 200a and the second indoor unit 200b to the accumulator 170. Here, the outdoor heat exchanger 120 serves as a condenser, and the first indoor unit 200a and the second indoor unit 200b serve as an evaporator.

The accumulator 170 is disposed at a suctioning side of the compressor 110 to separate un-gasified refrigerant in a liquid state from the refrigerant being introduced into the compressor 110 to prevent the refrigerant in the liquid state from being discharged to the compressor 110. By this, the compressor 110 may be prevented from being damaged.

The oil separator 180 separates oil mixed with vapor of the refrigerant discharged from the compressor 110 and returns the oil to the compressor 110. This way, an oil film is formed on surfaces of the outdoor heat exchanger 120 and the indoor heat exchangers 210, thereby preventing a heat transfer effect from being degraded and preventing a lubricating action from being degraded due to a lack of lubricating oil in the compressor 110.

The air conditioner 1 further includes connection valves v1, v2, v3, and v4 to connect the refrigerant tube of the outdoor unit 100 to the refrigerant tubes of the first indoor unit 200a and the second indoor unit 200b.

The first indoor unit 200a and the second indoor unit 200b are the same devices, and the first indoor unit 200a and the second indoor unit 200b each include the indoor heat exchanger 210, the main fan 220, the auxiliary fan 230, and the second detection units 240.

The indoor heat exchangers 210 of the first and second indoor units 200a and 200b are each disposed in the air-conditioned space. During the cooling operation, the indoor heat exchangers 210 exchange heat with air of the air-conditioned space by heat absorption caused by evaporation of the refrigerant introduced from the first and second expansion valves 131 and 132. Here, the phase of the refrigerant in the low-temperature, low-pressure liquid state is converted to become refrigerant in a low-temperature, low-pressure gaseous state.

The main fan 220 is disposed in the indoor heat exchanger 210. The main fan 220 rotates by a first motor to draw air from the air-conditioned space and forcibly blow the air heat-exchanged in the indoor heat exchanger 210 to the air-conditioned space.

The auxiliary fan 230 is disposed in the indoor heat exchanger 210. The auxiliary fan 230 rotates by a second motor to draw some air discharged to the air-conditioned space, thereby adjusting the direction in which air discharged to the air-conditioned space flows.

The second detection unit 240 includes a third temperature detection unit 241 to detect a temperature of a refrigerant tube connected to an inlet of the indoor heat exchanger 210 of the refrigerant tubes connected to the indoor heat exchanger 210, a fourth temperature detection unit 242 to detect a temperature of a refrigerant tube connected to an outlet of the indoor heat exchanger 210 of the refrigerant tubes connected to the indoor heat exchanger 210, and a fifth temperature detection unit 243 disposed in the indoor unit 200 to detect the temperature of the air-conditioned space. Here, the temperatures of the inlet and the outlet of the indoor heat exchanger 210 respectively detected by the third temperature detection unit 241 and the fourth temperature detection unit 242 may be used in controls for overheating or overcooling.

During the heating operation, the air conditioner 1 switches flow passages of the four-way valve 160 to guide the high-temperature, high-pressure refrigerant discharged from the compressor 110 to the indoor heat exchanger 210 and guides the low-temperature, low-pressure refrigerant of the indoor units 200a and 200b to the accumulator 170. Here, the outdoor heat exchanger 120 serves as an evaporator, and the indoor heat exchanger 210 serves as a condenser.

During the heating operation, a phenomenon in which condensate is formed on the surface of the outdoor heat exchanger occurs in the air conditioner, and for this, a defrosting mode for removing the frost on the outdoor heat exchanger is performed. Here, the defrosting mode is a mode of removing frost on the outdoor heat exchanger by heat emitted from the outdoor heat exchanger due to operating in a cycle for the cooling operation to allow the outdoor heat exchanger to serve as a condenser.

The air conditioner may further include a driving module to control the indoor unit and the outdoor unit based on the cooling operation, the heating operation, and the operation modes. The configuration of the driving module will be described below.

In addition, the air conditioner may further include a user interface disposed in the indoor unit 200 or a remote controller (not shown) to receive a command from a user and output operation information. Here, the remote controller may be provided as a wired type or a wireless type.

In the above, the multi-type air conditioner capable of cooling and heating has been described. However, the multi-type air conditioner capable of cooling and heating is merely an example of an air conditioner, and a single-type air conditioner only capable of cooling or a single-type air conditioner capable of cooling and heating are not excluded.

Figure 2:
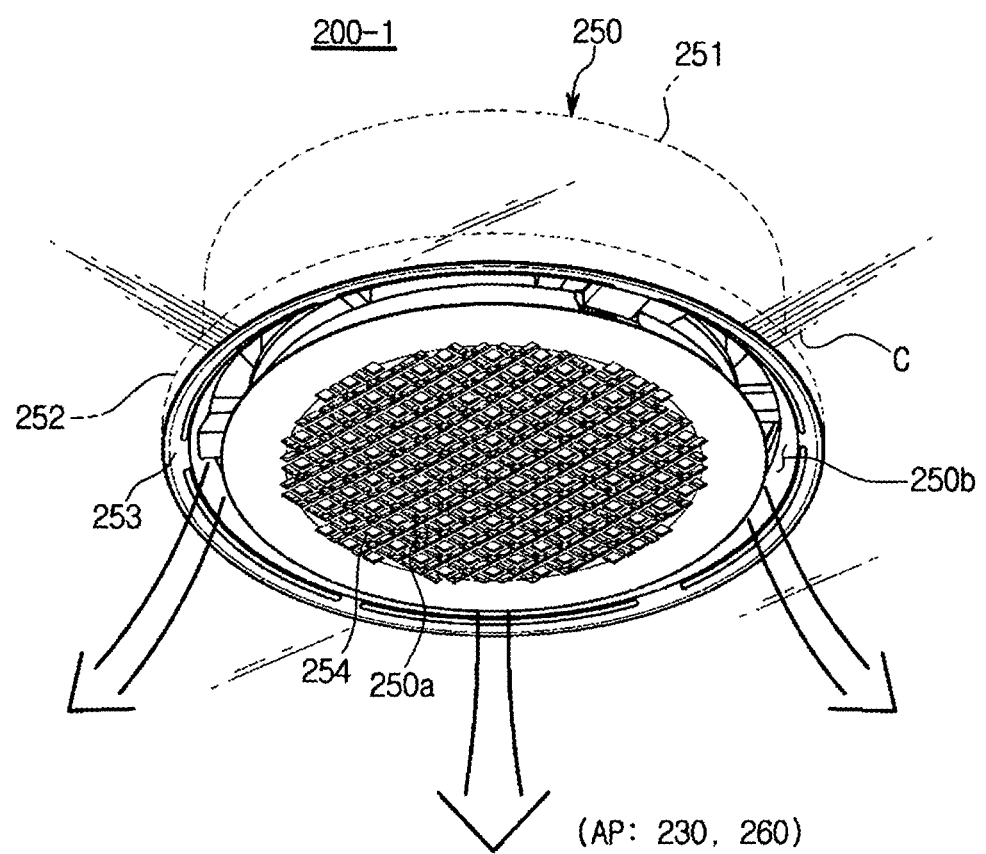
FIG. 2 is an exemplary view of an indoor unit of an air conditioner according to an embodiment.

FIG. 2 is an exemplary view of an indoor unit 200-1 of an air conditioner according to an embodiment and is an exemplary view of a ceiling-mounted indoor unit formed in a circular shape and installed on a ceiling.

As illustrated FIG. 2, the indoor unit 200-1 may be fixed and installed while at least a portion thereof is buried into a ceiling C.

The indoor unit 200-1 includes a housing 250 having a suction portion 250a and a discharge portion 250b. Here, the housing 250 has a nearly circular shape when a surface of the ceiling is viewed in the vertical direction. Also, the housing 250 includes a first housing 251 disposed in the ceiling C, a second housing 252 coupled to a lower portion of the first housing 251, and a third housing 253 coupled to a lower portion of the second housing 252.

The suction portion 250a including a plurality of suctioning holes may be disposed at a central portion of the third housing 253 to draw air. A filter portion 254 for filtering dust within air drawn into the suction portion 250a may be disposed at the suction portion 250a. The discharge portion 250b including a plurality of discharging holes through which air is discharged may be disposed at an outer portion of the suction portion 250a. The discharge portion 250b may have a nearly circular shape when viewed in the vertical direction toward the surface of the ceiling.

Figure 3:
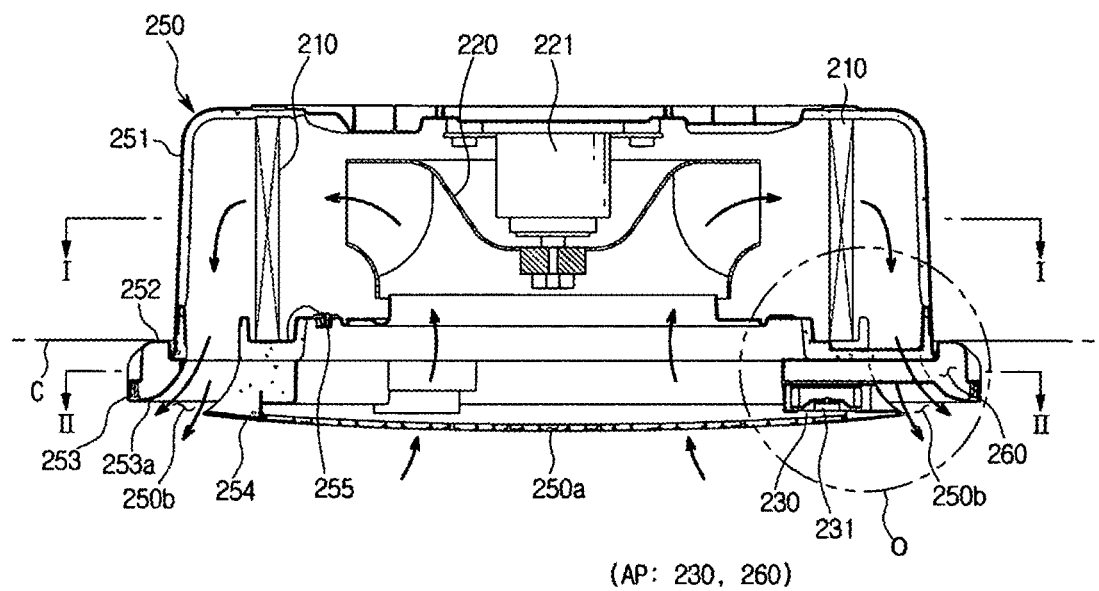
FIG. 3 is a side cross-sectional view of the indoor unit illustrated in FIG. 2.

FIG. 3 is a side cross-sectional view of the indoor unit illustrated in FIG. 2.

As illustrated in FIG. 3, the filter portion 254 for filtering dust within the air drawn into the suction portion 250a may be disposed on a bottom surface of the third housing 253.

In addition, the third housing 253 may have a Coanda curved surface portion 253a to guide air discharged through the discharge portion 250b. The air discharged through the discharge portion 250b flows along a surface of the Coanda curved surface portion 253a by the Coanda effect, and due to this, a an airflow direction is determined by the form of the surface of the Coanda curved surface portion 253a. In other words, when the slope of the Coanda curved surface portion 253 is gentle, an angle of the discharged airflow is also gentle. Conversely, when the slope of the Coanda curved surface portion 253 is steep, the angle of the discharged airflow also becomes greater.

The indoor unit 200-1 in the above structure suctions in the air of the air-conditioned space from the lower portion, heat-exchanges the air, and discharges the air again to the lower portion. Here, the indoor unit 200-1 may draw the air from which dust is filtered by the filter portion 254. Also, the indoor unit 200-1 may guide the air discharged through the discharge portion 250b to flow while in close contact with the Coanda curved surface portion 253a.

The indoor unit 200-1 includes the indoor heat exchanger 210 disposed in the housing 250, the main fan 220 and the auxiliary fan 230 to flow air, and a flow passage portion 260.

The indoor heat exchanger 210 may be placed on a tray 255 disposed in the housing 250. The tray 255 stores the condensate generated in the indoor heat exchanger 210. The indoor heat exchanger 210 may have a nearly circular shape when viewed in the vertical direction toward the surface of the ceiling.

Figure 4:
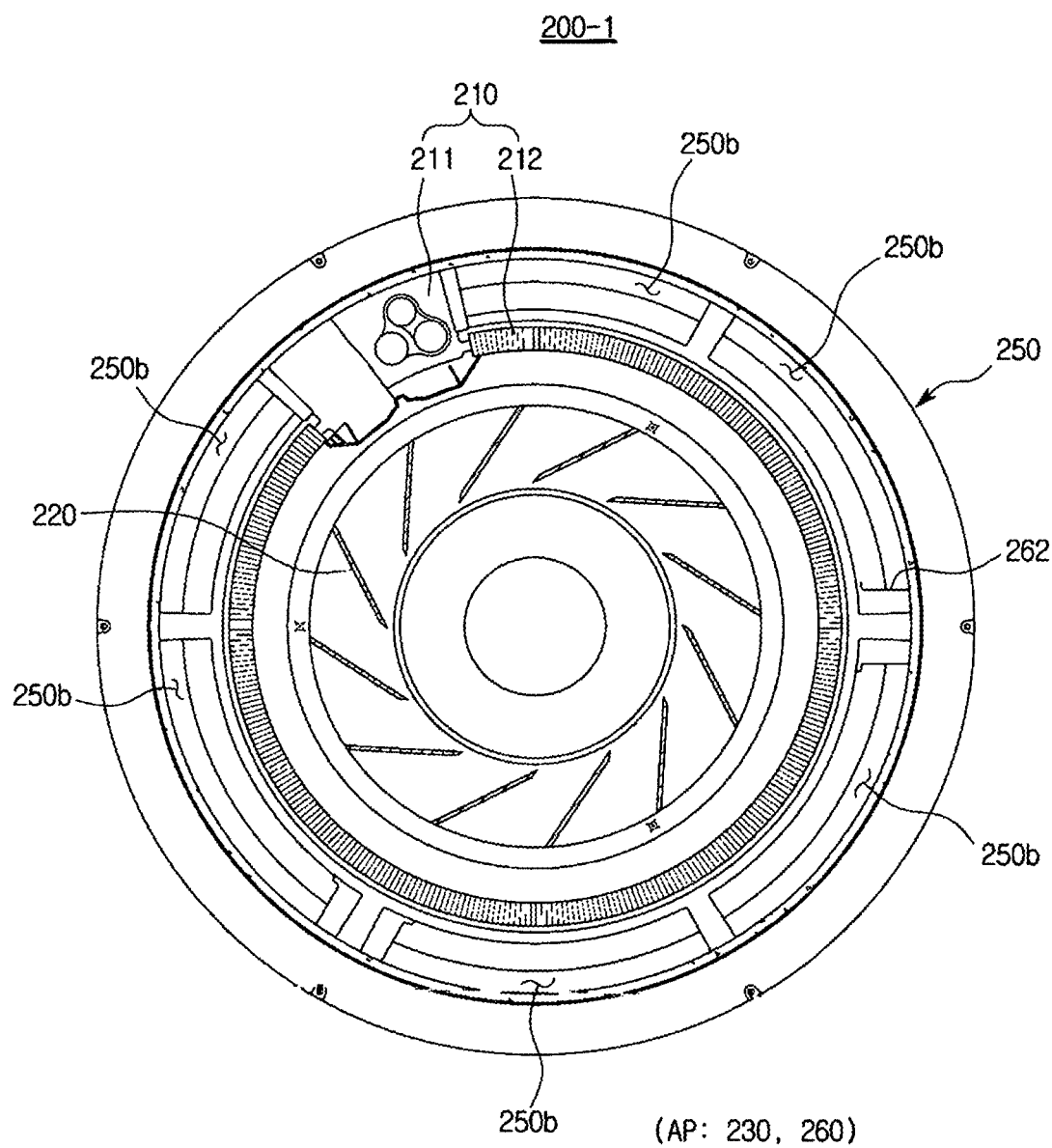
FIG. 4 is a plan cross-sectional view taken along line I-I of FIG. 3.

FIG. 4 is a plan cross-sectional view taken along line I-I of FIG. 3. As illustrated in FIG. 4, the indoor heat exchanger 210 includes a tube 212 through which refrigerant flows and a header 211 connected to an external refrigerant tube to supply or recover the refrigerant to or from the tube 212. A heat exchange fin may be disposed in the tube 212 to expand a heat dissipation area. The tube 212 may have a circular shape.

The main fan 220 may be disposed in a radial inner portion of the indoor heat exchanger 210. The main fan 220 may be a centrifugal fan that suctions in air in a rotation axis direction to discharge the air in the radial direction. The indoor unit 200-1 may include the first motor (221 in FIG. 3) to transmit a driving force to the main fan 220.

The indoor unit 200-1 further includes airflow control units (AP, refer to 230 and 260 of FIG. 3) for controlling the airflow direction. At least one of the airflow control units AP may be disposed in the housing, or a plurality thereof may be disposed in predetermined intervals. This embodiment is a case in which three airflow control units AP are disposed at intervals of 120°.

The airflow control unit AP may draw air around the discharge portion 250b. When suctioning in air around the discharge portion 250b, the airflow control units AP may draw air from one direction off of the direction of the discharged airflow. The airflow control units AP may include at least one auxiliary fan 230 and flow passage portion 260, and a second motor 231 to provide a driving force to the at least one auxiliary fan 230.

Figure 5:
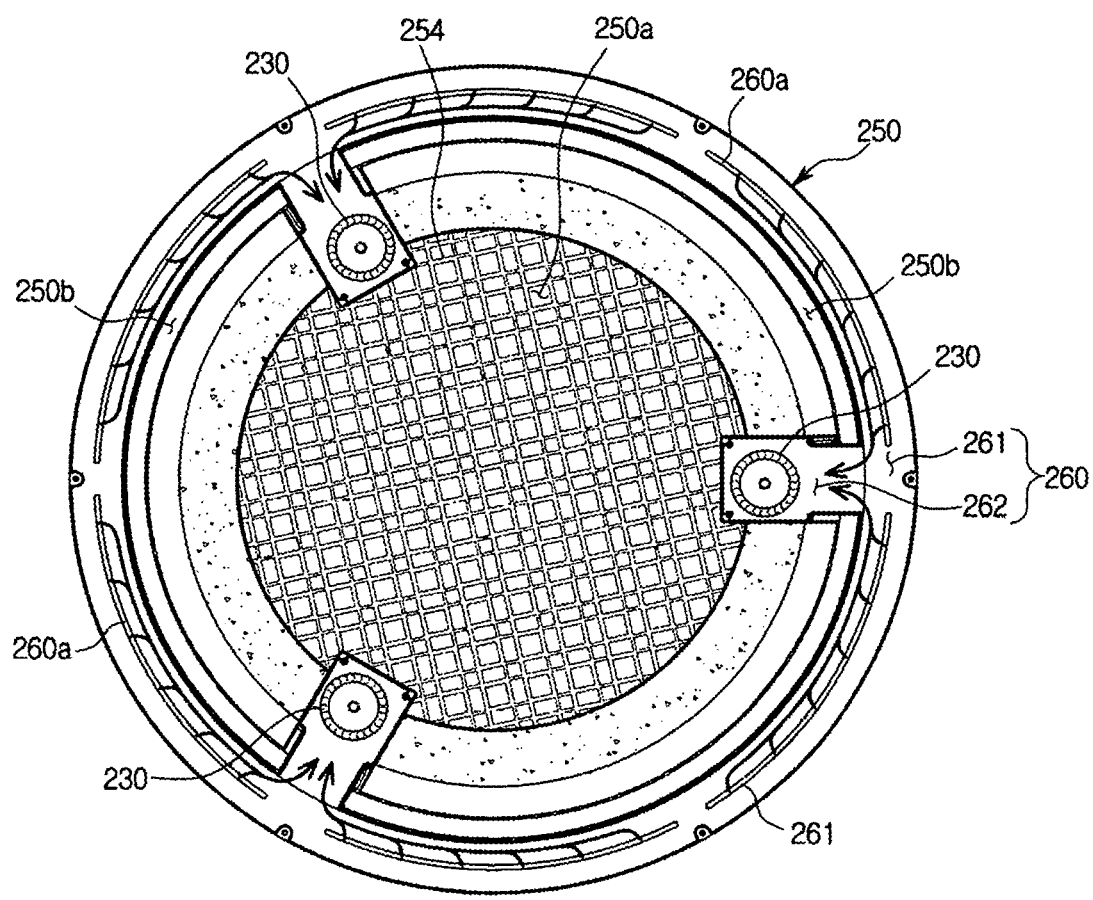
FIG. 5 is a plan cross-sectional view taken along line II-II of FIG. 3.

FIG. 5 is a plan cross-sectional view taken along line II-II of FIG. 3. As illustrated in FIG. 5, the auxiliary fan 230 generates a suctioning force for suctioning in the air around the discharge portion 250b. Also, the surrounding air is drawn by the suctioning force, and the pressure of the air changes. Furthermore, the auxiliary fan 230 changes a pattern of the airflow discharged through the discharge portion 250b to form various forms of airflow patterns.

The flow passage portion 260 forms a flow passage through which drawn air flows. That is, the flow passage portion 260 guides the flow of the drawn air.

The plurality of auxiliary fans 230 have the same structure, and thus only one auxiliary fan 230 will be described. Although a centrifugal fan is used as the auxiliary fan 230 in this embodiment, the auxiliary fan 230 is not limited thereto, and various fans including an axial-flow fan, a cross-flow fan, a mixed-flow fan, etc. may be used as the auxiliary fan 230 depending on design specifications.

Figure 6:
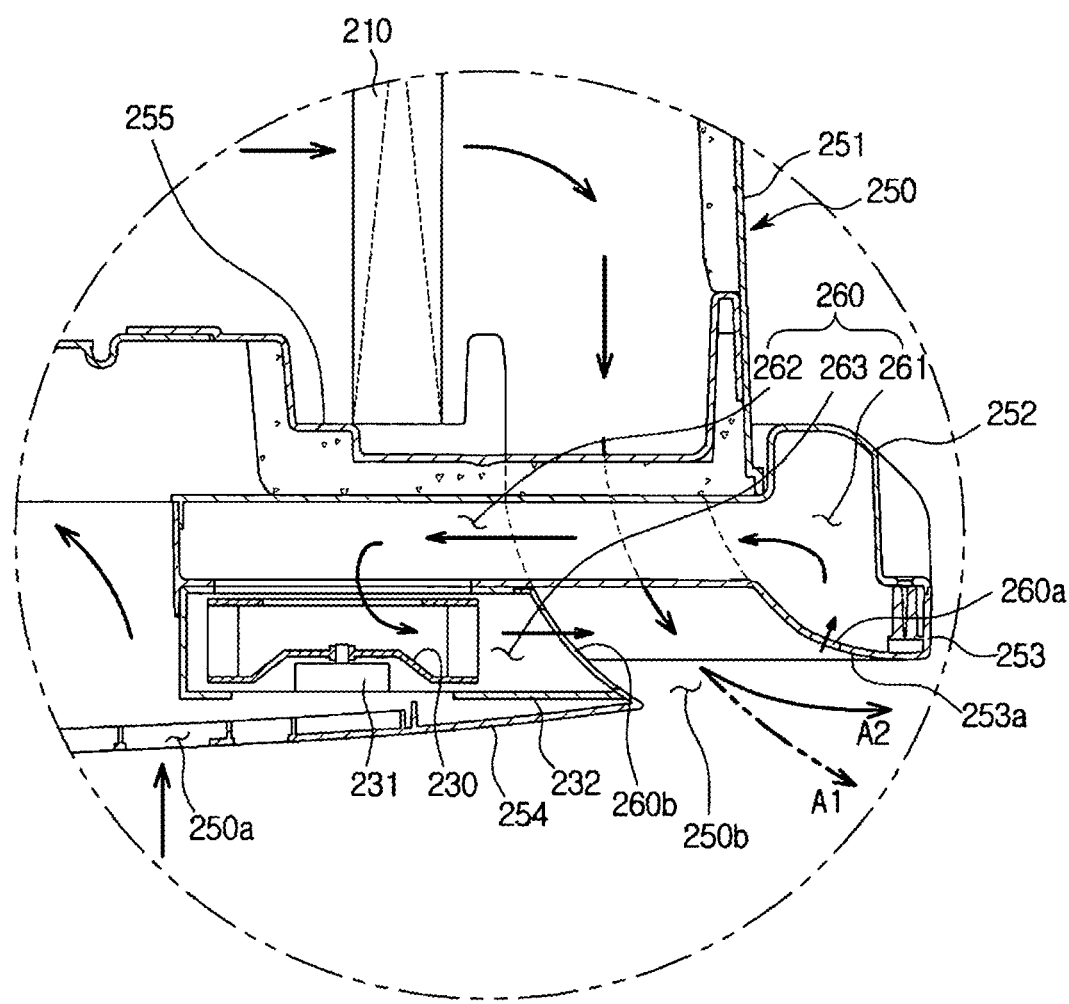
FIG. 6 is an enlarged view of a dotted circular portion of FIG. 3.

FIG. 6 is an enlarged view of a dotted circular portion O of FIG. 3. As illustrated in FIG. 6, the auxiliary fan 230 is disposed in a case 232, and a rotational speed, measured in a revolution per minute (RPM), for example, of the auxiliary fan 230 is adjusted in accordance with the driving force transmitted from the second motor 231. The auxiliary fan 230 may control the amount of air drawn around the discharge portion 250b by rotating. Also, the auxiliary fan 230 may control the direction of the discharged airflow by controlling the amount of air drawn around the discharge portion 250b. Here, the controlling of the direction of the discharged airflow includes controlling the angle of the discharged airflow.

The flow passage portion 260 includes a flow passage to connect an inlet portion 260a including an inlet to draw the air around the discharge portion 250b to an outlet portion 260b including an outlet to discharge the drawn air. Here, the inlet portion 260a may be formed on the Coanda curved surface portion 253a of the third housing 253, and the outlet portion 260b may be disposed around the discharge portion 250b at the opposite side of the inlet portion 260a. Specifically, the outlet portion 260b may be formed at the case 232.

The flow passage portion 260 may include a first flow passage 261 formed at the outer portion of the housing 250 in the circumferential direction to communicate with the inlet portion 260a, a second flow passage 262 configured to extend from the first flow passage 261 to the radial inner portion, and a third flow passage 263 formed in the case 232. Consequently, the air drawn through the inlet portion 260a may pass through the first flow passage 261, the second flow passage 262, and the third flow passage 263 and be discharged through the outlet portion 260b.

The airflow control units AP may discharge the drawn air in the opposite direction of a direction A1 in which the discharged air flows, may enlarge the angle of the discharged airflow, and may further facilitate the controlling of the airflow. That is, as illustrated in FIG. 6, assuming that the direction of the discharged airflow when the plurality of auxiliary fans 230 of the airflow control units AP is not operating is the direction A1, the plurality of auxiliary fans 230 of the airflow control units AP may operate to draw air from one direction off of the direction A1, thereby switching the direction of the discharged airflow to a direction A2.

In addition, in accordance with the amount of air drawn by the auxiliary fan 230, switching of the angle of the discharged airflow may be adjusted. That is, the angle of the discharged airflow may be switched to a small angle when the amount of air drawn by the auxiliary fan 230 is large, and the angle of the discharged airflow may be switched to a large angle when the amount of air drawn by the auxiliary fan 230 is small. Here, the angle of the discharged airflow is with respect to the surface of the ceiling. That is, the angle of the discharged airflow is 0° in the horizontal direction parallel to the surface of the ceiling and is 90° in a direction perpendicular to the surface of the ceiling (i.e., the normal direction).

The airflow control units AP may discharge the drawn air in the opposite direction of the direction A1 in which the discharged air flows. By this, the angle of the discharged airflow may be enlarged, and controlling the airflow may be further facilitated. The auxiliary fan 230 of the airflow control units AP suctions in air from the radial outer portion of the discharge portion 250b to allow the discharged airflow to be widely spread from the radial central portion to the radial outer portion of the discharge portion 250b.

The indoor unit 200-1 of the air conditioner according to the embodiment may control the discharged airflow even without a blade structure of a discharge portion. That is, although a blade is disposed in the discharge portion and the discharged airflow is controlled by rotation of the blade in the indoor unit of the conventional air conditioner, the air conditioner according to the embodiment may control the form of the discharged airflow even without a blade disposed at the discharge portion of the indoor unit. Here, the form of the discharged airflow may include a direction of the discharged airflow and a pattern of the discharged airflow. Accordingly, because discharged air is not interfered by the blade, the amount of discharged air may be increased and noise of the flowing air may be reduced.

In addition, although the discharge portion of the indoor unit of the conventional air conditioner can only have a straight shape in order to rotate the blade, the discharge portion of the indoor unit of the air conditioner according to the embodiment may be formed in a circular shape. Accordingly, the housing, the heat exchanger, etc. may also be formed in the circular shape, thereby not only improving an esthetic sense by the differentiated design but also enabling a natural airflow and reducing loss of pressure when considering that a first fan generally has a circular shape, thus improving cooling or heating performance of the air conditioner as a result.

The structure of the flow passage portion 260 in this embodiment is merely an example, and the flow passage portion 260 may be in any structure, shape, and arrangement as long as the flow passage portion 260 connects the inlet portion 260a to the outlet portion 260b.

Related to the above, a modified embodiment of the airflow control units AP will be described with reference to FIGS. 7 and 8.

Figure 7:
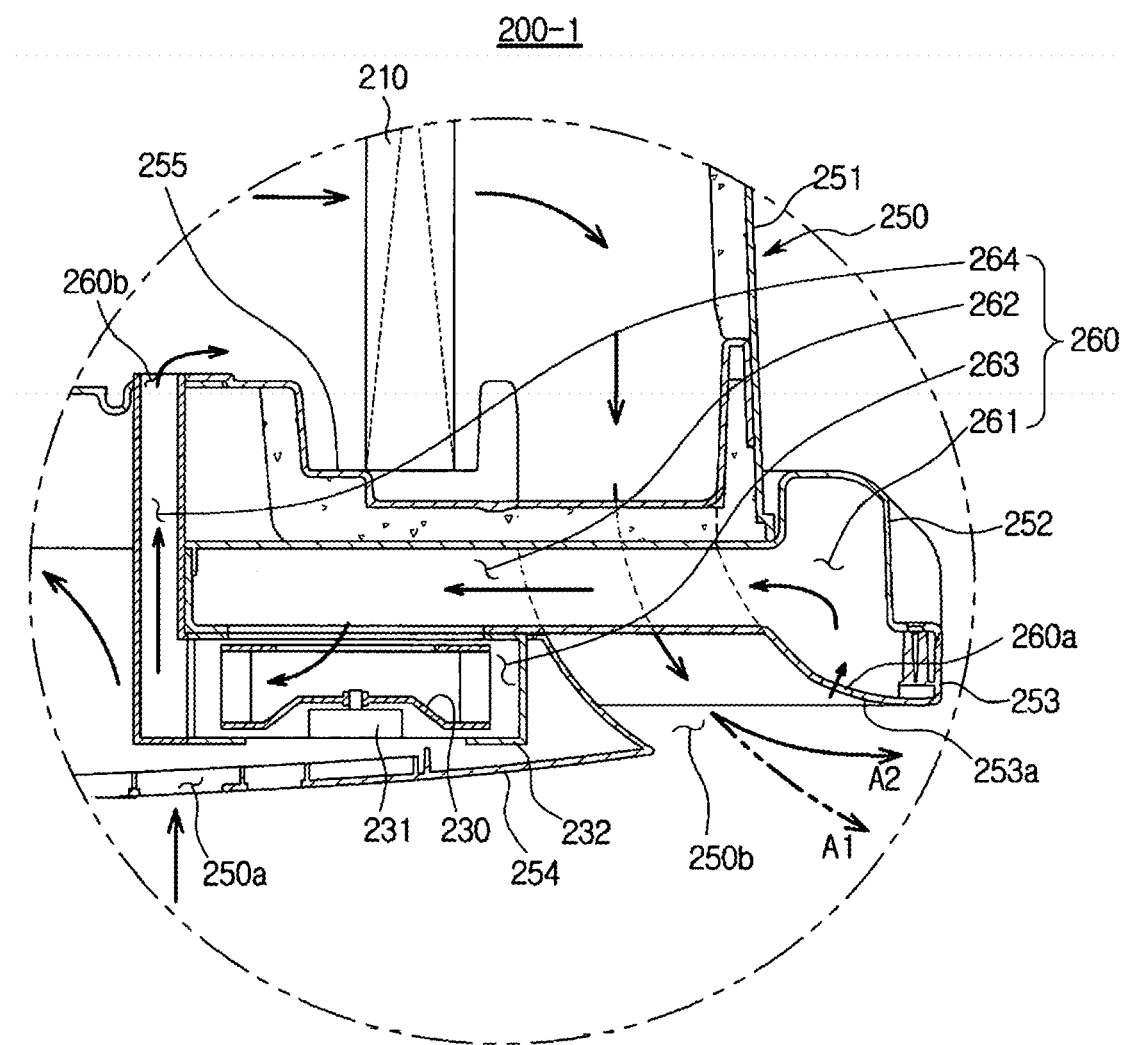
FIG. 7 is an exemplary view of airflow control units according to an embodiment.

FIG. 7 is an exemplary view of airflow control units AP1 according to an embodiment. Furthermore, like reference numerals will be given to like elements from FIG. 2 described above, and description thereof will be omitted.

As illustrated in FIG. 7, the airflow control units AP1 of the indoor unit 200-1 of the air conditioner may discharge the air drawn around the discharge portion 250b into the housing 250 instead of discharging the air toward the discharge portion 250b. The airflow control units AP1 discharge the air drawn around the discharge portion 250b toward an upper stream of the indoor heat exchanger 210 in accordance with a an airflow direction. The air discharged in this manner is heat-exchanged again by passing through the indoor heat exchanger 210 and then finally discharged to an indoor space through the discharge portion 250b.

The auxiliary fan 230 is disposed in the case 232, and the RPM of the auxiliary fan 230 is adjusted in accordance with the driving force transmitted from the second motor 231. The auxiliary fan 230 may control the amount of air drawn around the discharge portion 250b by rotating. The auxiliary fan 230 may control the direction of the discharged airflow by controlling the amount of air drawn around the discharge portion 250b. Here, the controlling of the direction of the discharged airflow includes controlling the angle of the discharged airflow.

The flow passage portion 260 includes the inlet portion 260a formed in the third housing 253 and configured to draw air around the discharge portion 250b to discharge the air drawn around the discharge portion 250b to the inner portion of the housing 250, and the outlet portion 260b formed in the housing 250 and configured to discharge the drawn air.

The flow passage portion 260 includes the first flow passage 261 formed in the circumferential direction and configured to communicate with the inlet portion 260a, the second flow passage 262 configured to extend from the first flow passage 261 to the radial inner portion, the third flow passage 263 formed in the case 232, and a fourth flow passage 264 configured to extend from the third flow passage 263 to the inner portion of the housing 250 and communicate with the outlet portion 260b. Consequently, the air drawn through the inlet portion 260a may pass through the first flow passage 261, the second flow passage 262, the third flow passage 263, and the fourth flow passage 264 and be discharged through the outlet portion 260b.

Figure 8:
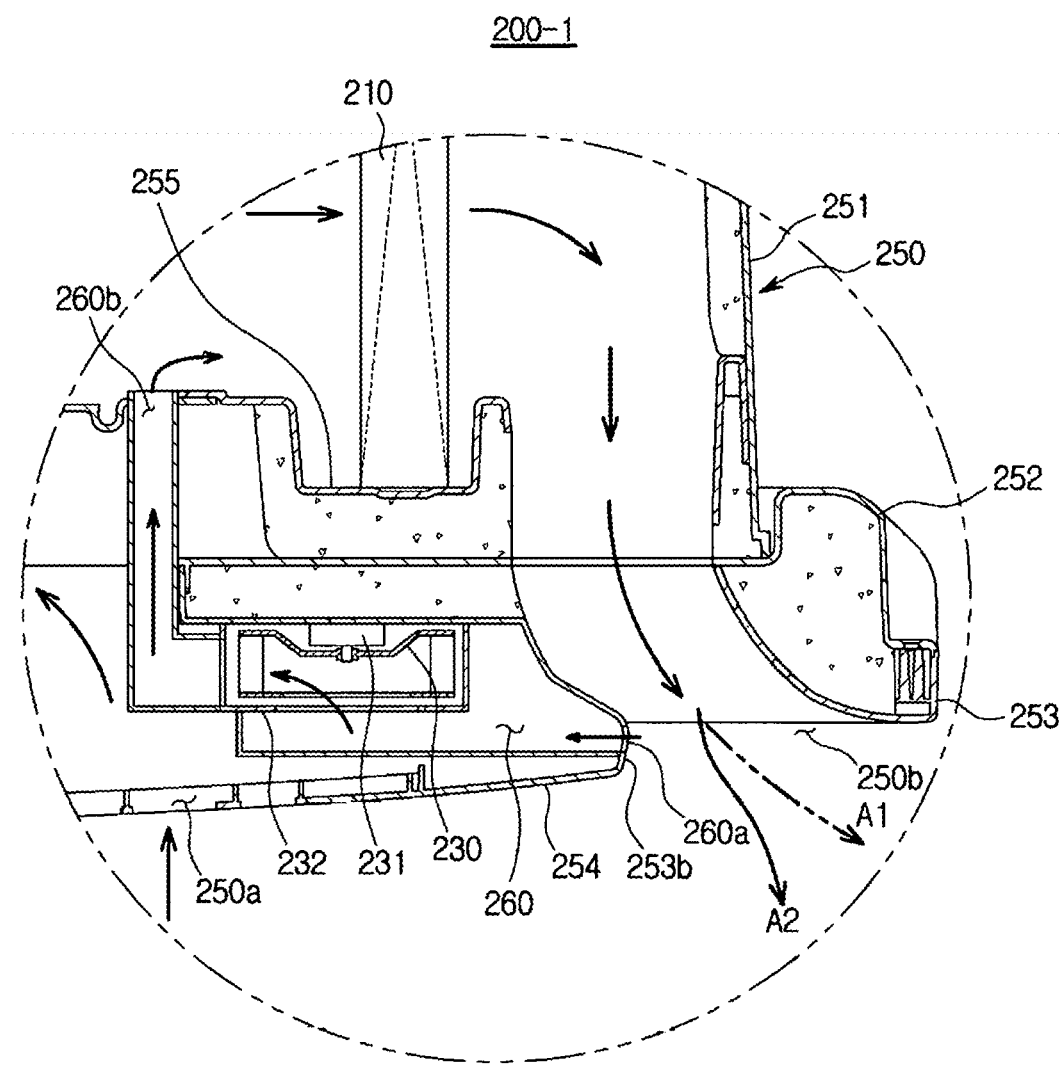
FIG. 8 is an exemplary view of airflow control units according to an embodiment.

FIG. 8 is an exemplary view of airflow control units AP2 according to an embodiment. Furthermore, like reference numerals will be given to like elements from FIG. 2 described above, and the description thereof will be omitted.

As illustrated in FIG. 8, the airflow control units AP2 may be disposed to draw air from the radial inner portion of the discharge portion 250b instead of suctioning in the air from the radial outer portion of the discharge portion 250b.

The auxiliary fan 230 is disposed in the case 232, and the RPM of the auxiliary fan 230 is adjusted by the driving force transmitted from the second motor 231. The auxiliary fan 230 may control the amount of air drawn around the discharge portion 250b by rotating. That is, the auxiliary fan 230 may control the direction of the discharged airflow by suctioning in air around the discharge portion 250b. Here, the controlling of the direction of the discharged airflow includes controlling the angle of the discharged airflow.

The flow passage portion 260 includes the inlet portion 260a disposed at the radial inner portion of the discharge portion 250b, i.e., at a surface 253b of the third housing on which the filter portion 254 is mounted, to draw air around the discharge portion 250b, and the outlet portion 260b to deliver the air drawn through the inlet portion 260a toward the indoor heat exchanger 210. Also, the flow passage portion 260 may include a first flow passage to communicate with the inlet portion 260a and a second flow passage to simultaneously extend to the radial inner portion and communicate with the outlet portion 260b.

As in the above, the airflow control units AP2 draw air from the radial inner portion of the discharge portion 250b such that the discharged airflow may be concentrated from the radial outer portion toward the radial central portion of the discharge portion 250b.

Figure 9:
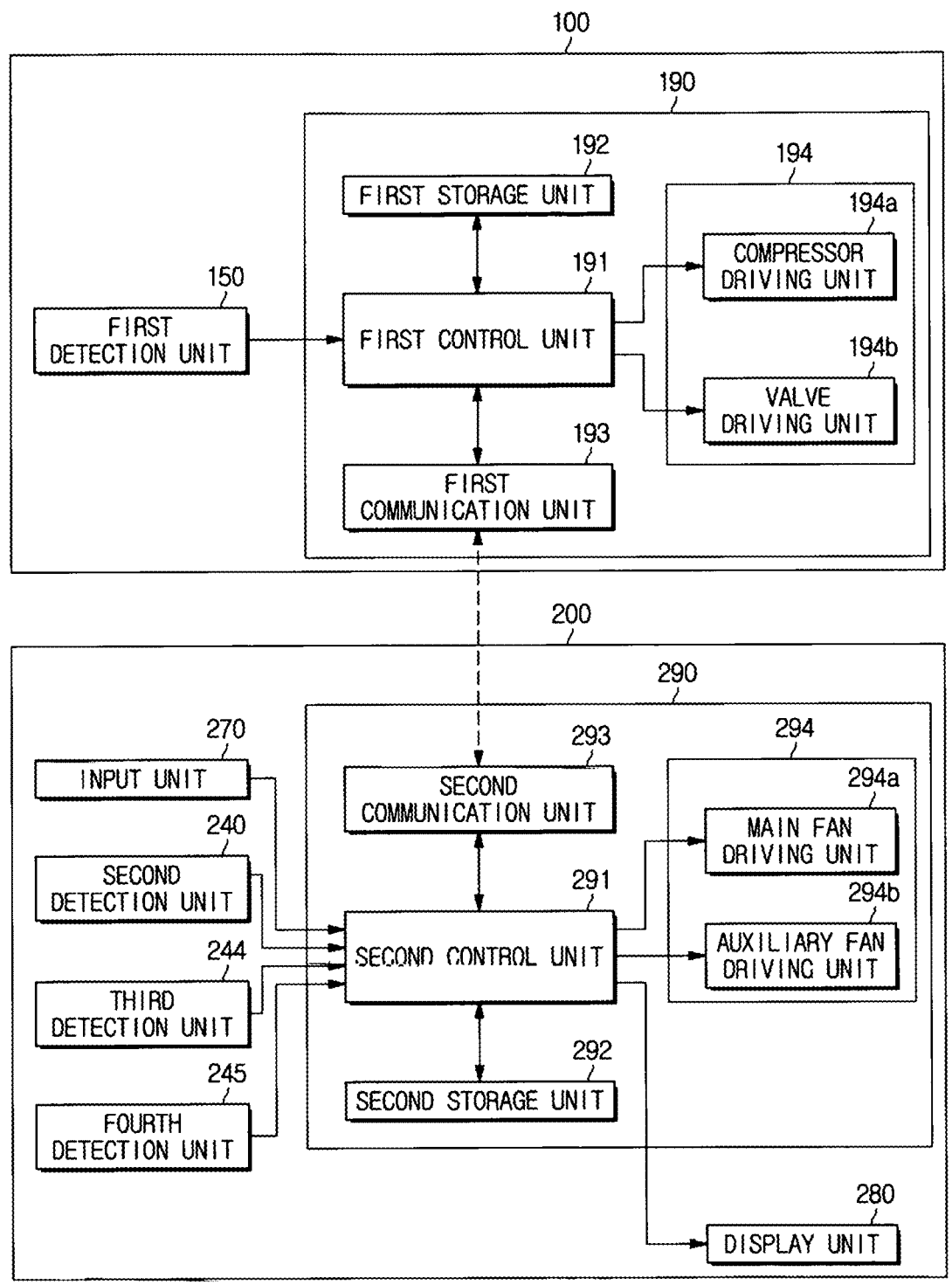
FIG. 9 is a control block diagram of an air conditioner according to an embodiment.

FIG. 9 is a control block diagram of an air conditioner according to an embodiment.

The air conditioner shown in FIG. 9 may be any one of a single-type heating air conditioner, a single-type cooling air conditioner, a single-type cooling-and-heating air conditioner, a multi-type heating air conditioner, a multi-type cooling air conditioner, and a multi-type cooling-and-heating air conditioner. Also, an indoor unit may be any one of a circular ceiling-mounted indoor unit, a quadrilateral ceiling-mounted indoor unit, a wall-mounted indoor unit, and a stand-type indoor unit.

The air conditioner includes the outdoor unit 100 and the indoor unit 200, and the outdoor unit 100 and the indoor unit 200 of the air conditioner communicate with each other. In other words, the outdoor unit 100 and the indoor unit 200 transmit and receive information on each other, i.e., information of the outdoor unit 100 and information of the indoor unit 200.

The outdoor unit 100 of the air conditioner includes a first driving module 190 for controlling various types of loads such as the first detection unit 150, a compressor, and an expansion valve, etc. Also, the indoor unit 200 includes a second driving module 290 for controlling various types of loads such as the second detection unit 240, an input unit 270, a display unit 280, the main fan 220, and the auxiliary fan 230, etc.

To differentiate the elements of the outdoor unit from the elements of the indoor unit, "first" will be given to an element of the outdoor unit and "second" will be given to an element of the indoor unit with respect to elements with the same names.

First, the elements of the outdoor unit 100 will be described.

The first detection unit 150 includes the first temperature detection unit 151 to detect a temperature of refrigerant flowing in the outdoor heat exchanger 120 and the second temperature detection unit 152 to detect an outdoor temperature. The temperature information detected by the first temperature detection unit 151 and the second temperature detection unit 152 may be used as information for determining a start and an end of the defrosting mode.

The first driving module 190 drives the plurality of outdoor loads 110, 130, 140, and 160 based on indoor load information, an operation mode, and a working mode sent from the indoor unit 200, and outdoor detected information detected by the outdoor unit 100 and includes a first control unit 191, a first storage unit 192, a first communication unit 193, and a first driving unit 194.

The first control unit 191 controls turning the compressor 110 on or off, RPM of the compressor 110, opening of the expansion valve 130, RPM of the outdoor fan 140, etc. when an operation command sent from the indoor unit 200 is received. Here, the operation command includes an operation mode, a working mode, indoor load information.

The operation mode includes a cooling mode and a heating mode, and the working mode includes a normal mode, a high speed mode, and an airflow circulation mode. The indoor load information includes a target indoor temperature and a detected indoor temperature. Furthermore, when both of the cooling operation and the heating operation are possible, the first control unit 191 may also check whether the operation mode is the heating operation or the cooling operation to control the opening of the flow passages of the four-way valve 160.

When the cooling operation is input, the first control unit 191 adjusts the opening of the flow passages of the four-way valve 160 and controls the compressor 110, the expansion valve 130, and the outdoor fan 140 to circulate refrigerant, thereby cooling the air-conditioned space. When the heating operation is input, the first control unit 191 controls flow switching of the four-way valve 160 and controls the compressor 110, the expansion valve 130, and the outdoor fan 140 to switch the flow of the refrigerant, thereby heating the indoor space.

In addition, during the heating operation, the first control unit 191 may determine a start of the defrosting operation based on at least one of temperature information and compressor operation time information detected by the first detection unit and control the defrosting operation when the start of the defrosting operation is determined. Here, the defrosting operation may include controlling the flow passages of the four-way valve 160 to be switched such that the refrigerant circulates to a defrosting cycle (same as the refrigeration cycle) or operating a heating unit installed adjacent to the outdoor heat exchanger.

The first storage unit 192 stores the RPM of the compressor 110, the opening of the expansion valve 130, and the RPM of the outdoor fan 140, etc. corresponding to the operation command. Also, the first storage unit 192 stores the compressor operation time information and information on the temperature of the outdoor heat exchanger at each outdoor temperature for determining the start of the defrosting operation, stores information on the RPM of the auxiliary fan during the defrosting operation, and stores information on the temperature of the outdoor heat exchanger at each outdoor temperature or defrosting operation time information for determining an end of the defrosting operation. Here, the RPM of the auxiliary fan during the defrosting operation may be stored by being matched with each RPM of the main fan during the heating operation right before the defrosting operation.

The first communication unit 193 performs communication with at least one indoor unit. The first communication unit 193 receives indoor load information and an operation command sent from at least one indoor unit 200 and transmits the indoor load information and lite operation mode to the first control unit 191 and transmits defrosting mode information to the indoor unit 200.

The first driving unit 194 includes a compressor driving unit 194a to drive the compressor based on a command of the first control unit 191 and a valve driving unit 194b to drive various types of valves based on the command of the first control unit 191. The compressor driving unit 194a may be an inverter driving unit that rotates a motor disposed in the compressor. Here, the various types of valves may include at least one of the expansion valve and the four-way valve.

Next, the configuration of the indoor unit 200 will be described.

The second detection unit 240 includes the fifth temperature detection unit 243 to detect a temperature of an indoor space.

A third detection unit 244 detects whether a user is present in the indoor space and a position of the user. The third detection unit 244 includes a human body sensor, and the human body sensor may include any sensor capable of detecting a human body including a near infrared sensor, an infrared sensor, an image sensor, etc.

A fourth detection unit 245 includes a sensor for detecting the amount of dust in the filter portion provided at the suction portion of the housing.

The sensor may be a current detection unit of the first motor 221 that indirectly detects the amount of dust. That is, the current detection unit detects a current flowing in the first motor 221 of the main fan 220. The load of the first motor 221 that applies a driving force to the main fan 220 may vary depending on the amount of air drawn into the indoor unit 200, and here, the current detection unit detects the current flowing in the first motor 221 in order to detect the load of the first motor 221.

In addition, the sensor may be an optical detection unit or an air pressure detection unit that directly detects the amount of dust. The air pressure detection unit detects the pressure of air drawn into the main fan 220. That is, the air pressure detection unit detects the pressure of the drawn air because the pressure of the air drawn into the main fan 220 may vary depending on the amount of dust in the filter portion.

The input unit 270 receives the operation modes including the cooling operation and the heating operation, the working modes including the normal mode, the high speed mode, and the airflow circulation mode, the target indoor temperature, and information on airflow direction and airflow speed as inputs from a user and the input pieces of information are transmitted to a second control unit 291.

The display unit 280 displays information on the operation mode, the working mode, the airflow direction, the airflow speed, the target indoor temperature, the currently detected indoor temperature, etc.

The second driving module 290 controls rotations of the main fan 220 and the auxiliary fan 230 based on the information input to the input unit 270 and the information detected by the second detection unit 240/the third detection unit 244/the fourth detection unit 245 and includes the second control unit 291, a second storage unit 292, a second communication unit 293, and a second driving unit 294.

The second control unit 291 controls operations of the main fan 220, the auxiliary fan 230, etc. based on the information input to the input unit 270 and the information received by the second communication unit 293.

When the normal mode is selected, the second control unit 291 controls the main fan 220 and the auxiliary fan 230 so that an airflow having a reference airflow speed and a reference airflow direction is discharged. In normal mode, when airflow speed information and airflow direction information is input, the second control unit 291 checks RPM of the main fan 220 corresponding to the input airflow speed information, checks an airflow angle corresponding to the airflow direction information, and controls the RPM of the auxiliary fan 230 based on the checked RPM of the main fan 220 and the airflow angle.

By this, the second control unit 291 may adjust the amount of air drawn around the discharge portion 250b and adjust the direction of the discharged airflow. Here, the value of the RPM of the auxiliary fan 230 acquired may be a value acquired based on a function of the RPM of the main fan 220 and the airflow angle or may be a stored value stored pre-acquired from an experiment for acquiring angles in which air flows for each RPM of the main fan 220.

When the high speed mode or the airflow circulation mode is selected, the second control unit 291 controls the main fan 220 by the preset RPM and turns the auxiliary fan 230 on or off or repeatedly and variably controls the RPM of the auxiliary fan 230 in a first section until the indoor temperature reaches the target temperature. Also, in a second section after the indoor temperature has reached the target temperature, the second control unit 291 controls the RPM of the auxiliary fan 230 to be a preset RPM. That is, the second control unit 291 cyclically and repeatedly controls the RPM of the auxiliary fan 230 in the first section to be a first RPM or a second RPM that is greater than the first RPM.

In addition, the second control unit 291 may also cyclically and repeatedly control the RPM of the auxiliary fan 230 in the first section to be the first RPM, the second RPM that is greater than the first RPM, and a third RPM that is greater than the second RPM. Furthermore, the second control unit 291 may also repeatedly control the operation of the auxiliary fan 230 to be turned on or off in the first section.

In addition, the second control unit 291 controls the main fan 220 by the preset RPM and controls the RPM of the auxiliary fan 230 so that the airflow discharged through the discharge portion reaches a user. Particularly, the second control unit 291 checks whether a user is present in the indoor space and a position of the user in the indoor space based on the information detected by the third detection unit 244, checks an airflow angle corresponding to the position of the user in the indoor space, checks RPM of the auxiliary fan 230 corresponding to the RPM of the main fan 220 and the airflow angle, and controls the RPM of the auxiliary fan 230 to be the checked RPM.

When a defrosting operation signal is received, the second control unit 291 controls the operation of the main fan 220 to be stopped and controls the auxiliary fan 230 to rotate by the preset RPM. During the defrosting operation, the second control unit 291 may also check the RPM of the main fan 220 during the heating operation right before the defrosting operation and control the RPM of the auxiliary fan 230 based on the checked RPM of the main fan 220.

In addition, during the defrosting operation, the second control unit 291 may also control the operation of the main fan 220 to be stopped, check whether the user is present in the indoor space based on the information detected by the third detection unit 244, and control the operation of the auxiliary fan 230 based on whether the user is present. For example, during the defrosting operation, the second control unit 291 may control the auxiliary fan 230 to be stopped when it is determined that there is no user in the indoor space and may operate the auxiliary fan 230 when it is determined that a user is present in the indoor space. By this, power consumed due to the operation of the auxiliary fan 230 during the defrosting operation may be decreased.

In addition, when an operation command is input, the second control unit 291 determines whether it is an initial operation command, checks the amount of dust in the filter portion based on the information detected by the fourth detection unit 245 when it is determined that an initial operation command has been input, and controls storage of a first amount of dust which is the checked initial amount of dust in the filter portion. Also, when the input operation command is not an initial operation command, the second control unit 291 checks a second amount of dust in the filter portion in a predetermined cycle while performing the operation and controls the RPM of the auxiliary fan 230 to be compensated based on the checked first amount of dust and second amount of dust.

When an operation command is input, the second control unit 291 determines whether the operation command is an initial operation command, detects a current flowing in the first motor 221 when the input operation command is determined to be the initial operation command, and controls storage of a first current detected. Also, when the input operation command is not an initial operation command, the second control unit 291 periodically checks the current of the first motor 221 every predetermined cycle while performing the operation and controls the RPM of the auxiliary fan 230 to be compensated based on the checked first current and the second current.

When it is determined that an initial operation command has been input, the second control unit 291 checks a duty ratio of pulse width modulation (PWM) for rotating the first motor 221 by the maximum RPM and controls storage of the first duty ratio checked. Also, when the input operation command is not an initial operation command, the second control unit 291 periodically checks a duty ratio of the PWM for rotating the first motor 221 by the maximum RPM every predetermined cycle and controls the RPM of the auxiliary fan 230 to be compensated based on the second duty ratio and the first duty ratio checked. That is, the maximum RPM of the first motor 221 of the main fan 220 may vary depending on the amount of dust in the filter portion, and accordingly, duty ratios of PWM signals applied to the first motor 221 may be different.

The second control unit 291 controls the second communication unit 293 to transmit the information input to the input unit 270 and the information detected by the second detection unit 240 to the outdoor unit via the second communication unit 293. The second control unit 291 may receive temperature information, i.e. the information on the outdoor temperature and the temperature of outdoor heat exchanger, from the outdoor unit 100 and determine the start of the defrosting operation based on the received outdoor temperature and the temperature of the outdoor heat exchanger and may also receive the compressor operation time from the outdoor unit 100 to determine the start of the defrosting operation.

The second storage unit 292 stores information on a reference RPM of the main fan 220 and a reference RPM of the auxiliary fan 230 with respect to the reference airflow speed and the reference airflow direction in the normal mode. Here, the reference RPM of the main fan 220 the reference RPM of the auxiliary fan 230 may be different for each operation mode or may be the same.

In addition, in the normal mode, the second storage unit 292 stores information on the RPM of the main fan 220 for each airflow speed and stores information on the airflow angle for each airflow direction. Furthermore, the second storage unit 292 may also store information on the RPM of the auxiliary fan 230 based on the RPM of the main fan 220 and the airflow angle.

In the high speed mode or the airflow circulation mode, the second storage unit 292 stores control information of the main fan 220 and control information of the auxiliary fan 230 in the preset first section and stores control information of the main fan 220 and control information of the auxiliary fan 230 in the preset second section. Here, the control information may include information on controlling the RPM and information on controlling the main fan 220 or the auxiliary fan 230 on and off.

Furthermore, the RPM of the main fan 220 in the first section and the RPM of the main fan 220 in the second section may be the same as each other or different from each other. Also, the RPM of the auxiliary fan 230 in the first section may be a RPM that cyclically repeats being increased and decreased. The RPM of the auxiliary fan 230 in the first section may include the first RPM and the second RPM greater than the first RPM, and the RPM of the auxiliary fan 230 in the second section may be the same as the second RPM. The RPM of the auxiliary fan 230 in the first section may also include the first RPM, the second RPM greater than the first RPM, and the third RPM greater than the second RPM.

During the defrosting operation, the second storage unit 292 stores information on the present RPM of the auxiliary fan. Furthermore, the second storage unit 292 may store information on the RPM of the auxiliary fan 230 for each RPM of the main fan 220 during the heating operation before the defrosting operation starts.

In the normal mode, the second storage unit 292 stores information on the RPM of the main fan for each airflow speed and stores information on the airflow angle for each airflow direction. Furthermore, the second storage unit 292 stores the first duty ratio, the first current, or the first amount of dust during the initial operation. Here, the first amount of dust may include information on the amount of light, information on the air pressure, or information on the current.

The second storage unit 292 may also store a compensation value for the RPM of the auxiliary fan 230 corresponding to the first amount of dust and the second amount of dust. Also, the second storage unit 292 may also store a compensation value for the auxiliary fan 230 corresponding to the first duty ratio and the second duty ratio. Also, the second storage unit 292 may also store a compensation value for the auxiliary fan 230 corresponding to the first current and the second current.

The second communication unit 293 may communicate with at least one indoor unit. The second communication unit 293 transmits information on the defrosting operation transmitted from the outdoor unit 100 to the second control unit 291. The second communication unit 293 receives the indoor load information and the operation command to transmit the indoor load information and the operation command to the first control unit 191 of the outdoor unit.

The second driving unit 294 drives various types of loads disposed in the indoor unit based on the command of the second control unit 291. The second driving unit 294 includes a main fan driving fan 294a to drive the first motor 221 of the main fan 220 and a second fan driving unit 294b to drive the second motor 231 of the auxiliary fan 230.

The first control unit 191 of the outdoor unit 100 and the second control unit 292 of the indoor unit 200 may be a processor, a central processing unit (CPU), a microprogrammed control unit (MCU), etc.

The first storage unit 192 of the outdoor unit 100 and the second storage unit 292 of the indoor unit 200 may include not only a volatile memory such as a random access memory (RAM), a static RAM (S-RAM), a dynamic RAM (D-RAM), etc. but also a nonvolatile memory such as a flash memory, a read-only memory (ROM), an erasable programmable ROM (EPROM), an electrically EPROM (EEPROM), etc.

Figure 10:
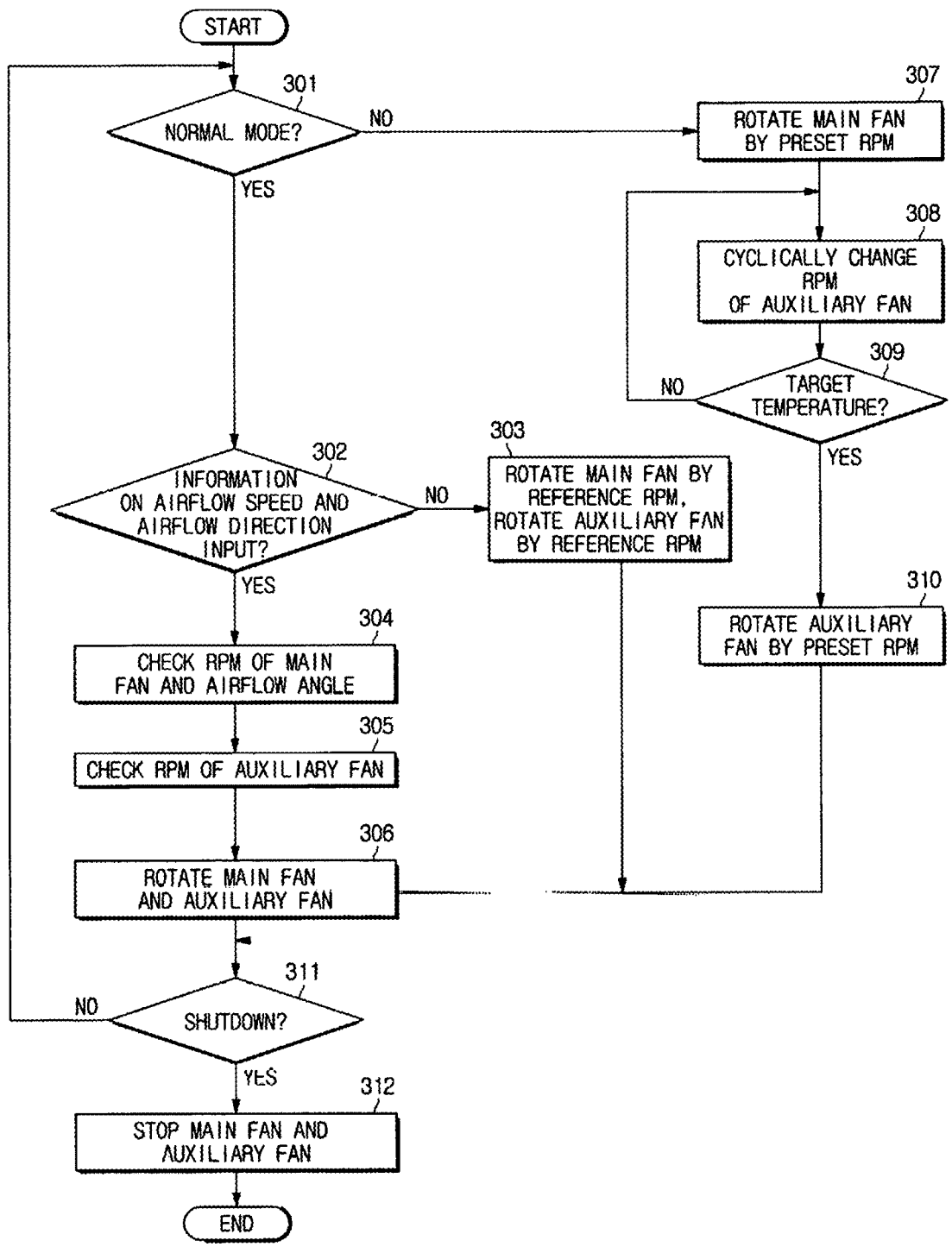
FIG. 10 is an example of a method of controlling an air conditioner according to an embodiment.

FIG. 10 is an example of a method of controlling an air conditioner according to an embodiment. The control of the normal mode and the high speed mode during a cooling operation will be described with reference to FIG. 10.

The air conditioner checks an operation mode when a power-on signal is input via the input unit 270 or the remote controller (not shown). If the operation mode is the cooling operation, the compressor 110 is driven and the expansion valve 130 is opened to allow the refrigerant compressed by the compressor 110 to move to the indoor heat exchanger 210 via the outdoor heat exchanger 120 and the expansion valve 130. In this manner, the air conditioner allows the refrigerant to be circulated in the refrigeration cycle to perform the cooling operation. Furthermore, when the four-way valve 160 is provided, the air conditioner controls the flow passages of the four-way valve 160 to perform the cooling operation.

The air conditioner may perform the cooling operation in various working modes.

Before a working mode is selected by a user, the air conditioner may perform a working mode that was performed before the air conditioner was turned on or perform a default working mode (i.e. the normal mode). Here, the working mode may include the normal mode and the high speed mode.

When a working mode is input via the input unit 270 or the remote controller (not shown) of the indoor unit, the air conditioner checks whether the input working mode is the normal mode or the high speed mode (operation S301).

If the checked working mode is the normal mode ("YES" to S301), the air conditioner checks whether airflow speed information and airflow direction information is input (operation S302).

If there is no airflow speed information and airflow direction information input ("NO" to S302), the indoor unit 200 of the air conditioner rotates both the main fan 220 and the auxiliary fan 230 by predetermined reference numbers of rotations (operation S303).

Specifically, the air conditioner rotates the main fan 220 by the predetermined reference RPM to draw air of the air-conditioned space, to heat-exchange the drawn air, and to discharge the heat-exchanged air through the discharge portion 250b at a reference airflow speed.

In addition, the indoor unit 200 of the air conditioner may rotate the auxiliary fan 230 by the predetermined reference RPM to apply a suction force to the airflow discharged through the discharge portion 250b in order to allow the airflow direction to be adjusted to a reference direction. Here, air drawn by the rotation of the auxiliary fan 230 is discharged again to the outside of the indoor unit 200 through the flow passage portion 260.

In this manner, the indoor unit 200 of the air conditioner may rotate the main fan 220 by the reference RPM and rotate the auxiliary fan 230 also by the reference RPM during the normal mode to adjust the speed and the direction of the airflow discharged to the air-conditioned space to be the reference airflow speed and the reference airflow direction. After the operation S303, an operation S311 to be described below takes place.

Unlike the above, when it is checked that information on the airflow speed and the airflow direction is input while the normal mode is selected ("YES" to S302), the indoor unit 200 of the air conditioner checks a target RPM of the main fan 220 corresponding to the input airflow speed information and checks a target airflow angle corresponding to the airflow direction information (operation S304). Also, an actual RPM of the second fan 230 is checked based on the checked target RPM of the first fan 220 and the target airflow angle (operation S305).

Then, the air conditioner rotates the first fan 220 to follow the checked target RPM of the main fan 220 and rotates the auxiliary fan 230 to follow the checked target RPM of the auxiliary fan 230 (operation S306).

The controlling of the main fan 220 and the auxiliary fan 230 in the normal mode will be described in more detail with reference to FIG. 11.

Figure 11:
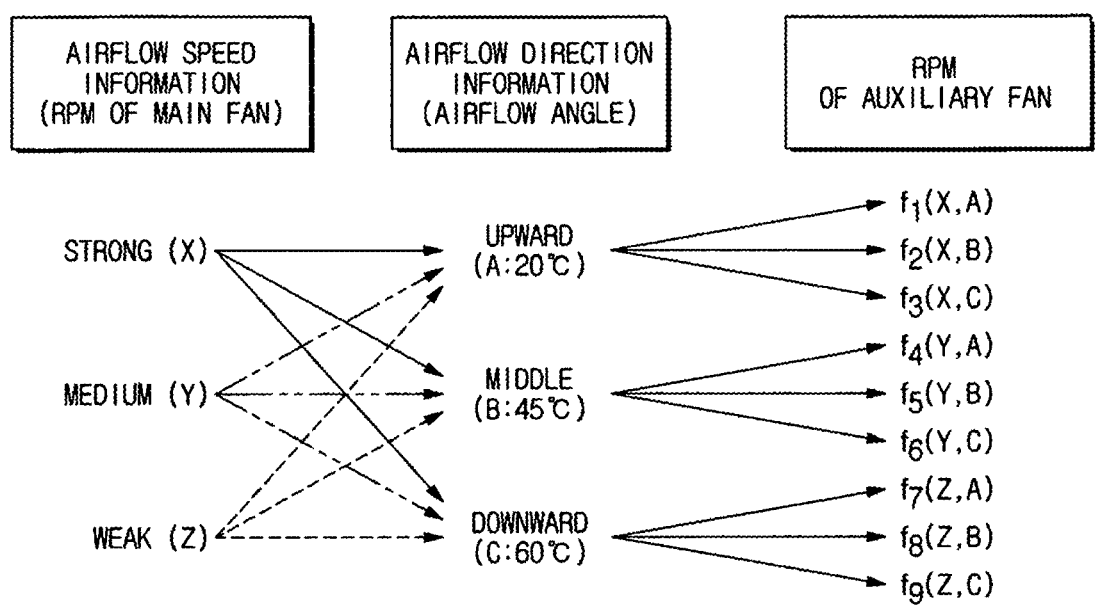
FIG. 11 is an exemplary view of setting RPM of the second fan in accordance with airflow speed information and airflow direction information of an air conditioner according to an embodiment.

FIG. 11 is an exemplary view of setting RPM of the second fan in accordance with airflow speed information and airflow direction information of the air conditioner according to an embodiment.

For example, the airflow speed information includes strong, medium, and weak in order of the strength and includes information on the RPM of the main fan 220 for forming an airflow speed at each strength. Also, the airflow direction information includes downward, middle, and upward in order of the direction and includes information on the airflow angle for forming each airflow direction. That is, the airflow speed information may include strong (X), medium (Y), and weak (Z), and the airflow direction information may include upward (A: 20°), middle (B: 45°), and downward (C: 60°).

Here, the target RPM of the auxiliary fan 230 may be acquired by combining the input airflow speed information and airflow direction information. For example, the RPM of the second fan 230 may be acquired by f1(X, A) when "airflow speed strong" and "airflow direction upward" are input, and the RPM of the second fan 230 may be acquired by f8(Z, B) when "airflow speed weak" and "airflow direction middle" are input. Furthermore, the reference airflow speed is applied as the airflow speed information when the airflow speed information is not input, and the reference airflow direction is applied as the airflow direction information when the airflow direction information is not input.

Returning to FIG. 10, the air conditioner checks whether a shutdown command is input (operation S311).

When it is checked that the shutdown command has been input ("YES" to S311), the air conditioner stops both the main fan 220 and the auxiliary fan 230. Here, the air conditioner may also stop the operations of the compressor and the outdoor fan.

Unlike the above, when the shutdown command has not been input ("NO" to S311), the air conditioner continues to the operation S302 to perform the normal mode described above and continues the operation of the normal mode.

In the operation S301, when the working mode is the high speed mode instead of the normal mode ("NO" to S301), the air conditioner rotates the main fan 220 and the second fan 230 in predetermined forms for the high speed mode (operation S307).

Specifically, when performing the high speed mode, the air conditioner rotates the main fan 220 by the preset RPM to draw air of the air-conditioned space, heat-exchanges the drawn air, and discharges the heat-exchanged air through the discharge portion 250b. Here, the main fan 220 may also be rotated by the maximum RPM.

In addition, the air conditioner rotates the auxiliary fan 230 while cyclically changing the RPM thereof (operation S308).

The indoor unit of the air conditioner rotates the auxiliary fan 230 by alternately and repeatedly rotating the auxiliary fan 230 by the first RPM, the second RPM, and the third RPM in a predetermined cycle. Here, the second RPM may be greater than the first RPM, and the third RPM may be greater than the second RPM.

This will be described with reference to FIGS. 12, 13, 14A, 14B, and 15.

FIGS. 12, 13, 14A, 14B, and 15 are exemplary views of controlling an airflow in a high speed mode of the air conditioner according to the embodiment.

Figure 12:
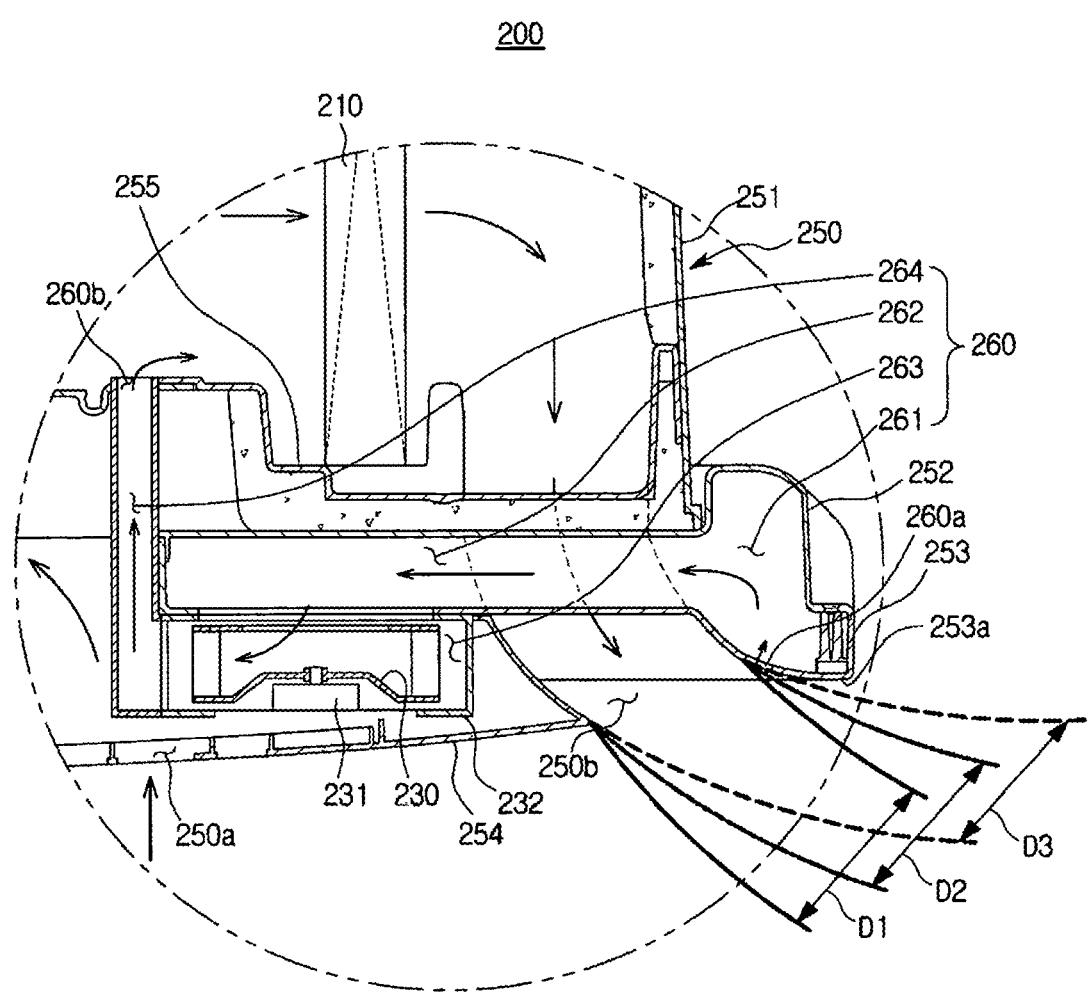
FIGS. 12, 13, 14A, 14B, and 15 are exemplary views of controlling an airflow in a high speed mode of an air conditioner according to an embodiment.

As illustrated in FIG. 12, the indoor unit 200 of the air conditioner rotates the auxiliary fan 230 by the first RPM to adjust the airflow direction to be D1, rotates the auxiliary fan 230 by the second RPM after a predetermined amount of time to adjust the airflow direction to be D2, rotates the auxiliary fan 230 by the third RPM after a predetermined amount of time to adjust to airflow direction to be D3, and rotates the auxiliary fan 230 by the first RPM after a predetermined amount of time to adjust the airflow direction to be D1. Furthermore, the air conditioner may also adjust the airflow direction to be D3 and rotate the auxiliary fan 230 by the second RPM to adjust the airflow direction to be D2.

The RPM of the auxiliary fan 230 may be cyclically changed so that the airflow swings to discharge cold air in multiple directions of the indoor space. As a result, the air conditioner may rapidly cool the indoor space and generate a direct airflow of cold air that directly comes in contact with the user.

In addition, the indoor unit 200 may also cyclically turn the operation of the auxiliary fan 230 on or off, in order to apply or remove the suction force to or from the discharged airflow, thereby adjusting the direction of the discharged airflow.

Returning to FIG. 10, the air conditioner checks an actual indoor temperature and a target temperature while the high speed mode is performed and determines whether the actual indoor temperature has reached the target temperature (operation S309).

In addition, when the actual indoor temperature is determined to have reached the target temperature, the auxiliary fan 230 is rotated by a preset RPM (operation S310).

Figure 13:
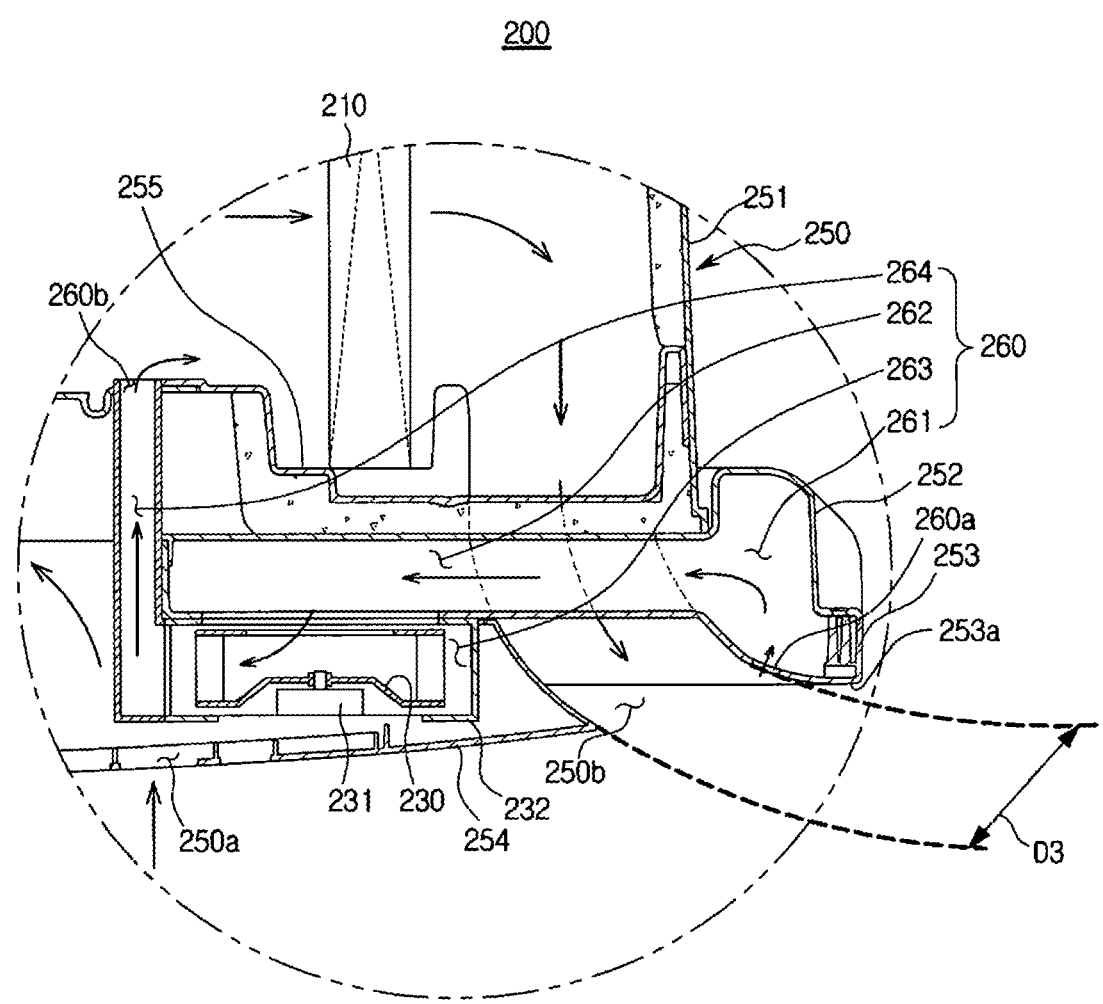

As illustrated in FIG. 13, the indoor unit 200 rotates the auxiliary fan 230 by the preset RPM to adjust the airflow direction to be D3 to allow the airflow direction to head toward the surface of the ceiling. By this, the indoor unit prevents cold air from directly coming in contact with the user. That is, the indoor unit 200 generates an indirect airflow.

In addition, when the auxiliary fan 230 is a fan that can only be turned on or off, the indoor unit 200 may turn on the auxiliary fan 230 to allow the minimum airflow angle to be formed.

Figure 14A:
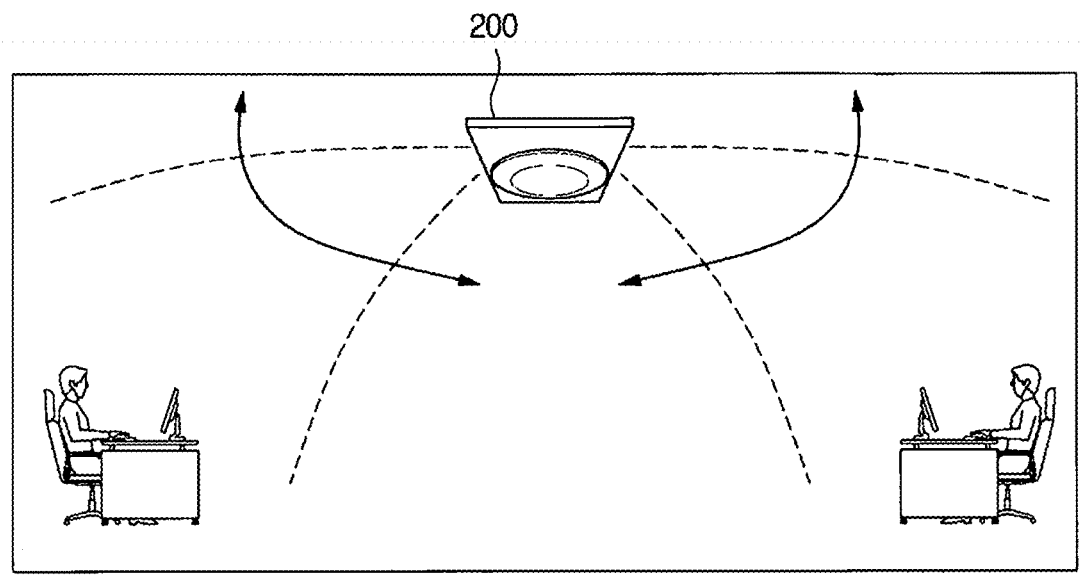
Figure 14B:
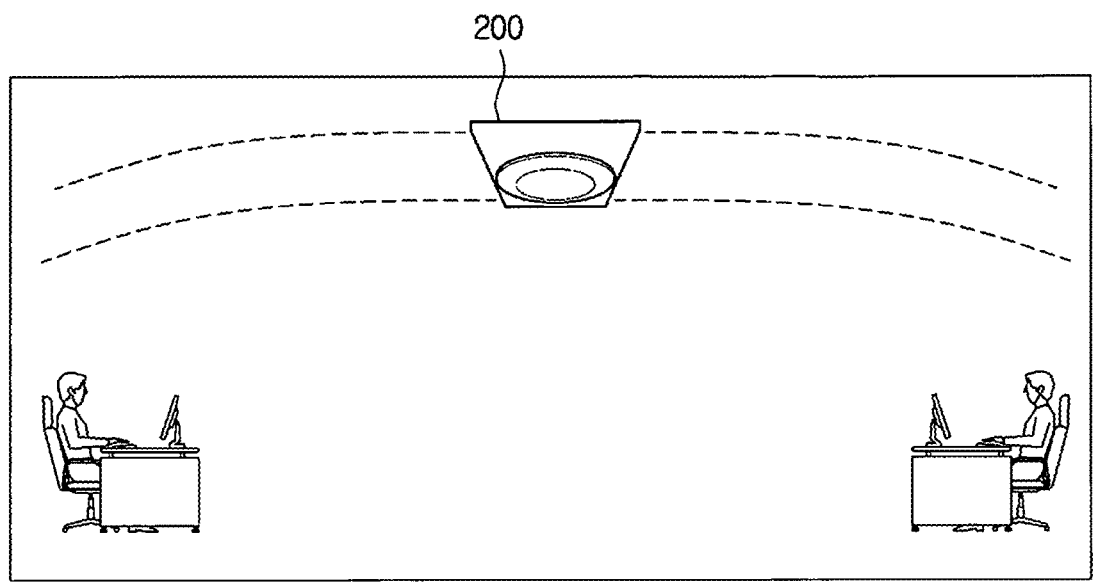

As illustrated in FIGS. 14A and 14B, the indoor unit 200 vertically adjusts the airflow direction to discharge cold air to a wide area and allows a temperature of an indoor space to be maintained at a target temperature when the indoor temperature reaches the target temperature while adjusting the airflow direction upward to prevent the cold air from directly coming in contact with the user. In this way, a user feels pleasant.

Figure 15:
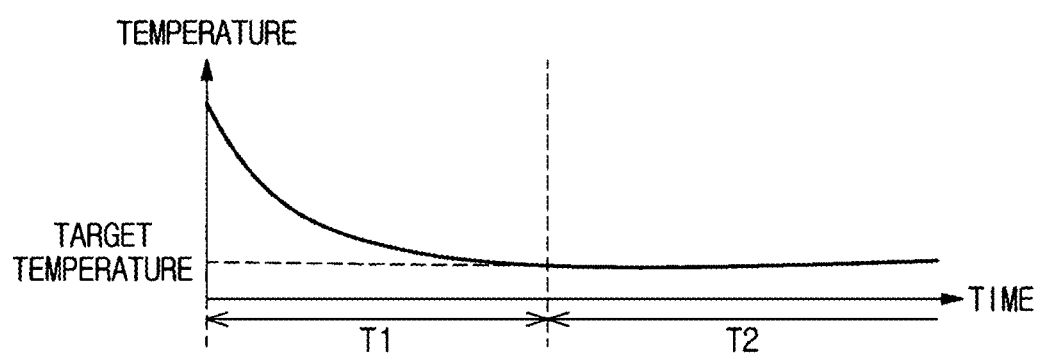

As illustrated in FIG. 15, to rapidly lower the temperature of the indoor space, the indoor unit 200 controls the airflow to swing during the first section T1 until the indoor temperature reaches the target temperature and after the indoor temperature reaches the target temperature, controls the RPM of the auxiliary fan 230 to be the preset RPM during the second section T2 to maintain the temperature of the indoor space at the target temperature.

Returning to FIG. 10, the air conditioner determines whether a shutdown command has been input (operation S311).

When it is determined that the shutdown command has been input ("YES" to S311), the air conditioner stops the main fan and the auxiliary fan (operation S312). In addition, the air conditioner also stops the operations of the compressor and the outdoor fan.

Figure 16:
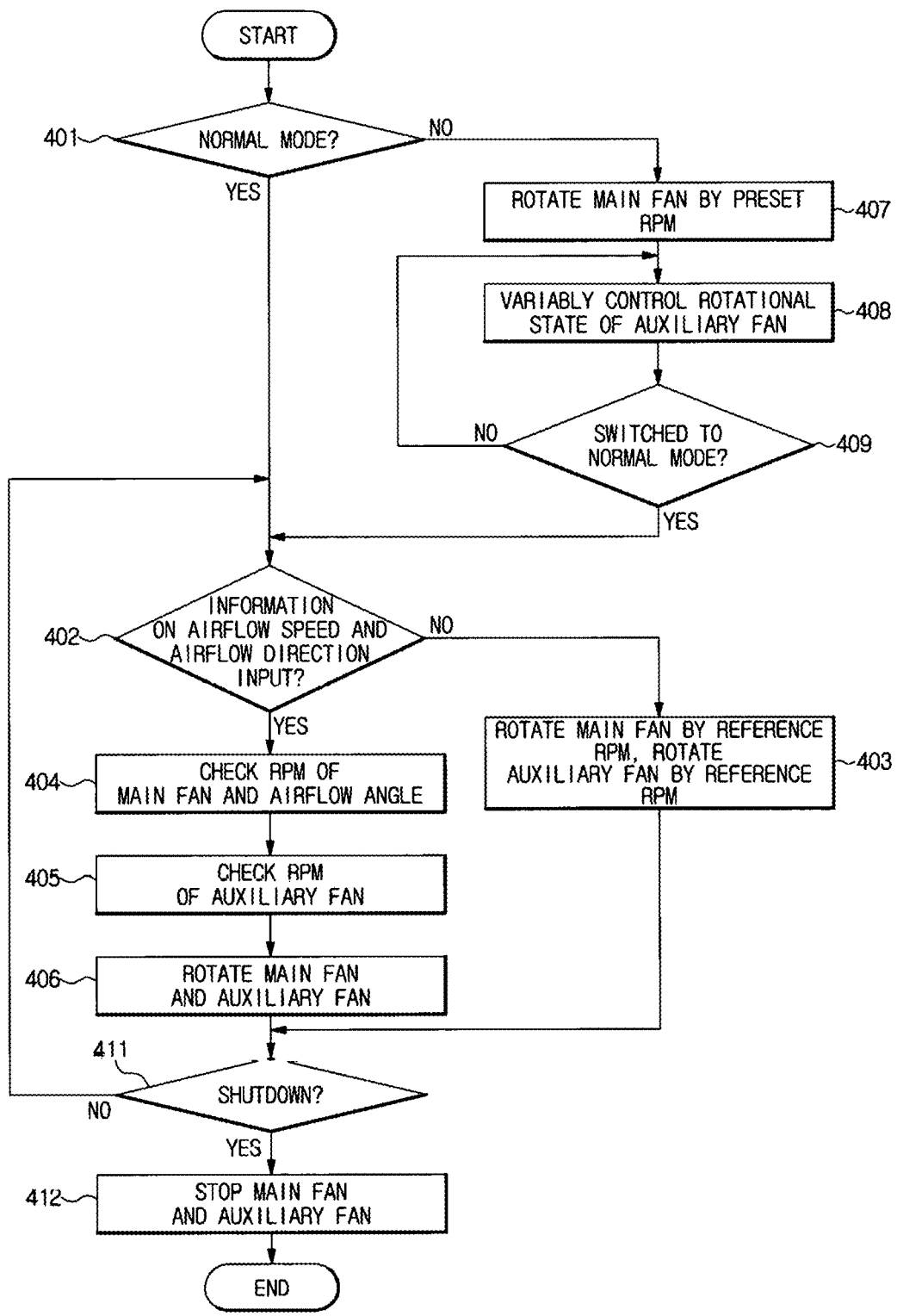
FIG. 16 is an example of a method of controlling an air conditioner according to an embodiment.

FIG. 16 is an example of a method of controlling the air conditioner according to the embodiment.

When a working mode is input via the input unit 270 or the remote controller (not shown) of the indoor unit, the air conditioner checks whether the input working mode is the normal mode or the airflow circulation mode (operation S401).

When the checked working mode is the normal mode ("YES" to S401), the air conditioner performs operations S402, S403, S404, S405, S406, S411, and S412 illustrated in FIG. 16. Here, because the operations S402, S403, S404, S405, S406, S411, and S412 are the same as the operations S302, S303, S304, S305, S306, S311, and S312 described above with reference to FIG. 10, the description thereof will be omitted.

When the working mode is the airflow circulation mode instead of the normal mode ("NO" to S401), the air conditioner rotates the main fan 220 and the auxiliary fan 230 in predetermined forms for the airflow circulation mode (operation S407).

Specifically, when the airflow circulation mode is performed, the air conditioner rotates the main fan 220 by the preset RPM to draw air of the air-conditioned space, heat-exchanges the drawn air, and discharges the heat-exchanged air through the discharge portion 250b. Here, the main fan 220 may also be rotated by the maximum RPM.

Then, the air conditioner variably controls the rotational state of the second fan 230 (operation S408).

Specifically, the auxiliary fan 230 of the indoor unit 200 of the air conditioner may be rotated by the first RPM, the second RPM, and the third RPM. Here, the second RPM may be greater than the first RPM, and the third RPM may be greater than the second RPM. Here, an airflow discharged from the indoor unit 200 when the auxiliary fan 230 rotates by the first RPM is the same as D1 of FIG. 12 described above, an airflow discharged from the indoor unit 200 when the auxiliary fan 230 rotates by the second RPM is the same as D2 of FIG. 12, and an airflow discharged from the indoor unit 200 when the auxiliary fan 230 rotates by the third RPM is the same as D3 of FIG. 12.

Because the plurality of auxiliary fans 230 are disposed in the indoor unit 200 of the air conditioner, when the RPM of each of the plurality of auxiliary fans 230 is variably controlled independently, various new airflows in which airflow patterns of D1, D2, an D3 of FIG. 12 are combined may be formed. This will be described with reference to FIGS. 17A and 17B part (a) to part (c).

FIGS. 17A and 17B part (a) to part (c) are views illustrating an embodiment of forming various airflow patterns by variably controlling RPM of the plurality of second fans disposed in the indoor unit of the air conditioner. FIG. 17A is a table illustrating forms of variably controlling RPM of the auxiliary fan 230. In FIG. 17B part (a) to part (c), airflows formed by variably controlling RPM in each of the operation operations #1, #2, and #3 illustrated in the table of FIG. 17A are separately shown. The plurality of auxiliary fans 230 each are differentiated as an auxiliary fan A, an auxiliary fan B, and an auxiliary fan C.

In the initial operation, all of the plurality of auxiliary fans 230 begin from an off state.

In the first operation #1 for realizing variable airflow patterns, the auxiliary fan A, the auxiliary fan B, and the auxiliary fan C are rotated by the first RPM, the second RPM, and the third RPM, respectively. Then, in the second operation #2, the auxiliary fan A, the auxiliary fan B, and the auxiliary fan C are rotated by the third RPM, the first RPM, and the second RPM, respectively. Then, in the third operation #3, the auxiliary fan A, the auxiliary fan B, and the auxiliary fan C are rotated by the second RPM, the third RPM, and the first RPM, respectively. The first to third operations #1, #2, and #3 are continuously repeated.

As in the above, the auxiliary fan A, the auxiliary fan B, and the auxiliary fan C are not rotated by the same RPM, but the auxiliary fan A, the auxiliary fan B, and the auxiliary fan C are rotated by different RPM while the RPM of each of the auxiliary fan A, the auxiliary fan B, and the auxiliary fan C is not fixed and may be changed to a rotating manner every predetermined interval.

As a result, the pattern of the airflow discharged through the discharge portion 250b of the indoor unit 200 may be changed in various ways. As illustrated in FIG. 17B part (a) to part (c), a combination of airflows discharged from the discharge portion 250b of the indoor unit 200 changes in every operation. That is, it can be recognized that the discharged airflow forms a D1-D2-D3 combination in the operation #1, the discharged airflow forms a D3-D1-D2 combination in the operation #2, and the discharged airflow forms a D2-D3-D1 combination in the operation #3.

In this manner, the air conditioner may control a state of a discharged airflow generated from at least one of the plurality of discharge portions 250b to be differentiated from states of discharged airflows generated from remaining discharge portions while controlling the plurality of auxiliary fans 230 such that a position at which the differentiated discharged airflow is generated among the plurality of discharge portions 250b cycles. By this, an effect of discharging an airflow while rotating the indoor unit 200 may be obtained.

The time duration for each of the first to third operations #1, #2, and #3 depends on a predetermined amount of time. To increase a speed at which variable airflow patterns are changed, the time duration for each of the operations #1, #2, and #3 may be shortened (e.g. three seconds). Conversely, to relatively slow down the speed at which the variable airflow patterns are changed, the time duration for each of the operations #1, #2, and #3 may be relatively extended (e.g. seven seconds).

As in the above, the RPM of the auxiliary fan 230 may be cyclically changed to form various forms of discharged airflows such that cold air may be discharged in multiple directions of the indoor space, thereby rapidly cooling the indoor space and generating a direct airflow of cold air that directly comes in contact with the user.

Furthermore, the indoor unit 200 may also turn the operation of the auxiliary fan 230 on or off, in order to apply or remove the suction force to or from the discharged airflow in order to adjust the direction of the discharged airflow. This will be described with reference to FIGS. 18A and 18B.

Figure 18B:
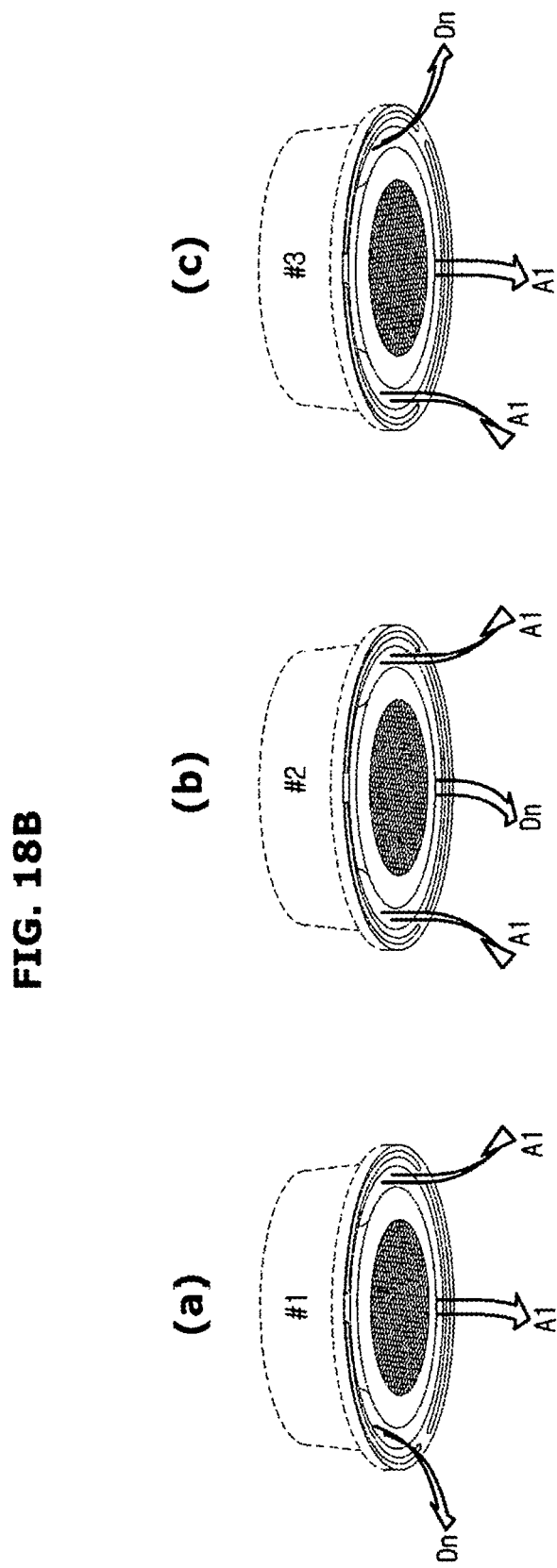

FIGS. 18A and 18B part (a) to part (c) are views illustrating an embodiment of forming variable airflow patterns by variably controlling turning on or off the plurality of second fans disposed in the indoor unit of the air conditioner. FIG. 18A is a table illustrating forms of variably controlling turning on or off the second fan 230. In FIG. 18B part (a) to part (c), forms of airflows discharged in each of the operations #1, #2, and #3 illustrated in the table of FIG. 18A are separately shown. The plurality of auxiliary fans 230 each are differentiated as an auxiliary fan A, an auxiliary fan B, and an auxiliary fan C.

In the initial operation, all of the plurality of auxiliary fans 230 begin from an off state.

In the first operation #1 for realizing variable airflow patterns, only the auxiliary fan A is turned on, and the remaining auxiliary fan B and auxiliary fan C are turned off. Then, in the second operation #2, only the auxiliary fan B is turned on, and the remaining auxiliary fan A and auxiliary fan C are turned off. Then, in the third operation #3, only the auxiliary fan C is turned on, and the remaining auxiliary fan B and auxiliary fan A are turned off. The first to third operations #1, #2, and #3 are continuously repeated.

An airflow Dn illustrated in FIG. 18B part (a) to part (c) refers to any one of the airflows D1, D2, and D3 formed in accordance with the RPM of the auxiliary fan 230 as described above with reference to FIGS. 17A and 17B part (a) to part (c) (n=1, 2, 3). That is, the airflow Dn formed by the auxiliary fan 230 which is turned on among the plurality of auxiliary fans 230 may be any one of the airflows D1, D2, and D3 formed in accordance with the RPM of the auxiliary fan 230. Other airflows A1 illustrated in FIG. 18B part (a) to part (c) refer to discharged airflows A1 when the auxiliary fan 230 does not operate. That is, an airflow same as Dn illustrated in FIG. 18B part (a) to part (c) is formed when the auxiliary fan 230 is turned on, and airflows same as A1 in FIG. 18B part (a) to part (c) are formed when the auxiliary fan 230 is turned off.

As in the above, the auxiliary fan A, the auxiliary fan B, and the auxiliary fan C are not controlled at once to be turned on or off uniformly, but at least one of the auxiliary fan A, the auxiliary fan B, and the auxiliary fan C is controlled to be turned off or turned on while the on/off state of each of the auxiliary fan A, the auxiliary fan B, and the auxiliary fan C is not fixed and may be switched to a rotating manner every predetermined interval.

As a result, the pattern of the airflow discharged through the discharge portion 250b of the indoor unit 200 changes in various ways. As illustrated in FIG. 18B part (a) to part (c), a combination of airflows discharged from the discharge portion 250b of the indoor unit 200 changes in every operation. That is, it can be recognized that the discharged airflow forms a Dn-A1-A1 combination in the operation #1, the discharged airflow forms an A1-Dn-A1 combination in the operation #2, and the discharged airflow forms an A1-A1-Dn combination in the operation #3.

In this manner, the air conditioner may control a state of a discharged airflow generated from at least one discharge portion of the plurality of discharge portions 250b to be differentiated from states of discharged airflows generated from remaining discharge portions while controlling the plurality of auxiliary fans 230 such that a position at which the differentiated discharged airflow is generated among the plurality of discharge portions 250b circulates. By this, an effect of discharging an airflow while rotating the indoor unit 200 may be obtained.

The time duration for each of the first to third operations #1, #2, and #3 depends on a predetermined amount of time. To increase a speed at which variable airflow patterns are changed, the time duration for each of the operations #1, #2, and #3 may be shortened (e.g. three seconds). Conversely, to relatively slow down the speed at which the variable airflow patterns are changed, the time duration for each of the operations #1, #2, and #3 may be relatively extended (e.g. seven seconds).

Returning to FIG. 16, the air conditioner checks whether the working mode is switched from the airflow circulation mode to the normal mode while the airflow circulation mode is performed (operation S409).

When the working mode is switched from the airflow circulation mode to the normal mode ("YES" to S409), the air conditioner continues to the operation S402 to perform the normal mode.

Unlike the above, when the working mode is continuously maintained as the airflow circulation mode ("NO" to S409), the air conditioner continues to the operation S408 of variably controlling the rotational state of the auxiliary fan 230.

Forming variable airflow patterns by controlling RPM of the auxiliary fan 230 is illustrated in FIGS. 17A and 17B part (a) to part (c), and forming variable airflow patterns by controlling an on/off state of the auxiliary fan 230 is illustrated in FIGS. 18A and 18B part (a) to part (c).

The air conditioner according to the embodiment of the present disclosure is not limited to performing any one of controlling the RPM of the auxiliary fan 230 and controlling the on/off state of the auxiliary fan 230 and may form another form of variable airflows by combining the controlling of the RPM and the controlling of the on/off state of the auxiliary fan 230. For example, some of the auxiliary fan A, the auxiliary fan B, and the auxiliary fan C may have the on/off state thereof controlled and the remaining auxiliary fans may have the RPM thereof controlled. In another example, some of the auxiliary fan A, the auxiliary fan B, and the auxiliary fan C may have the on/off state thereof controlled and the remaining auxiliary fans may have RPM thereof controlled, and after a predetermined amount of time passes, the roles may be exchanged with each other and some of the auxiliary fan A, the auxiliary fan B, and the auxiliary fan C may have RPM thereof controlled and the remaining auxiliary fans may have the on/off state thereof controlled.

In addition, although not illustrated in FIG. 16, when the shutdown command is generated while the airflow circulation mode is being performed, the rotations of the main fan 220 and the auxiliary fan 230 may be stopped as in the operation S412 described above. Here, the air conditioner may also stop the operations of the compressor and the outdoor fan.

Figure 19:
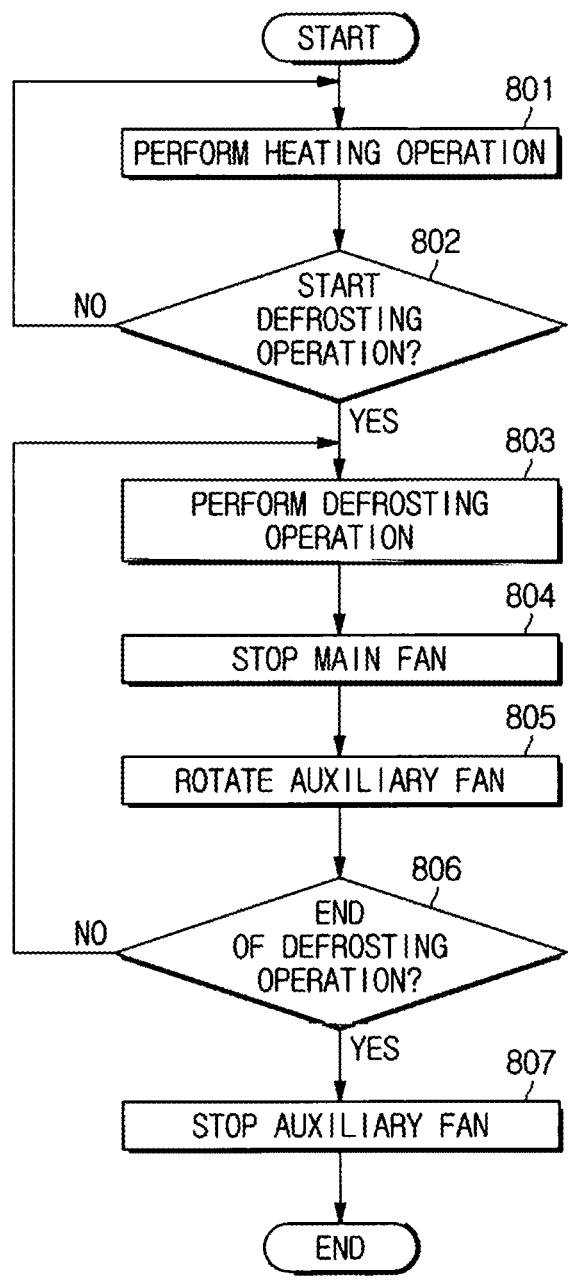
FIG. 19 is a control flow chart of the defrosting operation of an air conditioner according to an embodiment.
Figure 20:
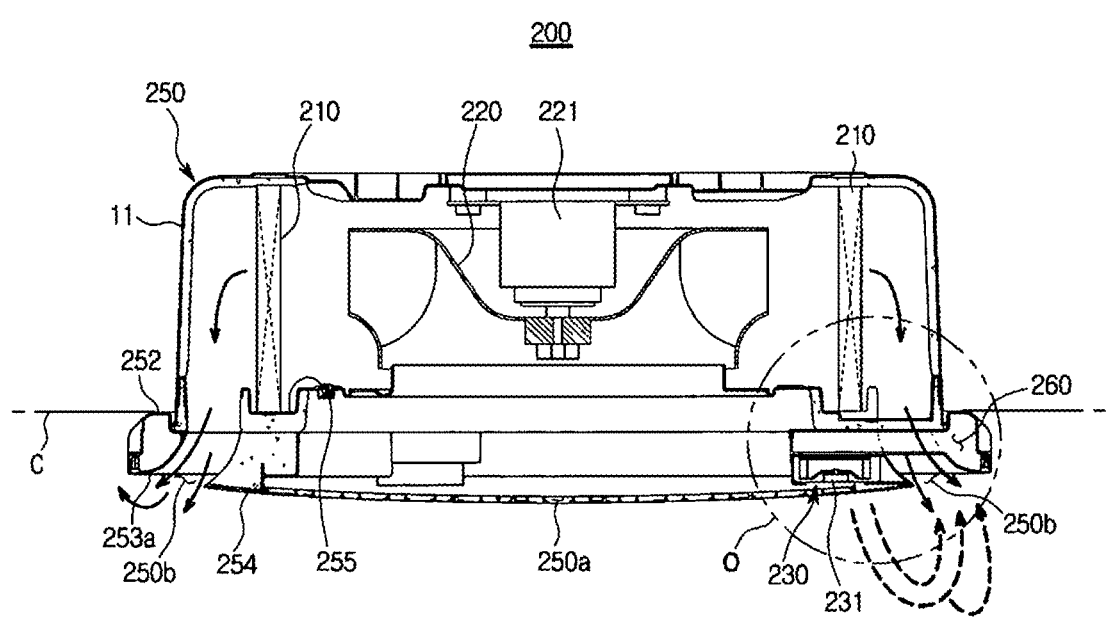
FIG. 20 is an exemplary view of adjusting an airflow during the defrosting operation of an air conditioner according to an embodiment.

FIG. 19 is a control flow chart of the defrosting operation of the air conditioner according to the embodiment, and FIG. 20 is an exemplary view of adjusting an airflow during the defrosting operation of the air conditioner according to the embodiment.

The order of controlling the defrosting operation will be described with reference to FIGS. 19 and 20.

The air conditioner performs the heating operation (operation S801).

When a power-on signal is input via the input unit 270 or the remote controller (not shown) of the indoor unit, the air conditioner checks an operation mode and controls the flow passages of the four-way valve 160 when the operation mode is the heating operation. Also, the air conditioner drives the compressor 110 and adjusts the opening of the expansion valve 130 to allow the refrigerant compressed by the compressor 110 to move to the indoor heat exchanger 210 via the four-way valve 160.

Here, the refrigerant of the indoor heat exchanger 210 is delivered to the outdoor heat exchanger 120 via the expansion valve 130. In this manner, the air conditioner may allow the refrigerant to be circulated in the heating cycle to perform the heating operation. Here, the outdoor heat exchanger 120 of the outdoor unit serves as an evaporator. As the time of performing the heating operation increases, dew is formed and frost is generated on the surface of the outdoor heat exchanger 120.

The air conditioner performs the heating operation in the normal mode or the high speed mode. The air conditioner may adjust the direction of airflow discharged through the discharge portion while controlling the RPM of the main fan 220 of the indoor unit 200 based on a selected working mode and controlling the RPM of the auxiliary fan 230 based on the RPM of the main fan 220.

As in the above, the air conditioner determines a start of the defrosting operation for removing the frost on the outdoor heat exchanger 120 while performing the heating operation (operation S802).

The determining of the start of the defrosting operation includes checking a defrosting temperature corresponding to a detected outdoor temperature and comparing the checked defrosting temperature with the detected temperature of the outdoor heat exchanger to determine as the start of the defrosting operation when the temperature of the outdoor heat exchanger is equal to or lower than the defrosting temperature.

The checking of the defrosting temperature takes into consideration that the temperature of the outdoor heat exchanger may vary in accordance with the outdoor temperature and whether the frost is formed, and checks the temperature of the outdoor heat exchanger when the frost is formed at each outdoor temperature in order to accurately recognize whether the frost is formed.

In addition, the determining of the start of the defrosting operation may also include counting the operation time of the compressor while the heating operation is being performed, and determining as the start of the defrosting operation when the counted operation time of the compressor is equal to or longer than a preset amount of time.

When the start of the defrosting operation is determined ("YES" to S802), the air conditioner switches the flow passages of the four-way valve 160 to perform the cooling cycle in order to perform the defrosting operation (operation S803).

Here, the outdoor heat exchanger of the outdoor unit serves as a condenser, and the indoor heat exchanger of the indoor unit serves as an evaporator.

Then, the air conditioner stops the rotation of the main fan 220 (operation S804) and rotates the auxiliary fan 230 (operation S805). As a result, air flowed to the indoor space is drawn again.

As illustrated in FIG. 20, a process, in which air of the indoor space is forcibly drawn and air heat-exchanged in the indoor heat exchanger is forcibly discharge, does not occur because he main fan 220 of the indoor unit is stopped, however, a state, in which air naturally heat-exchanged in the indoor heat exchanger 210 that serves as an evaporator is discharged to the indoor space, occurs during the defrosting operation.

Accordingly, the indoor unit 200 rotates the auxiliary fan 230 to adjust the direction of the airflow discharged through the discharge portion to be upward. By this, the air naturally heat-exchanged in the indoor heat exchanger 210 may be prevented from moving to the indoor space.

The rotating of the auxiliary fan 230 includes checking the RPM of the main fan 220 during the heating operation right before the defrosting operation and controlling the RPM of the auxiliary fan 230 based on the checked RPM of the main fan 220.

The air conditioner determines an end of the defrosting operation while performing the defrosting operation (operation S806).

Here, the determining of the end of the defrosting operation includes detecting the temperature of the outdoor heat exchanger while performing the defrosting operation, determining whether the detected temperature of the outdoor heat exchanger is equal to or higher than a preset temperature, and determining as the end of the defrosting operation when the detected temperature of the outdoor heat exchanger is determined to be equal to or higher than the preset temperature.

In addition, the determining of the end of the defrosting operation may also include counting the operation time of the defrosting while the defrosting operation is being performed and determining whether the counted operation time of the defrosting has exceeded a preset amount of time.

When the end of the defrosting operation is determined to have arrived ("YES" to S806), the air conditioner stops the auxiliary fan 230 (operation S807).

In addition, the air conditioner switches the flow passages of the four-way valve 160 and rotates the main fan 220 again to perform the heating operation.

The air conditioner may perform the heating operation in a working mode that was performed right before the defrosting operation. When however, the working mode is changed by the user, the main fan 220 and the auxiliary fan 230 are rotated based on the changed working mode.

Figure 21:
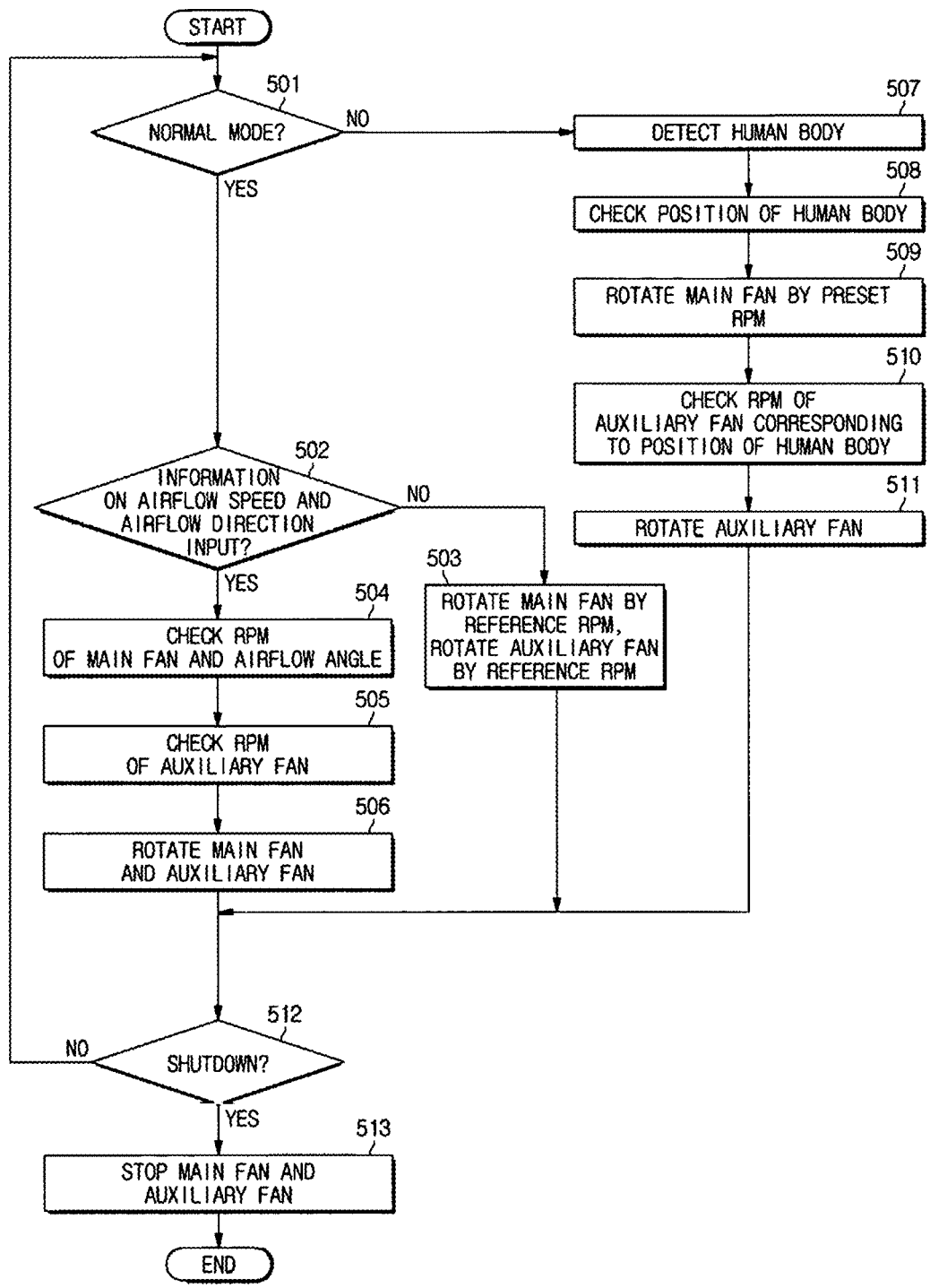
FIG. 21 is a control flow chart of an air conditioner according to an embodiment.

FIG. 21 is a control flow chart of an air conditioner according to an embodiment.

When a power-on signal is input via the input unit 270 or the remote controller (not shown) of the indoor unit 200, the air conditioner checks an operation mode, and when the operation mode is the cooling operation, drives the compressor 110 and opens the expansion valve 130 to allow the refrigerant compressed by the compressor 110 to move to the indoor heat exchanger 210 via the outdoor heat exchanger 120 and the expansion valve 130. In this manner, the air conditioner allows the refrigerant to be circulated in the cooling cycle to perform the cooling operation. Furthermore, when the four-way valve is disposed, the air conditioner controls the flow passages of the four-way valve 160 to perform the cooling operation.

The air conditioner may perform the cooling operation in various working modes. Here, the working modes may include the normal mode and the high speed mode.

When a working mode is input via the input unit 270 or the remote controller (not shown) of the indoor unit 200, the air conditioner determines whether the input working mode is the normal mode or the high speed mode (operation S501).

When the checked working mode is the normal mode ("YES" to S501), the air conditioner performs operations S502, S503, S504, S505, S506, S512, and S513. Because the operations S502, S503, S504, S505, S506, S512, and S513 are the same as the operations S302, S303, S304, S305, S306, S311, and S312 described above with reference to FIG. 10, the description thereof will be omitted.

When the high speed mode is input ("NO" to S501), the air conditioner activates the operation of the third detection unit 244 to detect a human body in the indoor space (operation S507).

When a human body is detected, the air conditioner checks the position of the human body (operation S508) and checks an airflow angle corresponding to the checked position.

In addition, the air conditioner rotates the main fan 220 by the preset RPM (operation S509), checks the RPM of the auxiliary fan 230 corresponding to the RPM of the main fan 220 and the airflow angle (operation S510), and rotates the auxiliary fan 230 by the checked RPM (operation S511).

As in the above, when performing in the high speed mode, the air conditioner rotates the main fan 220 by the preset RPM to draw air of the indoor space, heat-exchanges the drawn air, and discharges the heat-exchanged air through the discharge portion. Here, the main fan 220 may also be rotated by the maximum RPM.

Then, the air conditioner controls the RPM of the auxiliary fan 230 to adjust the direction of the airflow discharged from the indoor unit 200 to head toward the position of the user, thereby generating a direct airflow of cold air that directly comes in contact with the user.

Then, the air conditioner determines whether the shutdown command has been input (operation S512), and, stops the main fan 220 and the auxiliary fan 230 (operation S513) when it is determined that the shutdown command has been input ("YES" to S512). In addition, the air conditioner also stops the operations of the compressor and the outdoor fan.

Figure 22:
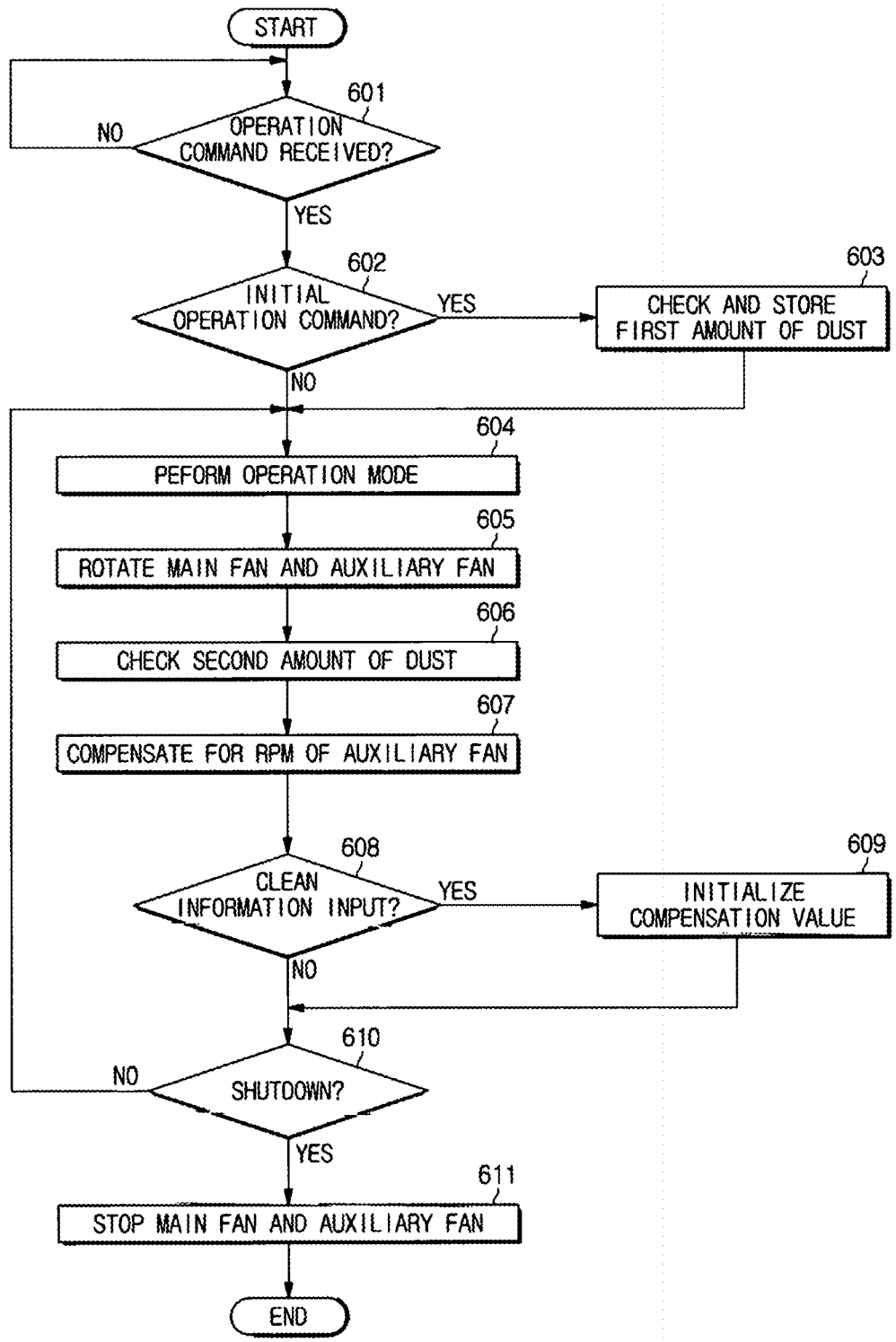
FIG. 22 is a control flow chart of an air conditioner according to an embodiment.

FIG. 22 is a control flow chart of an air conditioner according to an embodiment.

When a power-on signal is input via the input unit 270 or the remote controller (not shown) of the indoor unit, the air conditioner supplies operating power to various types of loads in the indoor unit and the outdoor unit.

When an operation command is received ("YES" to S601), the air conditioner determines whether the received operation command is an initial operation command (operation S602).

When the received operation command is determined to be an initial operation command ("YES" to S602), the air conditioner checks the amount of dust in the filter portion based on the information detected by the fourth detection unit 245 and stores the checked amount of dust as a first amount of dust (operation S603).

The air conditioner drives the various types of loads in the indoor unit and the outdoor unit to perform an operation mode, i.e. the heating operation or the cooling operation (operation S604).

The air conditioner may perform the cooling operation in various working modes. Here, the working modes may include the normal mode and the high speed mode, and because the operations to control the normal mode and the high speed mode are the same as in the previous embodiment, the description thereof will be omitted.

While performing an operation mode, the air conditioner checks the RPM of the main fan 220 and the auxiliary fan 230 based on a working mode, airflow direction information, and airflow speed information and rotates each of the main fan 220 and the auxiliary fan 230 by the checked RPM (operation S605).

The air conditioner checks a second amount of dust in the filter portion in a predetermined cycle during the operation (operation S606).

Here, the checking of the amount of dust in the filter portion may include using an optical sensor to detect the amount of light and checking the amount of dust corresponding to the detected amount of light, may include using an air pressure sensor to detect the air pressure and checking the amount of dust corresponding to the detected air pressure, or may include detecting the current of the first motor and checking the amount of dust corresponding to the detected current.

In addition, the checking of the amount of dust in the filter portion may include checking a duty ratio of the PWM for rotating the first motor 221 by the maximum RPM.

The air conditioner checks a value for compensating the RPM of the auxiliary fan 230 corresponding to the first amount of dust and the second amount of dust to compensate for the RPM of the auxiliary fan 230 (operation S607).

When the airflow speed decreases due to the RPM of the main fan 220 decreasing due to dust in the filter portion, the air conditioner may lower RPM of the auxiliary fan 230 to maintain the airflow direction.

In addition, when the checked amount of dust is equal to or larger than a reference amount of dust, the air conditioner outputs cleaning information for performing cleaning.

When clean information is input to the input unit (operation S608), the air conditioner initializes the compensation value of the auxiliary fan 230 (operation S609).

The air conditioner determines whether the shutdown command has been input (operation S610), and stops the main fan and the auxiliary fan (operation S611) when it is determined that shutdown command has been input ("YES" to S610). In addition, the air conditioner also stops the operations of the compressor and the outdoor fan.

Figure 23:
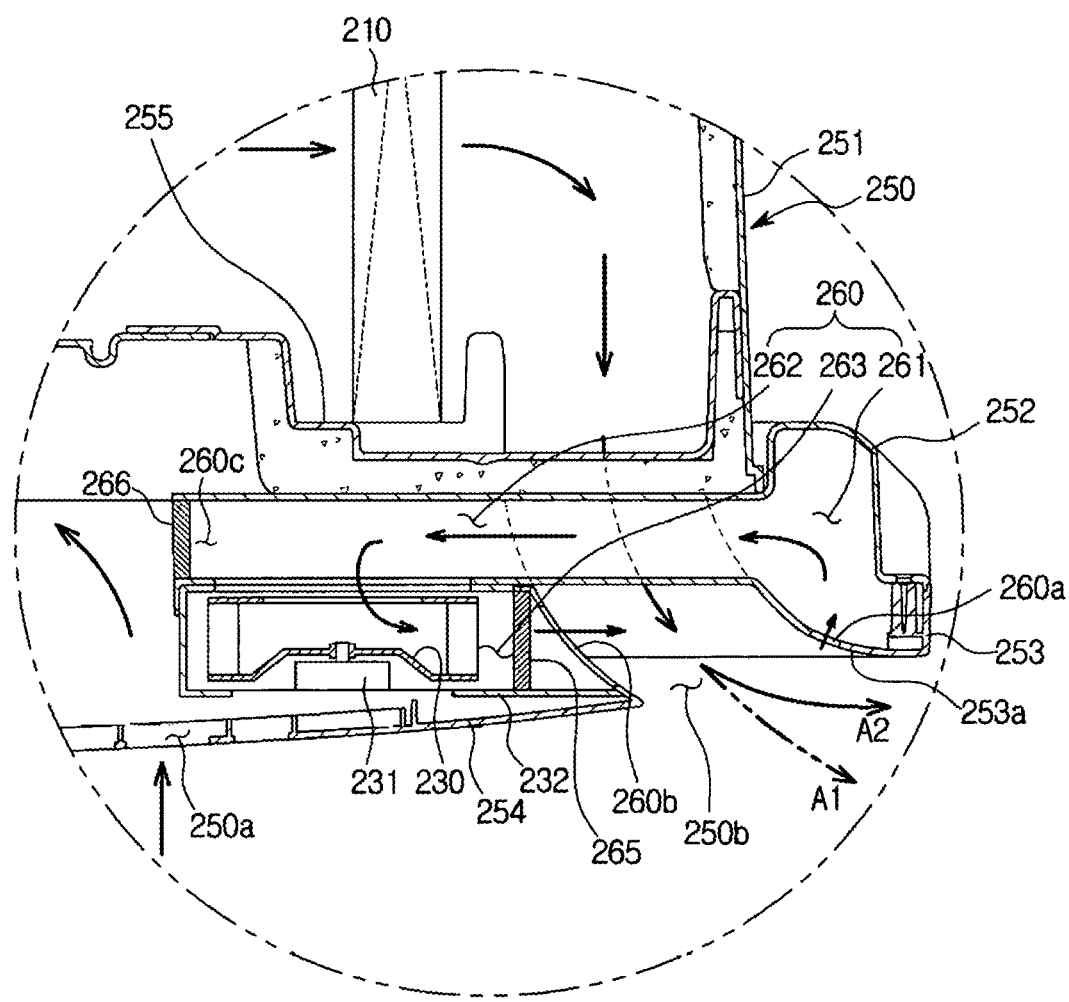
FIG. 23 is an exemplary view of airflow control units disposed in an air conditioner according to an embodiment.

FIG. 23 is an exemplary view of airflow control units AP3 disposed in the air conditioner according to an embodiment.

Furthermore, like reference numerals will be given to like elements which are the same as those in FIG. 2 described above, and the description thereof will be omitted.

The airflow control units AP3 may include at least one auxiliary fan 230 to generate a suction force for suctioning in air around the discharge portion 250*b*, the second motor 231 to apply a driving force to each of the auxiliary fans 230, and the flow passage portion 260 to form a flow passage for guiding air drawn by each of the auxiliary fans 230.

The flow passage portion 260 includes the inlet portion 260*a* to draw the air around the discharge portion 250*b*, a first outlet portion 260*b* to discharge the drawn air toward the discharge portion, and a second outlet portion 260*c* to discharge the drawn air toward the indoor heat exchanger.

In addition, the flow passage portion 260 may further include the first flow passage 261 formed at the outer portion of the housing 250 in the circumferential direction to communicate with the inlet portion 260*a*, the second flow passage 262 configured to extend from the first flow passage 261 to the radial inner portion, and the third flow passage 263 formed in the case 232. Consequently, the air drawn through the inlet portion 260*a* may pass through the first flow passage 261, the second flow passage 262, and the third flow passage 263 and be discharged through the first outlet portion 260*b* or the second outlet portion 260*c*.

Furthermore, the flow passage portion 260 may further include a first opening-and-closing member 265 disposed in the third flow passage 263 to open and close the first outlet portion 260*b* and a second opening-and-closing member 266 disposed in the second flow passage 262 to open and close the second outlet portion 260*c*. Here, the first opening-and-closing member 265 and the second opening-and-closing member 266 may be dampers.

The airflow control units AP3 may discharge the drawn air in the opposite direction of the direction A1 in which the discharged air flows, may enlarge the angle of the discharged airflow, and may further facilitate controlling of the airflow. That is, when the direction of the discharged airflow is the direction A1 when the plurality of auxiliary fans 230 of the airflow control units AP3 do not operate, the plurality of auxiliary fans 230 of the airflow control units AP3 may operate to draw air from one direction off of the direction A1, thereby switching the direction of the discharged airflow to the direction A2.

Here, switching of the angle of the discharged airflow may be adjusted in accordance with the amount of air drawn by the auxiliary fan 230. That is, the angle of the discharged airflow may be switched to a small angle when the amount of air drawn by the auxiliary fan 230 is large, and the angle of the discharged airflow may be switched to a large angle when the amount of air drawn by the auxiliary fan 230 is small. Here, the angle of the discharged airflow is based on the surface of the ceiling. That is, the angle of the discharged airflow is 0° in the horizontal direction corresponding to the surface of the ceiling and is 90° in the direction perpendicular to the surface of the ceiling.

The structure of the flow passage portion 260 of the embodiment is merely an example, and the flow passage portion 260 may have any structure, shape, and arrangement as long as the flow passage portion 260 connects the inlet portion 260*a*, the first outlet portion 260*b*, and the second outlet portion 260*c*.

Figure 24:
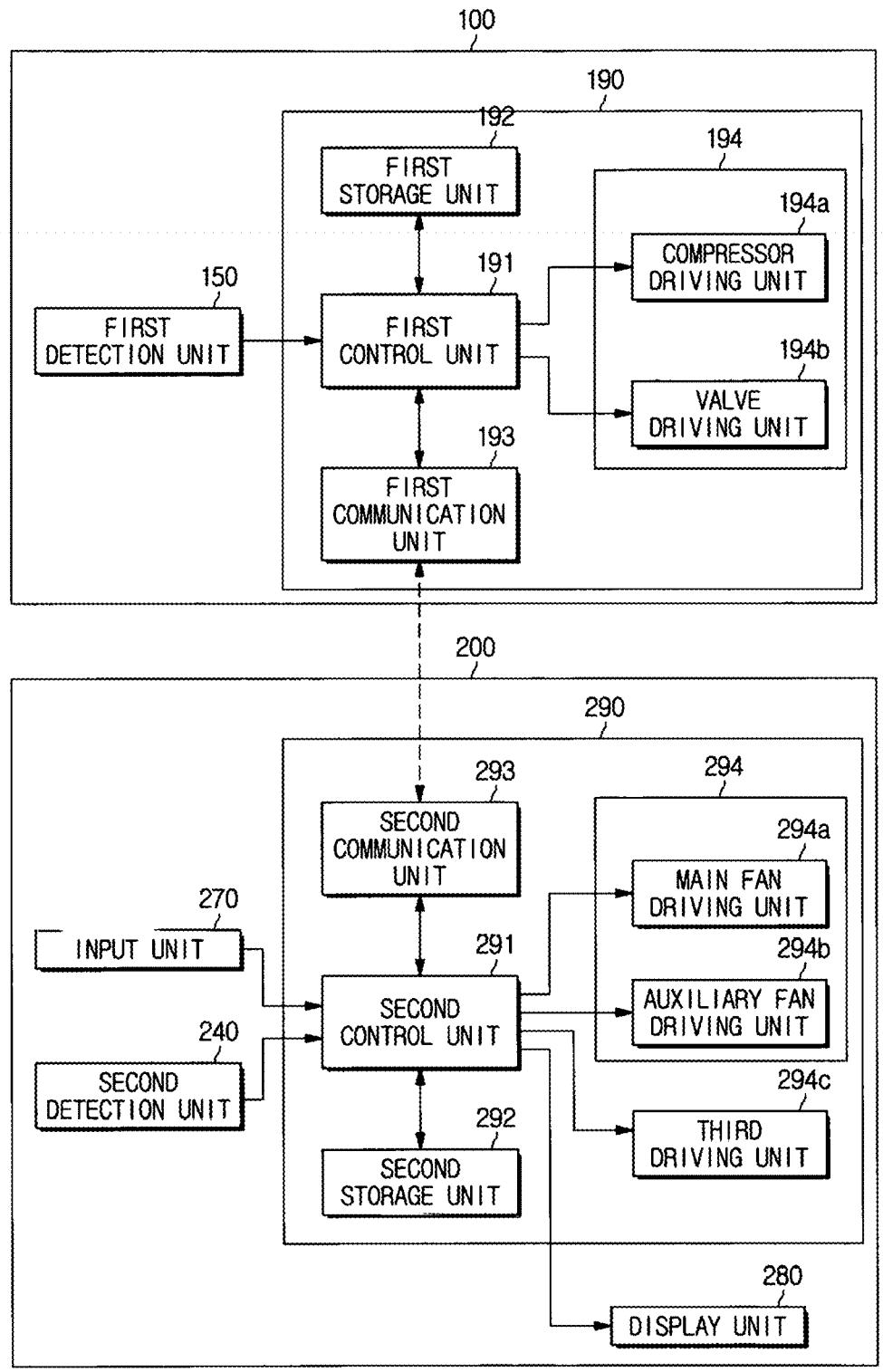
FIG. 24 is a control block diagram of an air conditioner according to an embodiment.

FIG. 24 is a control block diagram of an air conditioner according to an embodiment.

The air conditioner according to an embodiment includes the outdoor unit 100 and the indoor unit 200, and the outdoor unit 100 and the indoor unit 200 communicate with each other. That is, the outdoor unit 100 and the indoor unit 200 transmit and receive information on each other, i.e., information of the outdoor unit 100 and information of the indoor unit 200.

The outdoor unit 100 of the air conditioner includes the first driving module 190 for controlling various types of devices such as the first detection unit 150, the compressor, and the expansion valve, etc. Because the first detection unit 150 and the first driving module 190 are the same as those included in the outdoor unit 100 in the embodiment illustrated in FIG. 9, the description thereof will be omitted.

The indoor unit 200 of the air conditioner includes the second detection unit 240, the input unit 270, the display unit 280, and the second driving module 290. Because the second detection unit 240, the input unit 270, and the display unit 280 are the same as those included in the indoor unit 200 in the embodiment illustrated in FIG. 9, the description thereof will be omitted.

The second driving module 290 controls rotations of the main fan 220 and the auxiliary fan 230 based on the information input to the input unit 270 and the information detected by the second detection unit 240 and includes the second control unit 291, the second storage unit 292, the second communication unit 293, the second driving unit 294, and the third driving unit 294c. Because the second storage unit 292, the second communication unit 293, and the second driving unit 294 are the same as those included in the indoor unit 200 in the embodiment illustrated in FIG. 9, the description thereof will be omitted.

The second control unit 291 controls operations of the main fan 220, the auxiliary fan 230, etc. based on the information input to the input unit 270 and the information received by the second communication unit 293.

When the normal mode is selected, the second control unit 291 controls the first opening-and-closing member 265 to be open to open the first outlet portion 260b and controls the second opening-and-closing member 266 to be closed to close the second outlet portion 260c. By this, the second control unit 291 allows air introduced by the auxiliary fan 230 to be discharged to the discharge portion.

In addition, when the normal mode is selected, the second control unit 291 controls the main fan 220 and the auxiliary fan 230 so that an airflow having a reference airflow speed and a reference airflow direction is discharged. In the normal mode, when information on the airflow speed and the airflow direction is input, the second control unit 291 checks the RPM of the main fan 220 corresponding to the input airflow speed information, checks an airflow angle corresponding to the airflow direction information, and controls the RPM of the auxiliary fan 230 based on the checked RPM of the main fan 220 and the airflow angle.

When the high speed mode is selected, the second control unit 291 controls the main fan 220 by the preset RPM and controls the RPM of the auxiliary fan 230 based on the RPM of the main tan 220.

Figure 25:
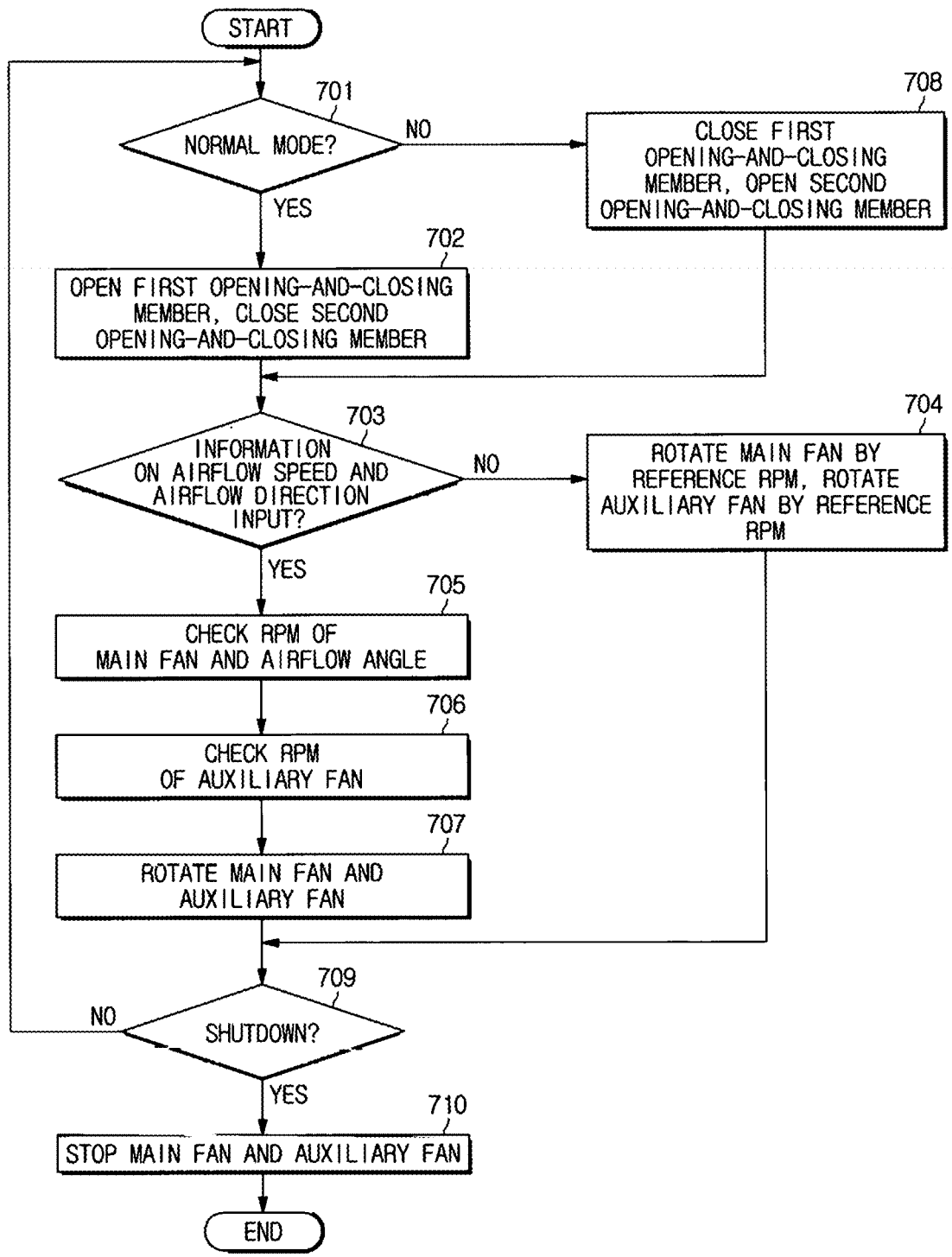
FIG. 25 is a control flow chart of an air conditioner according an embodiment.
Figure 26:
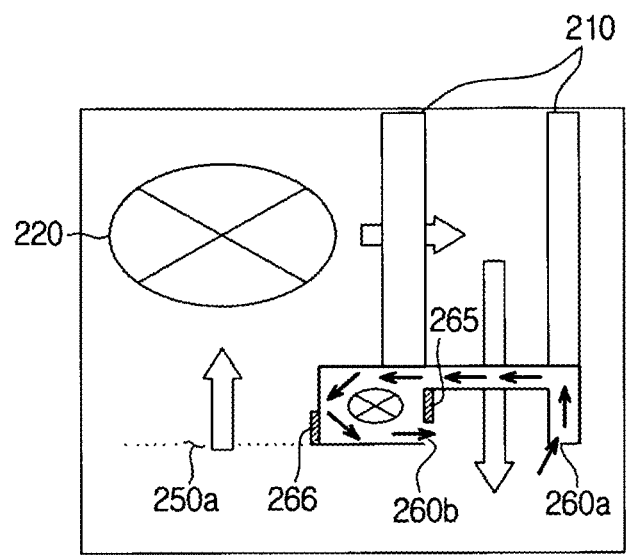
FIGS. 26 and 27 are exemplary views of airflows in an indoor unit disposed in an air conditioner according to an embodiment.
Figure 27:
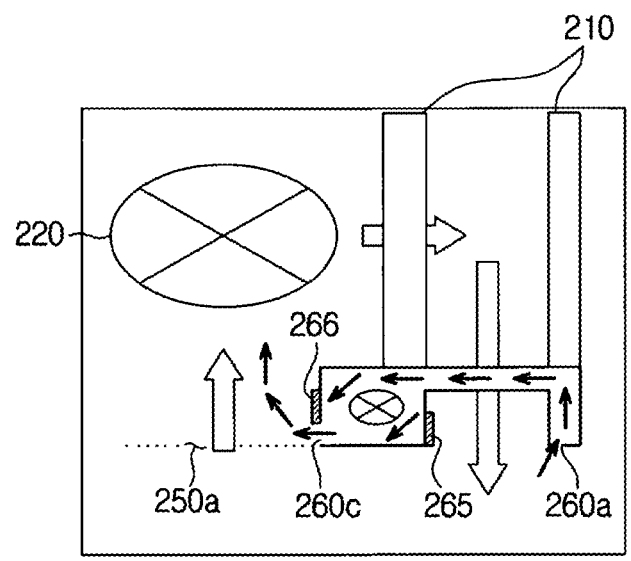

FIG. 25 is a control flow chart of the air conditioner according an embodiment, and FIGS. 26 and 27 are exemplary views of airflows in the indoor unit disposed in the air conditioner according to an embodiment.

When a power-on signal is input via the input unit 270 or the remote controller (not shown) of the indoor unit, the air conditioner checks an operation mode and performs the checked operation mode.

The air conditioner may perform the heating operation or the cooling operation in various working modes. Here, the working modes may include the normal mode and the high speed mode.

When a working mode is input via the input unit 270 or the remote controller (not shown) of the indoor unit, the air conditioner determines whether the input working mode is the normal mode or the high speed mode (operation S701).

When the checked working mode is the normal mode ("YES" to S701), the air conditioner opens the first opening-and-closing member 265 and closes the second opening-and-closing member 266 (operation S702).

When the checked operation mode is the normal mode, as illustrated in FIG. 26, the air conditioner controls the first opening-and-closing member 265 to be open to open the first outlet portion 260b and controls the second opening-and-closing member 266 to be closed to close the second outlet portion 260c. By this, air introduced by the auxiliary fan 230 may be discharged to the discharge portion.

In addition, the air conditioner determines whether information on the airflow speed and the airflow direction is input in the normal mode (operation S703), and rotates the main fan 220 and the auxiliary fan 230 by the reference RPM (operation S704) when it is determined that there is no input information on the airflow speed and the airflow direction ("NO" to S703).

Specifically, the air conditioner rotates the main fan 220 by the reference RPM to draw air of the indoor space, heat-exchanges the drawn air, and discharges the heat-exchanged air through the discharge portion at a reference airflow speed. In addition, the indoor unit of the air conditioner rotates the auxiliary fan 230 by the reference RPM to apply a suction force to the airflow discharged through the discharge portion and adjusts the airflow direction to be a reference direction. Here, air drawn by the rotation of the auxiliary fan 230 is discharged again to the outside of the indoor unit through the flow passage portion 260.

In this manner, the indoor unit 200 of the air conditioner may rotate the main fan 220 by the reference RPM and rotate the auxiliary fan 230 by the reference RPM during the normal mode to adjust the speed and the direction of the airflow discharged to the indoor space to be the reference airflow speed and the reference airflow direction.

When it is determined that the airflow speed information and the airflow direction information have been input while the normal mode is selected ("YES" to S703), the air conditioner checks the RPM of the main fan 220 corresponding to the airflow speed information and the airflow angle corresponding to the airflow direction information (operation S705), and checks the RPM of the auxiliary fan 230 based on the RPM of the main fan 220 and the airflow angle checked (operation S706).

Then, the air conditioner rotates the main fan 220 and the auxiliary fan 230 by the checked RPM (operation S707). Furthermore, the reference airflow speed is applied as the airflow speed information when the airflow speed information is not input, and the reference airflow direction is applied as the airflow direction information when the airflow direction information is not input.

When the high speed mode is input ("NO" to S701), the air conditioner closes the first opening-and-closing member 265 and opens the second opening-and-closing member 266 (operation S708).

As illustrated in FIG. 27, the indoor unit 200 controls the first opening-and-closing member 265 to be closed to close the first outlet portion 260b and controls the second opening-and-closing member 266 to be opened to open the second outlet portion 260c. In this way, the air introduced by the auxiliary fan 230 may be discharged to the indoor heat exchanger. In this manner, the indoor unit 200 re-suctions in the discharged air, thereby compensating for a temperature of discharged air at an initial stage of cooling and heating operations and improving cooling and heating temperatures sensed by the user.

In addition, the air conditioner rotates the main fan 220 by the preset RPM, checks the RPM of the auxiliary fan 230 corresponding to the RPM of the main fan and the airflow angle, and rotates the auxiliary fan 230 by the RPM checked. Here, the air conditioner may also rotate the main fan 220 by the maximum RPM.

Furthermore, the air conditioner may determine whether the airflow direction information and the airflow speed information have been input even in the high speed mode, and, when the airflow direction information and the airflow speed information have been input, may control the RPM of the main fan 220 and the auxiliary fan 230 based on the airflow direction information and the airflow speed information.

The air conditioner determines whether the shutdown command has been input (operation S709) and, when it is determined that the shutdown command has been input, stops the main fan and the auxiliary fan (operation S710).

In the above, an operation of controlling an airflow direction based on the circular ceiling-mounted indoor unit has been described. However, the structure of the indoor unit is not limited to be formed in the circular shape and being installed on the ceiling.

In other words, the indoor unit may have any shape as long as the indoor unit includes a main fan that generates an airflow and an auxiliary fan that changes the direction of the airflow, and the shape of the indoor unit may be changed in various ways. For example, the indoor unit may be a quadrilateral ceiling-mounted indoor unit, a wall-mounted indoor unit, or a stand-type indoor unit.

Hereinafter, another example among various structures of an indoor unit will be described.

Figure 28:
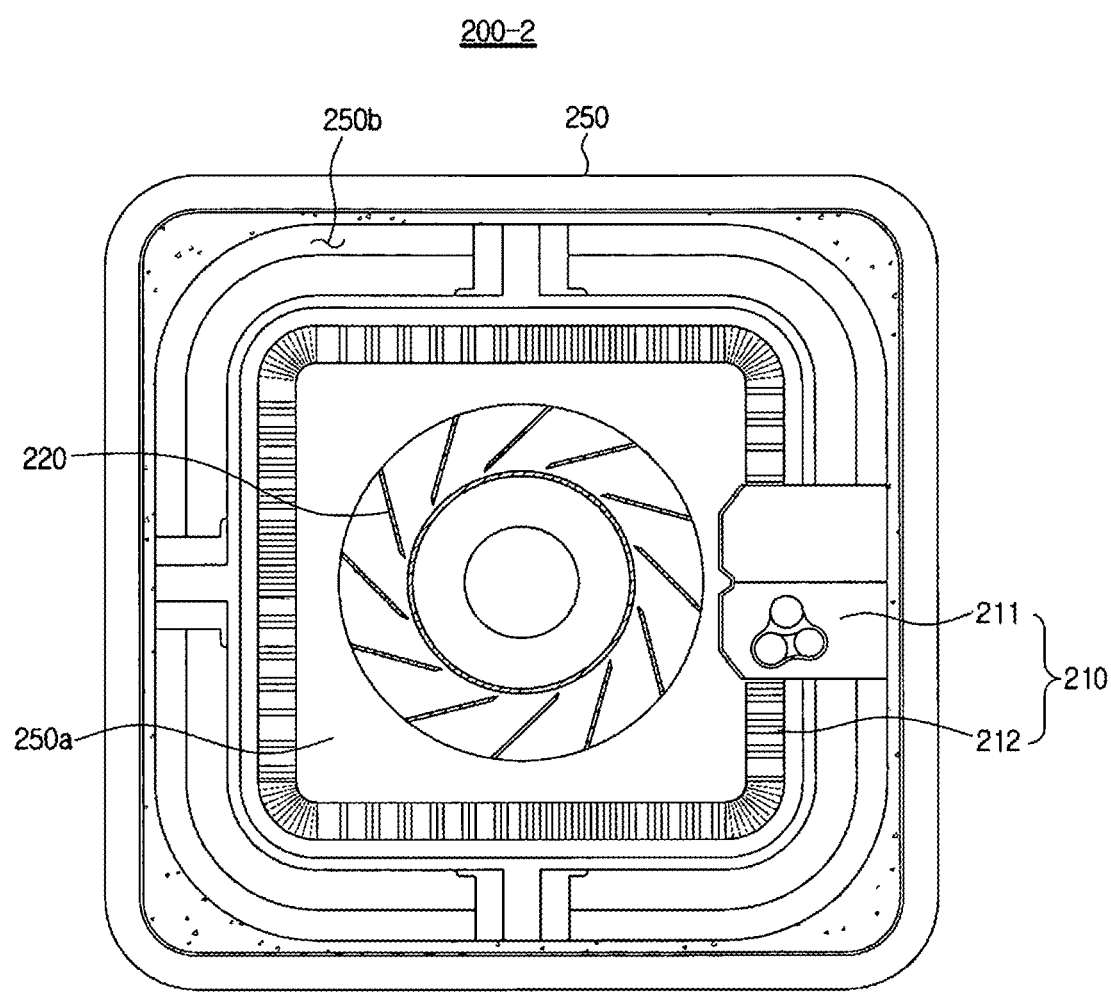
FIGS. 28 and 29 are exemplary views of an indoor unit of an air conditioner according to an embodiment.
Figure 29:
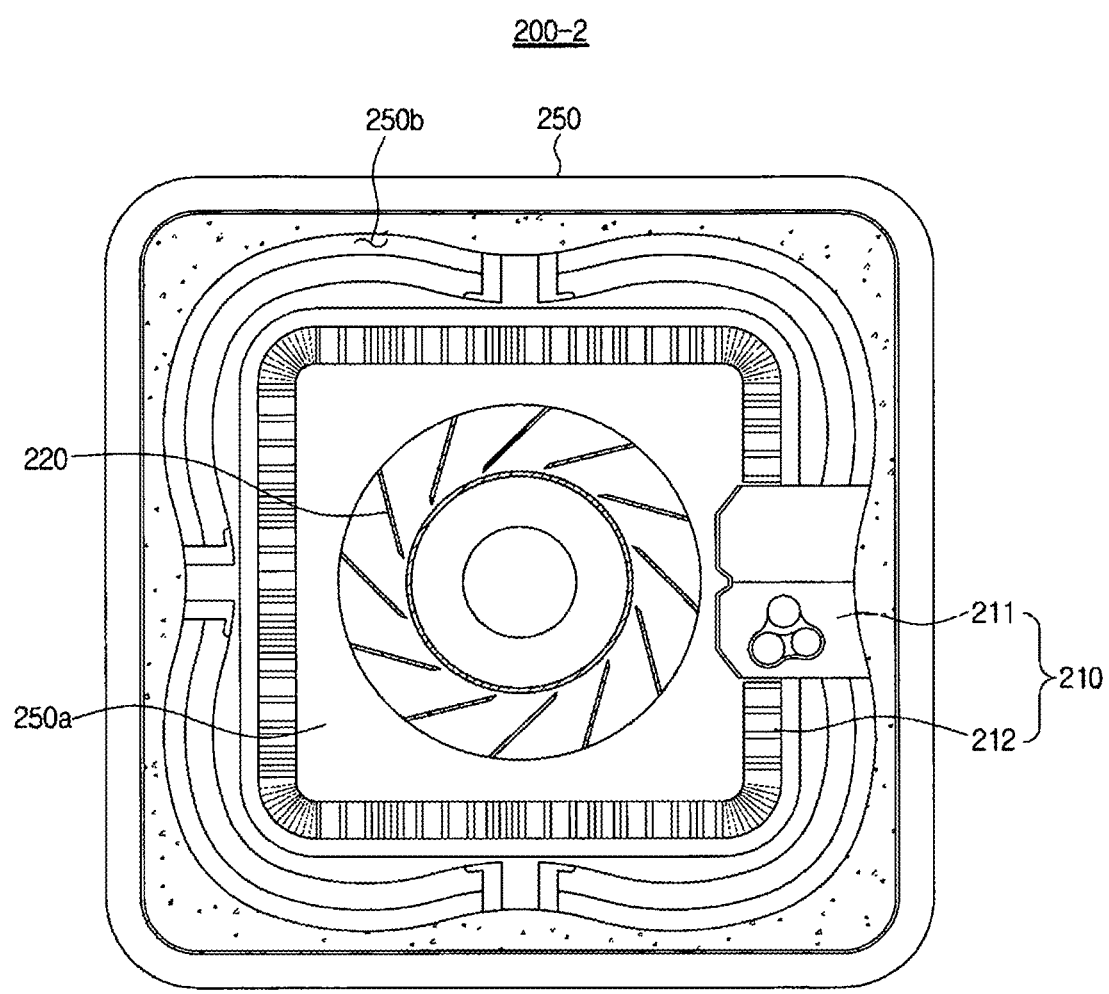

FIGS. 28 and 29 are exemplary views of an indoor unit of an air conditioner according to an embodiment. Like reference numerals will be given to like elements overlapping with those in the embodiments mentioned above, and the description thereof will be omitted.

As illustrated in FIG. 28, an indoor unit 200-2 of an air conditioner includes the housing 250 having a nearly quadrilateral shape when viewed in the vertical direction.

The suction portion 250a through which air is drawn may be formed at a central portion of a bottom surface of the housing 250, and the discharge portion 250b through which air is discharged may be formed at a radial outer portion of the bottom surface of the suction portion.

The discharge portion 250b may have a nearly quadrilateral shape when viewed in the vertical direction and corner portions thereof may be roundly formed.

Although the discharge portion of the indoor unit of the conventional air conditioner can only have a straight shape in order to rotate the blade, the discharge portion 250b according to the embodiment does not have a blade structure and thus may have the rounded corner portions.

In addition, the discharge portion 250b may have various polygonal shapes including a triangular shape, a pentagonal shape, a hexagonal shape, etc. other than the quadrilateral shape.

In the housing 250, the indoor heat exchanger 210 and the main fan 220, the auxiliary fan 230, and the flow passage portion 260 disposed in the radial inner portion of the indoor heat exchanger 210 to circulate air may be disposed.

The indoor heat exchanger 210 includes the header 211 connected to an external refrigerant tube to supply or recover refrigerant to or from the tube 212 and the tube 212 through which refrigerant flows.

Here, an airflow of heat-exchanged air may be generated by the main fan 220, and a direction of the airflow may be changed by the auxiliary fan 230.

In addition, unlike the indoor unit illustrated in FIG. 28, the indoor unit 200-2 of the air conditioner may have the discharge portion 250b formed with each side formed in a curved shape as illustrated in FIG. 29. That is, the discharge portion 250b may have a nearly quadrilateral shape as a whole when viewed in the vertical direction while each side thereof is formed in a curved shape instead of a straight shape.

Figure 30:
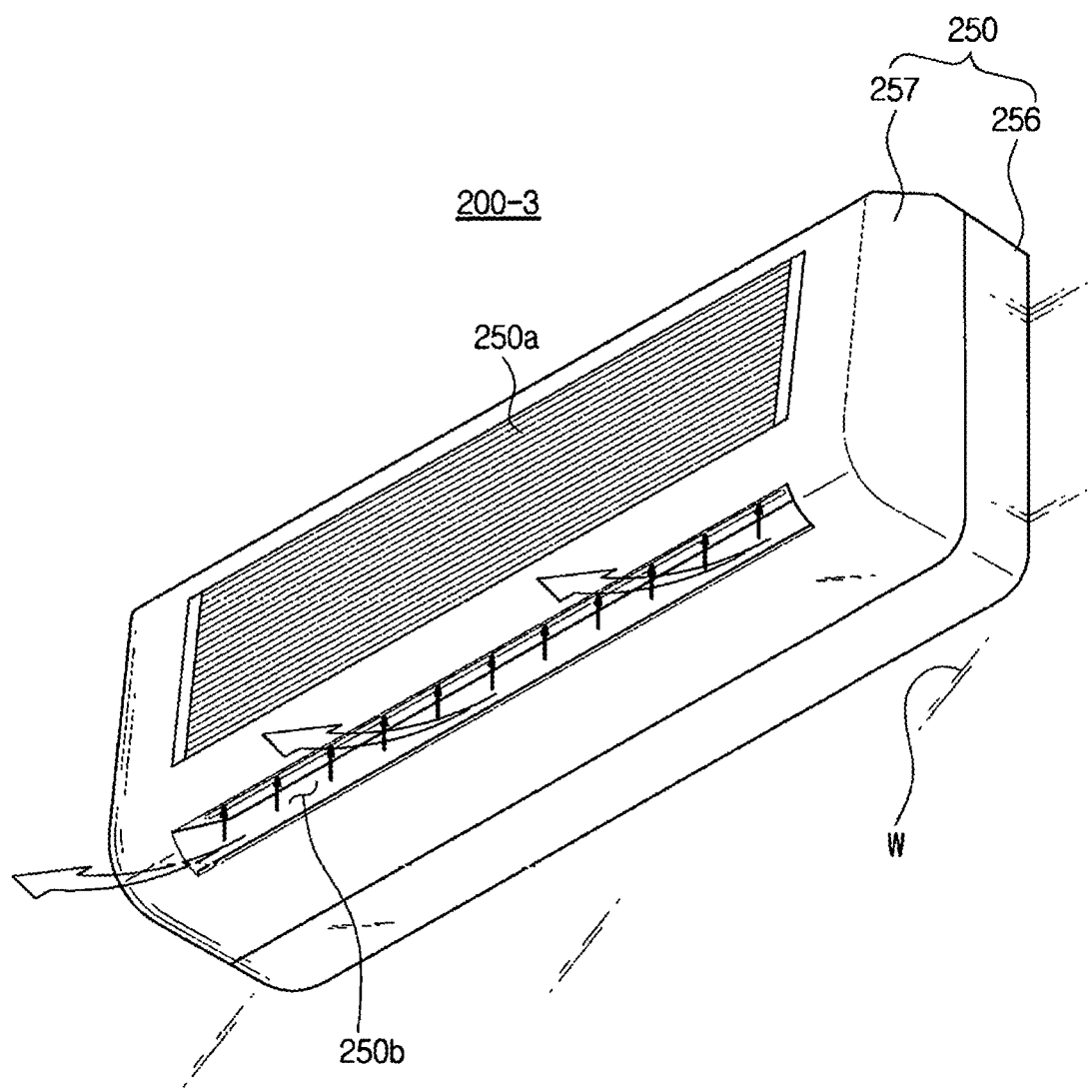
FIGS. 30 and 31 are exemplary views of an indoor unit of an air conditioner according to an embodiment.
Figure 31:
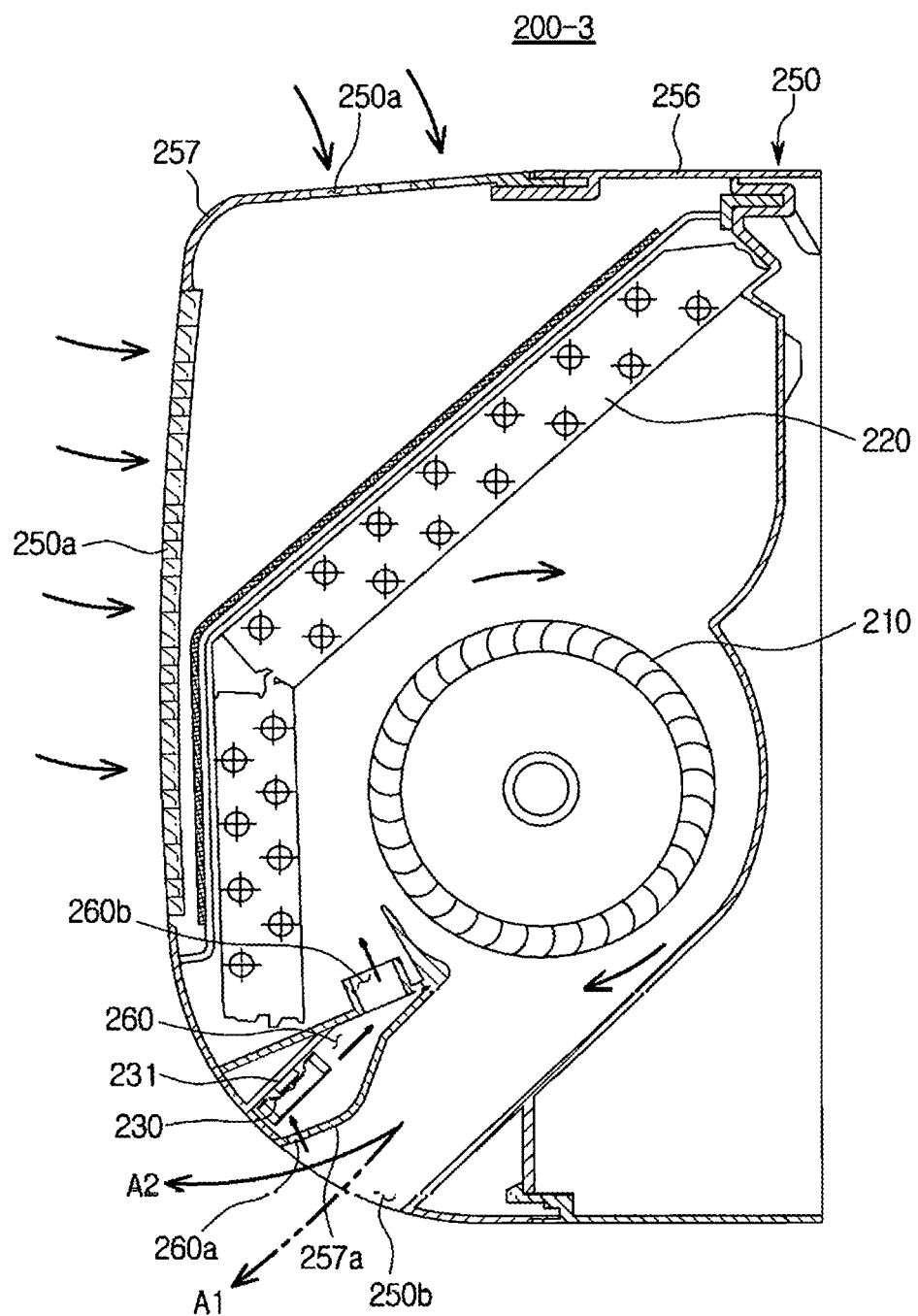

FIGS. 30 and 31 are exemplary views of an indoor unit of an air conditioner according to an embodiment. Specifically, FIGS. 30 and 31 illustrate a wall-mounted indoor unit 200-3, FIG. 30 is a perspective view of the wall-mounted indoor unit 200-3, and FIG. 31 is a side cross-sectional view of the wall-mounted indoor unit 200-3. Like reference numerals will be given to like elements overlapping with those in the embodiments mentioned above, and the description thereof will be omitted.

As illustrated in FIG. 30, the indoor unit 200-3 may be installed on a wall W.

The indoor unit 200-3 of the air conditioner includes the housing 250 having the suction portion 250a and the discharge portion 250b.

The housing 250 includes a rear housing 256 coupled to the wall W and a front housing 257 coupled to a front portion of the rear housing 256.

The suction portion 250a through which air is drawn may be formed at a front surface and an upper surface of the front housing 257, and the discharge portion 250b through which air is discharged may be formed at a lower portion of the front housing 257.

As in the embodiments mentioned above, the discharge portion 250b may have various shapes including a circular shape, a polygonal shape, a curved shape, etc. Consequently, the indoor unit 200-3 of the air conditioner may draw air from the front portion and the upper portion, heat-exchange the air, and discharge the heat-exchanged air through the lower portion. The housing 250 may have a Coanda curved surface portion 257a to guide air discharged through the discharge portion 250b. The housing 250 may guide the airflow discharged through the discharge portion 250b to flow while in close contact with the Coanda curved surface portion 257a.

The indoor unit 200-3 includes the indoor heat exchanger 210 disposed in the housing 250 and the main fan 220 to circulate air. Here, the main fan 220 may be a cross-flow fan.

The indoor unit 200-3 of the air conditioner further includes the airflow control units AP to draw air around the discharge portion 250b to change the pressure in order to control the direction of the discharged airflow.

The airflow control units AP may include at least one auxiliary fan 230 to generate a suction force for suctioning in the air around the discharge portion 250b, the second motor 231 to apply a driving force to each of the auxiliary fans 230, and the flow passage portion 260 to form a flow passage for guiding air drawn by each of the auxiliary fans 230.

The flow passage portion 260 may include the inlet portion 260a to draw the air around the discharge portion 250b, the outlet portion 260b to discharge the drawn air, and a flow passage to connect the inlet portion 260a to the outlet portion 260b. Furthermore, the inlet portion 260a may be formed at the Coanda curved surface portion 257a of the housing 250.

Here, an airflow of heat-exchanged air is generated by the main fan 220, and the direction of the airflow may be changed from A1 to A2 or A2 to A1 by the auxiliary fan 230.

Figure 32:
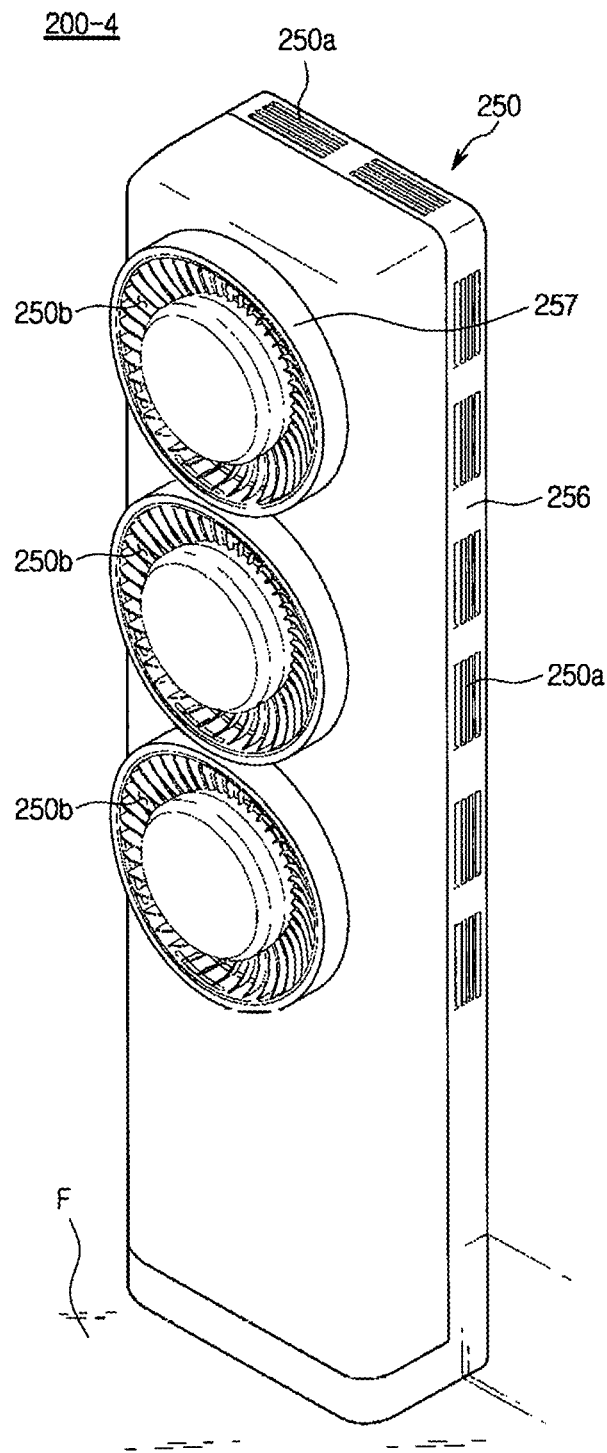
FIGS. 32 and 33 are exemplary views of an indoor unit of an air conditioner according to an embodiment.
Figure 33:
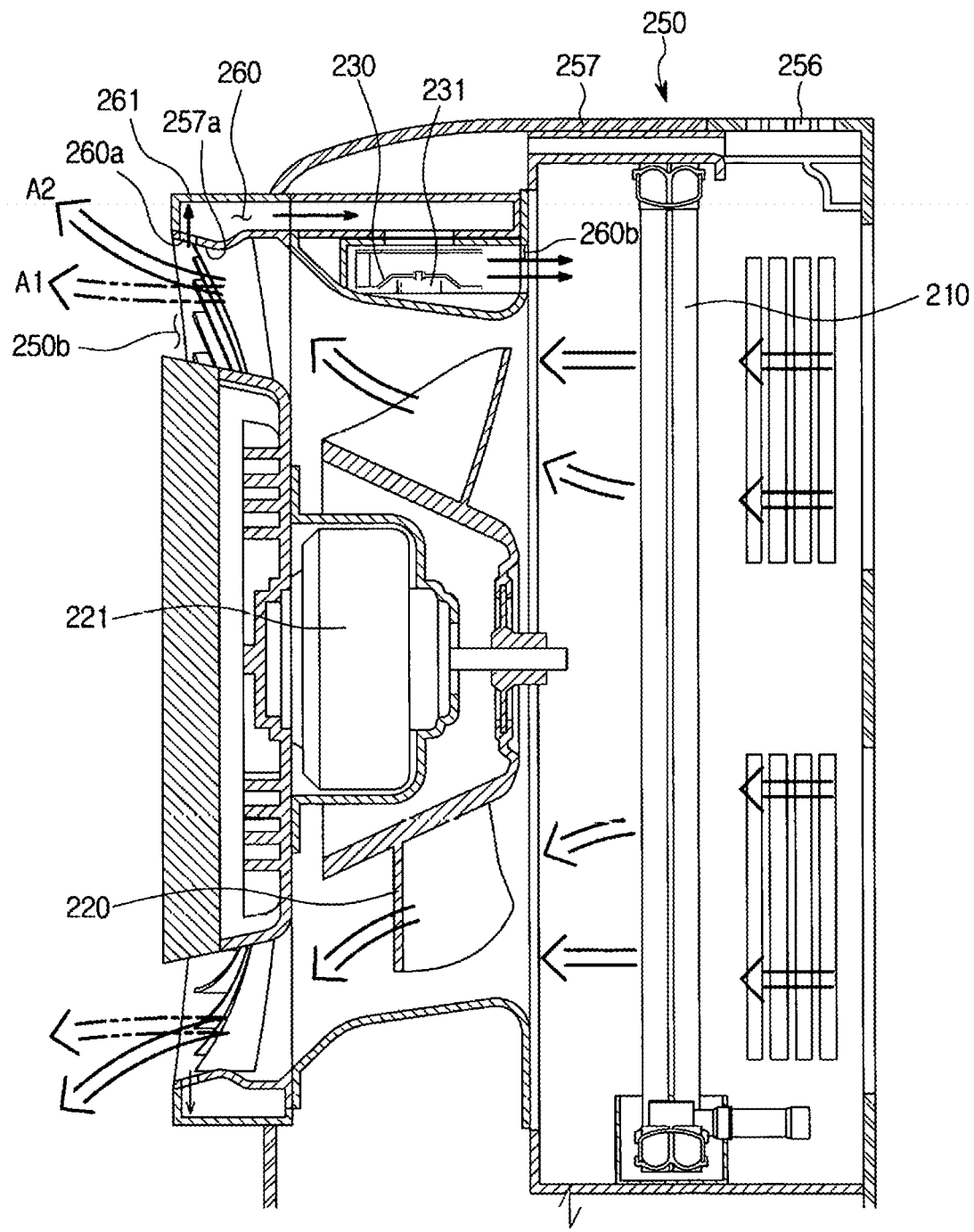

FIGS. 32 and 33 are exemplary views of an indoor unit of an air conditioner according to an embodiment. FIGS. 32 and 33 illustrate a stand-type indoor unit 200-4, FIG. 32 is a perspective view of the stand-type indoor unit 200-4, and FIG. 33 is a side cross-sectional view of the stand-type indoor unit 200-4. Like reference numerals will be given to like elements overlapping with those in the embodiments mentioned above, and the description thereof will be omitted.

As illustrated in FIG. 32, the indoor unit 200-4 of the air conditioner may be disposed to stand on a floor surface F.

The indoor unit 200-4 of the air conditioner includes the housing 250 having the suction portion 250a and the discharge portion 250b. The housing 250 includes the rear housing 256 having the suction portion 250a disposed at an upper portion and left and right side surfaces thereof and the front housing 257 coupled to the rear housing 256 and having the discharge portion 250b disposed. Consequently, the indoor unit 200-4 of the air conditioner may draw air from the front portion and the side portion, heat-exchange the air, and discharge the heat-exchanged air through the front portion. As in the embodiments mentioned above, the discharge portion 250b may have various shapes including a circular shape, a polygonal shape, a curved shape, etc.

The housing 250 may have the Coanda curved surface portion 257a to guide air discharged through the discharge portion 250b. The housing 250 may guide the airflow discharged through the discharge portion 250b to flow in close contact with the Coanda curved surface portion 257a.

The indoor unit 200-4 includes the indoor heat exchanger 210 disposed in the housing 250, a plurality of main fans 220 to circulate air, and the first motor 221 to apply a driving force to the plurality of main fans 220. Here, the plurality of main fans 220 may be a mixed-flow fan or an axial-flow fan.

The indoor unit 200-4 of the air conditioner further includes the airflow control units AP to draw air around the discharge portion 250b to change the pressure in order to control the direction of the discharged airflow. Here, the airflow control units AP may be disposed around each of the plurality of main fans 220. Furthermore, the plurality of airflow control units AP may be disposed around one main fan 220.

The airflow control units AP may include the auxiliary fan 230 to generate a suction force for suctioning in the air around the discharge portion 250b, the second motor 231 to drive the auxiliary fan 230, and the flow passage portion 260 to guide the air drawn by the auxiliary fan 230.

The flow passage portion 260 may include the inlet portion 260a to draw the air around the discharge portion 250b, the outlet portion 260b to discharge the drawn air, and the flow passage 261 to connect the inlet portion 260a to the outlet portion 260b. Furthermore, the inlet portion 260a may be formed at the Coanda curved surface portion 257a of the housing 250.

Here, an airflow of heat-exchanged air is generated by the main fan 220, and the direction of the airflow may be changed from A1 to A2 or A2 to A1 by the auxiliary fan 230.

Furthermore, in the case of the indoor unit having the plurality of main fans 220, one main fan 220 may serve as a main fan and draw air of the indoor space, heat-exchange the drawn air, and discharge the heat-exchanged air, and fans disposed adjacent to the main fan may serve as auxiliary fans and adjust the direction of the airflow discharged through the discharge portion.

In the above, the operation of controlling a direction of an airflow based on the indoor unit not including a blade has been described. However, the indoor unit is not limited to not including a blade.

In other words, the indoor unit may include a blade.

Hereinafter, an example of an indoor unit including a blade will be described.

Figure 34:
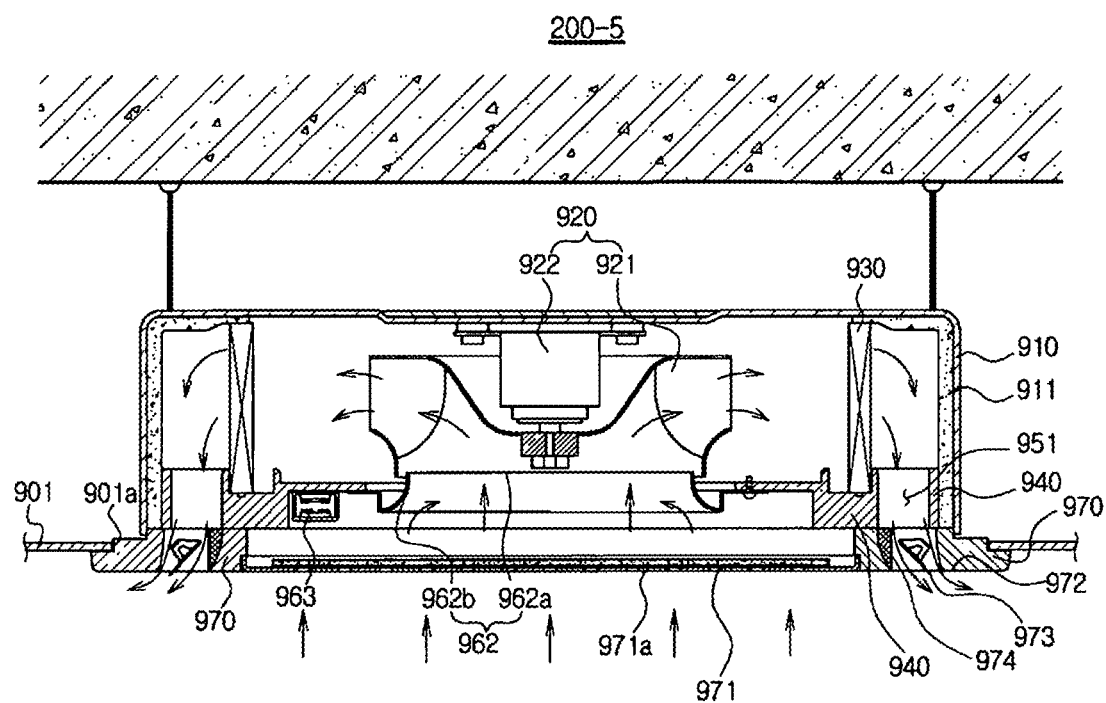
FIGS. 34 and 35 are exemplary views of an indoor unit of an air conditioner according to an embodiment.
Figure 35:
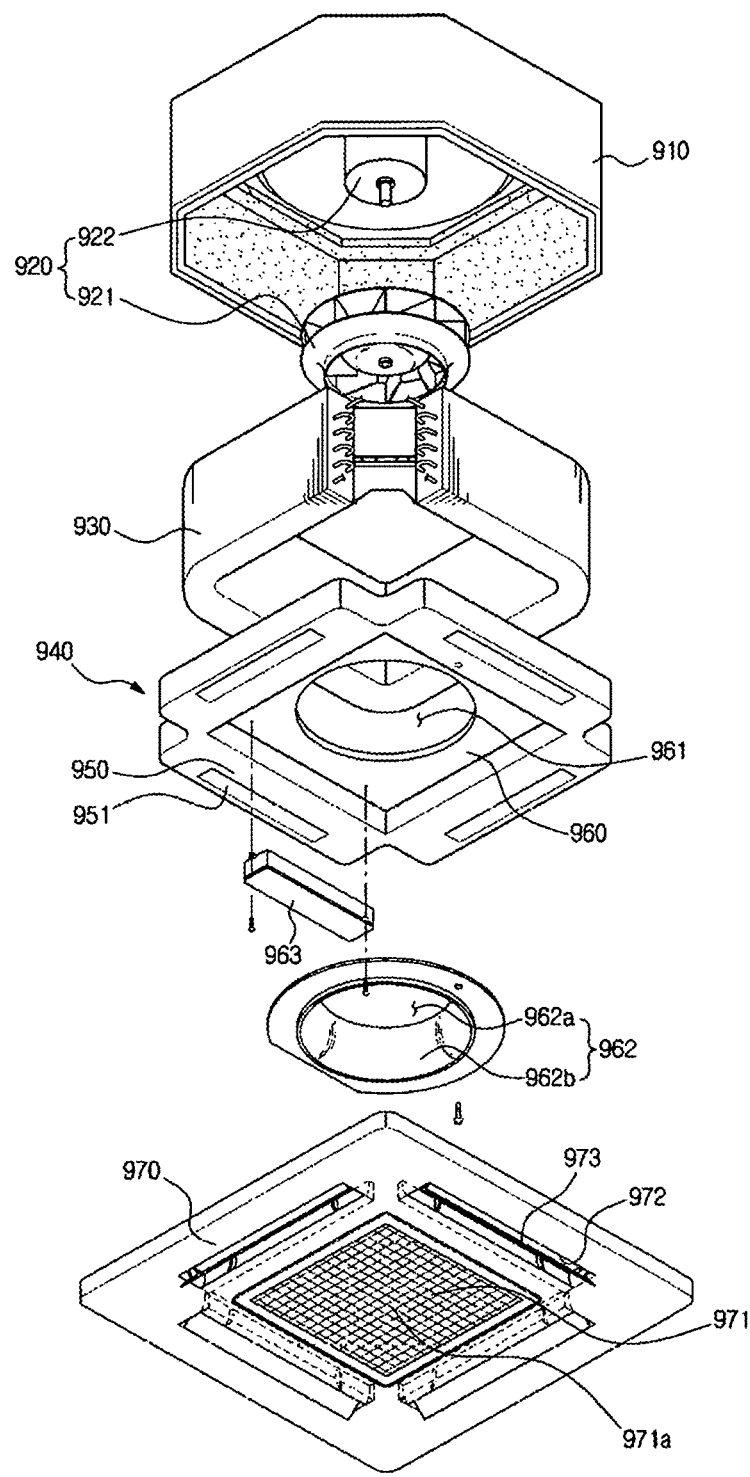

FIGS. 34 and 35 are exemplary views of an indoor unit of an air conditioner according to an embodiment. Specifically, FIG. 34 is a cross-sectional view illustrating the configuration of the air conditioner, and FIG. 35 is a perspective view illustrating a state in which a ceiling panel of the air conditioner is disassembled.

As illustrated in FIGS. 34 and 35, a ceiling-mounted air conditioner includes a box-shaped casing 910 inserted into a ceiling 901, having a blower device 920 and a heat exchanger 930 disposed therein, and having a lower portion thereof opened, a drain member 940 configured to gather condensate of the heat exchanger 930 and discharge the condensate to the outside and coupled to the lower portion of the casing 910, and a ceiling panel 970 coupled to the drain member 940 and configured to cover an opening 901a of the ceiling 901.

The casing 910 is formed nearly in the shape of a hollow enclosure in order to mount the blower device 920 and the heat exchanger 930 therein, and an insulating member 911 formed with foamed polystyrene is attached to an inner surface of the casing 910 for insulation. An adhesive may be used in attaching the insulating member 911.

In the casing 910, the blower device 920 disposed at a central portion to provide a forcibly blowing force and the heat exchanger 930 disposed at a radial outer portion of the blower device 920 to heat-exchange air introduced into the casing 910 by the blower device 920 are disposed.

The blower device 920 includes a blower fan 921 to draw air from the bottom and discharge the air in the radial direction and a driving motor 922 to drive the blower fan 921, and the driving motor 922 is fixed to an inner upper surface of the casing 910.

The heat exchanger 930 is disposed around the blower fan 921 in the form of encompassing the blower fan 921 to exchange heat with air discharged from the blower fan 921.

The drain member 940 includes a drain tray 950 disposed at a lower portion of the heat exchanger 930 to gather and discharge condensate generated in a heat exchange process, a cold air flow passage 951 formed at an outer portion of the drain tray 950 to guide heat-exchanged cold air to a discharge portion 972, and a partition unit 960 formed at an inner portion of the drain tray 950 to divide an inner space of the casing 910 into a blower device region and an outer region.

The drain tray 950 supports the lower portion of the heat exchanger 930 and is formed in the shape of a groove to allow the condensate generated on the outer surface of the heat exchanger 930 to flow down and be collected in the drain tray 950.

The partition unit 960 is formed in the shape of a flat plate having an opening 961. The opening 961 of the partition unit 960 is formed to have a larger diameter than the outer diameter of the blower fan 921 to allow the blower fan 921 to pass therethrough. This is to enable the blower fan 921 to be detached through the opening 961 when attempting to detach the blower fan 921 for maintenance and repair, etc. of the driving motor 922. That is, the blower fan 921 may be detached even without detaching the partition unit 960. Here, the partition unit 960 may be integrally formed with the drain tray 950, or the partition unit 960 and the drain tray 950 may also be provided as separate members so that the edge of the partition unit 960 may be coupled to the inner circumferential side of the drain member 940.

The cold air flow passage 951 is formed at a position corresponding to the discharge portion 972 to communicate with the discharge portion 972 of the ceiling panel 970 to be described below at the outer portion of the drain tray 950. Consequently, a gap in the cold air flow passage 951 in the width direction W is correspondingly formed to be equal to or smaller than a gap of the discharge portion 972 in the width direction W.

However, a gap of the cold air flow passage 951 in a longitudinal direction L is formed to be smaller than a gap of the discharge portion 972 of the ceiling panel 970 in the longitudinal direction L. This is to allow the drain member 940 installed at an inner portion of the discharge portion 972 to cover a refrigerant tube and other parts installed at an inner portion of the ceiling panel 970 in order to prevent the inner parts of the casing 910 from being exposed to the outside through the discharge portion 972. That is, because the air conditioner according to still another embodiment of the present disclosure has four discharge portions 972 formed in the same shape to provide an aesthetic exterior, an inner part may be inevitably disposed in at least one of the discharge portions 972. Thus, the cold air flow passage 951 installed at the inner portion of the discharge portion 972 is formed to be small to prevent the inner part from being exposed to the outside through the discharge portion 972.

In addition, a bell mouth member 962 is disposed at the lower portion of the partition unit 960. The bell mouth member 962 includes a central opening 962a through which drawn air passes and an air guide surface 962b formed at the opening 962a in a bent form. The circumferential portion of the bell mouth member 962 is detachably coupled to the opening 961 of the partition unit 960. The bell mouth member 962 guides air introduced through a suction port 971 of the ceiling panel 970 toward a suctioning side of the blower fan 921.

A control box 963 in which a plurality of electronic parts for controlling an operation of the air conditioner are embedded is installed at one portion of a lower surface of the partition unit 960. The control box 963 is fixed to the lower surface of the partition unit 960 close to the drain tray 950.

The lower surface of the drain member 940 is supported by the upper surface of the ceiling panel 970. While the bell mouth member 962 and the control box 963 are coupled to the drain member 940 as in the above, the ceiling panel 970 is coupled to the drain member 940.

The suction port 971 for suctioning indoor air is formed at a central portion of the ceiling panel 970, and the plurality of discharge portions 972 are formed at the outer portion of the suction port 971. The plurality of discharge portions 972 are formed at positions corresponding to the cold air flow passage 951 of the drain member 940.

In addition, a filter (971a) to filter air introduced through the suction port 971 is installed at the suction port 971 of the ceiling panel 970. Also, a blade 973 to guide discharged air while rotating along a predetermined section is installed at each of the discharge portions 972. The blade 973 is operated by a motor (not shown) that rotates in the forward direction and the reverse direction.

The discharge portions 972 are formed in the same shape at each of the four places near the four sides of the ceiling panel 970. The discharge portions 972 are formed in the shape of a channel extending in the longitudinal direction L, the width direction W, and a thickness direction H to have a rectangular cross-section and allow heat-exchanged cold air that has passed through the cold air flow passage in the thickness direction H to be discharged to the indoor space.

Figure 36:
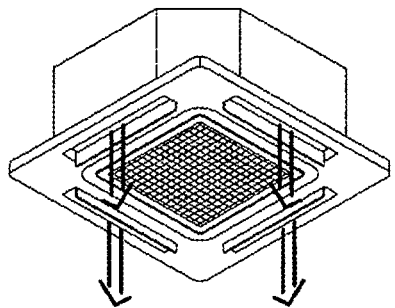
FIG. 36 part (a) to part (d), are views illustrating states of blades of an air conditioner according to an embodiment and forms of discharged airflows in accordance with the states of the blades.
Figure 36:
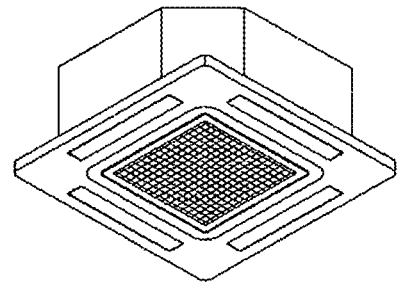
Figure 36:
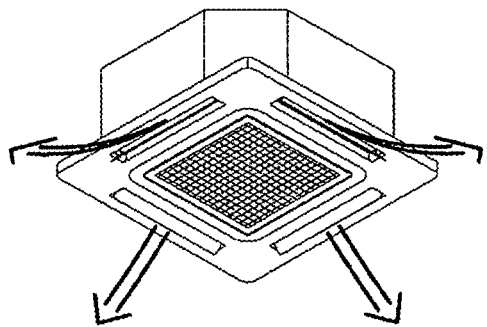
Figure 36:
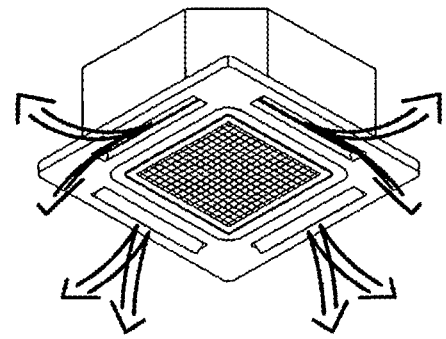

FIG. 36 part (a) to part (d) is a view illustrating states of blades of the air conditioner according to the embodiment and forms of discharged airflows in accordance with the states of the blades.

As illustrated in FIG. 36 part (a) to part (d), operations of the blades 973 may include being open, being closed, being open by a predetermined angle, and swinging by the predetermined angle. The opening of the blades 973 illustrated in FIG. 36 part (a) is a state in which the blades 973 are opened by the maximum angle. The closing of the blades 973 illustrated in FIG. 36 part (b) is a state in which the blades 973 are completely closed. The opening of the blades 973 by a predetermined angle is a state in which the blades 973 discharge airflows while being maintained at any angle between being open and being closed. The swinging of the blades 973 illustrated in FIG. 36 part (d) is a state in which the blades 973 swing back and forth within a range of any angle between being open and being closed.

Figure 37B:
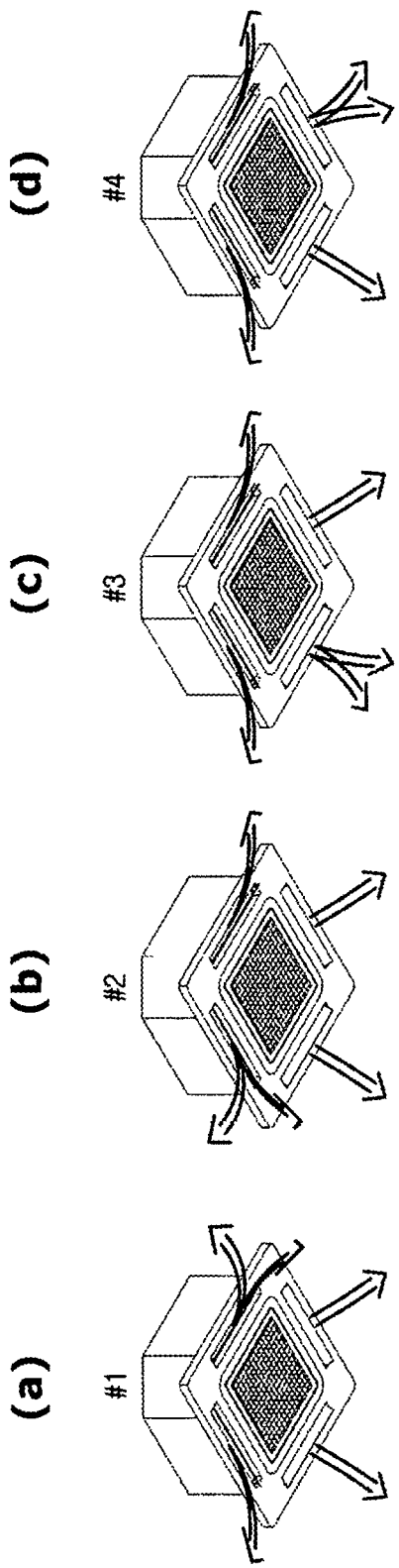

FIGS. 37A and 37B part (a) to part (d) are a view illustrating an embodiment of forming variable airflow patterns by variably controlling swinging/fixing of the plurality of blades disposed in the indoor unit of the air conditioner. FIG. 37A is a table illustrating forms of variably controlling swinging/fixing of the blades 973. In FIG. 37B part (a) to part (d), airflows formed by variably controlling the blades in each of the operations #1, #2, #3, and #4 illustrated in the table of FIG. 37A are separately shown. The plurality of blades 973 each are differentiated as a blade A, a blade B, a blade C, and a blade D.

In the initial operation, all of the plurality of blades 973 begin from a closed state.

In the first operation #1 for realizing variable airflow patterns, the blade A swings within a range of a predetermined angle, and the remaining blade B, blade C, and blade D are fixed. Here, "fixing" refers to being fixed without swinging while being open by a predetermined angle. Then, in the second operation #2, the blade B swings within the range of the predetermined angle, and the remaining blade A, blade C, and blade D are fixed. Then, in the third operation #3, the blade C swings within the range of the predetermined angle, and the remaining blade A, blade B, and blade D are fixed. Then, in the fourth operation #4, the blade D swings within the range of the predetermined angle, and the remaining blade A, blade B, and blade C are fixed. The first to fourth operations #1, #2, #3, and #4 are continuously repeated.

As in the above, the blade A, the blade B, the blade C, and the blade D are not operated in the same fixed state, but any one of the blade A, the blade B, the blade C, and the blade D may swing and the remaining blades may be fixed in a predetermined angle while the order of swinging each of the blade A, the blade B, the blade C, and the blade D may be changed sequentially in a rotating manner every predetermined interval.

As a result, the pattern of the airflow discharged through the discharge portions 972 may be changed in various ways. As can be recognized from FIG. 37B part (a) to part (d), a combination of airflows discharged from the discharge portions 972 of the indoor unit changes in every operation. That is, it can be recognized that the discharged airflow forms a swing-fixed-fixed-fixed combination in the operation #1, the discharged airflow forms a fixed-swing-fixed-fixed combination in the operation #2, the discharged airflow forms a fixed-fixed-swing-fixed combination in the operation #3, and the discharged airflow forms a fixed-fixed-fixed-swing combination in the operation #4.

In this manner, the air conditioner may control a state of a discharged airflow generated from at least one of the plurality of discharge portions 972 to be differentiated from states of discharged airflows generated from remaining discharge portions while controlling the plurality of blades 973 such that a position at which the differentiated discharged airflow is generated among the plurality of discharge portions 972 cycles. By this, an effect of discharging an airflow while rotating the indoor unit may be obtained.

The time duration for each of the first to fourth operations #1, #2, #3, and #4 depends on a predetermined amount of time. To increase a speed at which variable airflow patterns are changed, the time duration for each of the operations #1, #2, #3, and #4 is shortened (e.g. three seconds). Conversely, to relatively slow down the speed at which the variable airflow patterns are changed, the time duration for each of the operations #1, #2, #3, and #4 may be relatively extended (e.g. seven seconds).

As in the above, the states of the blades 973 may be cyclically changed to form various forms of discharged airflows such that cold air may be discharged to multiple directions of the indoor space, thereby rapidly cooling the indoor space and generating a direct flow of cold air that directly comes in contact with the user.

Furthermore, the indoor unit may also open or close the blades 973 to control an airflow to be discharged or not discharged from each of the plurality of discharge portions 972. This will be described with reference to FIGS. 38A and 38B part (a) to part (d).

Figure 38B:
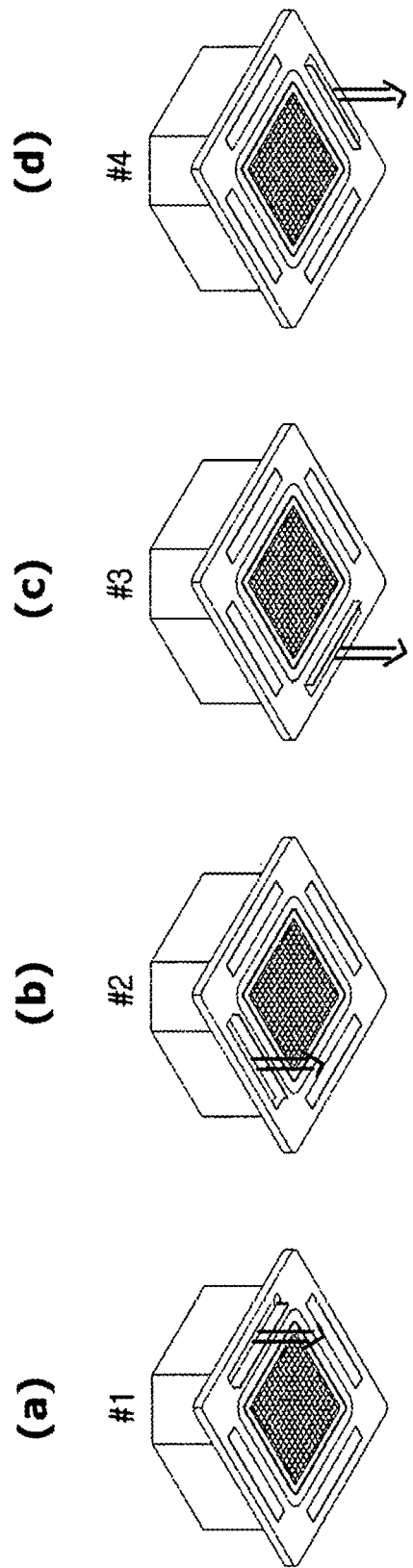

FIGS. 38A and 38B part (a) to part (d) are a view illustrating an embodiment of forming variable airflow patterns by variably controlling opening/closing of the plurality of blades 973 disposed in the indoor unit of the air conditioner. FIG. 38A is a table illustrating forms of variably controlling the opening/closing of the plurality of blades 973. In FIG. 38B part (a) to part (d), forms of airflows discharged in each of the operations #1, #2, #3, and #4 illustrated in the table of FIG. 38A are separately shown. The plurality of blades 973 each are differentiated as a blade A, a blade B, a blade C, and a blade D.

In the initial operation, all of the plurality of blades 973 begin from a closed state.

In the first operation #1 for realizing variable airflow patterns, only the blade A is opened, and the remaining blade B, blade C, and blade D are closed. Then, in the second operation #2, only the blade B is opened, and the remaining blade A, blade C, and blade D are closed. Then, in the third operation #3, only the blade C is opened, and the remaining blade A, blade B, and blade D are closed. Then, in the fourth operation #4, only the blade D is opened, and the remaining blade A, blade B, and blade C are closed. The first to fourth operations #1, #2, #3, and #4 are continuously repeated.

As in the above, the blade A, the blade B, the blade C, and the blade D are not controlled at once to be open/closed uniformly, but at least one of the blade A, the blade B, the blade C, and the blade D may be controlled to be closed or opened while the open/closed state of the blade A, the blade B, the blade C, and the blade D may be switched to a rotating manner every predetermined interval instead of being fixed.

As a result, the pattern of the airflow discharged through the discharge portions 972 of the indoor unit may be changed in various ways. As can be recognized from FIG. 38B part (a) to part (d), a combination of airflows discharged from the discharge portions 972 of the indoor unit changes for every operation. That is, it can be recognized that the discharged airflow forms an opened-closed-closed-closed combination in the operation #1, the discharged airflow forms a closed-opened-closed-closed combination in the operation #2, the discharged airflow forms a closed-closed-opened-closed combination in the operation #3, and the discharged airflow forms a closed-closed-closed-opened combination in the operation #4.

In this manner, the air conditioner may control a state of a discharged airflow generated from at least one discharge portion of the plurality of discharge portions 972 to be differentiated from states of discharged airflows generated from remaining discharge portions while controlling the plurality of blades 973 such that a position at which the differentiated discharged airflow is generated among the plurality of discharge portions 972 switches. By this, an effect of discharging an airflow while rotating the indoor unit may be obtained.

The time duration for each of the first to fourth operations #1, #2, #3, and #4 depends on a predetermined amount of time. To increase a speed at which variable airflow patterns are changed, the time duration for each of the operations #1, #2, #3, and #4 is shortened (e.g. three seconds). Conversely, to relatively slow down the speed at which the variable airflow patterns are changed, the time duration for each of the operations #1, #2, #3, and #4 is relatively extended (e.g. seven seconds).

Forming variable airflow patterns by controlling swinging/fixed states of the blades 973 is illustrated in FIGS. 37A and 37B part (a) to part (d), and forming variable airflow patterns by controlling open/closed states of the blades 973 is illustrated in FIGS. 38A and 38B part (a) to part (d). The air conditioner is not limited to performing any one of controlling the swinging/fixed states of the blades 973 and controlling the open/closed states of the blades 973 and may form still another form of variable airflows by combining the controlling of the swinging/fixed states of the blades 973 and the controlling of the opened/closed states of the blades 973. Also, more diverse forms of variable airflows may be formed by combinations of swinging ranges or combinations of fixed blade angles.

Figure 39B:
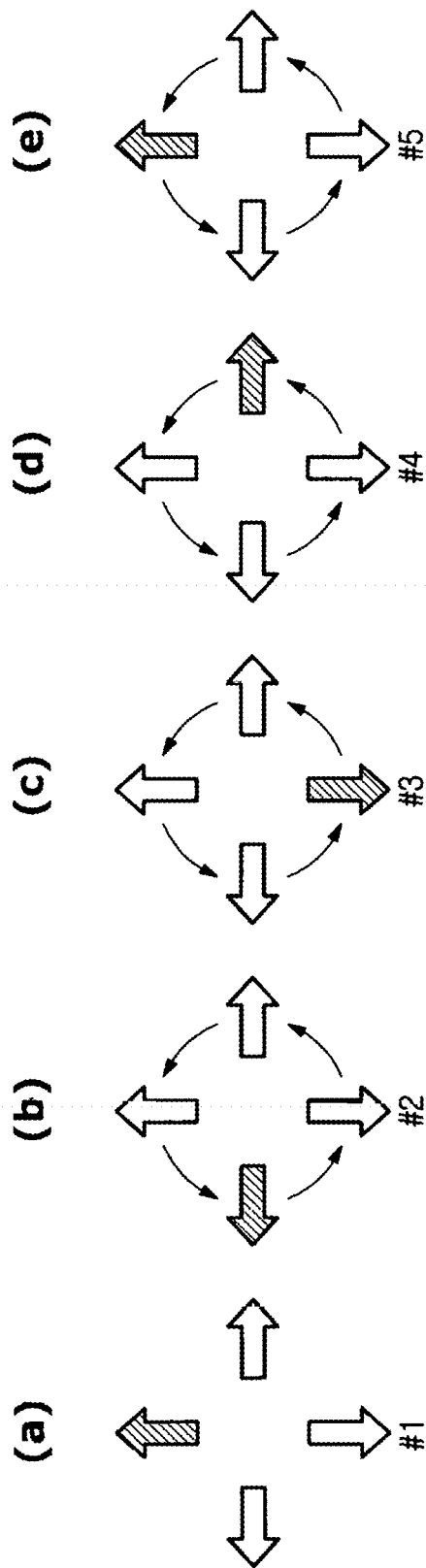
FIG. 39A part (a) to part (d) and 39B part (a) to part (e) are views illustrating effects of an airflow circulation mode of an air conditioner according to an embodiment.

FIG. 39A part (a) to part (d) and 39B part (a) to part (e) are a view illustrating effects of the airflow circulation mode of the air conditioner according to the embodiment. FIG. 39A part (a) to part (d) illustrates a case of a circular indoor unit not including a blade, and FIG. 39B part (a) to part (e) illustrates a case of a quadrilateral indoor unit including a blade. In each case, it is assumed that a ceiling-mounted air conditioner is viewed in the air-conditioned space.

In FIG. 39A part (a) to part (d) and 39B part (a) to part (e), thick arrows represent discharged airflows that are discharged by airflow switching portions such as the auxiliary fan 230 or the blade 973, and thin arrows represent a direction in which an airflow pattern cycles in each of the discharge portions. Also, hatched arrows among the thick arrows represent a differentiated discharged airflow generated in at least one of the plurality of discharge portions.

As illustrated in FIG. 39A part (a) to part (d), in the circular indoor unit not including a blade, a state of a discharged airflow generated from at least one of the plurality of discharge portions 250b may be controlled to be differentiated from states of discharged airflows generated from remaining discharge portions while controlling the plurality of auxiliary fans 230 such that a position at which the differentiated discharged airflow is generated among the plurality of discharge portions 250b switches. By this, an effect of discharging an airflow while rotating the indoor unit may be obtained.

In addition, as illustrated in FIG. 39B part (a) to part (e), in the quadrilateral indoor unit including a blade, a state of a discharged airflow generated from at least one of the plurality of discharge portions 972 may be controlled to be differentiated from states of discharged airflows generated from remaining discharge portions while controlling the plurality of blades 973 such that a position at which the differentiated discharged airflow is generated among the plurality of discharge portions 972 switches. By this, an effect of discharging an airflow while rotating the indoor unit may be obtained.

In addition, other than controlling an airflow to circulate in any one direction of the forward direction and the reverse direction as illustrated in FIG. 39A part (a) to part (d) and 39B part (a) to part (e), the airflow may be controlled to alternately circulate in the forward direction and the reverse direction. Further, the airflow may also be controlled to asymmetrically circulate, e.g. circulating twice in the forward direction and then circulating once in the reverse direction, or vice versa.

In case of the air conditioner not including a blade, it is difficult for a user to check a direction of a discharged airflow. To resolve this, a display using a lamp or a light-emitting diode (LED), etc. to visually display a direction of an airflow may be disposed in the air conditioner.

Figure 40:
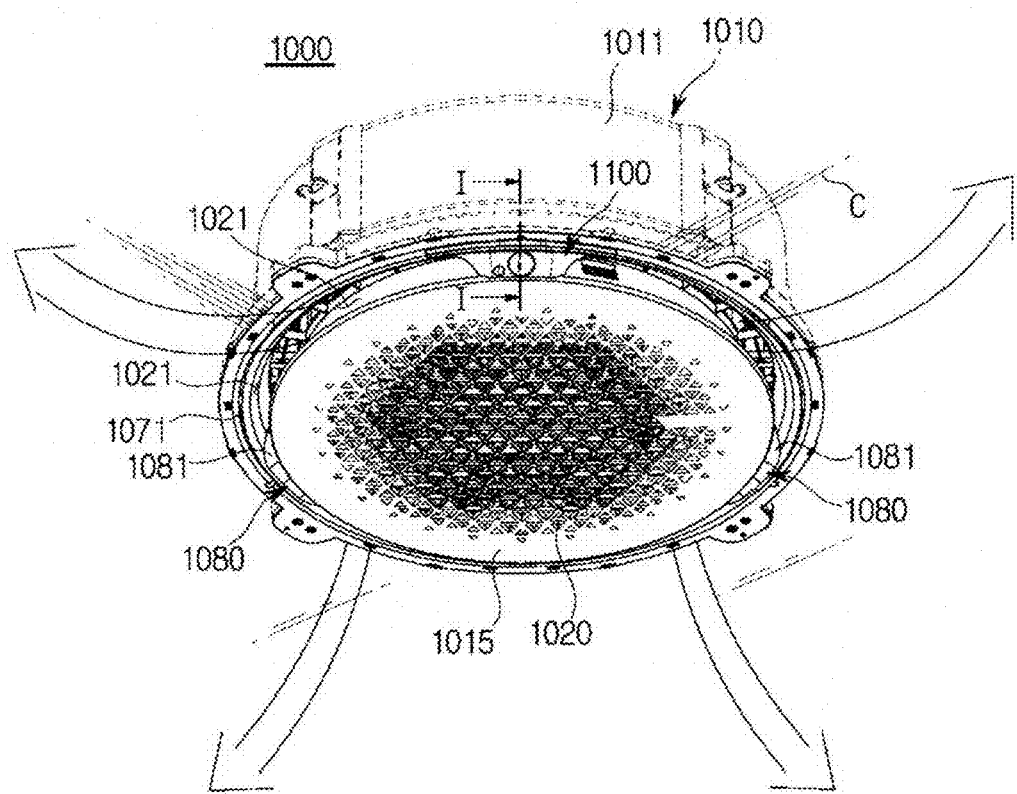
FIG. 40 is a perspective view of an air conditioner according to an embodiment.
Figure 41:
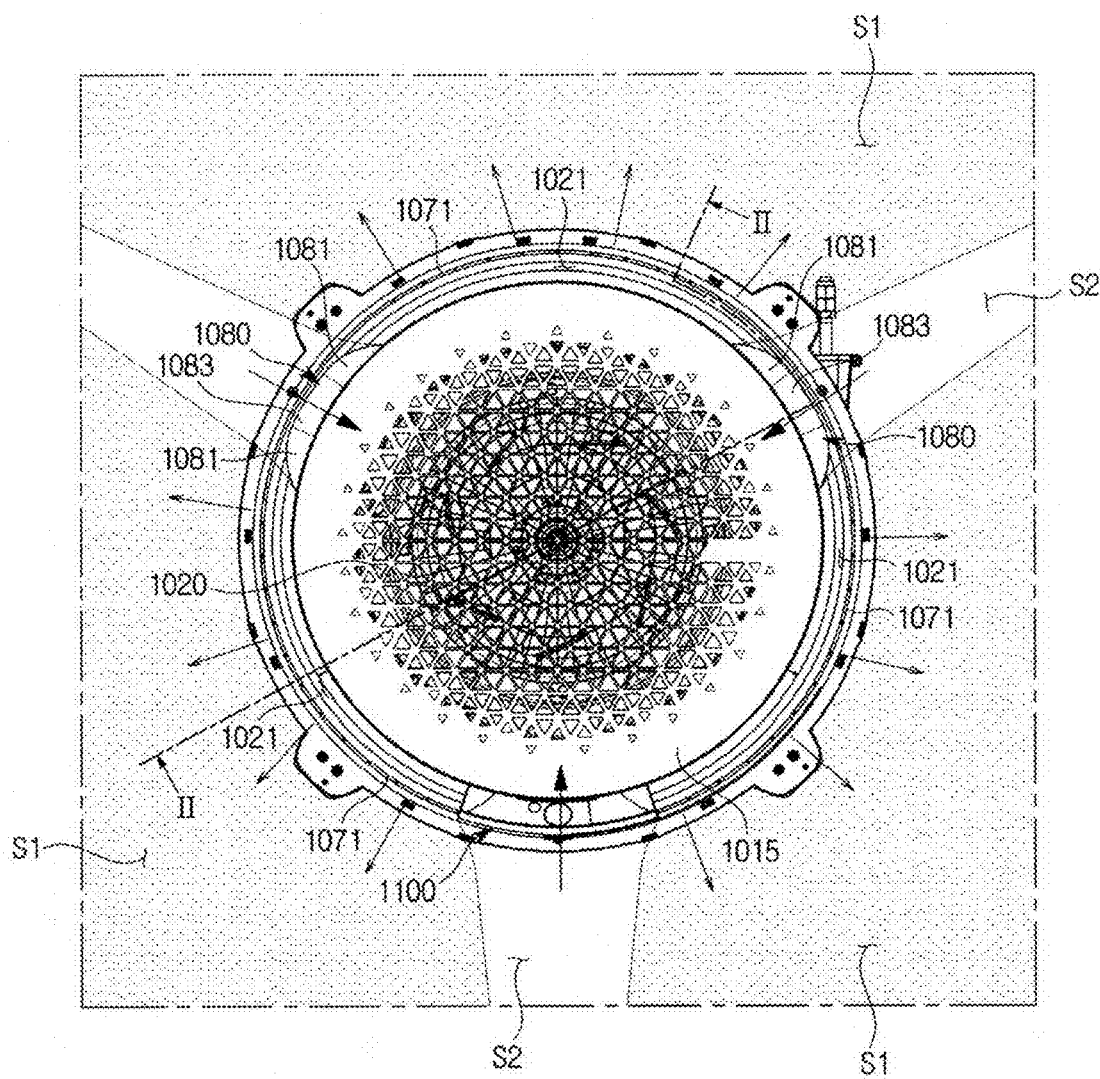
FIG. 41 is a rear view of an air conditioner according to an embodiment viewed from the bottom.
Figure 42:
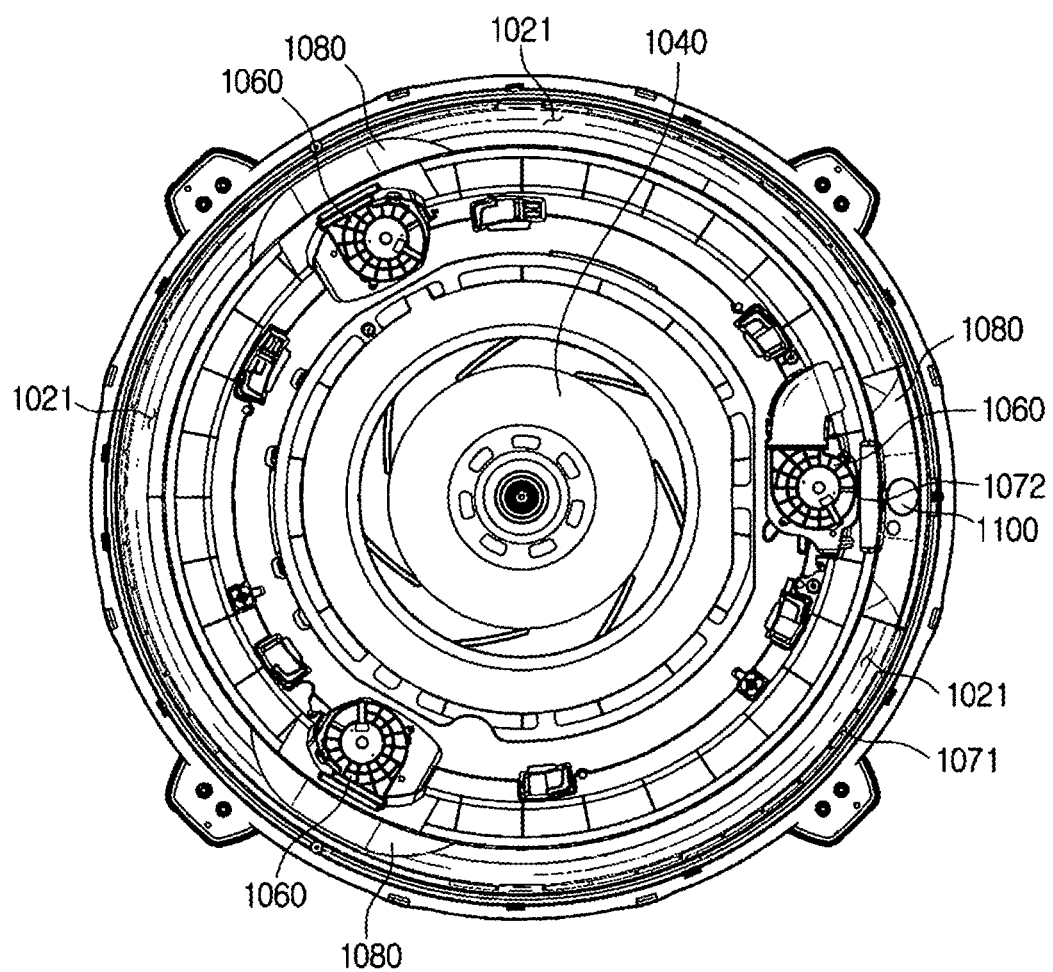
FIG. 42 is a rear view of a state in which a lower housing of an indoor unit of an air conditioner according to an embodiment is removed.
Figure 43:
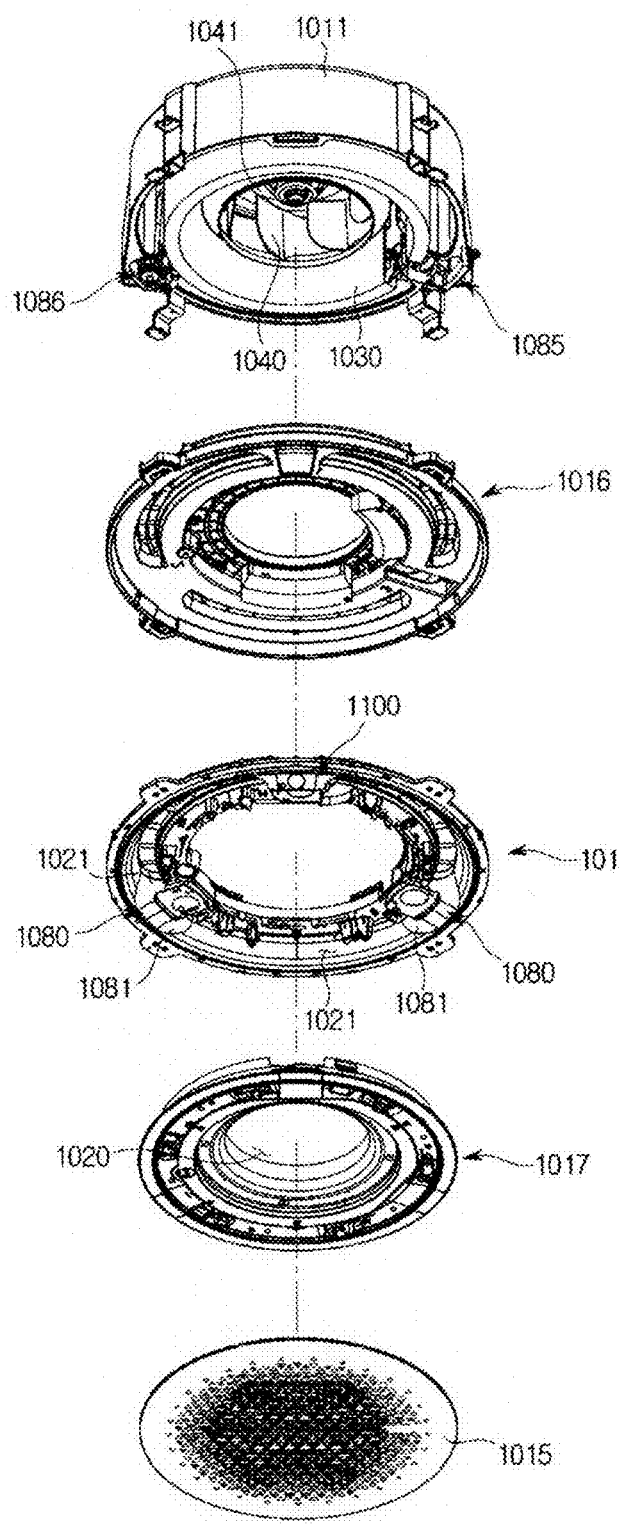
FIG. 43 is an exploded perspective view of an air conditioner according to an embodiment.
Figure 44:
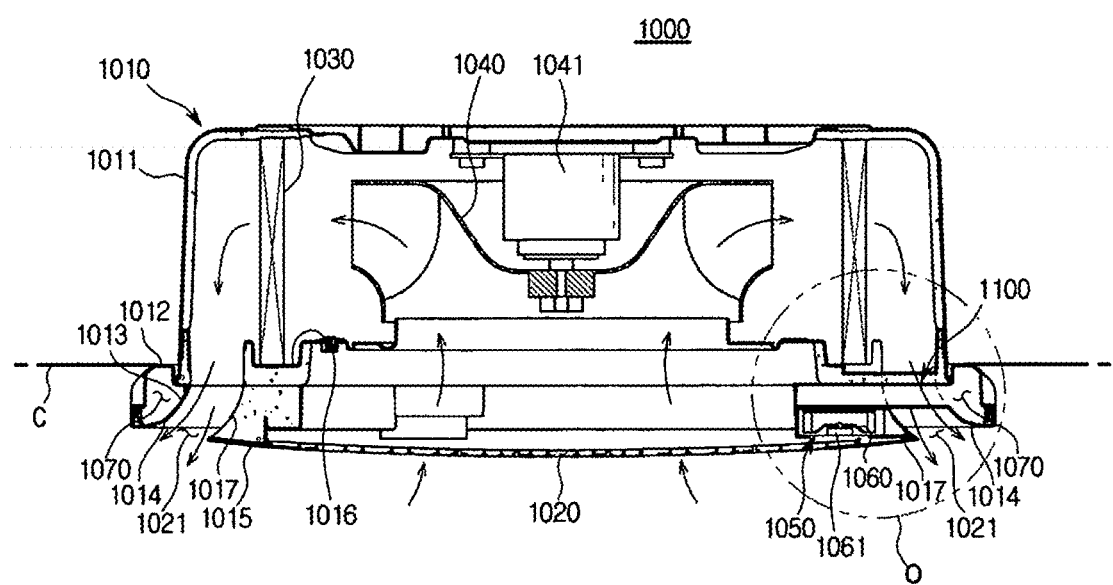
FIG. 44 is a side cross-sectional view taken along line II-II marked in FIG. 41.
Figure 45:
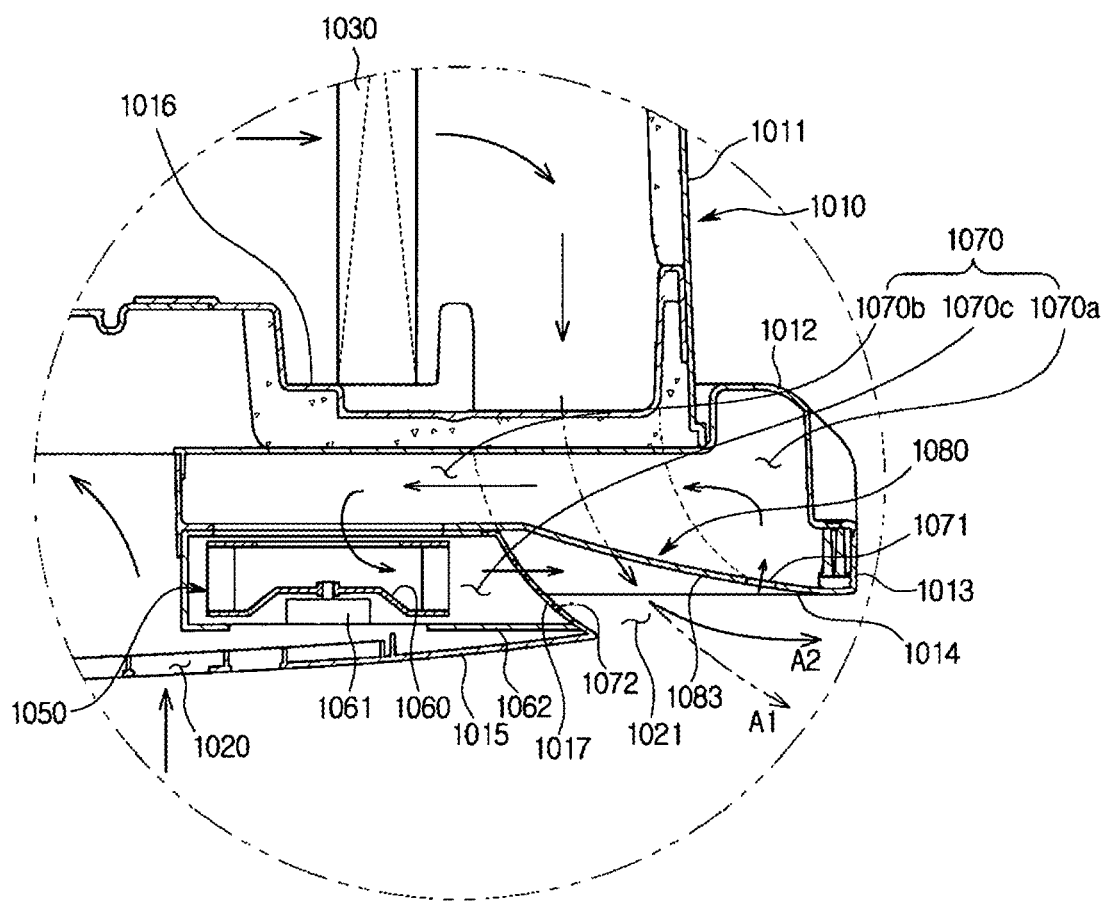
FIG. 45 is an enlarged view of a '0' portion marked in FIG. 44.

FIG. 40 is a perspective view of an air conditioner according to an embodiment, and FIG. 41 is a rear view of the air conditioner according to the embodiment viewed from the bottom. Also, FIG. 42 is a rear view of a state in which a lower housing of an indoor unit of the air conditioner according to the embodiment is removed, and FIG. 43 is an exploded perspective view of the air conditioner according to the embodiment. Also, FIG. 44 is a side cross-sectional view taken along line II-II marked in FIG. 41, and FIG. 45 is an enlarged view of a 'O' portion marked in FIG. 44.

Referring to FIGS. 40 to 45, an indoor unit 1000 of the air conditioner according to the embodiment will be described.

The indoor unit 1000 may be installed on the ceiling C. At least a portion of the indoor unit 1000 of the air conditioner may be buried into the ceiling C.

The indoor unit 1000 may include a housing 1010 having a suction port 1020 and a discharge port 1021, a heat exchanger 1030 disposed in the housing 1010, and a main fan 1040 to circulate air.

The housing 1010 may have a nearly circular shape when the surface of the ceiling is viewed in the vertical direction. The housing 1010 may include an upper housing 1011 installed in the ceiling C, a middle housing 1012 coupled to a lower portion of the upper housing 1011, a lower housing 1013 coupled to a lower portion of the middle housing 1012, and a discharge cover 1017 coupled to an inner lower portion of the lower housing 1013.

The suction port 1020 penetrated from the outside to the main fan 1040 to allow outside air to be drawn may be formed at a central portion of the lower housing 1013, and the discharge port 1021 through which air is discharged may be formed at the radial outer portion of the suction port 1020. The discharge port 1021 may have a nearly circular shape when the surface of the ceiling C is viewed in the vertical direction.

By the above structure, the indoor unit 1000 may draw air from the bottom, cool or heat the air, and discharge the air back to the bottom.

The lower housing 1013 may have a Coanda curved surface portion 1014 to guide air discharged through the discharge port 1021. The Coanda curved surface portion 1014 may guide the air discharged through the discharge port 1021 to flow in close contact with the Coanda curved surface portion 1014.

The discharge cover 1017, that forms the suction port 1020 and the discharge portion 1021 together with the lower housing 1013, may be coupled to the inner lower portion of the lower housing 1013. Also, a grille 1015 may be coupled to the bottom surface of the lower housing 1013 to filter dust from air drawn through the suction port 1020, and a filter (not shown) to filter foreign substances such as dust contained in the air drawn through the suction port 1020 may be disposed at an inner portion of the grille 1015.

The heat exchanger 1030 is disposed in the housing and may be disposed on an air flow passage that connects the suction port 1020 to the discharge port 1021. The heat exchanger 1030 may be configured with a tube (not shown) through which refrigerant flows and a header (not shown) connected to an external refrigerant tube to supply or recover refrigerant to or from the tube. A heat exchange fin (not shown) may be disposed in the tube to expand the heat dissipation area.

The heat exchanger 1030 may have a nearly circular shape when viewed in the vertical direction. The heat exchanger 1030 may be placed on a drain tray 1016 such that condensate generated in the heat exchanger 1030 may be collected in the drain tray 1016.

The main fan 1040 may be disposed at the radial inner portion of the heat exchanger 1030. The main fan 1040 may be a centrifugal fan that suctions in air in the axial direction and discharges the air in the radial direction. A blower motor 1041 for driving the main fan 1040 may be disposed in the indoor unit 1000. Also, the indoor unit 1000 may include a bell mouth to guide the air drawn through the suction port 1020 to be introduced into the main fan 1040.

By the above configuration, the indoor unit 1000 may draw indoor air, cool the air, and discharge the air to the indoor space, or may draw indoor air, heat the air, and discharge the air to the indoor space.

The indoor unit 1000 may further include a heat exchanger pipe 1085 connected to the heat exchanger 1030 to allow refrigerant to flow therethrough and a drain pump 1086 to discharge the condensate collected in the drain tray 1016 to the outside. The heat exchanger pipe 1085 and the drain pump 1086 may be disposed at a bridge 1080 to be described below not to cover the suction port.

The indoor unit 1000 may further include the bridge 1080 disposed adjacent to the discharge port 1021 and extending by a preset length in the circumferential direction of the discharge port 1021. Three bridges 1080 may be disposed to be spaced apart from each other by preset intervals along the circumferential direction.

When the discharge port 1021 is formed in a circular shape and air is discharged from all directions, a relatively high pressure is formed around the discharge port 1021, and a relatively lower pressure is formed around the suction port 1020. Also, because air is discharged from all directions of the discharge port 1021 and an air curtain is formed, air that should be drawn through the suction port 1020 cannot be supplied to the suction port 1020. In this state, the air discharged from the discharge port 1021 is drawn again through the suction port 1020, the air drawn again causes dew to be formed in the housing 1010, and the discharged air is lost, thereby degrading a performance that may be sensed by the user.

The bridge 1080 is disposed on the discharge port 1021 to block the discharge port 1021 by a preset length. Accordingly, the discharge port 1021 is divided into a first section S1 through which air is discharged and a second section S2 blocked by the bridge 1080 and through which almost no air is discharged. That is, the bridge 1080 may form the second section S2 from which air to be drawn through the suction port 1020 is supplied. Also, the bridge 1080 may decrease a pressure difference between the low pressure around the suction port 1020 and the high pressure around the discharge port 1021.

The bridge 1080 may include one pair of discharge guide surfaces 1081 becoming gradually closer toward the direction in which air is discharged to minimize the second section S2 formed by the bridge 1080. Air discharged from the discharge port 1021 by the discharge guide surfaces 1081 may be discharged while being more widely spread from the discharge port 1021.

Although it is illustrated that three bridges 1080 are disposed in the indoor unit 1000 in the same intervals, i.e., 120°, embodiments are not limited thereto. Only one bridge 1080 may be disposed, two bridges 1080 may be disposed in 180° intervals, or four bridges 1080 may be disposed in 90° intervals. A plurality of bridges 1080 may also be disposed in different angular intervals along the circumferential direction of the discharge port 1021. Furthermore, five or more bridges may also be disposed. That is, the number of bridges is not limited.

However, in order to form the second section S2 and facilitate supplying of air to be drawn through the suction port 1020, the sum of the lengths of bridges 1080 may be 5% or larger and 40% or less than the overall circumferential length of the discharge port. That is, a ratio of the second section S2 with respect to the sum of the first section S1 and the second section S2 may be 5% or larger and 40% or less.

The indoor unit 1000 may further include an airflow control unit 1050 to control a discharged airflow.

The airflow control unit 1050 may draw air around the discharge port 1021 and change the pressure in order to control the direction of the discharged airflow. Also, the airflow control unit 1050 may control the amount of air drawn around the discharge port 1021. That is, the airflow control unit 1050 may control the amount of air drawn around the discharge port 1021 to control the direction of the discharged airflow.

Here, the controlling of the direction of the discharged airflow includes controlling the angle of the discharged airflow.

When suctioning in the air around the discharge port 1021, the airflow control unit 1050 may draw air from one direction off of a direction of the discharged airflow. That is, as illustrated in FIG. 45, assuming that the direction of the discharged airflow when the plurality of auxiliary fans 230 of the airflow control units AP is not operating is the direction A1, the airflow control unit 1050 may operate to draw air from one direction off of the direction A1, thereby switching the direction of the discharged airflow to the direction A2.

Here, in accordance with the amount of air drawn by an auxiliary fan 1060, switching of the angle of the discharged airflow may be adjusted. That is, the angle of the discharged airflow may be switched to a small angle when the amount of air drawn is small, and the angle of the discharged airflow may be switched to a large angle when the amount of air drawn by the auxiliary fan 230 is large.

Here, the angle of the discharged airflow is based on the surface of the ceiling C. That is, the angle of the discharged airflow is 0° in the horizontal direction corresponding to the surface of the ceiling C and is 90° in a direction perpendicular to the surface of the ceiling C. Consequently, the direction of the discharged airflow is controlled to be horizontal when the angle of the discharged airflow is 0°, the direction of the discharged airflow is controlled to be vertical when the angle of the discharged airflow is 90°, and the direction of the discharged airflow is controlled to be in the middle which is the middle between the horizontal airflow and the vertical airflow when the angle of the discharged airflow is about 45°.

The airflow control unit 1050 may discharge the drawn air in the opposite direction of the direction A1 in which the discharged air flows. By this, the angle of the discharged airflow may be enlarged, and controlling the airflow may be further facilitated.

The airflow control unit 1050 may draw air from the radial outer portion of the discharge port 1021. Because the airflow control unit 1050 suctions in air from the radial outer portion of the discharge port 1021, the discharged airflow may be widely spread from the radial central portion to the radial outer portion of the discharge port 1021.

The airflow control unit 1050 may include the auxiliary fan 1060 to generate a suction force for suctioning in air around the discharge port 1021, an airflow control motor 1061 for driving the auxiliary fan 1060, and a guiding flow passage 1070 to guide air drawn by the auxiliary fan 1060.

The auxiliary fan 1060 may be disposed at an inner surface of the lower housing 1013. For example, the auxiliary fan 1060 may be accommodated in a fan case 1062 disposed at one end portion adjacent to the suction port 1020 of the bridge 1080. Three auxiliary fans 1060 may be disposed corresponding to the number of bridges 1080, but embodiments are not limited thereto, and the number and the arrangement of the auxiliary fans 1060 may also be designed in various ways as the number and the arrangement of the bridges 1080.

Although a centrifugal fan is illustrated as the auxiliary fan 1060, embodiments are not limited thereto, and various fans including an axial-flow fan, a cross-flow fan, a mixed-flow fan, etc. may be used as the auxiliary fan 1060 according to design specifications.

The guiding flow passage 1070 connects an inlet 1071 to draw air around the discharge port 1021 to an outlet 1072 to discharge the drawn air. A portion of the guiding flow passage 1070 may be formed at the bridge 1080.

The inlet 1071 may be formed on the Coanda curved surface portion 1014 of the lower housing 1013. Consequently, the discharged airflow bent toward the inlet 1071 of the lower housing 1013 by the suction force of auxiliary fan 1060 may flow along the surface of the Coanda curved surface portion 1014.

The outlet 1072 may be disposed around the discharge port 21 at the opposite side of the inlet 1071. Specifically, the outlet 1072 may be formed in the fan case 1062. The outlet 1072 may be formed at the discharge cover 1017.

By the above configuration, as mentioned above, the airflow control unit 1050 may discharge drawn air in the opposite direction of the direction A1 of the discharged airflow, enlarge the angle of the discharged airflow, and further facilitate the controlling of the airflow.

The guiding flow passage 1070 may include a first flow passage 1070*a* formed at the outer portion of the housing 1010 in the circumferential direction and configured to communicate with the inlet 1071, a second flow passage 1070*b* configured to extend from the first flow passage 1070a toward the radial inner portion, and a third flow passage 1070c formed in the fan case 1062.

Consequently, air drawn through the inlet 1071 may pass through the first flow passage 1070a, the second flow passage 1070b, and the third flow passage 1070c and be discharged through the outlet 1072.

However, the above structure of the guiding flow passage 1070 is merely an example, and the guiding flow passage 1070 may have any structure, shape, and arrangement as long as the guiding flow passage 1070 connects the inlet 1071 to the outlet 1072.

In addition, when a display unit 1100 to be described below is disposed at a lower portion of the bridge 1080, the outlet 1072 becomes unable to discharge air toward a lower surface 1083 of the bridge 1080. Consequently, an insulating material (not shown) may be disposed between the display unit 1100 and the bridge 1080 to prevent a dew formation problem that may occur at the display unit 1100.

By the above configuration, compared to a conventional structure in which a blade is provided in a discharge port and a discharged airflow is controlled by rotation of the blade, the indoor unit 1000 of the air conditioner according to the embodiment may control a discharged airflow even without a blade structure. Accordingly, because the discharged air is not interfered by a blade, the amount of discharged air can be increased and noise of the flowing air can be reduced.

Although a discharge port of an indoor unit of a conventional air conditioner may only have a straight shape in order to rotate the blade, the indoor unit 1000 of the air conditioner according to the embodiment of the present disclosure may be formed in a circular shape. Accordingly, the housing 1010, the heat exchanger 1030, etc. may also be formed in the circular shape, thereby not only improving an esthetic sense by the differentiated design but also enabling a natural airflow and reducing loss of pressure when considering that the main fan 1040 generally has a circular shape, thus improving cooling or heating performance of the air conditioner as a result.

As in the above, the indoor unit 1000 of the air conditioner according to the embodiment of the present disclosure may control the discharged airflow in various ways even without a blade structure.

However, in case of the air conditioner not including a blade, it is difficult for the user to check a direction of a discharged airflow. To resolve this, the display unit 1100 capable of visually expressing a direction of an airflow using a lamp or an LED, etc. is installed in the indoor unit 1000 of the air conditioner.

Hereinafter, the configuration of the display unit 1100 will be described in detail.

Figure 46:
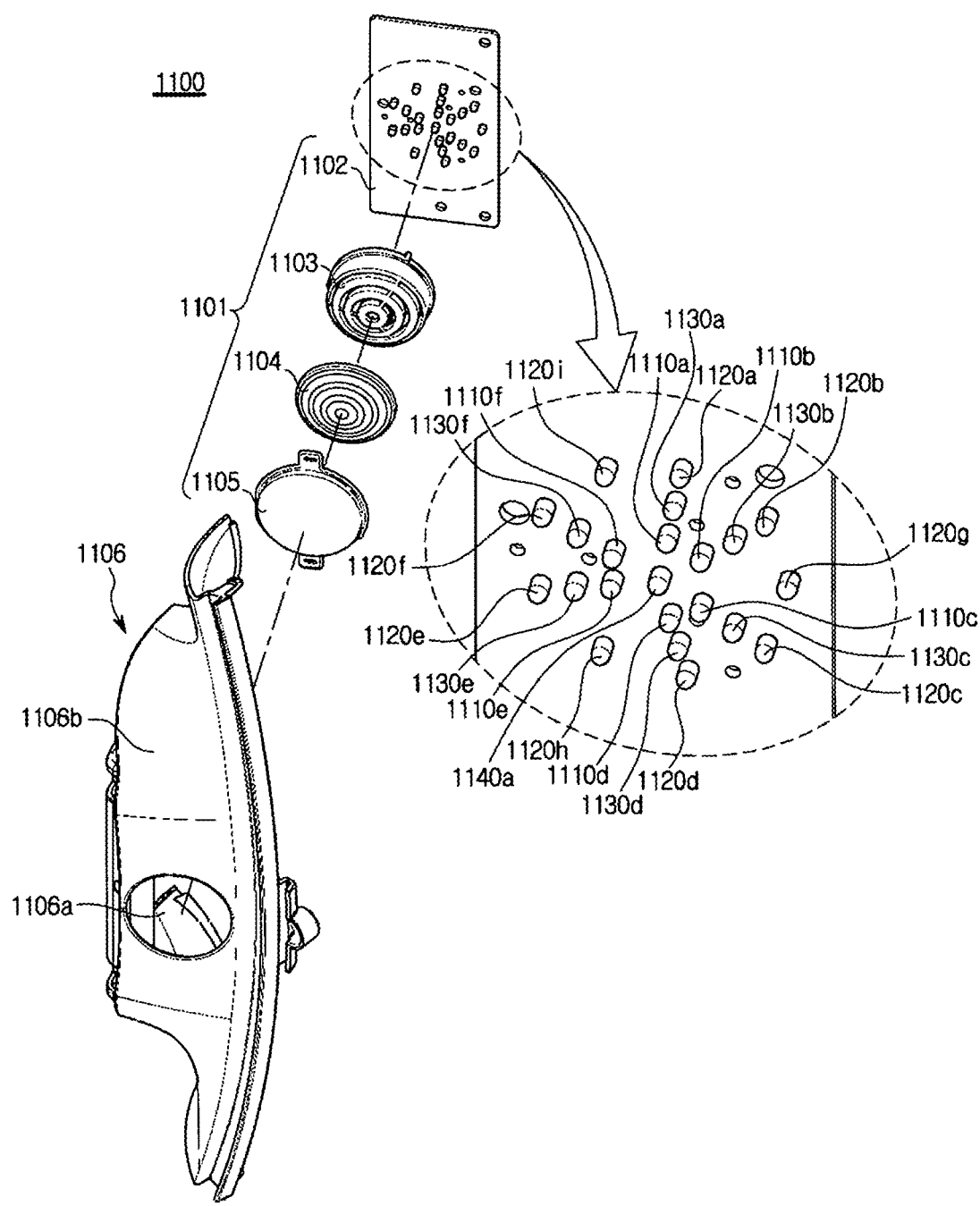
FIG. 46 is an exploded perspective view of a display unit of an air conditioner according to an embodiment.
Figure 47:
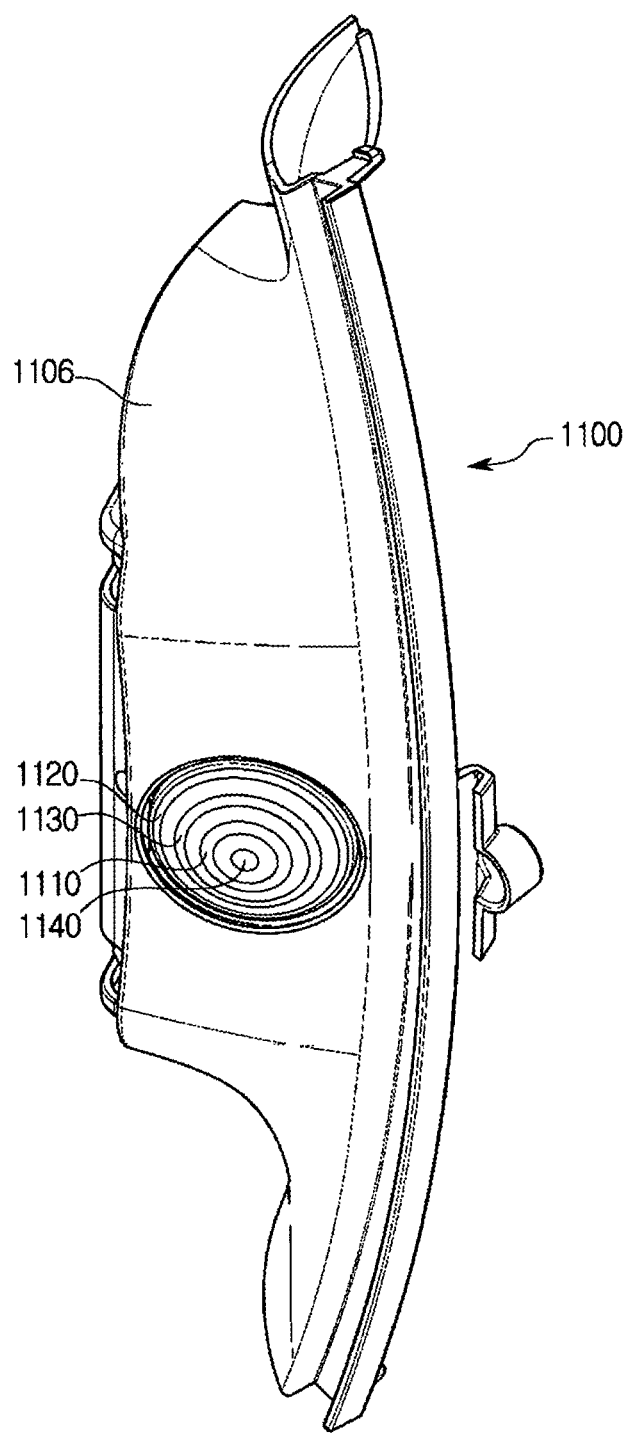
FIG. 47 is an enlarged view of a display unit of an air conditioner according to an embodiment.
Figure 48:
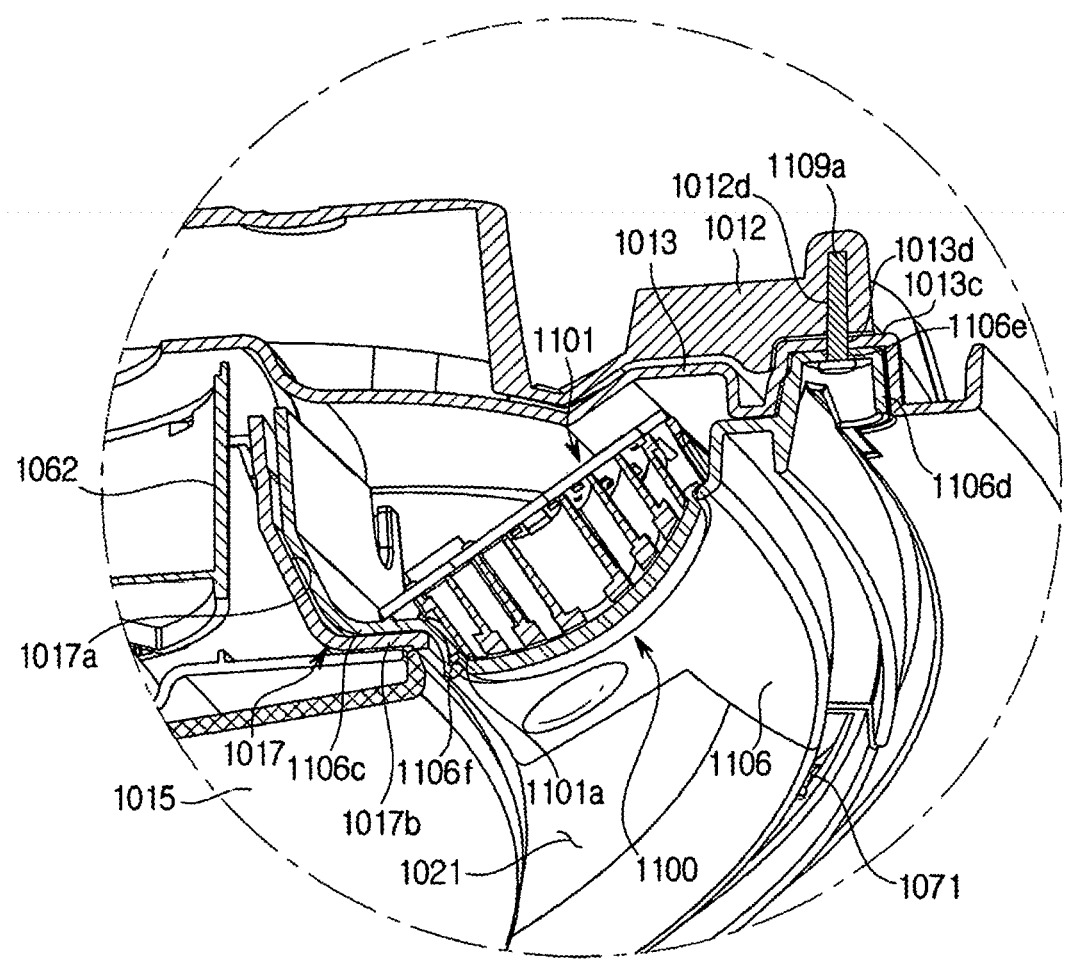
FIG. 48 is an example of a cross-sectional view taken along line I-I marked in FIG. 41.
Figure 49:
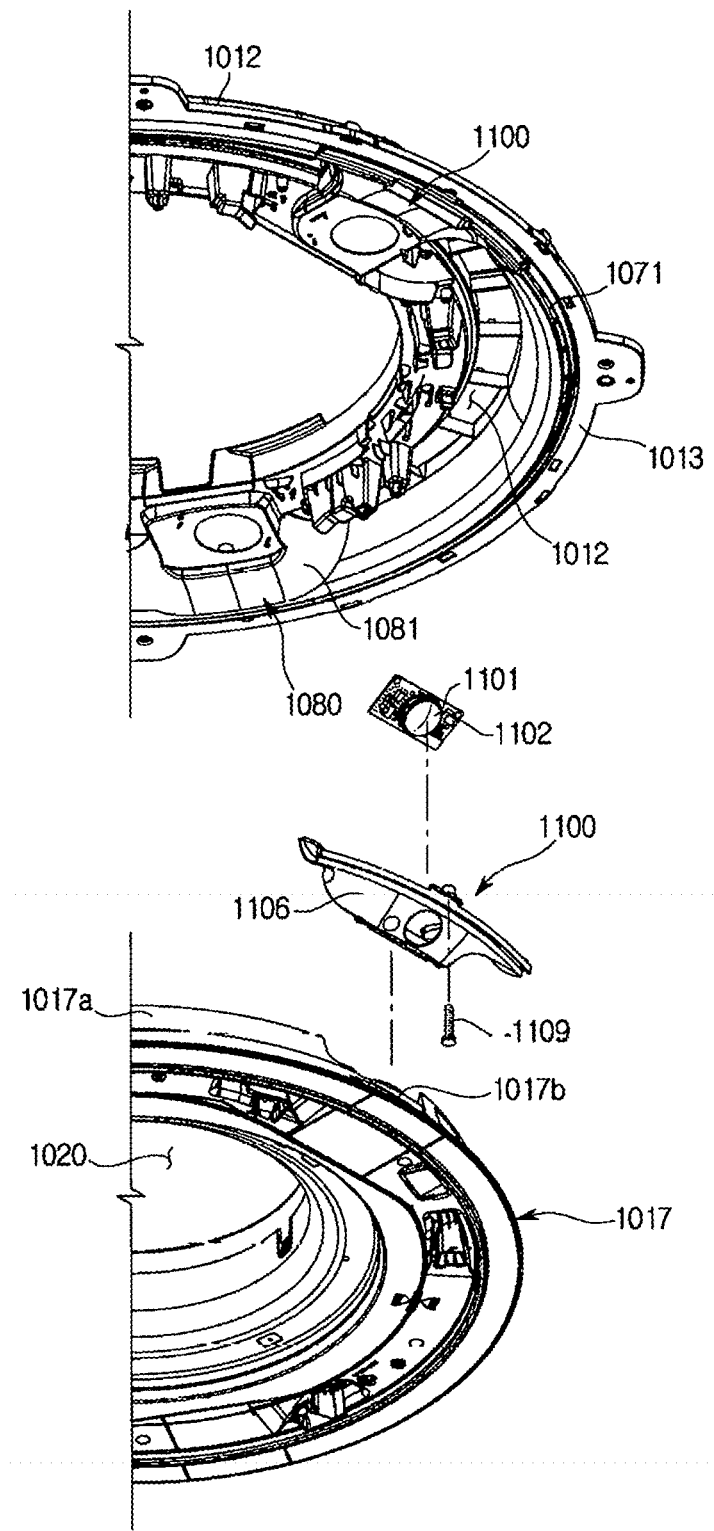
FIG. 49 is an exploded view of a portion of an air conditioner according to an embodiment.

FIG. 46 is an exploded perspective view of a display unit of an air conditioner according to an embodiment, and FIG. 47 is an enlarged view of the display unit of the air conditioner according to the embodiment. Also, FIG. 48 is an example of a cross-sectional view taken along line I-I marked in FIG. 41, and FIG. 49 is an exploded view of a portion of the air conditioner according to the embodiment.

The display unit 1100 may display an operation state of the air conditioner and information on the air conditioner to the user. Specifically, the display unit 1100 may display whether the air conditioner is operating, display a direction of a discharged airflow, and display whether the air conditioner is currently operating in a cooling mode or operating in a heating mode, but embodiments are not limited thereto, and various types of information related to the air conditioner may be displayed on the display unit 1100.

The display unit 1100 may further include a communication unit (not shown) capable of transmitting and receiving information to and from an external device and/or an input unit (not shown) capable of receiving a command input by the user.

The display unit 1100 may be disposed at a lower portion of the bridge 1080 and may be disposed roughly on an outer circumferential surface of the lower housing 1013 when the surface of the ceiling C is viewed in the vertical direction.

Although the display unit 1100 is disposed on at least one of the three bridges 1080 in the embodiment, embodiments are not limited thereto. For example, the display unit 1100 may be disposed on each of the three bridges 1080. In this manner, the number and the arrangement of the display unit 1100 may be designed in various ways.

The display unit 1100 may include a display 1101 to display information to the user and a display cover 1106 to surround and protect the display 1101.

The display cover 1106 may be disposed at a lower portion of the display 1101 in order to surround and protect the display 1101, and a hole 1106a to expose the display 1101 to the outside may be disposed at a central portion of the display cover 1106.

The configuration of the display cover 1106 will be described in more detail below.

The display 1101 displays information to the user and may be implemented with various types of displays including a liquid crystal display (LCD), an LED display, a flat-panel display, a curved display, a flexible display, etc. However, to assist in understanding the present disclosure, the display 1101 will be described below while assuming that the display 1101 includes a plurality of LEDs.

The display 1101 may be inserted into the hole 1106a formed at the display cover 1106.

The display 1101 is a hemispherical lighting device having a plurality of light emitting parts formed in the shape of a circular band and may include a hemispherical light-emitting cover 1105, a printed board assembly (PBA) substrate 1102 on which a plurality of light sources (LEDs) are installed, a light-emitting base 1103 to transmit light radiated from the plurality of light sources (LEDs) through a gap formed in the shape of a circular band, and a reflector 1104 to reflect the light that has passed through the light-emitting base 1103 toward a front surface of the light-emitting cover 1105 in an optical pattern formed in the shape of a circular band.

By the above structure, the display 1101 may display the direction of the discharged airflow controlled to be in various directions. That is, the display 1101 includes a first light-emitting unit 1110 to display a state in which the direction of the discharged airflow is controlled to be vertical (concentrated), a second light-emitting unit 1120 to display a state in which the direction of the discharged airflow is controlled to be horizontal (wide), and a third light-emitting unit 1130 to display a state in which the direction of the discharged airflow is controlled to be in the middle (middle) which is the middle between the horizontal airflow and the vertical airflow.

To display the state in which the direction of the discharged airflow is controlled to be vertical, the first light-emitting unit 1110 may include a plurality (approximately six) of light sources 1110a, 1110b, 1110c, 1110d, 1110e, and 1110f to visually express an optical pattern in the shape of a circular band disposed at an inner portion of the display 1101. For example, the first light-emitting unit 1110 may include a first light source A (1110a), a first light source B (1110b), a first light source C (1110c), a first light source D (1110d), a first light source E (1110e), and a first light source F (1110f).

To display the state in which the direction of the discharged airflow is controlled to be horizontal, the second light-emitting unit 1120 may include a plurality (approximately nine) of light sources 1120a, 1120b, 1120c, 1120d, 1120e, 1120f, 1120g, 1120h, and 1120i to visually express an optical pattern in the shape of a circular band disposed at an edge portion of the display 1101. For example, the second light-emitting unit 1120 may include a second light source A (1120a), a second light source B (1120b), a second light source C (1120c), a second light source D (1120d), a second light source E (1120e), a second light source F (1120f), a second light source G (1120g), a second light source H (1120h), and a second light source I (1120i).

To display the state in which the direction of the discharged airflow is controlled to be in the middle which is the middle between the horizontal airflow and the vertical airflow, the third light-emitting unit 1130 may include a plurality (approximately six) of light sources 1130a, 1130b, 1130c, 1130d, 1130e, and 1130f to visually express an optical pattern in the shape of a circular band disposed at the middle between the first light-emitting unit 1110 and the second light-emitting unit 1120. For example, the third light-emitting unit 1130 may include a third light source A (1130a), a third light source B (1130b), a third light source C (1130c), a third light source D (1130d), a third light source E (1130e), and a third light source F (1130f).

Here, of course the number and the arrangement of the light sources 1110a, 1110b, 1110c, 1110d, 1110e, and 1110f, 1120a, 1120b, 1120c, 1120d, 1120e, 1120f, 1120g, 1120h, and 1120i, and 1130a, 1130b, 1130c, 1130d, 1130e, and 1130f disposed at each of the first light-emitting unit 1110 to the third light-emitting unit 1130 may be designed in various ways.

By the above structure, the first light-emitting unit 1110, the second light-emitting unit 1120 and the third light-emitting unit 1130 may turn on or turn off the plurality of light sources 1110a, 1110b, 1110c, 1110d, 1110e, and 1110f, 1120a, 1120b, 1120c, 1120d, 1120e, 1120f, 1120g, 1120h, and 1120i, and 1130a, 1130b, 1130c, 1130d, 1130e, and 1130f disposed at each of the first light-emitting unit 1110, the second light-emitting unit 1120 and the third light-emitting unit 1130 to display whether the direction of the airflow discharged from the indoor unit 1000 is vertical, horizontal, or middle.

In addition, the display 1101 may also sequentially turn on the first light-emitting unit 1110, the second light-emitting unit 1120 and the third light-emitting unit 1130 from the inner portion to the outer portion or from the outer portion to the inner portion to display a state in which the direction of the airflow is controlled to be automatic.

In addition, the display 1101 may further include a fourth light-emitting unit 1140 to display an operation state or an error state of the air conditioner. The fourth light-emitting unit 1140 may include a circular light source 1140a disposed at the center of the display unit 1100 and display a power-on/power-off state or an operational error state of the indoor unit 1000 of the air conditioner using LEDs of various colors.

As described above, the display cover 1106 is disposed at the lower portion of the display 1101 to surround and protect the display 1101.

The display cover 1106 may include one pair of guiding curved surface portions 1106b to guide air discharged from the discharge port 1021 to be discharged while being spread along the circumferential direction of the discharge port 1021. The pair of guiding curved surface portions 1106b may be disposed to have widths thereof gradually narrowing in the direction in which air is discharged. By the pair of guiding curved surface portions 1106b, the air discharged from the discharge port 1021 adjacent to the display unit 1100 may come in contact with an outer surface of the display cover 1106 along the guiding curved surface portions 1106b, cool the heat generated from the display unit 1100, and be discharged.

One end portion 1106c of the display cover 1106 adjacent to the suction port 1020 may be disposed to overlap the upper portion of the display cover 1017 to be supported by the discharge cover 1017 without a separate fixing member. The one end portion 1106c of the display cover 1106 may be formed in the shape corresponding to that of an outer circumferential surface 1017a of the discharge cover 1017 to be supported by coming in contact with the outer circumferential surface 1017a of the discharge cover 1017.

One portion 1017b of the outer circumferential surface 1017a of the discharge cover 1017 may be formed to be bent toward the radial outer portion of the discharge port 1021 in order to support the display cover 1106 against gravity. The one portion 1017b of the outer circumferential surface 1017a of the discharge cover 1017 may be bent from the outer circumferential surface 1017a of the discharge cover 1017 to extend in a nearly horizontal direction. Accordingly, the one portion 1017b of the outer circumferential surface 1017a of the discharge cover 1017 may support the display cover 1106 against gravity.

The one end portion 1106c of the display cover 1106 may be formed to correspond to the shapes of the outer circumferential surface 1017a of the discharge cover 1017 and the one portion 1017b of the outer circumferential surface 1017a in order to overlap with upper portions of the outer circumferential surface 1017a of the discharge cover 1017 and the one portion 1017b of the outer circumferential surface 1017a. Accordingly, the one end portion 1106c of the display cover 1106 may be supported by the outer circumferential surface 1017a of the discharge cover 1017 and the one portion 1017b of the outer circumferential surface 1017a.

The display cover 1106 may include a recessed groove 1106f to allow the display 1101 to be seated and fixed. The groove 1106f may be formed to correspond to the shape of one corner portion 1101a of the display 1101. The one corner portion 1101a of the display 1101 may be seated on the groove 1106f of the display cover 1106 such that the position of the display 1101 may be fixed within the display cover 1106.

The other end portion 1106d, which is opposite from the one end portion 1106c of the display cover 1106, may be disposed to abut a display cover coupling portion 1013c disposed at an outer end portion of the lower housing 1013. The other end portion 1106d of the display cover 1106 may be fixed by a fixing member 1109a while being disposed to overlap the display cover coupling portion 1013c. Fixing member accommodation portions 1106e and 1013d, which is formed to correspond to the fixing member 1109a to be coupled to the fixing member 1109a, may be respectively disposed at the other end portion 1106d of the display cover 1106 and the display cover coupling portion 1013c of the lower housing 1013.

The fixing member 1109a may be a male screw having screw threads formed on the outer circumferential surface thereof, and in this case, the fixing member accommodation portion 1106e of the display cover 1106 and the fixing member accommodation portion 1013*d* of the display cover coupling portion 1013*c* may be female screws.

For a firmer support, the fixing member 1109*a* may not only fix the display cover 1106 and the lower housing 1013 but also fix the middle housing 1012 together. In this case, a fixing member accommodation portion 1012*d* may also be disposed in the middle housing 1012. Furthermore, the fixing member accommodation portion 1012*d* of the middle housing 1012 may be a female screw.

In the present disclosure, the display unit 1100 may be firmly coupled to the housing 1010 by coupling the display unit 1100 to the housing 1010 and fixing the display unit 1100 by the structure described above. Also, the display unit 1100 may be fixed to the housing 1010 using the fewest possible number of separate fixing members 1109*a*, thereby reducing the unit cost of the air conditioner. Furthermore, because the display unit 1100 may be easily detached from the housing 1010 due to the structure described above, the indoor unit 1000 may be easily maintained and repaired.

Referring to FIG. 49, a process of coupling the display unit 1100 will be described.

The user places the display unit 1100 on the discharge port of the lower housing 1013 while the display 1101 is seated on the upper portion of the display cover 1106. While the display unit 1100 is disposed at the lower portion of the lower housing 1013, the user couples the discharge cover 1017 to the lower housing 1013. By this process, the one end portion 1106*c* of the display cover 1106 may firstly be fixed to the lower housing 1013.

Here, the other end portion 1106*d* of the display cover 1106 is disposed at the lower portion of the display cover coupling portion 1013*c* to overlap the display cover coupling portion 1013*c* of the lower housing 1013. That is, the other end portion 1106*d* of the display cover 1106 abuts the display cover coupling portion 1013*c*. In this state, the user uses the fixing member 1109*a* to fix the display cover 1106 to the lower housing 1013. Specifically, when the fixing member 1109*a* is a male screw, the user may couple the male screw to the fixing member accommodation portions 1106*e* and 1013*d* respectively formed at the display cover 1106 and the lower housing 1013 to couple and fix the display cover 1106 to the lower housing 1013.

As described above, the fixing member 1109*a* may also be coupled to the fixing member accommodation portion 1012*d* disposed in the middle housing 1012 to simultaneously couple and fix the display cover 1106, the lower housing 1013, and the middle housing 1012.

Although coupling the display unit 1100 to the housing 1010 by the fixing member 1109*a* implemented with a screw has been described above, ways for implementing the fixing member 1109*a* is not limited to the screw.

Hereinafter, various ways for implementing the fixing member 1109*a* will be described.

Figure 50:
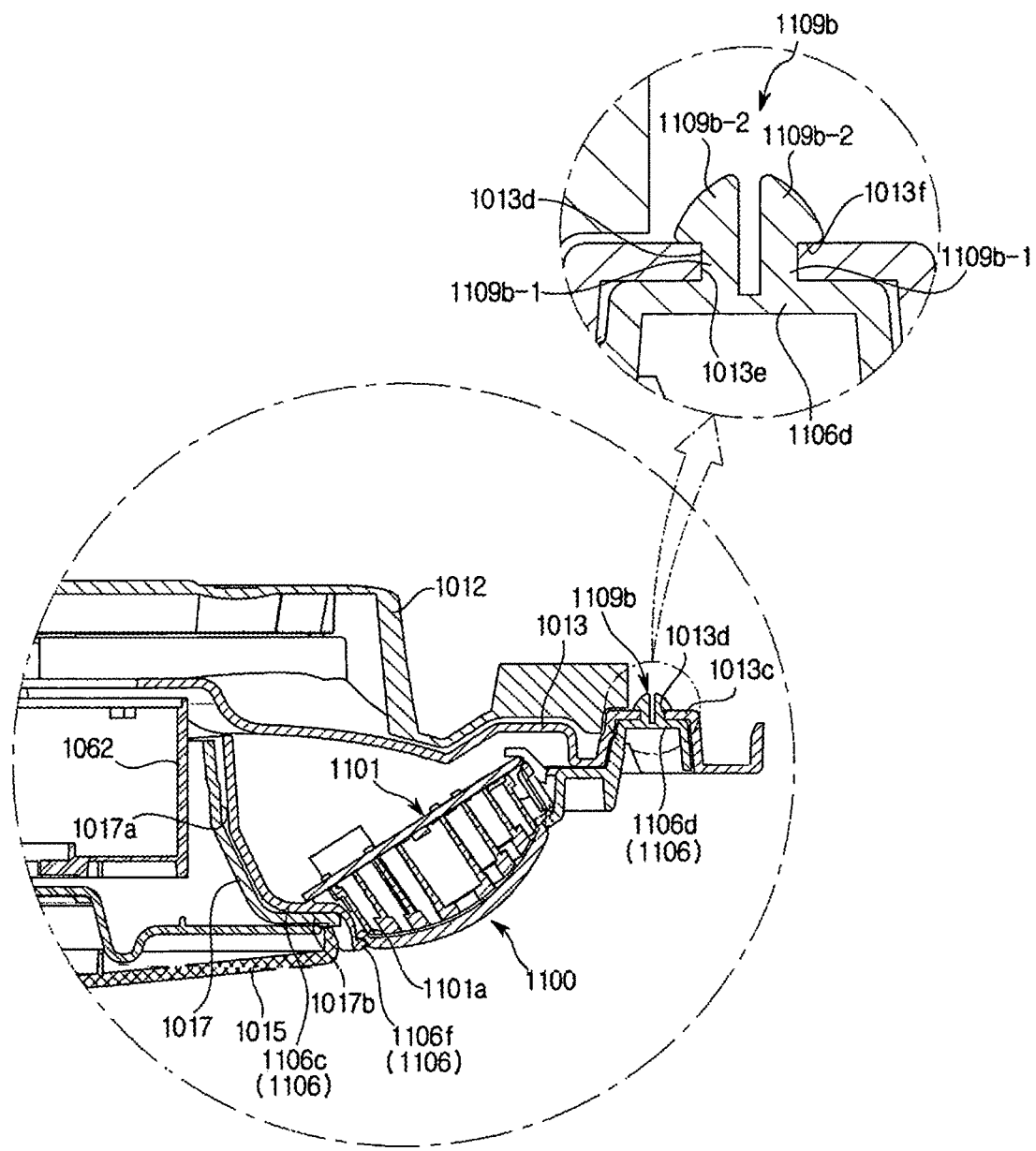
FIG. 50 is an example of a cross-sectional view taken along line I-I marked in FIG. 41.

FIG. 50 is an example of a cross-sectional view taken along line I-I marked in FIG. 41.

An example of the display cover will be described with reference to FIG. 50. However, like reference numerals may be given to like elements from the embodiment illustrated in FIG. 48, and the description thereof may be omitted.

The one end portion 1106*c* of the display cover 1106 adjacent to the suction port 1020 may be disposed to overlap the upper portion of the display cover 1017 to be supported by the discharge cover 1017 without a separate fixing member. The one end portion 1106*c* of the display cover 1106 may be supported by the one portion 1017*b* of the outer circumferential surface 1017*a* of the discharge cover 1017 against gravity.

The other end portion 1106*d* which is opposite from the one end portion 1106*c* of the display cover 1106 may be disposed to abut the display cover coupling portion 1013*c* disposed at the outer end portion of the lower housing 1013. The other end portion 1106*d* of the display cover 1106 may be fixed by a fixing member 1109*b* protruding from the other end portion 1106*d* of the display cover 1106 while being disposed to overlap the display cover coupling portion 1013*c*. The fixing member accommodation portion 1013*d* formed to correspond to the fixing member 1109*b* to be coupled to the fixing member 1109*b* may be disposed at the display cover coupling portion 1013*c* of the lower housing 1013. The fixing member 1109*b* and the fixing member accommodation portion 1013*d* may be disposed to be coupled by snap-fitting.

Specifically, the fixing member 1109*b* may include two extension portions 1109*b*-1 and locking portions 1109*b*-2 disposed at each of the extension portions 1109*b*-1.

The extension portions 1109*b*-1 extend by a predetermined length from the other end portion 1106*d* of the display cover 1106 toward the lower housing 1013. To allow the display cover 1106 and the lower housing 1013 to abut each other instead of being apart by a predetermined interval when the display cover 1106 is coupled to the lower housing 1013, the length of the extension portions 1109*b*-1 may be formed to correspond to the depth of a through-hole 1013*e* disposed by the fixing member accommodation portion 1013*d*.

The extension portions 1109*b*-1 may be formed with an elastic material to be bendable when the locking portions 1109*b*-2 to be described below pass through the through-hole 1013*e* disposed at the fixing member accommodation portion 1013*d*. Accordingly, the extension portions 1109*b*-1 may be bent in the direction of becoming closer to each other in order to allow the locking portions 1109*b*-2 protruding from the end portions of the extension portions 1109*b*-1 to have a wider width than the through-hole 1013*e* to pass through the through-hole 1013*e*. After the locking portions 1109*b*-2 pass through the through-hole 1013*e*, the extension portions 1109*b*-1 are restored to be separated by the original interval by an elastic force, and accordingly, the locking portions 1109*b*-2 are fixed to a locking groove 1013*f* disposed at the fixing member accommodation portion 1013*d* of the lower housing 1013.

The locking portions 1109*b*-2 protrude from the end portions of the extension portions 1109*b*-1. The locking portions 1109*b*-2 are disposed to have a larger width than the through-hole 1013*e* disposed at the fixing member accommodation portion 1013*d*. The locking portions 1109*b*-2 may pass through the through-hole 1013*e* by the elastic force of the extension portions 1109*b*-1. After the locking portions 1109*b*-2 pass through the through-hole 1013*e*, the locking portions 1109*b*-2 may be fixed to the locking groove 1013*f* disposed at the fixing member accommodation portion 1013*d* of the lower housing 1013.

The one corner portion 1101*a* of the display 1101 may be fixed to the groove 1106*f* of the display cover 1106.

In the indoor unit 1000 illustrated in FIG. 50, the fixing member 1109*b* disposed at the other end portion 1106*d* of the display cover 1106 may firstly be fixed only by being inserted into the fixing member accommodation portion 1013*d* disposed at the lower housing 1013.

Figure 51:
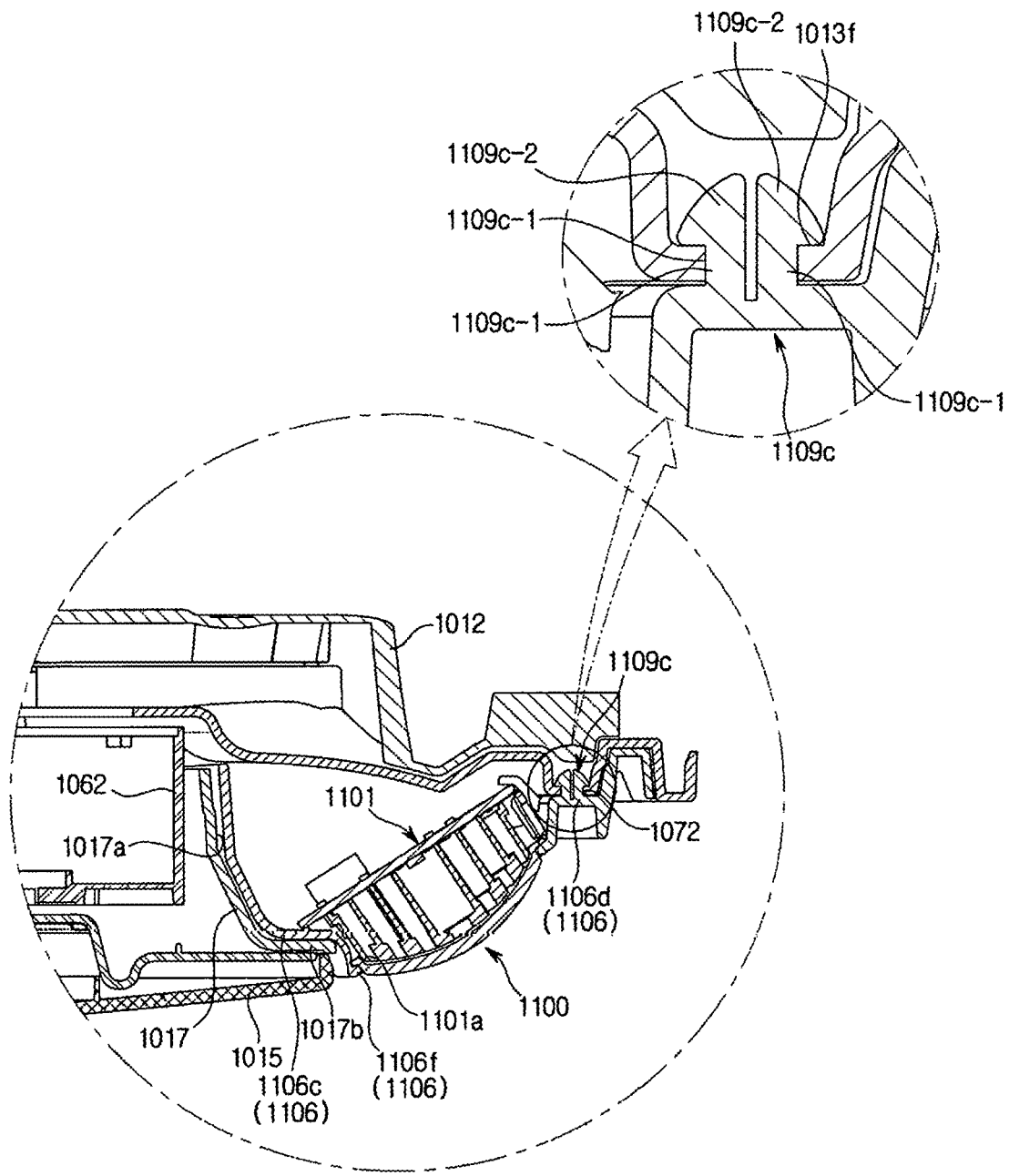
FIG. 51 is an example of a cross-sectional view taken along line I-I marked in FIG. 41.

FIG. 51 is an example of a cross-sectional view taken along line I-I marked in FIG. 41.

An example of the display cover will be described with reference to FIG. 51. However, like reference numerals may be given to like elements from the embodiment illustrated in FIG. 48, and the description thereof may be omitted.

The other end portion 1106d of the display cover 1106 may be coupled and fixed to the outlet 1072 disposed at the lower housing 1013.

Specifically, the other end portion 1106d of the display cover 1106 includes a fixing member 1109c extending toward the lower housing 1013 as the other end portion 1106d of the display cover 1106 illustrated in FIG. 50. The fixing member 1109c may include an extension portion 1109c-1 and a locking portion 1109c-2.

The extension portion 1109c-1 may have a length corresponding to the depth of the outlet 1072 disposed at the lower housing 1013. The locking portion 1109c-2 passes through the outlet 1072 to be fixed to the locking groove 1013f of the lower housing 1013.

The one end portion 1106c of the display cover 1106 may be supported by the one portion 1017b of the outer circumferential surface 1017a of the discharge cover 1017 against gravity.

The one corner portion 1101a of the display 1101 may be fixed to the groove 1106a of the display cover 1106.

In the case of the indoor unit 1000 illustrated in FIG. 51, because the display unit 1100 may be coupled to the existing outlet 1072 without requiring a separate fixing member accommodation portion, the unit cost of the air conditioner may be decreased.

Figure 52:
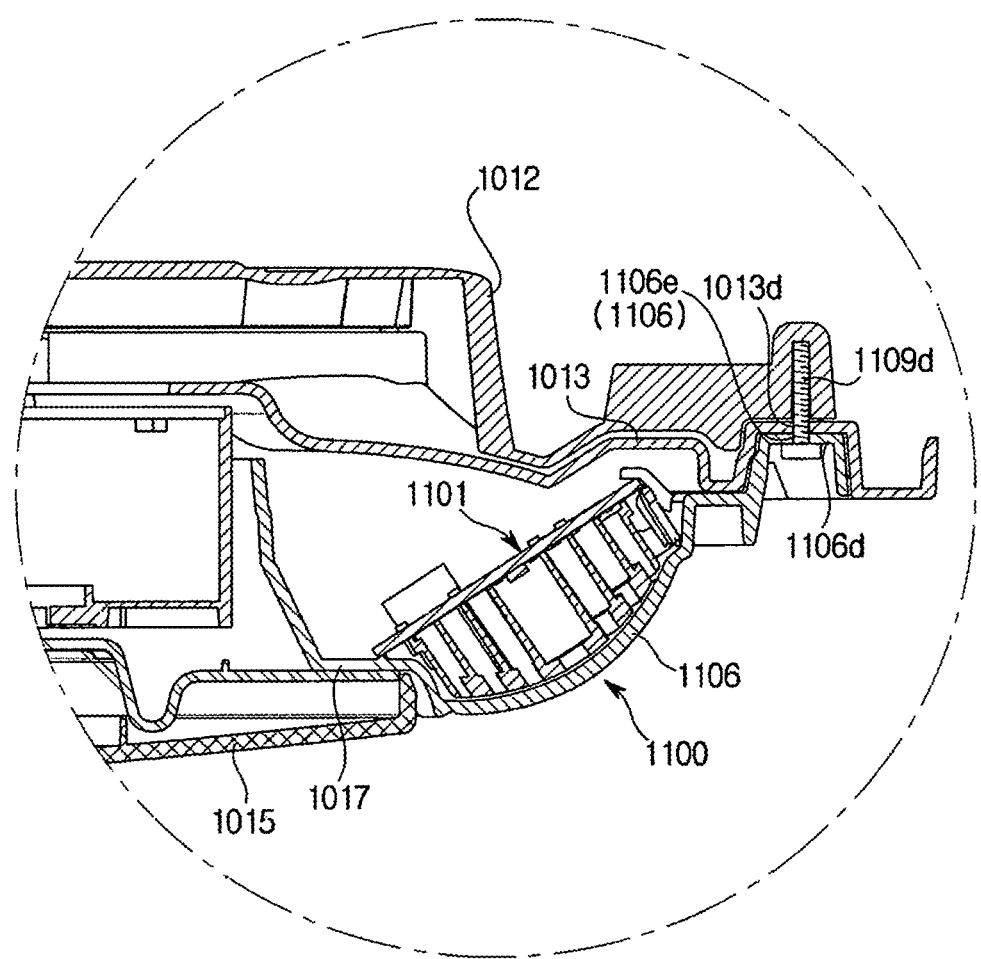
FIG. 52 is an example of a cross-sectional view taken along line I-I marked in FIG. 41.

FIG. 52 is an example of a cross-sectional view taken along line I-I marked in FIG. 41.

An example of the display cover will be described with reference to FIG. 52. However, like reference numerals may be given to like elements from the embodiment illustrated in FIG. 48, and the description thereof may be omitted.

The display cover 1106 may be integrally formed with the discharge cover 1017.

The discharge cover 1017 may include the display cover 1106 extending from one portion at which the display 1101 is disposed along the radial direction of the discharge port 1021. The display cover 1106 is disposed to surround the display 1101 from the bottom.

The fixing member accommodation portion 1106e to accommodate a fixing member 1109d may be disposed at the outer end portion 1106d of the display cover 1106 spaced apart from the discharge cover 1017. The fixing member accommodation portion 1013d to accommodate the fixing member 1109d together with the fixing member accommodation portion 1106e may be disposed at the lower housing 1013. The fixing member 1109d may be a male screw inserted into the fixing member accommodation portion 1106e of the display cover 1106 and the fixing member accommodation portion 1013d of the lower housing 1013 to couple and fix the discharge cover 1017 to the lower housing 1013. In this case, the fixing member accommodation portions 1106e and 1013d may be female screws.

The one corner portion 1101a of the display 1101 may be fixed to the groove 1106a of the display cover 1106.

In the case of the indoor unit 1000 illustrated in FIG. 52, the discharge cover 1017 and the display cover 1016 are integrally formed such that the display 1101 may be coupled and fixed to the housing 1010 without a separate fixing member.

Figure 53:
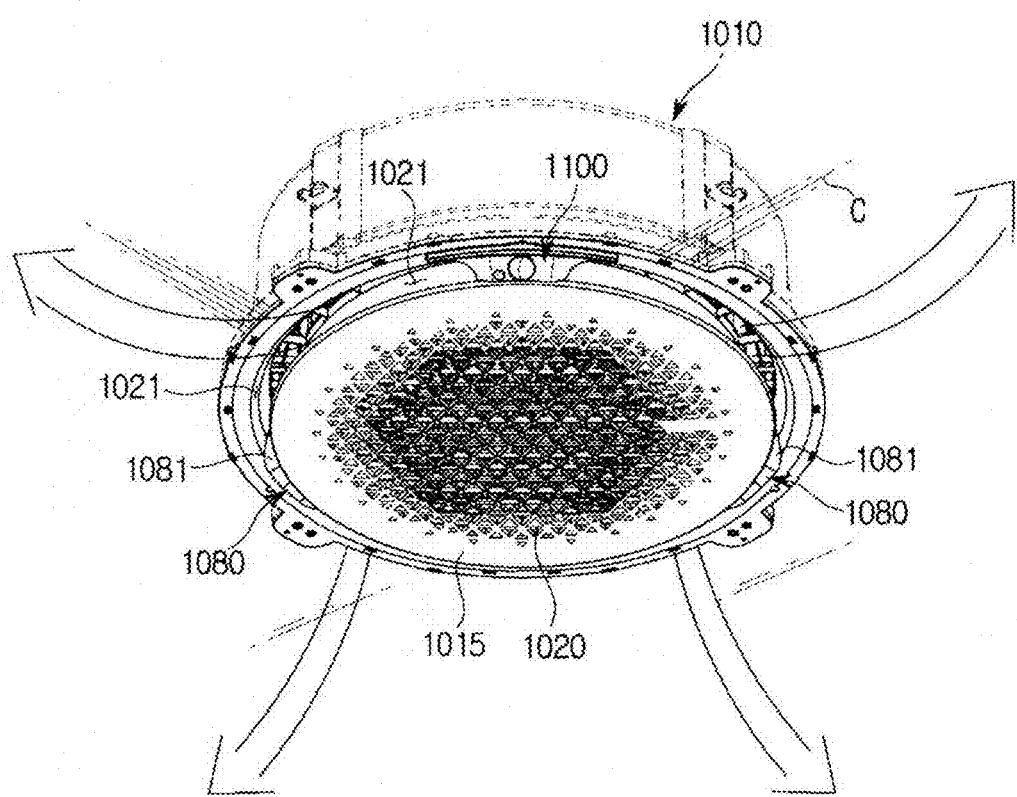
FIG. 53 is a view illustrating an embodiment of an air conditioner illustrated in FIG. 40.

FIG. 53 is a view illustrating an embodiment of the air conditioner illustrated in FIG. 40.

Although the display unit 1100 described above is illustrated as being applied to the indoor unit 1000 including the airflow control unit 1050 as illustrated in FIG. 40, the display unit 1100 described above may of course be also applied to the indoor unit 1000 simply including only the circular discharge port 1021 without the airflow control unit 1050 as illustrated in FIG. 53.

As described above, in the indoor unit 1000 according to the present disclosure, the display unit 1100 may be firmly fixed to the housing 1010 using the fewest number of separate fixing members, and accordingly, the display unit 1100 may easily be detached from the housing 1010 such that maintenance and repair of the indoor unit 1000 may be facilitated.

In the above, the configuration of the air conditioner including the display unit 1100 has been described.

Hereinafter, operations of the air conditioner including the display unit 1100 will be described.

Figure 54:
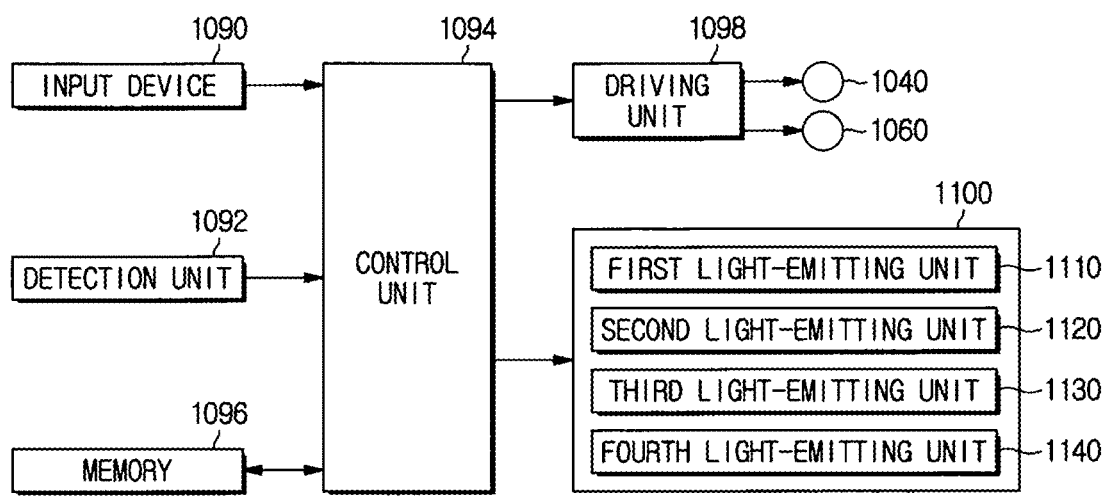
FIG. 54 is a control block diagram of an indoor unit of an air conditioner according to an embodiment.

FIG. 54 is a control block diagram of an indoor unit of an air conditioner according to an embodiment.

In FIG. 54, the indoor unit 1000 of the air conditioner further includes an input device 1090, a detection unit 1092, a control unit 1094, a memory 1096, a driving unit 1098, and the display unit 1100.

The input device 1090 is used to input a command for setting operation information such as an operation mode (e.g. cooling or heating operation) of the indoor unit 1000 of the air conditioner, a target indoor temperature, an airflow direction, and an airflow strength by the user's manipulation. The input device 1090 may be configured with a key, a button, a switch, a touch pad, etc. and may be any device that generates predetermined input data by manipulations such as pressing, touching, rotating, etc.

For example, the input device 1090 is a remote controller to wirelessly transmit a control command for setting the operation of the indoor unit 1000 of the air conditioner or controlling the airflow direction and may include a cellphone, a personal communications service (PCS) phone, a smartphone, a personal digital assistants (PDA) terminal, a portable multimedia player (PMP) a laptop computer, a digital broadcasting terminal, a netbook, a tablet, a navigation, etc.

Other than the above, the input device 1090 includes all devices such as a digital camera and a camcorder having a wire/wireless communication function capable of implementing various functions using different application programs.

In addition, the input device 1090 may be a general remote controller having a simple form. A remote controller generally uses infrared data association (IrDA) to transmit and receive a signal to and from the indoor unit 1000 of the air conditioner.

In addition, the input device 1090 may use various means such as radio frequency (RF), wireless fidelity (Wi-Fi), Bluetooth, Zigbee, near-field communication (NFC), ultrawide band (UWB) communication, etc. to transmit and receive a wireless communication signal to and from the indoor unit 1000 of the air conditioner, and the input device 1090 may use any means as long as the input device 1090 and the indoor unit 1000 are able to transmit and receive a wireless communication signal to and from each other.

The input device 1090 may include a power button to control the power of the indoor unit 1000 to be turned on or off, an operation selection button to select the operation mode of the indoor unit 1000, an airflow direction button to control the direction of an airflow, an airflow volume button to control the strength of the airflow, a temperature button to control the temperature, a dial, etc.

The detection unit 1092 detects a temperature of the indoor space and transmits the detected temperature to the control unit 1094.

The control unit 1094 is a microprocessor that controls the overall operation of the indoor unit 1000 of the air conditioner. The control unit 1094 receives various types of operation modes and temperature information from the input device 1090 and the detection unit 1092, and, based on the various types of operation modes and the temperature information received, transmits a control command to the driving unit 1098 and the display unit 1100.

In the memory 1096, control data for controlling the operation of the indoor unit 1000 of the air conditioner, reference data used while controlling the operation of the indoor unit 1000 of the air conditioner, operation data generated while the indoor unit 1000 performs a predetermined operation, set information such as set data input by the input device 1090 for the indoor unit 1000 to perform a predetermined operation, whether a reserved operation is scheduled, and failure information including a cause of malfunctioning or a location where the malfunctioning has occurred when the indoor unit 1000 malfunctions may be stored.

In addition, the memory 1096 may store optical pattern information displayed by the display unit 1100. For example, optical pattern information for which the plurality of light sources (LEDs) emit light in the shape of triple circular bands along a set airflow direction may be stored in the memory 1096, and when requested by the control unit 1094, the stored optical pattern information may be transmitted to the control unit 1094.

In addition, the memory 1096 may be implemented with a nonvolatile memory device such as a ROM, a PROM, an EPROM, and a flash memory, a volatile memory device such as a RAM, or a storage medium such as a hard disc, a card type memory (e.g. Secure Digital (SD) or eXtreme Digital (XD) memory, etc.), and an optical disc. However, the memory 1096 is not limited thereto, and various storage mediums that may be considered by the designer may be used as the memory 1096.

The driving unit 1098 drives the main fan 1040, the auxiliary fan 1060, etc. related to the operation of the indoor unit 1000 of the air conditioner in accordance with a driving control signal of the control unit 1094.

That is, the driving unit 1098 may control driving and speed of the airflow control motor 1061 in accordance with the driving control signal of the control unit 1094. Consequently, the amount of air drawn around the suction port 1021 may be controlled and the direction of the discharged airflow may be controlled.

In addition, the driving unit 1098 may control driving and speed of the blower motor 1041 in accordance with the driving control signal of the control unit 1094. Consequently, the strength of the airflow discharged from the discharge port 1021 may be controlled.

The display unit 1100 is used to display user input information and the operation state of the indoor unit 1000 of the air conditioner in accordance with a displayed control signal of the control unit 1094. The display unit 1100 may use the first light-emitting unit 1110, the second light-emitting unit 1120, the third light-emitting unit 1130 and the fourth light-emitting unit 1140 to display the direction of the discharged airflow in accordance with various types of operation information received from the input device 1090.

That is, the display unit 1100 may display whether the airflow direction selected by the user via the input device 1090 is vertical, horizontal, middle, or automatic.

The air conditioner according to the embodiment of the present disclosure may further include a sound output unit to output the operation state of the indoor unit 1000 and the user's manipulation state by a sound (e.g., a beep sound)

Hereinafter, an air conditioner without a blade, a method of controlling the same, and effects thereof will be described.

Figure 55:
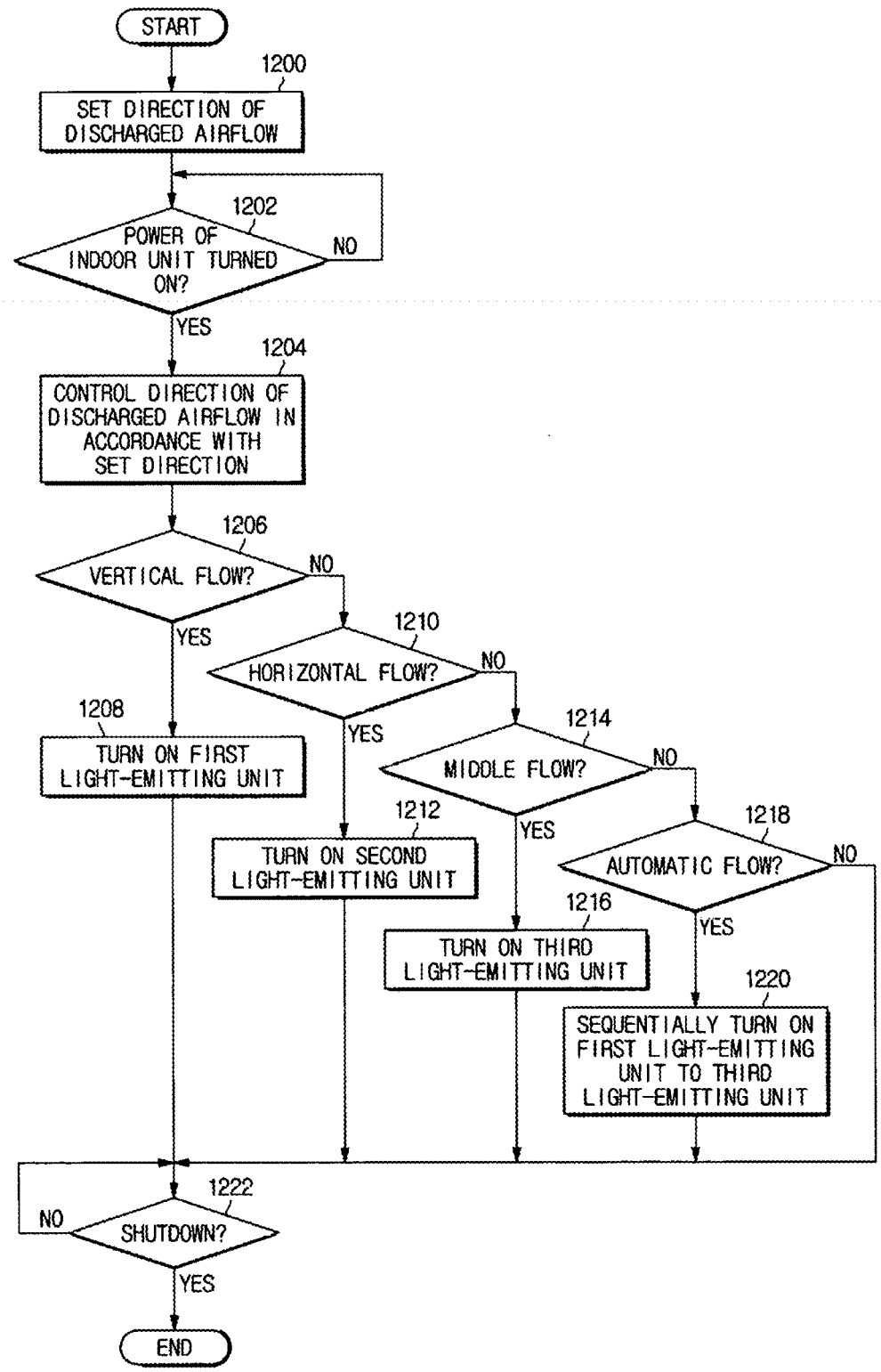
FIG. 55 is an operation flow chart illustrating a control algorithm for visually expressing a direction of a discharged airflow in an air conditioner according to an embodiment.
Figure 56A:
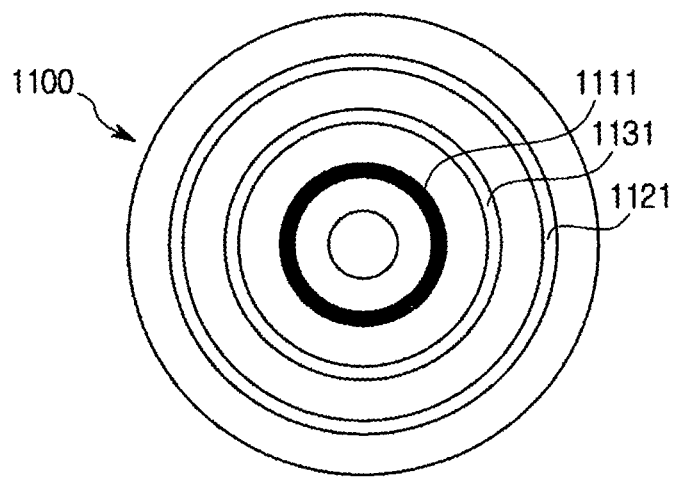
FIGS. 56A, 56B and 56C illustrate an example of a direction of a discharged airflow visually expressed by an air conditioner according to an embodiment.
Figure 56B:
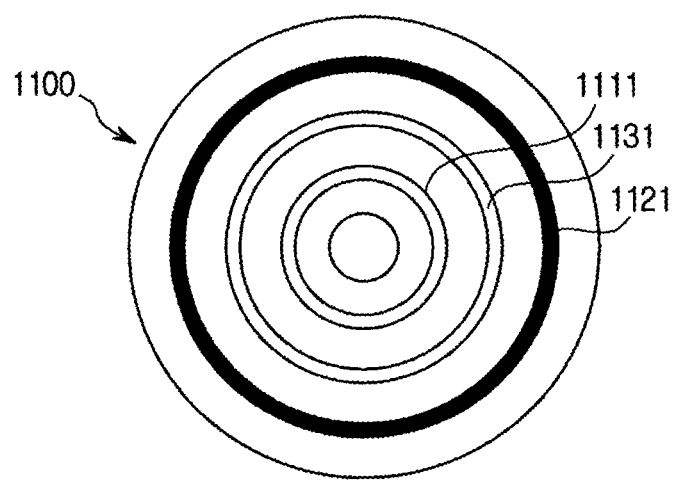
Figure 56C:
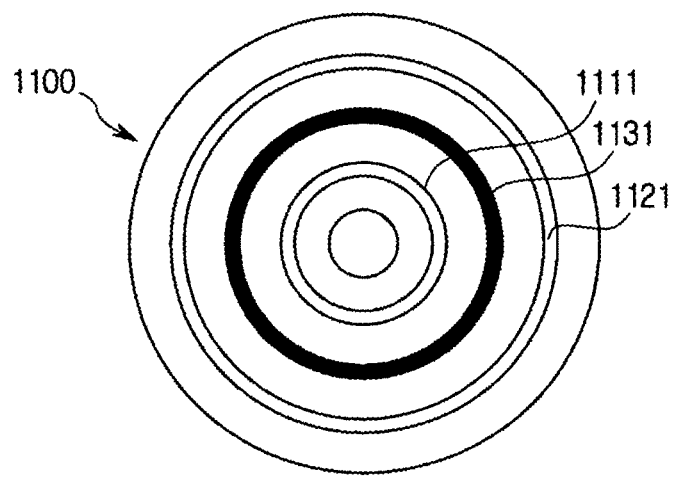

FIG. 55 is an operation flow chart illustrating a control algorithm for visually expressing a direction of a discharged airflow in an air conditioner according to an embodiment. FIGS. 56A, 56B and 56C illustrate an example of a direction of a discharged airflow visually expressed by the air conditioner according to the embodiment.

In FIG. 55, the user manipulates the input device 1090 to set operation information including an operation mode (e.g. cooling or heating operation) of the indoor unit 1000 of the air conditioner, a target indoor temperature, a direction of a discharged airflow, etc. (operation S1200). The operation information set by the user via the input device 1090 is transmitted to the control unit 1094.

Consequently, the control unit 1094 receives the various types of operation information from the input device 1090 and determines whether the power of the indoor unit 1000 is turned on in order to control the overall operation of the indoor unit 1000 based on the received information (operation S1202).

When the power of the indoor unit 1000 is determined to be turned on as a result of the operation S1202, the control unit 1094 transmits a driving control signal to the driving unit 1098 in order to control the direction of the discharged airflow in accordance with the set direction.

The driving unit 1098 may control driving and speed of the airflow control motor 1061 in accordance with the driving control signal from the control unit 1094 to control the amount of air drawn around the discharge port 1021 and control the direction of the discharged airflow (operation S1204).

The control unit 1094 determines whether the direction of the airflow is vertical in order to visually display the direction of the discharged airflow (operation S1206).

When the direction of the airflow is determined to be vertical as a result of the operation S1206, the control unit 1094 turns on the light sources 1110*a*, 1110*b*, 1110*c*, 1110*d*, 1110*e*, and 1110*f* of the first light-emitting unit 1110 to display the optical pattern in the shape of a circular band disposed at the inner portion of the display unit 1100 (operation S1208). For example, by turning on the light sources 1110*a*, 1110*b*, 1110*c*, 1110*d*, 1110*e*, and 1110*f* of the first light-emitting unit 1110, a first circular image 1111 may be displayed on the central portion of the display unit 1100 as illustrated in FIG. 56A.

Consequently, the user may intuitively recognize that the direction of the discharged airflow is being controlled to be vertical.

On the other hand, when the direction of the airflow is not determined to be vertical as a result of the operation S1206, the control unit 1094 determines whether the direction of the airflow is horizontal (operation S1210).

When the direction of the airflow is determined to be horizontal as a result of the operation S1210, the control unit 1094 turns on the light sources 1120*a*, 1120*b*, 1120*c*, 1120*d*, 1120*e*, 1120*f*, 1120*g*, 1120*h*, and 1120*i* of the second light-emitting unit 1120 to display the optical pattern in the shape of a circular band disposed at the edge portion of the display unit 1100 (operation S1212). For example, by turning on the light sources 1120*a*, 1120*b*, 1120*c*, 1120*d*, 1120*e*, 1120*f*, 1120*g*, 1120*h*, and 1120*i* of the second light-emitting unit 1120, a second circular image 1121 may be displayed on the edge portion of the display unit 1100 as illustrated in FIG. 56B.

Consequently, the user may intuitively recognize that the direction of the discharged airflow is being controlled to be horizontal.

On the other hand, when the direction of the airflow is not determined to be horizontal as a result of the operation S1210, the control unit 1094 determines whether the direction of the airflow is middle (operation S1214).

When the direction of the airflow is determined to be in the middle as a result of the operation S1214, the control unit 1094 turns on the light sources 1130a, 1130b, 1130c, 1130d, 1130e, and 1130f of the third light-emitting unit 1130 to display the optical pattern in the shape of a circular band disposed at the middle portion of the display unit 1100 (operation S1216). For example, by turning on the light sources 1130a, 1130b, 1130c, 1130d, 1130e, and 1130f of the third light-emitting unit 1130, a third circular image 1131 may be displayed between the first circular image 1111 and the second circular image 1121 on the display unit 1100 as illustrated in FIG. 56C.

Consequently, the user may intuitively recognize that the direction of the discharged airflow is being controlled to be in the middle.

On the other hand, when the direction of the airflow is not determined to be in the middle as a result of the operation S1214, the control unit 1094 determines whether the direction of the airflow is automatic (operation S1218).

When the direction of the airflow is determined to be automatic as a result of the operation S1218, the control unit 1094 sequentially turns on the light sources 1110a, 1110b, 1110c, 1110d, 1110e, and 1110f of the first light-emitting unit 1110, the light sources 1120a, 1120b, 1120c, 1120d, 1120e, 1120f, 1120g, 1120h, and 1120i of the second light-emitting unit 1120, and the light sources 1130a, 1130b, 1130c, 1130d, 1130e, and 1130f of the third light-emitting unit 1130 from the inner portion to the outer portion or from the outer portion to the inner portion to animate a progression of the optical pattern in the shape of a circular band from the inner portion of the display unit 1100 toward the optical pattern in the shape of a circular band at the edge portion of the display unit 1100 (operation S1220).

Consequently, the user may intuitively recognize that the direction of the discharged airflow is being controlled to be automatic.

In this manner, the display unit 1100 visualizes the direction of the discharged airflow in accordance with the direction of the airflow to allow the user to intuitively recognize the direction of the discharged airflow even in the indoor unit 1000 of the air conditioner without a blade.

Then, the control unit 1094 determines whether the power is turned off (operation S1222), and when the power is not turned off, controls the auxiliary fan 1060 to control the direction of the discharged airflow in accordance with the set direction and controls the display unit 1100 to visually display the direction of the discharged airflow.

When the power is determined to be turned off as a result of the operation S1222, the control unit 1094 ends the operation by stopping operations of all loads on the indoor unit 1000 of the air conditioner.

Meanwhile, although the direction of the airflow has been described in the embodiment of the present disclosure as being implemented with a vertical airflow, a horizontal airflow, a mid-airflow, or an automatic airflow, the present disclosure is not limited thereto and more light-emitting units may be disposed at the display unit 1100 to visually express airflow directions when the airflow directions are further subdivided. The number and the arrangement of the light-emitting units disposed at the display unit 1100 may be designed in various ways.

In addition, the display unit 1100 may visualize the airflow circulation mode described above. For example, when the plurality of auxiliary fans 1060 include an auxiliary fan A, an auxiliary fan B, and an auxiliary fan C, the display unit 1100 may display an airflow direction due to each of the auxiliary fan A, the auxiliary fan B, and the auxiliary fan C.

Figure 57A:
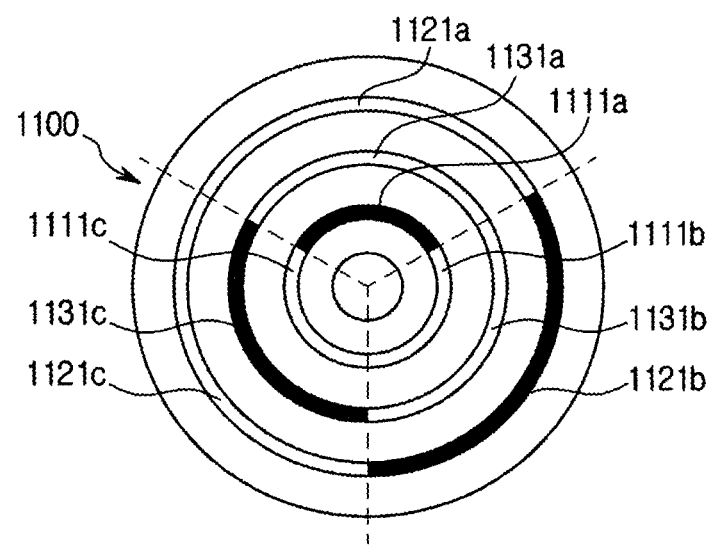
FIGS. 57A, 57B and 57C illustrate an example of a direction of a discharged airflow visually expressed by an air conditioner according to an embodiment.
Figure 57B:
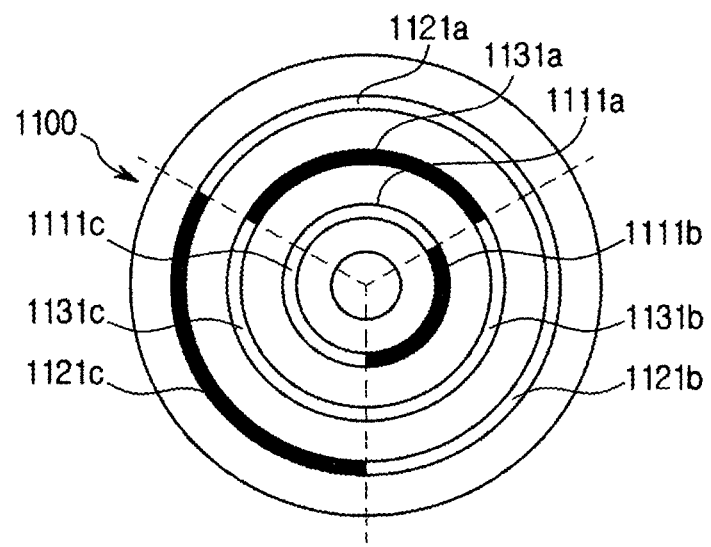
Figure 57C:
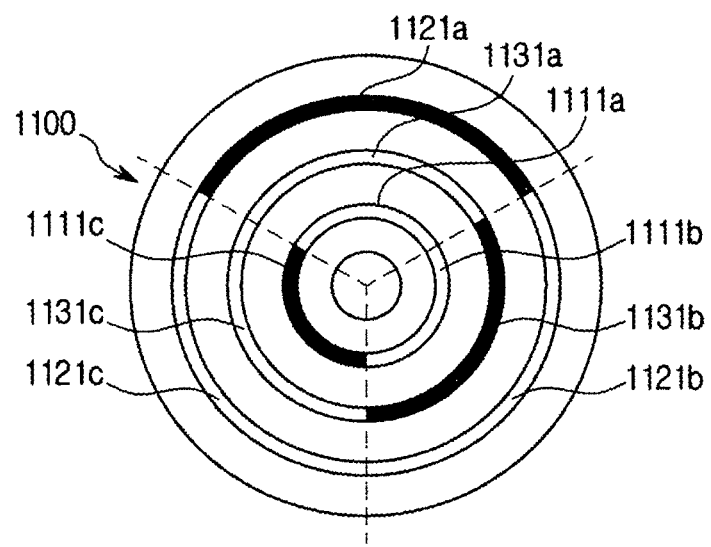

FIGS. 57A, 57B and 57C illustrate an example of a direction of a discharged airflow visually expressed by an air conditioner according to an embodiment.

As illustrated in FIGS. 57A, 57B and 57C, in order to visualize the airflow circulation mode, the first, second, and third circular images 1111, 1121, and 1131 displayed on the display unit 1100 may be divided into a plurality of arc-shaped images 1111a, 1111b, 1111c, 1121a, 1121b, 1121c, 1131a, 1131b, and 1131c.

The first circular image 1111 may be divided into the first arc-shaped image A (1111a), the first arc-shaped image B (1111b), and the first arc-shaped image C (1111c), and the second circular image 1121 may be divided into the second arc-shaped image A (1121a), the second arc-shaped image B (1121b), and the second arc-shaped image C (1121c). Also, the third circular image 1131 may be divided into the third arc-shaped image A (1131a), the third arc-shaped image B (1131b), and the third arc-shaped image C (1131c).

Here, the first arc-shaped image A (1111a), the first arc-shaped image B (1111b), and the first arc-shaped image C (1111c) may represent a vertical airflow, the second arc-shaped image A (1121a), the second arc-shaped image B (1121b), and the second arc-shaped image C (1121c) may represent a horizontal airflow, and the third arc-shaped image A (1131a), the third arc-shaped image B (1131b), and the third arc-shaped image C (1131c) may represent a mid-airflow.

In addition, the first arc-shaped image A (1111a), the second arc-shaped image A (1121a), and the third arc-shaped image A (1131a) may visualize an airflow direction due to the auxiliary fan A, and the first arc-shaped image B (1111b), the second arc-shaped image B (1121b), and the third arc-shaped image B (1131b) may visualize an airflow direction due to the auxiliary fan B. The first arc-shaped image C (1111c), the second arc-shaped image C (1121c), and the third arc-shaped image C (1131c) may visualize an airflow direction due to the auxiliary fan C.

When a vertical airflow is generated by the auxiliary fan A, a horizontal airflow is generated by the auxiliary fan B, and a mid-airflow is generated by the auxiliary fan C, as illustrated in FIG. 57A, the first arc-shaped image A (1111a) representing the vertical airflow due to the auxiliary fan A, the second arc-shaped image B (1121b) representing the horizontal airflow due to the auxiliary fan B, and the third arc-shaped image C (1131c) representing the mid-airflow due to the auxiliary fan C may be displayed on the display unit 1100. In addition, the first light source A (1110a) and the first light source B (1110b) of the first light-emitting unit 1110 illustrated in FIG. 46 may be turned on to display the first arc-shaped image A (1111a), the second light source C (1120c) and the second light source D (1120d) of the second light-emitting unit 1120 may be turned on to display the second arc-shaped image B (1121b), and the third light source E (1130e) and the third light source F (1130f) of the third light-emitting unit 1130 may be turned on to display the third arc-shaped image C (1131c).

When a mid-airflow is generated by the auxiliary fan A, a vertical airflow is generated by the auxiliary fan B, and a horizontal airflow is generated by the auxiliary fan C, as illustrated in FIG. 57B, the third arc-shaped image A (1131a) representing the mid-airflow due to the auxiliary fan A, the first arc-shaped image B (1111b) representing the vertical airflow due to the auxiliary fan B, and the second arc-shaped image C (1121c) representing the horizontal airflow due to the auxiliary fan C may be displayed on the display unit 1100. In addition, the third light source A (1130a) and the third light source B (1130b) of the third light-emitting unit 1130 illustrated in FIG. 46 may be turned on to display the third arc-shaped image A (1131a), the first light source C (1110c) and the first light source D (1110d) of the first light-emitting unit 1110 may be turned on to display the first arc-shaped image B (1111b), and the second light source E (1120e) and the second light source F (1120f) of the second light-emitting unit 1120 may be turned on to display the second arc-shaped image C (1121c).

When a horizontal airflow is generated by the auxiliary fan A, a mid-airflow is generated by the auxiliary fan B, and a vertical airflow is generated by the auxiliary fan C, as illustrated in FIG. 57C, the second arc-shaped image A (1121a) representing the horizontal airflow due to the auxiliary fan A, the third arc-shaped image B (1131b) representing the mid-airflow due to the auxiliary fan B, and the first arc-shaped image C (1111c) representing the vertical airflow due to the auxiliary fan C may be displayed on the display unit 1100. In addition, the second light source A (1120a) and the second light source B (1120b) of the second light-emitting unit 1120 illustrated in FIG. 46 may be turned on to display the second arc-shaped image A (1121a), the third light source C (1130c) and the third light source D (1130d) of the third light-emitting unit 1130 may be turned on to display the third arc-shaped image B (1131b), and the first light source E (1110e) and the first light source F (1110f) of the first light-emitting unit 1110 may be turned on to display the first arc-shaped image C (1111c).

As described above, in the airflow circulation mode, the display unit 1100 may display the first arc-shaped images A, B, and C (1111a, 1111b, and 1111c), the second arc-shaped images A, B, and C (1121a, 1121b, and 1121c), and the third arc-shaped images A, B, and C (1131a, 1131b, and 1131c) in accordance with the airflow directions due to the auxiliary fans A, B, and C.

However, the visualizing of the airflow circulation mode is not limited to the method described above. For example, in order to visualize the airflow circulation mode itself instead of visualizing the airflow directions due to the auxiliary fans A, B, and C, the first, second, and third arc-shaped images A (1111a, 1121a, 1131a) may be displayed first, the first, second, and third arc-shaped images B (1111b, 1121b, 1131b) may be displayed next, and then the first, second, and third arc-shaped images C (1111c, 1121c, 1131c) may be displayed. As a result, the display unit 1100 may display a rotating fan-shaped image.

Next, a method of visually expressing the strength of a discharged airflow will be described.

Figure 58:
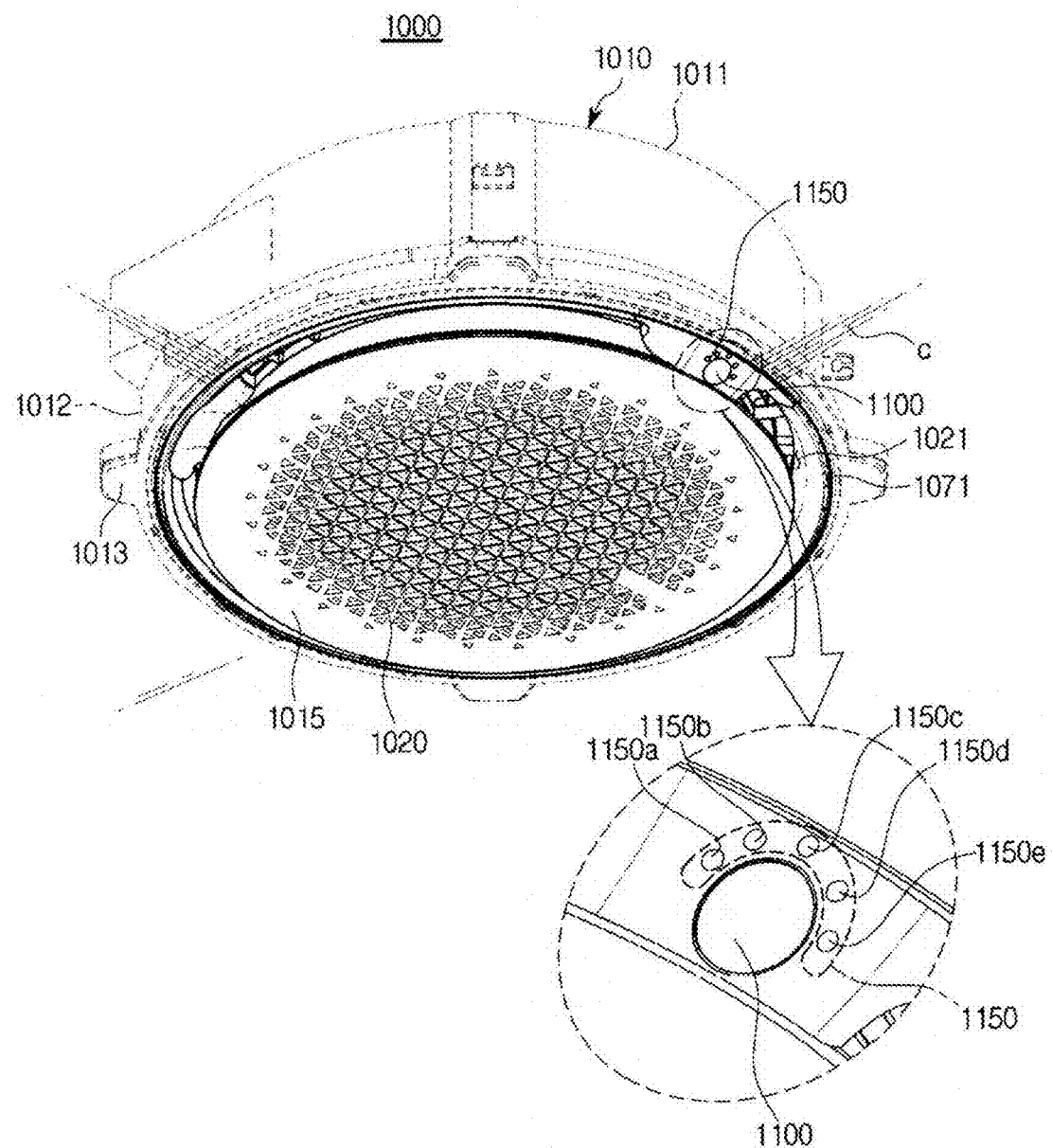
FIG. 58 is a perspective view illustrating an indoor unit of an air conditioner according to an embodiment.
Figure 59:
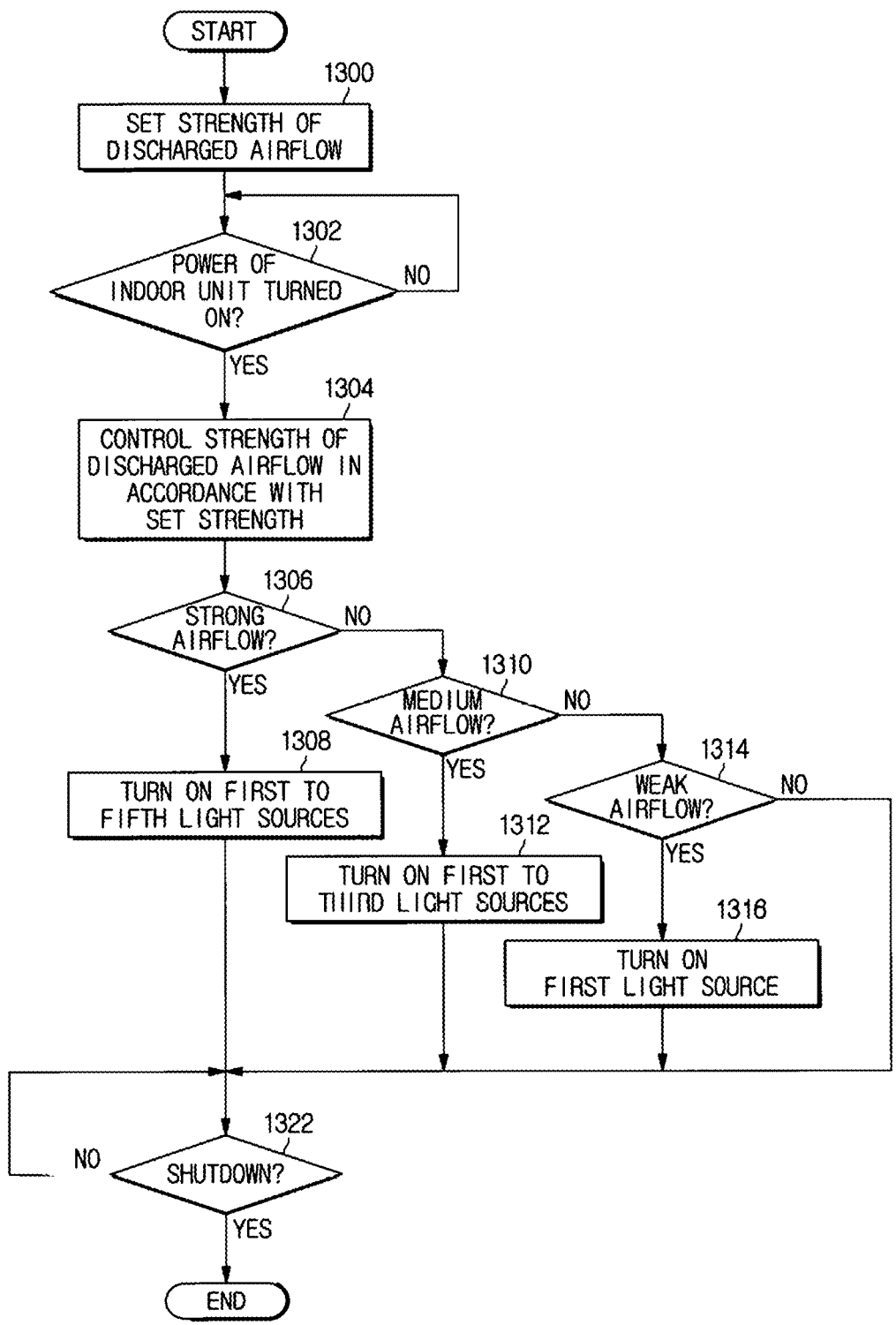
FIG. 59 is an operation flow chart illustrating a control algorithm for visually expressing a strength of a discharged airflow in an air conditioner according to an embodiment.

FIG. 58 is a perspective view illustrating an indoor unit of an air conditioner according to an embodiment, and FIG. 59 is an operation flow chart illustrating a control algorithm for visually expressing the strength of a discharged airflow in the air conditioner according to the embodiment. Like reference numerals and like names will be used for parts which are the same as those in FIG. 40 to omit overlapping description thereof.

In FIG. 58, the display unit 1100 may further include an auxiliary display 1150 capable of visually expressing the strength of a discharged airflow using an LED, etc.

The auxiliary display 1150 may include first source 1150a, second light source 1150b, third light source 1150c, fourth light source 1150d, and fifth light source 1150e disposed in the arc shape on an outer surface of the display unit 1100 and use the first to fifth light sources 1150a, 1150b, 1150c, 1150d, and 1150e to visually express the strength of a discharged airflow.

For example, when the strength of an airflow is strong, all of the first to fifth light sources 1150a, 1150b, 1150c, 1150d, and 1150e of the auxiliary display 1150 may be turned on to display that the strength of the discharged airflow is being controlled to be strong.

In addition, when the strength of an airflow is medium, the first light source 1150a, the second light source 1150b, and the third light source 1150c among the first to fifth light sources 1150a, 1150b, 1150c, 1150d, and 1150e of the auxiliary display 1150 may be turned on to display that the strength of the discharged airflow is being controlled to be medium.

In addition, when the strength of an airflow is weak, only the first light source 1150a among the first to fifth light sources 1150a, 1150b, 1150c, 1150d, and 1150e of the auxiliary display 1150 may be turned on to display that the strength of the discharged airflow is being controlled to be weak.

Meanwhile, although visually expressing the strength of a discharged airflow by controlling the number of the light sources turned on up to the fifth light source 1150e from the first light source 1150a of the auxiliary display 1150 has been described as an example in this embodiment, embodiments are not limited thereto, and the strength of a discharged airflow may be visually expressed also by controlling the number of the light sources 1150a, 1150b, 1150c, 1150d, and 1150e turned on up to the first light source 1150a or the fifth light source 1150e from the third light source 1150c of the auxiliary display 1150.

This may be described in more detail as follows.

First, when the strength of an airflow is strong, all of the first to fifth light sources 1150a, 1150b, 1150c, 1150d, and 1150e of the auxiliary display 1150 may be turned on to display that the strength of the discharged airflow is being controlled to be strong.

In addition, when the strength of an airflow is medium, the second light source 1150b, the third light source 1150c, and the fourth light source 1150d among the first to fifth light sources 1150a, 1150b, 1150c, 1150d, and 1150e of the auxiliary display 1150 may be turned on to display that the strength of the discharged airflow is being controlled to be medium.

In addition, when the strength of an airflow is weak, only the third light source 1150c among the first to fifth light sources 1150a, 1150b, 1150c, 1150d, and 1150e of the auxiliary display 1150 may be turned on to display that the strength of the discharged airflow is being controlled to be weak.

In FIG. 59, the user manipulates the input device 1090 to set operation information including an operation mode (e.g. cooling or heating operation) of the indoor unit 1000 of the air conditioner, a target indoor temperature, the strength of a discharged airflow, etc. (operation S1300). The operation information set by the user via the input device 1090 is transmitted to the control unit 1094.

Consequently, the control unit 1094 receives the various types of operation information from the input device 1090 and determines whether the power of the indoor unit 1000 is turned on in order to control the overall operation of the indoor unit 1000 based on the received information (operation S1302).

When the power of the indoor unit 1000 is determined to be turned on as a result of the operation S1302, the control unit 1094 transmits a driving control signal to the driving unit 1098 in order to control the strength of the discharged airflow in accordance with the set strength.

The driving unit 1098 may control driving and speed of the blower motor 1041 in accordance with the driving control signal from the control unit 1094 to control the amount of air drawn around the discharge port 1021 and control the strength of the discharged airflow (operation S1304).

The control unit 1094 determines whether the strength of the airflow is strong in order to visually display the strength of the discharged airflow (operation S1306).

When the strength of the airflow is determined to be strong as a result of the operation S1306, the control unit 1094 turns on all of the first to fifth light sources 1150*a*, 1150*b*, 1150*c*, 1150*d*, and 1150*e* of the auxiliary display 1150 to display that the strength of the discharged airflow is being controlled to be strong (operation S1308).

Consequently, the user may intuitively recognize that the strength of the discharged airflow is being controlled to be strong.

On the other hand, when the strength of the airflow is not determined to be strong as a result of the operation S1306, the control unit 1094 determines whether the strength of the airflow is medium (operation S1310).

When the strength of the airflow is determined to be medium as a result of the operation S1310, the control unit 1094 turns on the first light source 1150*a*, the second light source 1150*b*, and the third light source 1150*c* of the auxiliary display 1150 to display that the strength of the discharged airflow is being controlled to be medium (operation S1312).

Consequently, the user may intuitively recognize that the strength of the discharged airflow is being controlled to be medium.

On the other hand, when the strength of the airflow is not determined to be medium as a result of the operation S1310, the control unit 1094 determines whether the strength of the airflow is weak (operation S1314).

When the strength of the airflow is determined to be weak as a result of the operation S1314, the control unit 1094 turns on only the first light source 1150*a* of the auxiliary display 1150 to display that the strength of the discharged airflow is being controlled to be weak (operation S1316).

Consequently, the user may intuitively recognize that the strength of the discharged airflow is being controlled to be weak.

In this manner, the auxiliary display 1150 visualizes the strength of the discharged airflow in accordance with the strength of the airflow to allow the user to intuitively recognize the strength of the discharged airflow even in the indoor unit 1000 of the air conditioner without a blade.

Then, the control unit 1094 determines whether the power is turned off (operation S1322), and when the power is not turned off, controls the main fan 1040 to control the strength of the discharged airflow in accordance with the set strength and controls the auxiliary display 1150 to visually display the strength of the discharged airflow.

When the power is determined to be turned off as a result of the operation S1322, the control unit 1094 ends the operation while stopping operations of all loads on the indoor unit 1000 of the air conditioner.

Meanwhile, although the strength of the airflow has been described in the embodiment of the present disclosure as being implemented with a strong airflow, a medium airflow, or a weak airflow, the present disclosure is not limited thereto and more light sources (LEDs) may be disposed at the auxiliary display 1150 to visually express airflow strengths when the airflow strengths are further subdivided. The number and the arrangement of the light sources (LEDs) disposed at the auxiliary display 1150 may be designed in various ways.

Next, a method of visually expressing not only the direction of a discharged airflow but also the strength of the discharged airflow will be described.

Figure 60A:
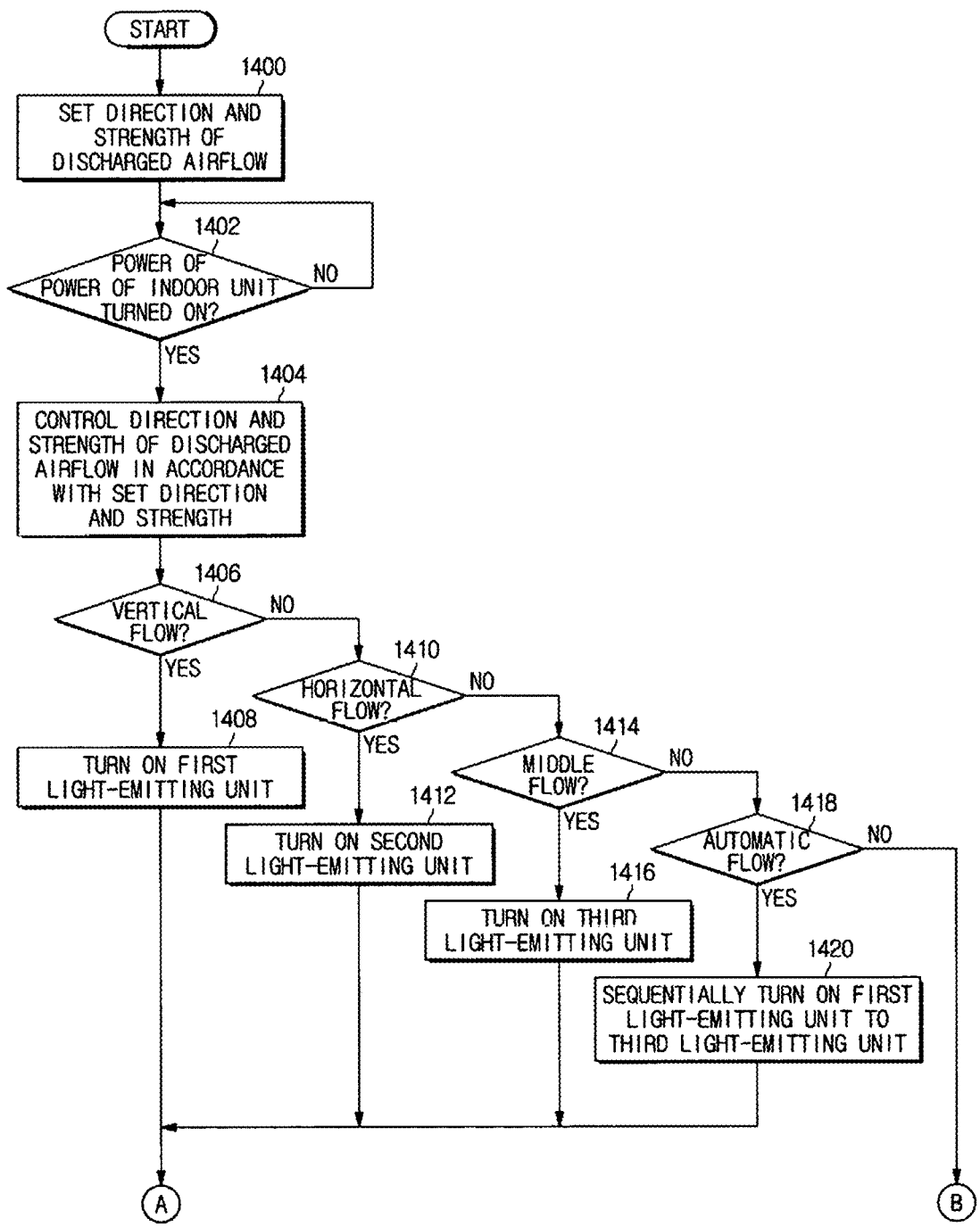
FIGS. 60A and 60B are operation flow charts illustrating a first control algorithm for visually expressing a direction and a strength of a discharged airflow in an air conditioner according an embodiment.
Figure 60B:
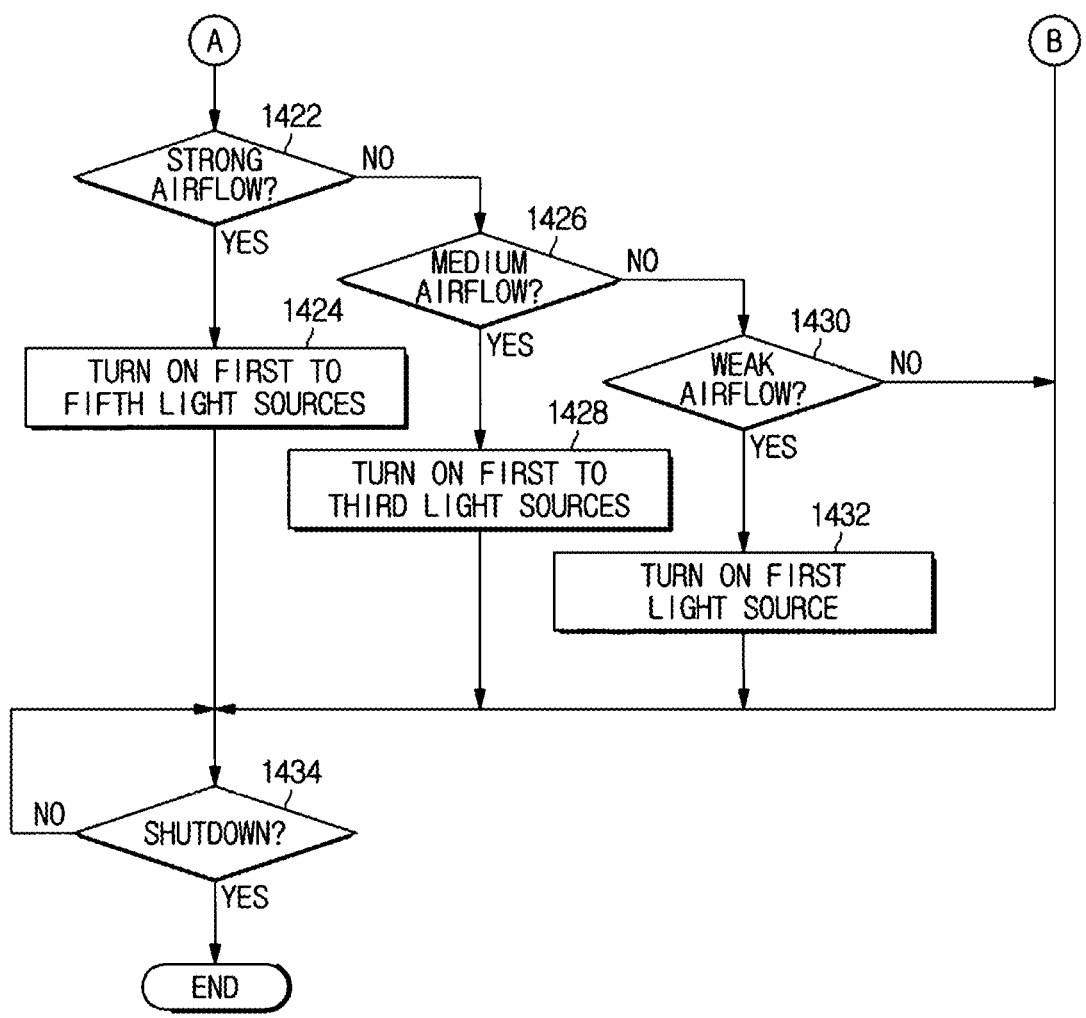

FIGS. 60A and 60B are operation flow charts illustrating a first control algorithm for visually expressing the direction and the strength of a discharged airflow in the air conditioner according an embodiment.

In the FIGS. 60A and 60B, the user manipulates the input device 1090 to set operation information including an operation mode (e.g. cooling or heating operation) of the indoor unit 1000 of the air conditioner, a target indoor temperature, the direction and the strength of a discharged airflow, etc. (operation S1400). The operation information set by the user via the input device 1090 is transmitted to the control unit 1094.

Consequently, the control unit 1094 receives the various types of operation information from the input device 1090 and determines whether the power of the indoor unit 1000 is turned on in order to control the overall operation of the indoor unit 1000 based on the received information (operation S1402).

When the power of the indoor unit 1000 is determined to be turned on as a result of the operation S1402, the control unit 1094 transmits a driving control signal to the driving unit 1098 in order to control the direction and the strength of the discharged airflow in accordance with the set direction and strength.

The driving unit 1098 may control driving and speed of the blower motor 1041 and the airflow control motor 1061 in accordance with the driving control signal from the control unit 1094 to control the amount of air drawn around the discharge port 1021 and control the direction and the strength of the discharged airflow (operation S1404).

First, the control unit 1094 determines whether the direction of the airflow is vertical in order to visually display the direction of the discharged airflow (operation S1406).

When the direction of the airflow is determined to be vertical as a result of the operation S1406, the control unit 1094 turns on the light sources 1110*a*, 1110*b*, 1110*c*, 1110*d*, 1110*e*, and 1110*f* of the first light-emitting unit 1110 to display the optical pattern in the shape of a circular band disposed at the inner portion of the display unit 1100 (operation S1408).

On the other hand, when the direction of the airflow is not determined to be vertical as a result of the operation S1406, the control unit 1094 determines whether the direction of the airflow is horizontal (operation S1410).

When the direction of the airflow is determined to be horizontal as a result of the operation S1410, the control unit 1094 turns on the light sources 1120*a*, 1120*b*, 1120*c*, 1120*d*, 1120*e*, 1120*f*, 1120*g*, 1120*h*, and 1120*i* of the second light-emitting unit 1120 to display the optical pattern in the shape of a circular band disposed at the edge portion of the display unit 1100 (operation S1412).

On the other hand, when the direction of the airflow is not determined to be horizontal as a result of the operation S1410, the control unit 1094 determines whether the direction of the airflow is middle (operation S1414).

When the direction of the airflow is determined to be in the middle as a result of the operation S1414, the control unit 1094 turns on the light sources 1130a, 1130b, 1130c, 1130d, 1130e, and 1130f of the third light-emitting unit 1130 to display the optical pattern in the shape of a circular band disposed at the middle portion of the display unit 1100 (operation S1416).

On the other hand, when the direction of the airflow is not determined to be in the middle as a result of the operation S1414, the control unit 1094 determines whether the direction of the airflow is automatic (operation S1418).

When the direction of the airflow is determined to be automatic as a result of the operation S1418, the control unit 1094 sequentially turns on the light sources 1110a, 1110b, 1110c, 1110d, 1110e, and 1110f of the first light-emitting unit 1110, the light sources 1120a, 1120b, 1120c, 1120d, 1120e, 1120f, 1120g, 1120h, and 1120i of the second light-emitting unit 1120, and the light sources 1130a, 1130b, 1130c, 1130d, 1130e, and 1130f of the third light-emitting unit 1130 from the inner portion to the outer portion or from the outer portion to the inner portion to animate a progression of the optical pattern in the shape of a circular band from the inner portion of the display unit 1100 toward the optical pattern in the shape of a circular band at the edge portion of the display unit 1100 (operation S1420).

In this manner, the display unit 1100 visualizes the direction of the discharged airflow in accordance with the direction of the airflow to allow the user to intuitively recognize the direction of the discharged airflow even in the indoor unit 1000 of the air conditioner without a blade.

Then, the control unit 1094 determines whether the strength of the airflow is strong in order to visually display the strength of the discharged airflow (operation S1422).

When the strength of the airflow is determined to be strong as a result of the operation S1422, the control unit 1094 turns on all of the first to fifth light sources 1150a, 1150b, 1150c, 1150d, and 1150e of the auxiliary display 1150 to display that the strength of the discharged airflow is being controlled to be strong (operation S1424).

On the other hand, when the strength of the airflow is not determined to be strong as a result of the operation S1422, the control unit 1094 determines whether the strength of the airflow is medium (operation S1426).

When the strength of the airflow is determined to be medium as a result of the operation S1426, the control unit 1094 turns on the first light source 1150a, the second light source 1150b, and the third light source 1150c of the auxiliary display 1150 to display that the strength of the discharged airflow is being controlled to be medium (operation S1428).

On the other hand, when the strength of the airflow is not determined to be medium as a result of the operation S1428, the control unit 1094 determines whether the strength of the airflow is weak (operation S1430).

When the strength of the airflow is determined to be weak as a result of the operation S1430, the control unit 1094 turns on only the first light source 1150a of the auxiliary display 1150 to display that the strength of the discharged airflow is being controlled to be weak (operation S1432).

In this manner, the auxiliary display 1150 visualizes the strength of the discharged airflow in accordance with the strength of the airflow to allow the user to intuitively recognize the strength of the discharged airflow even in the indoor unit 1000 of the air conditioner without a blade.

Then, the control unit 1094 determines whether the power is turned off (operation S1434) and, when the power is not turned off, controls the main fan 1040 and the auxiliary fan 1060 to control the direction and the strength of the discharged airflow in accordance with the set direction and strength and controls the display unit 1100 and the auxiliary display 1150 to visually display the direction and the strength of the discharged airflow.

When the power is determined to be turned off as a result of the operation S1434, the control unit 1094 ends the operation while stopping operations of all loads on the indoor unit 1000 of the air conditioner.

Next, another method of visually expressing not only a direction of a discharged airflow but also the strength of the discharged airflow will be described.

Figure 61A:
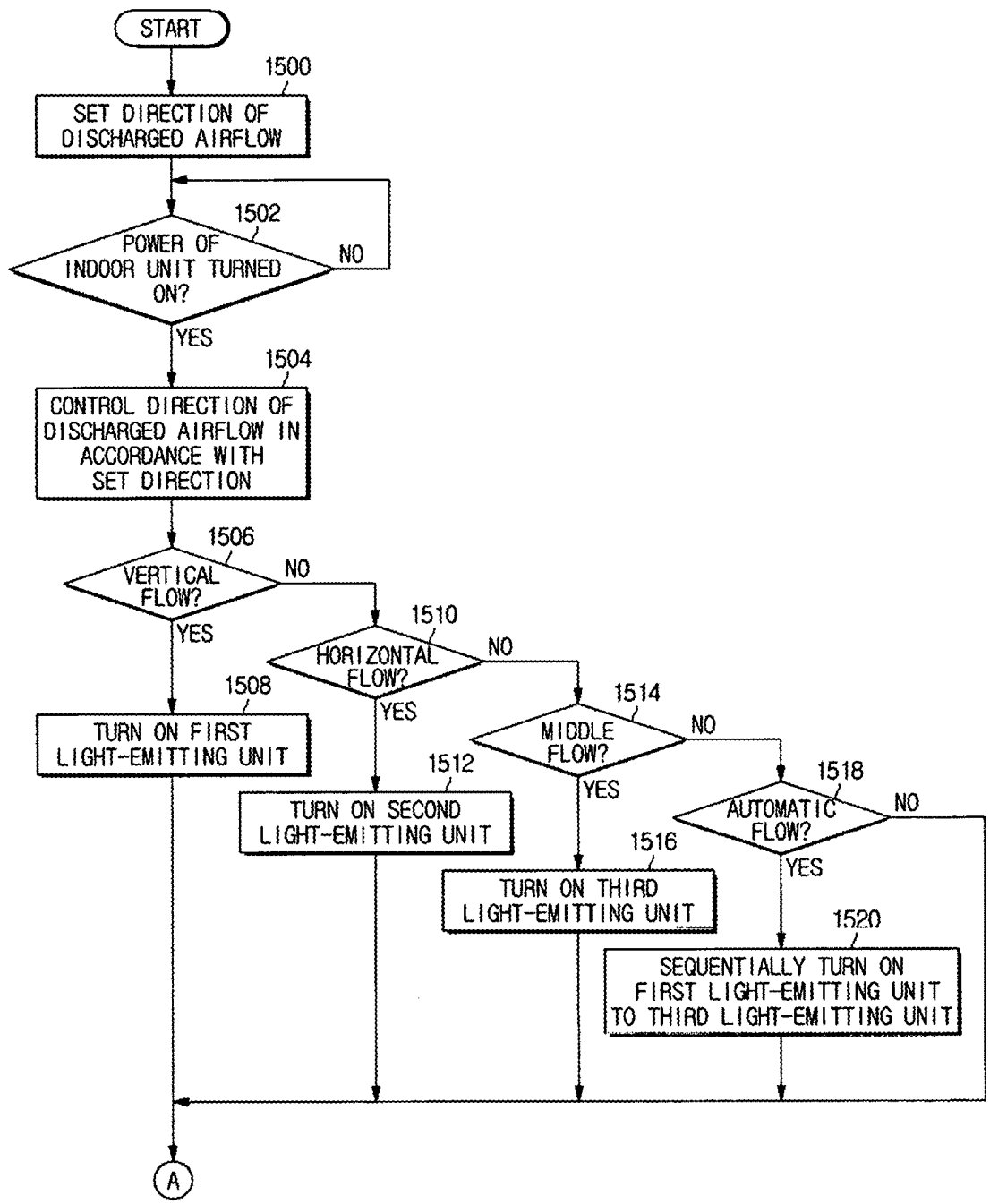
FIGS. 61A and 61B are operation flow charts illustrating a second control algorithm for visually expressing a direction and a strength of a discharged airflow in an air conditioner according an embodiment.
Figure 61B:
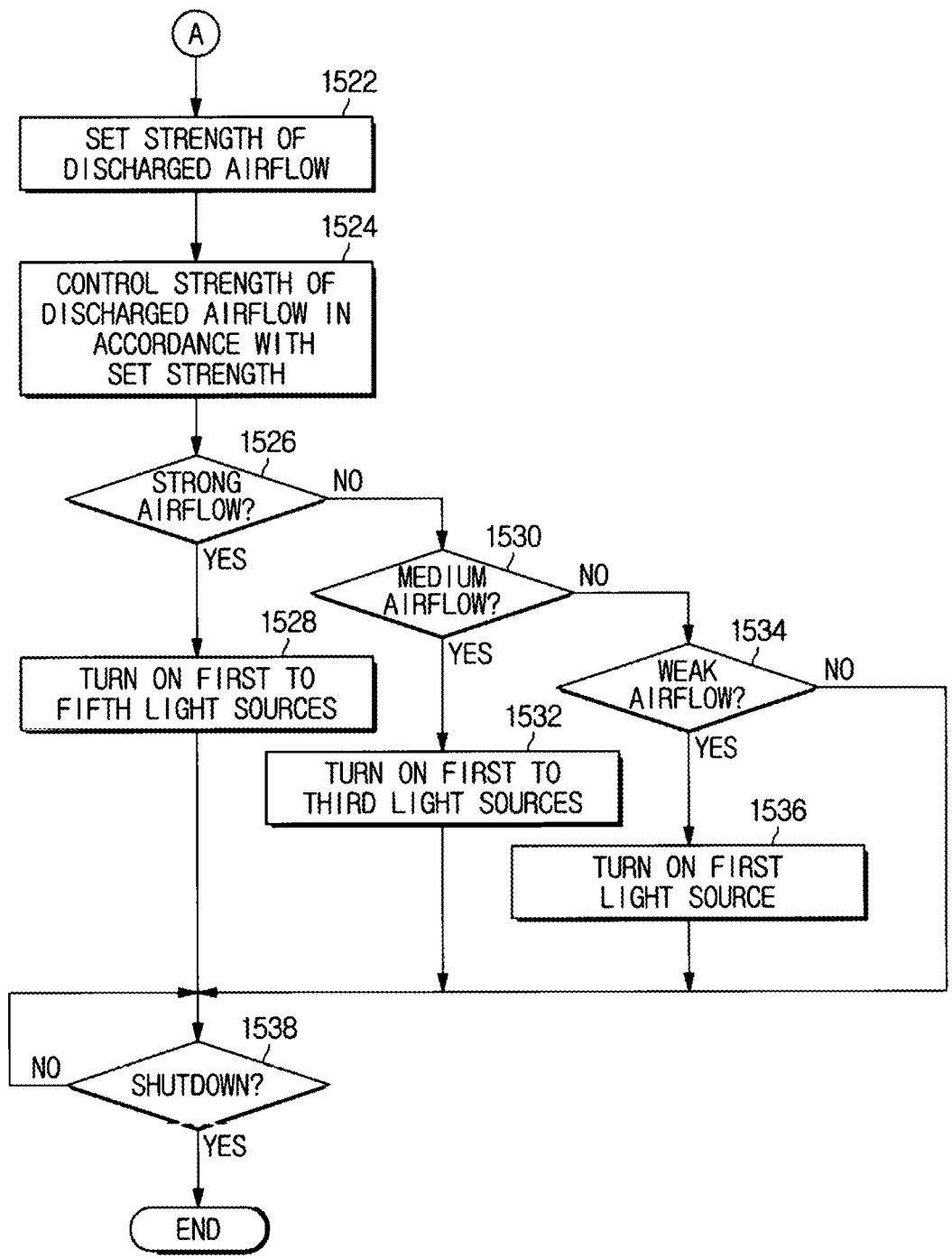

FIGS. 61A and 61B are operation flow charts illustrating a second control algorithm for visually expressing the direction and the strength of a discharged airflow in the air conditioner according an embodiment.

In the FIGS. 61A and 61B, the user manipulates the input device 1090 to set operation information including an operation mode (e.g. cooling or heating operation) of the indoor unit 1000 of the air conditioner, a target indoor temperature, the direction of a discharged airflow, etc. (operation S1500). The operation information set by the user via the input device 1090 is transmitted to the control unit 1094.

Consequently, the control unit 1094 receives the various types of operation information from the input device 1090 and determines whether the power of the indoor unit 1000 is turned on in order to control the overall operation of the indoor unit 1000 based on the received information (operation S1502).

When the power of the indoor unit 1000 is determined to be turned on as a result of the operation S1502, the control unit 1094 transmits a driving control signal to the driving unit 1098 in order to control the direction of the discharged airflow in accordance with the set direction.

The driving unit 1098 may control driving and speed of the airflow control motor 1061 in accordance with the driving control signal from the control unit 1094 to control the amount of air drawn around the discharge port 1021 and control the direction of the discharged airflow (operation S1504).

In addition, the control unit 1094 determines whether the direction of the airflow is vertical in order to visually display the direction of the discharged airflow (operation S1506).

When the direction of the airflow is determined to be vertical as a result of the operation S1506, the control unit 1094 turns on the light sources 1110a, 1110b, 1110c, 1110d, 1110e, and 1110f of the first light-emitting unit 1110 to display the optical pattern in the shape of a circular band disposed at the inner portion of the display unit 1100 (operation S1508).

On the other hand, when the direction of the airflow is not determined to be vertical as a result of the operation S1506, the control unit 1094 determines whether the direction of the airflow is horizontal (operation S1510).

When the direction of the airflow is determined to be horizontal as a result of the operation S1510, the control unit 1094 turns on the light sources 1120a, 1120b, 1120c, 1120d, 1120e, 1120f, 1120g, 1120h, and 1120i of the second light-emitting unit 1120 to display the optical pattern in the shape of a circular band disposed at the edge portion of the display unit 1100 (operation S1512).

On the other hand, when the direction of the airflow is not determined to be horizontal as a result of the operation S1510, the control unit 1094 determines whether the direction of the airflow is middle (operation S1514).

When the direction of the airflow is determined to be in the middle as a result of the operation S1514, the control unit 1094 turns on the light sources 1130a, 1130b, 1130c, 1130d, 1130e, and 1130f of the third light-emitting unit 1130 to display the optical pattern in the shape of a circular band disposed at the middle portion of the display unit 1100 (operation S1516).

On the other hand, when the direction of the airflow is not determined to be in the middle as a result of the operation S1514, the control unit 1094 determines whether the direction of the airflow is automatic (operation S1518).

When the direction of the airflow is determined to be automatic as a result of the operation S1518, the control unit 1094 sequentially turns on the light sources 1110a, 1110b, 1110c, 1110d, 1110e, and 1110f of the first light-emitting unit 1110, the light sources 1120a, 1120b, 1120c, 1120d, 1120e, 1120f, 1120g, 1120h, and 1120i of the second light-emitting unit 1120, and the light sources 1130a, 1130b, 1130c, 1130d, 1130e, and 1130f of the third light-emitting unit 1130 from the inner portion to the outer portion or from the outer portion to the inner portion to animate a progression of the optical pattern in the shape of a circular band from the inner portion of the display unit 1100 toward the optical pattern in the shape of a circular band at the edge portion of the display unit 1100 (operation S1520).

In this manner, when the user manipulates the input device 1090 to set the strength of the discharged airflow while visually checking the direction of the discharged airflow via the display unit 1100 (operation S1522), the control unit 1094 transmits a driving control signal to the driving unit 1098 in order to control the strength of the discharged airflow in accordance with the set strength.

The driving unit 1098 may control driving and speed of the blower motor 1041 in accordance with the driving control signal from the control unit 1094 to control the amount of air drawn around the discharge port 1021 and control the strength of the discharged airflow (operation S1524).

Then, the control unit 1094 determines whether the strength of the airflow is strong in order to visually display the strength of the discharged airflow (operation S1526).

When the strength of the airflow is determined to be strong as a result of the operation S1526, the control unit 1094 turns on all of the first to fifth light sources 1150a, 1150b, 1150c, 1150d, and 1150e of the auxiliary display 1150 to display that the strength of the discharged airflow is being controlled to be strong (operation S1528).

On the other hand, when the strength of the airflow is not determined to be strong as a result of the operation S1526, the control unit 1094 determines whether the strength of the airflow is medium (operation S1530).

When the strength of the airflow is determined to be medium as a result of the operation S1530, the control unit 1094 turns on the first light source 1150a, the second light source 1150b, and the third light source 1150c of the auxiliary display 1150 to display that the strength of the discharged airflow is being controlled to be medium (operation S1532).

On the other hand, when the strength of the airflow is not determined to be medium as a result of the operation S1530, the control unit 1094 determines whether the strength of the airflow is weak (operation S1534).

When the strength of the airflow is determined to be weak as a result of the operation S1534, the control unit 1094 turns on only the first light source 1150a of the auxiliary display 1150 to display that the strength of the discharged airflow is being controlled to be weak (operation S1536).

In this manner, when the user manipulates the input device 1090 to set the strength of the airflow while visually checking the direction of the discharged airflow via the display unit 1100, the user may also visually check the strength of the discharged airflow via the auxiliary display 1150.

Then, the control unit 1094 determines whether the power is turned off (operation S1538) and, when the power is not turned off, controls the main fan 1040 and the auxiliary fan 1060 to control the direction and the strength of the discharged airflow in accordance with the set direction and strength and controls the display unit 1100 and the auxiliary display 1150 to visually display the direction and the strength of the discharged airflow.

When the power is determined to be turned off as a result of the operation S1538, the control unit 1094 ends the operation while stopping operations of all loads on the indoor unit 1000 of the air conditioner.

Next, still another method of visually expressing not only a direction of a discharged airflow but also the strength of the discharged airflow will be described.

Figure 62A:
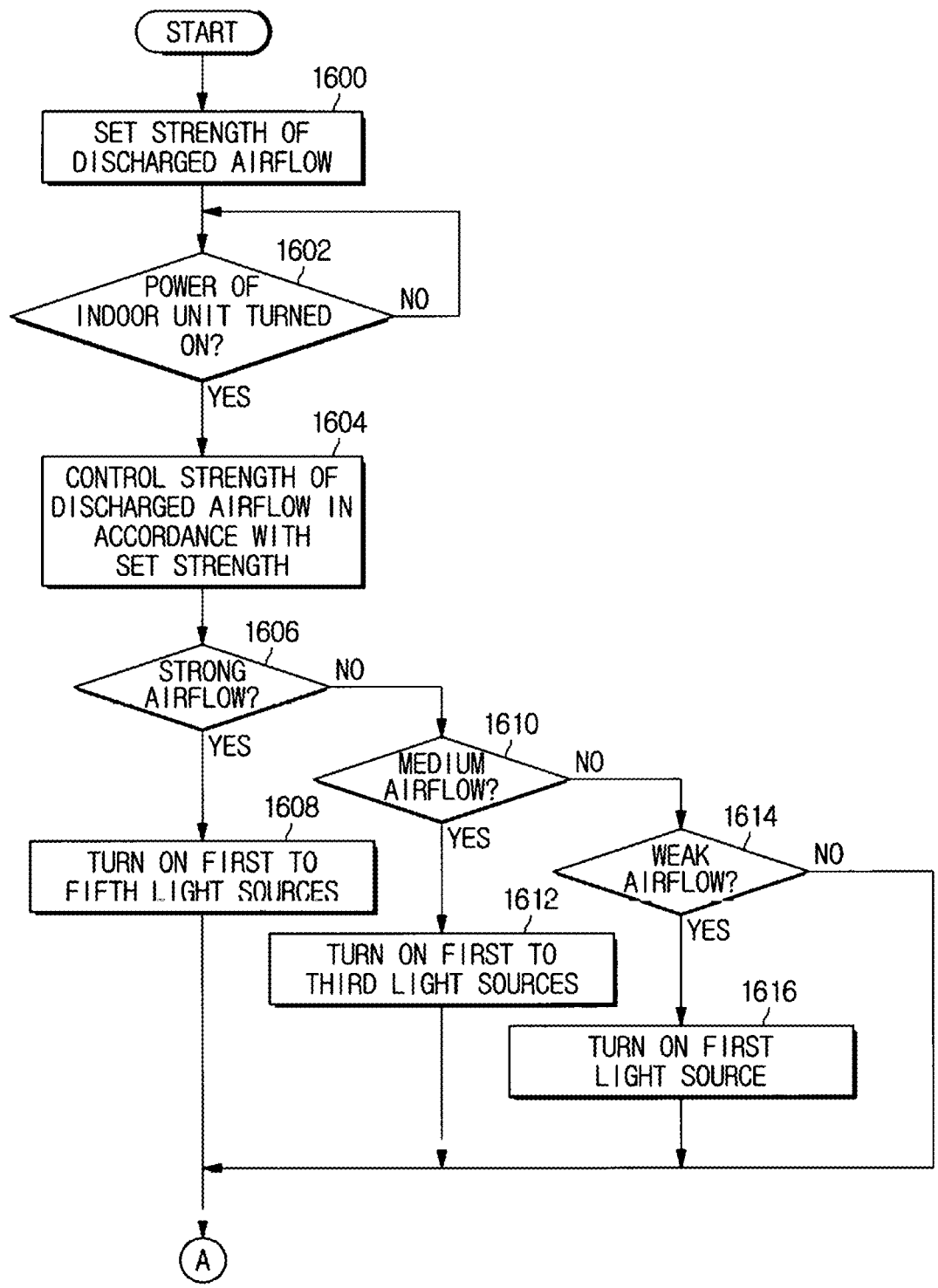
FIGS. 62A and 62B are operation flow charts illustrating a third control algorithm for visually expressing a direction and a strength of a discharged airflow in an air conditioner according another embodiment.
Figure 62B:
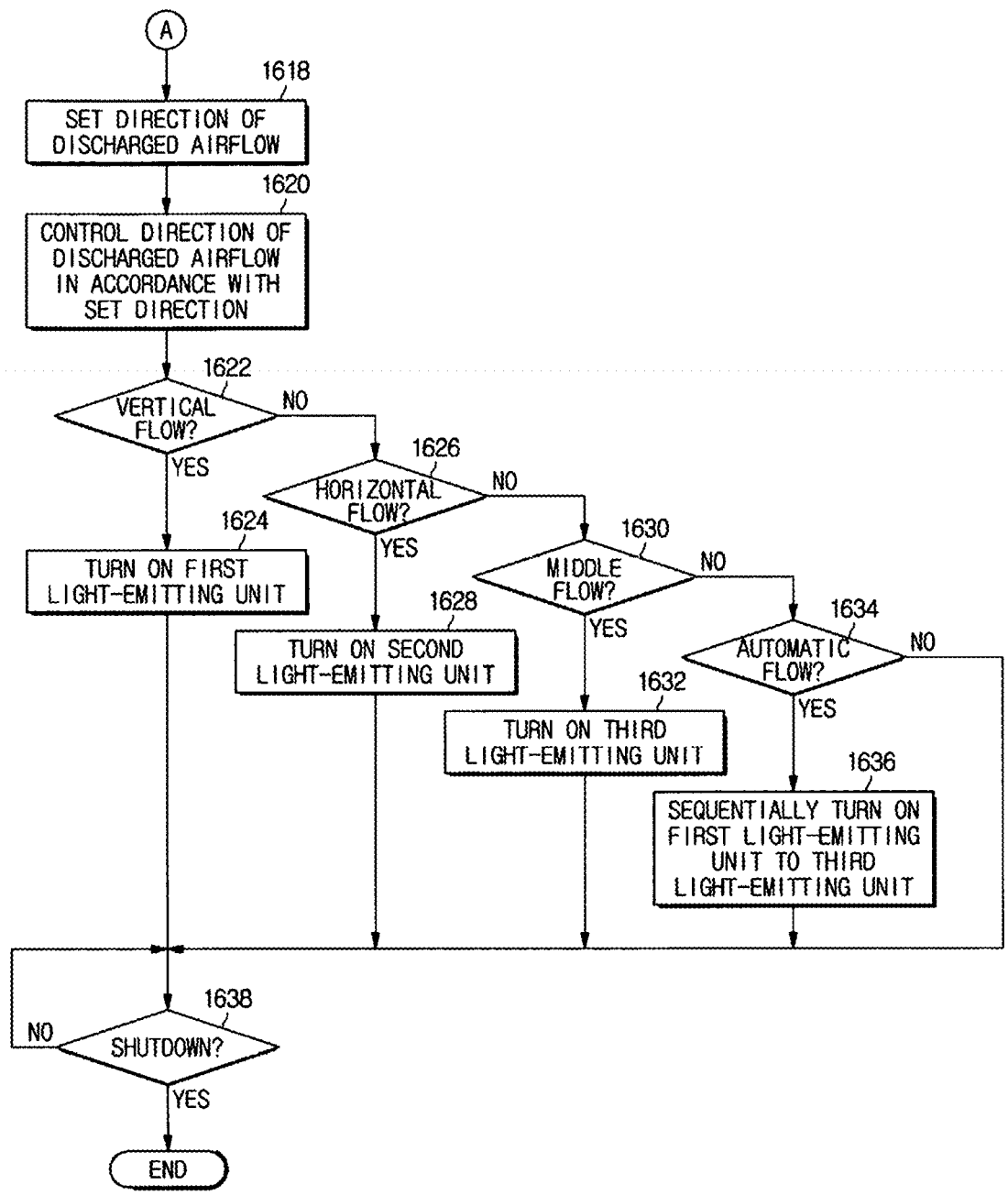

FIGS. 62A and 62B are operation flow charts illustrating a third control algorithm for visually expressing the direction and the strength of a discharged airflow in the air conditioner according another embodiment.

In the FIGS. 62A and 62B, the user manipulates the input device 1090 to set operation information including an operation mode (e.g. cooling or heating operation) of the indoor unit 1000 of the air conditioner, a target indoor temperature, the strength of a discharged airflow, etc. (operation S1600). The operation information set by the user via the input device 1090 is transmitted to the control unit 1094.

Consequently, the control unit 1094 receives the various types of operation information from the input device 1090 and determines whether the power of the indoor unit 1000 is turned on in order to control the overall operation of the indoor unit 1000 based on the received information (operation S1602).

When the power of the indoor unit 1000 is determined to be turned on as a result of the operation S1602, the control unit 1094 transmits a driving control signal to the driving unit 1098 in order to control the strength of the discharged airflow in accordance with the set strength.

The driving unit 1098 may control driving and speed of the blower motor 1041 in accordance with the driving control signal from the control unit 1094 to control the amount of air drawn around the discharge port 1021 and control the strength of the discharged airflow (operation S1604).

The control unit 1094 determines whether the strength of the airflow is strong in order to visually display the strength of the discharged airflow (operation S1606).

When the strength of the airflow is determined to be strong as a result of the operation S1606, the control unit 1094 turns on all of the first to fifth light sources 1150a, 1150b, 1150c, 1150d, and 1150e of the auxiliary display 1150 to display that the strength of the discharged airflow is being controlled to be strong (operation S1608).

On the other hand, when the strength of the airflow is not determined to be strong as a result of the operation S1606, the control unit 1094 determines whether the strength of the airflow is medium (operation S1610).

When the strength of the airflow is determined to be medium as a result of the operation S1610, the control unit 1094 turns on the first light source 1150a, the second light source 1150b, and the third light source 1150c of the auxiliary display 1150 to display that the strength of the discharged airflow is being controlled to be medium (operation S1612).

On the other hand, when the strength of the airflow is not determined to be medium as a result of the operation S1610, the control unit 1094 determines whether the strength of the airflow is weak (operation S1614).

When the strength of the airflow is determined to be weak as a result of the operation S1614, the control unit 1094 turns on only the first light source 1150a of the auxiliary display 1150 to display that the strength of the discharged airflow is being controlled to be weak (operation S1616).

In this manner, when the user manipulates the input device 1090 to set the direction of the discharged airflow while visually checking the strength of the discharged airflow via the auxiliary display 1150 (operation S1618), the control unit 1094 transmits a driving control signal to the driving unit 1098 in order to control the direction of the discharged airflow in accordance with the set direction.

The driving unit 1098 may control driving and speed of the airflow control motor 1061 in accordance with the driving control signal from the control unit 1094 to control the amount of air drawn around the discharge port 1021 and control the direction of the discharged airflow (operation S1620).

In addition, the control unit 1094 determines whether the direction of the airflow is vertical in order to visually display the direction of the discharged airflow (operation S1622).

When the direction of the airflow is determined to be vertical as a result of the operation S1622, the control unit 1094 turns on the light sources 1110a, 1110b, 1110c, 1110d, 1110e, and 1110f of the first light-emitting unit 1110 to display the optical pattern in the shape of a circular band disposed at the inner portion of the display unit 1100 (operation S1624).

On the other hand, when the direction of the airflow is not determined to be vertical as a result of the operation S1622, the control unit 1094 determines whether the direction of the airflow is horizontal (operation S1626).

When the direction of the airflow is determined to be horizontal as a result of the operation S1626, the control unit 1094 turns on the light sources 1120a, 1120b, 1120c, 1120d, 1120e, 1120f, 1120g, 1120h, and 1120i of the second light-emitting unit 1120 to display the optical pattern in the shape of a circular band disposed at the edge portion of the display unit 1100 (operation S1628).

On the other hand, when the direction of the airflow is not determined to be horizontal as a result of the operation S1626, the control unit 1094 determines whether the direction of the airflow is middle (operation S1630).

When the direction of the airflow is determined to be in the middle as a result of the operation S1630, the control unit 1094 turns on the light sources 1130a, 1130b, 1130c, 1130d, 1130e, and 1130f of the third light-emitting unit 1130 to display the optical pattern in the shape of a circular band disposed at the middle portion of the display unit 1100 (operation S1632).

On the other hand, when the direction of the airflow is not determined to be in the middle as a result of the operation S1630, the control unit 1094 determines whether the direction of the airflow is automatic (operation S1634).

When the direction of the airflow is determined to be automatic as a result of the operation S1634, the control unit 1094 sequentially turns on the light sources 1110a, 1110b, 1110c, 1110d, 1110e, and 1110f of the first light-emitting unit 1110, the light sources 1120a, 1120b, 1120c, 1120d, 1120e, 1120f, 1120g, 1120h, and 1120i of the second light-emitting unit 1120, and the light sources 1130a, 1130b, 1130c, 1130d, 1130e, and 1130f of the third light-emitting unit 1130 from the inner portion to the outer portion or from the outer portion to the inner portion to animate a progression of the optical pattern in the shape of a circular band from the inner portion of the display unit 1100 toward the optical pattern in the shape of a circular band at the edge portion of the display unit 1100 (operation S1636).

In this manner, when the user manipulates the input device 1090 to set the direction of the airflow while visually checking the strength of the discharged airflow via the auxiliary display 1150, the user may also visually check the direction of the discharged airflow via the display unit 1100.

Then, the control unit 1094 determines whether the power is turned off (operation S1638), and when the power is not turned off, controls the main fan 1040 and the auxiliary fan 1060 to control the direction and the strength of the discharged airflow in accordance with the set direction and strength and controls the display unit 1100 and the auxiliary display 1150 to visually display the direction and the strength of the discharged airflow.

When the power is determined to be turned off as a result of the operation S1638, the control unit 1094 ends the operation while stopping operations of all loads on the indoor unit 1000 of the air conditioner.

Although implementing the display unit 1100 that visually expresses a direction of a discharged airflow with an optical pattern in the shape of a circular band has been described as an example above, embodiments are not limited thereto and the direction of the discharged airflow may be shown with an optical shape in the shape of a rod-like band.

Hereinafter, various display units that visually express a direction of a discharged airflow will be described.

Figure 63:
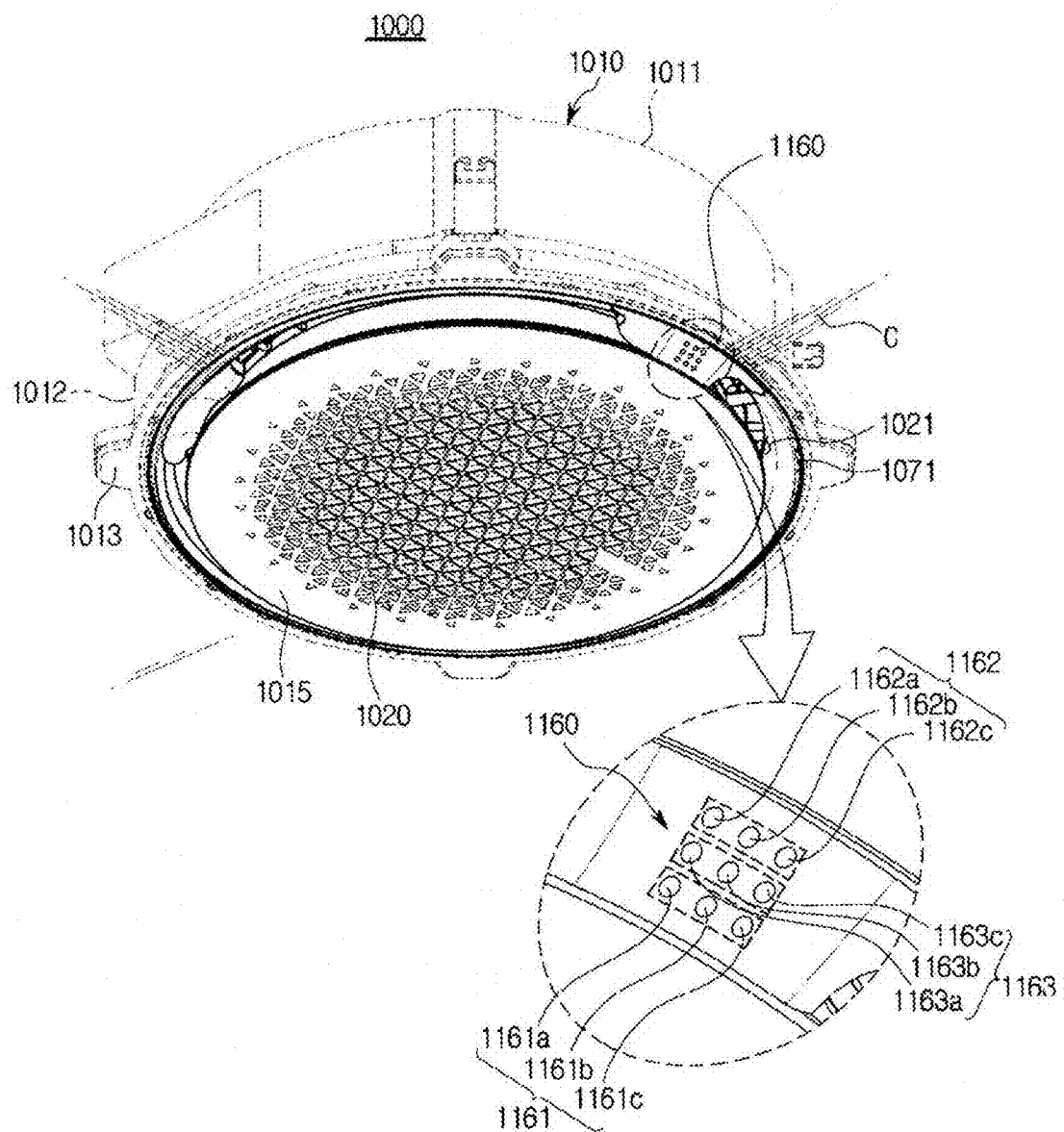
FIG. 63 is a perspective view illustrating an indoor unit of an air conditioner according to an embodiment.

FIG. 63 is a perspective view illustrating an indoor unit of an air conditioner according to an embodiment. Like reference numerals and like names will be used for parts which are the same as those in FIG. 40 to omit overlapping description thereof.

In FIG. 63, a display unit 1160 is a lighting device having a plurality of light-emitting units formed in the shape of a rod-like band and may display directions of a discharged airflow controlled in various directions.

The display unit 1160 includes a first light-emitting unit 1161 to display a state in which the direction of the discharged airflow is controlled to be vertical, a second light-emitting unit 1162 to display a state in which the direction of the discharged airflow is controlled to be horizontal, and a third light-emitting unit 1163 to display a state in which the direction of the discharged airflow is controlled to be in the middle which is the middle between the horizontal airflow and the vertical airflow.

To display the state in which the direction of the discharged airflow is controlled to be vertical, the first light-emitting unit 1161 may include a plurality (approximately three) of light sources 1161a, 1161b, and 1161c to visually express an optical pattern in the shape of a rod-like band disposed at an inner portion of the display unit 1160.

To display the state in which the direction of the discharged airflow is controlled to be horizontal, the second light-emitting unit 1162 may include a plurality (approximately three) of light sources 1162a, 1162b, and 1162c to visually express an optical pattern in the shape of a rod-like band disposed at an edge portion of the display unit 1160.

To display the state in which the direction of the discharged airflow is controlled to be in the middle which is the middle between the horizontal airflow and the vertical airflow, the third light-emitting unit 1163 may include a plurality (approximately three) of light sources 1163a, 1163b, and 1163c to visually express an optical pattern in the shape of a rod-like band disposed at the middle between the first light-emitting unit 1161 and the second light-emitting unit 1162.

Here, of course the number and the arrangement of the light sources 1161a, 1161b, and 1161c, 1162a, 1162b, and 1162c, and 1163a, 1163b, and 1163c disposed at each of the first light-emitting unit 1161 to the third light-emitting unit 1163 may be designed in various ways.

By the above structure, the first light-emitting unit 1161 to the third light-emitting unit 1163 may turn on or turn off the plurality of light sources 1161a, 1161b, and 1161c, 1162a, 1162b, and 1162c, and 1163a, 1163b, and 1163c disposed at each of the first light-emitting unit 1161 to the third light-emitting unit 1163 to display whether the direction of the airflow discharged from the indoor unit 1000 of the air conditioner is vertical, horizontal, or middle.

In addition, the display unit 1160 may also sequentially turn on the first light-emitting unit 1161 to the third light-emitting unit 1163 from the inner portion to the outer portion or from the outer portion to the inner portion to display a state in which the direction of the airflow is controlled to be automatic.

Figure 64:
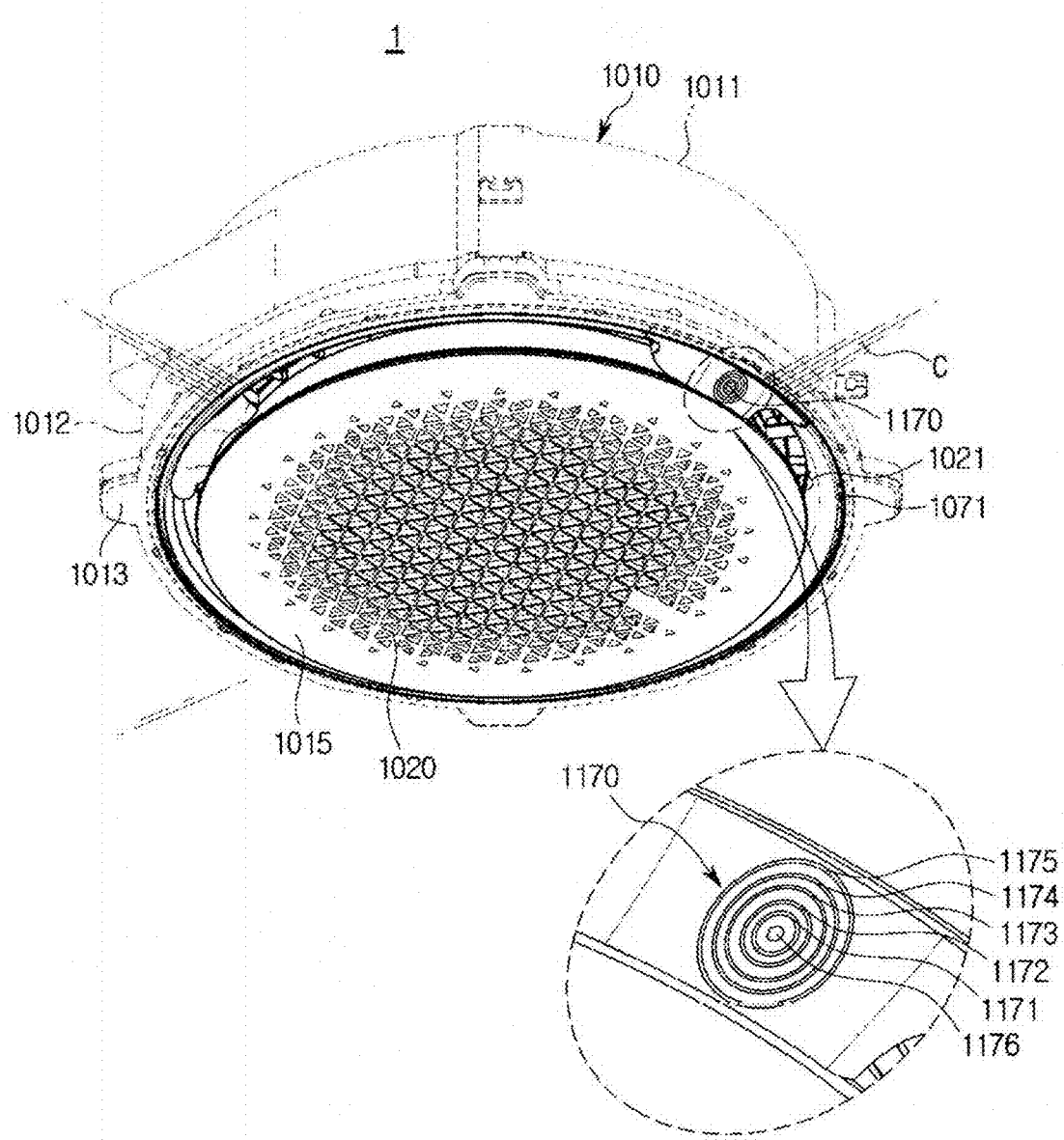
FIG. 64 is a perspective view illustrating an indoor unit of an air conditioner according to an embodiment.

FIG. 64 is a perspective view illustrating an indoor unit of an air conditioner according to an embodiment. Like reference numerals and like names will be used for parts which are the same as those in FIG. 40 to omit overlapping description thereof.

In FIG. 64, a display unit 1170 is a hemispherical lighting device having a plurality of light-emitting units formed in the shape of a circular band and may display directions of a discharged airflow controlled in various directions.

That is, the display unit 1170 includes a first light-emitting unit 1171 and a second light-emitting unit 1172 to display a state in which the direction of the discharged airflow is controlled to be vertical, a third light-emitting unit 1173 to display a state in which the direction of the discharged airflow is controlled to be in the middle, and a fourth light-emitting unit 1174 and a fifth light-emitting unit 1175 to display a state in which the direction of the discharged airflow is controlled to be horizontal.

To display the state in which the direction of the discharged airflow is controlled to be vertical, the first light-emitting unit 1171 and the second light-emitting unit 1172 may visually express two optical patterns in the shape of a circular band disposed at an inner portion of the display unit 1170. The first light-emitting unit 1171 and the second light-emitting unit 1172 may include a plurality of light sources (LEDs).

To display the state in which the direction of the discharged airflow is controlled to be in the middle, the third light-emitting unit 1173 may visually express one optical pattern in the shape of a circular band disposed at a middle portion of the display unit 1170. The third light-emitting unit 1173 may include a plurality of light sources (LEDs).

To display the state in which the direction of the discharged airflow is controlled to be horizontal, the fourth light-emitting unit 1174 and the fifth light-emitting unit 1175 may visually express two optical patterns in the shape of a circular band disposed at the outer portion of the display unit 1170. The fourth light-emitting unit 1174 and the fifth light-emitting unit 1175 may include a plurality of light sources (LEDs).

Here, of course the number and the arrangement of the light sources (LEDs) disposed at each of the first light-emitting unit 1171 to the fifth light-emitting unit 1175 may be designed in various ways.

By the above structure, the first light-emitting unit 1171 to the fifth light-emitting unit 1175 may turn on or turn off the plurality of light sources (LEDs) disposed therein to display whether the direction of the airflow discharged from the indoor unit 1000 of the air conditioner is vertical, horizontal, or middle.

In addition, the display unit 1170 may also sequentially turn on the first light-emitting unit 1171 to the fifth light-emitting unit 1175 from the inner portion to the outer portion or from the outer portion to the inner portion to display a state in which the direction of the airflow is controlled to be automatic.

In addition, the display unit 1170 may further include a sixth light-emitting unit 1176 to display an operation state or an error state of the air conditioner.

The sixth light-emitting unit 1176 is a circular light source disposed at the center of the display unit 1170 and may display a power-on/power-off state or an operational error state of the indoor unit 1000 of the air conditioner using various colors of LEDs.

Figure 65:
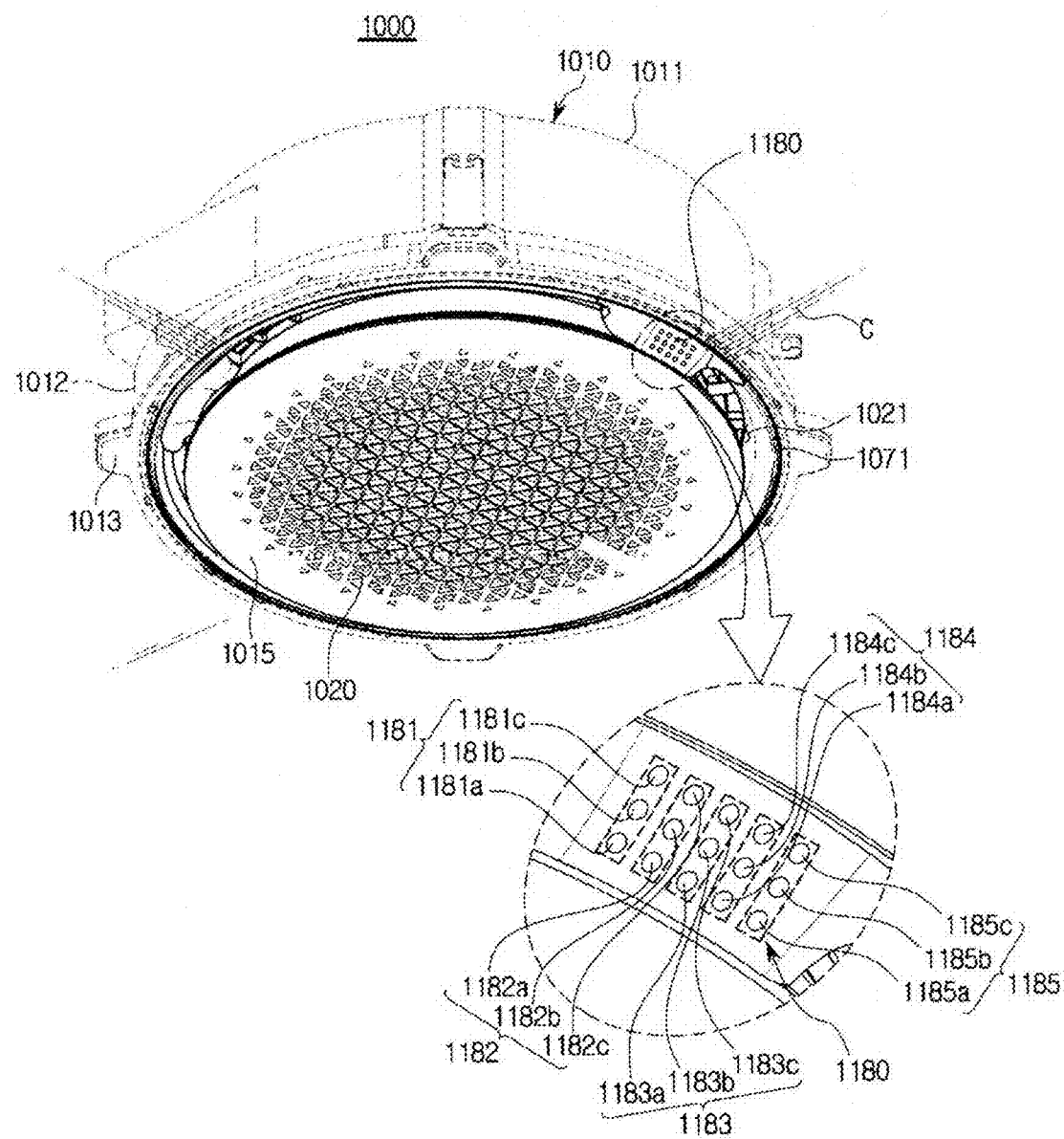
FIG. 65 is a perspective view illustrating an indoor unit of an air conditioner according to an embodiment.

FIG. 65 is a perspective view illustrating an indoor unit of an air conditioner according to an embodiment. Like reference numerals and like names will be used for parts which are the same as those in FIG. 40 to omit overlapping description thereof.

In FIG. 65, a display unit 1180 is a lighting device having a plurality of light-emitting units formed in the shape of a rod-like band and may display directions of a discharged airflow controlled in various directions.

The display unit 1180 includes a third light-emitting unit 1183 to display a state in which the direction of the discharged airflow is controlled to be vertical, a first light-emitting unit 1181 and a fifth light-emitting unit 1185 to display a state in which the direction of the discharged airflow is controlled to be horizontal, and a second light-emitting unit 1182 and a fourth light-emitting unit 1184 to display a state in which the direction of the discharged airflow is controlled to be in the middle.

To display the state in which the direction of the discharged airflow is controlled to be vertical, the third light-emitting unit 1183 may include a plurality (approximately three) of light sources 1183a, 1183b, and 1183c to visually express one optical pattern in the shape of a rod-like band disposed at an inner portion of the display unit 1180.

To display the state in which the direction of the discharged airflow is controlled to be horizontal, the first light-emitting unit 1181 and the fifth light-emitting unit 1185 may each include a plurality of light sources 1181a, 1181b, and 1181c, and 1185a, 1185b, and 1185c to visually express two optical patterns in the shape of a rod-like band disposed at the outer portion of the display unit 1180.

To display the state in which the direction of the discharged airflow is controlled to be in the middle, the second light-emitting unit 1182 and the fourth light-emitting unit 1184 may each include a plurality of light sources 1182a, 1182b, and 1182c, and 1184a, 1184b, and 1184c to visually express two optical patterns in the shape of a rod-like band disposed at the middle portion of the display unit 1180.

Here, of course the number and the arrangement of the light sources 1181a, 1181b, and 1181c, 1182a, 1182b, and 1182c, 1183a, 1183b, and 1183c, 1184a, 1184b, and 1184c, and 1185a, 1185b, and 1185c disposed at each of the first light-emitting unit 1181 to the fifth light-emitting unit 1185 may be designed in various ways.

By the above structure, the first light-emitting unit 1181 to the fifth light-emitting unit 1185 may turn on or turn off the plurality of light sources 1181a, 1181b, and 1181c, 1182a, 1182b, and 1182c, 1183a, 1183b, and 1183c, 1184a, 1184b, and 1184c, and 1185a, 1185b, and 1185c disposed at each of the first light-emitting unit 1181 to the fifth light-emitting unit 1185 to display whether the direction of the airflow discharged from the indoor unit 1000 of the air conditioner is vertical, horizontal, or middle.

In addition, the display unit 1180 may also sequentially turn on the first light-emitting unit 1181 to the fifth light-emitting unit 1185 from the inner portion to the outer portion or from the outer portion to the inner portion to display a state in which the direction of the airflow is controlled to be automatic.

FIG. 66 is a perspective view illustrating an indoor unit of an air conditioner according to an embodiment. Like reference numerals and like names will be used for parts which are the same as those in FIG. 40 to omit overlapping description thereof.

In FIG. 66, a first display unit 1191 is a lighting device having a plurality of light-emitting units formed in the shape of a rod-like band and may display directions of a discharged airflow controlled in various directions.

The first display unit 1191 includes a first light-emitting unit 1191a to display a state in which the direction of the discharged airflow is controlled to be vertical, a second light-emitting unit 1191b to display a state in which the direction of the discharged airflow is controlled to be horizontal, and a third light-emitting unit 1191c to display a state in which the direction of the discharged airflow is controlled to be in the middle.

To display the state in which the direction of the discharged airflow is controlled to be vertical, the first light-emitting unit 1191a may include one light source (LED) to visually express an optical pattern disposed at an inner portion of the display unit 1191.

To display the state in which the direction of the discharged airflow is controlled to be horizontal, the second light-emitting unit 1191b may include one light source (LED) to visually express an optical pattern disposed at an outer portion of the display unit 1191.

To display the state in which the direction of the discharged airflow is controlled to be in the middle, the third light-emitting unit 1191c may include one light source (LED) to visually express an optical pattern disposed at a middle portion of the display unit 1191.

A second display unit 1192 may include first to fifth light sources 1192a, 1192b, 1192c, 1192d, and 1192e disposed in the shape of a rod-like band at one portion of the first display unit 1191 and use the first to fifth light sources 1192a, 1192b, 1192c, 1192d, and 1192e to visually express the strength of a discharged airflow.

For example, when the strength of the airflow is strong, all of the first to fifth light sources 1192a, 1192b, 1192c, 1192d, and 1192e of the second display unit 1192 may be turned on to display that the strength of the discharged airflow is being controlled to be strong.

In addition, when the strength of the airflow is medium, the first to third light sources 1192a, 1192b, and 1192c among the first to fifth light sources 1192a, 1192b, 1192c, 1192d, and 1192e of the second display unit 1192 may be turned on to display that the strength of the discharged airflow is being controlled to be medium.

In addition, when the strength of the airflow is weak, only the first light source 1192a among the first to fifth light sources 1192a, 1192b, 1192c, 1192d, and 1192e of the second display unit 1192 may be turned on to display that the strength of the discharged airflow is being controlled to be weak.

Meanwhile, although visually expressing the strength of a discharged airflow by controlling the number of the light sources 1192a, 1192b, 1192c, 1192d, and 1192e turned on up to the fifth light source 1192e based on the first light source 1192a of the second display unit 1192 has been described as an example in this embodiment, the present disclosure is not limited thereto, and the strength of a discharged airflow may be visually expressed also by controlling the number of the light sources 1192a, 1192b, 1192c, 1192d, and 1192e turned on up to the first light source 1192a or the fifth light source 1192e from the third light source 1192c of the second display unit 1192.

This may be described in more detail as follows.

First, when the strength of an airflow is strong, all of the first to fifth light sources 1192a, 1192b, 1192c, 1192d, and 1192e of the second display unit 1192 may be turned on to display that the strength of the discharged airflow is being controlled to be strong.

In addition, when the strength of an airflow is medium, the second to fourth light sources 1192b, 1192c, and 1192d among the first to fifth light sources 1192a, 1192b, 1192c, 1192d, and 1192e of the second display unit 1192 may be turned on to display that the strength of the discharged airflow is being controlled to be medium.

In addition, when the strength of an airflow is weak, only the third light source 1192c among the first to fifth light sources 1192a, 1192b, 1192c, 1192d, and 1192e of the second display unit 1192 may be turned on to display that the strength of the discharged airflow is being controlled to be weak.

According to an aspect of the present disclosure, an airflow can be adjusted to be in a direction requested by a user by controlling RPM of a main fan and an auxiliary fan based on airflow speed information and airflow direction information. Thereby, the user's satisfaction can be improved.

According to an aspect of the present disclosure, an airflow direction can be maintained even when the amount of air being drawn is reduced due to dust accumulated at a suctioning side by controlling RPM of an auxiliary fan based on the amount of dust at the suctioning side and RPM of a main fan. Accordingly, the air-conditioning performance can also be maintained.

According to an aspect of the present disclosure, a target temperature can be maintained without a sense of an airflow by operating in a high speed mode before the target temperature is reached and operating in a normal mode when the target temperature is reached to make air flow upward during a cooling operation.

According to an aspect of the present disclosure, the efficiency of cooling and heating can be improved by suctioning in some air discharged during cooling and heating operations and guiding the air to a heat exchanger.

According to an aspect of the present disclosure, a discharged airflow can be directed to a user by controlling RPM of an auxiliary fan based on information on the position of the user during cooling and heating operations. That is, the conditioned air can reach the user.

According to an aspect of the present disclosure, comfort can be achieved by suctioning in discharged cold air using an auxiliary fan during a defrosting operation to prevent the cold air from reaching a user of an indoor space.

Compared to a conventional structure in which a blade is provided in a discharge portion and a discharged airflow is controlled by rotation of the blade, according to an aspect of the present disclosure, an indoor unit of an air conditioner can control a discharged airflow even without a blade structure. Accordingly, because the discharged air is not interfered by a blade, the amount of discharged air can be increased, and noise of the flowing air can be reduced.

According to an aspect of the present disclosure, although a discharge portion of an indoor unit of a conventional air conditioner can only have a straight shape in order to rotate the blade, according to an aspect of the present disclosure, a discharge portion of an indoor unit of an air conditioner can be formed in a circular shape. Accordingly, a housing, a heat exchanger, etc. can also be formed in the circular shape, thereby not only improving an esthetic sense by the differentiated design but also enabling a natural airflow and reducing loss of pressure when considering that a first fan generally has a circular shape, thus improving cooling or heating performance of the air conditioner as a result.

According to an aspect of the present disclosure, an airflow discharged from an indoor unit of an air conditioner to an air-conditioned space can be controlled in various forms.

According to an aspect of the present disclosure, an effect of rotating an indoor unit can be achieved even without rotating the indoor unit by controlling an airflow discharged from the indoor unit to circulate.

According to an aspect of the present disclosure, an air conditioner can firmly fix a display unit to a housing.

According to an aspect of the present disclosure, an air conditioner can fix a display unit to a housing using the fewest possible number of separate fixing members.

According to an aspect of the present disclosure, a display unit can be easily detached from a housing due to a simple structure of an air conditioner, thereby facilitating maintenance and repair of the display unit.

According to an aspect of the present disclosure, a direction of the discharged airflow can be controlled without a blade, and thus the discharged air is not interfered by the blade such that the amount of the discharged air is increased, thereby improving the performance of an air conditioner and reducing noise of the flowing air caused by a turbulent flow.

According to an aspect of the present disclosure, a direction of the discharged airflow is visually expressed using a lamp or a light-emitting diode (LED), etc., thereby enabling a user to intuitively recognize the airflow direction and enabling the user to easily check the visually expressed airflow direction in accordance with the user's manipulation.

According to an aspect of the present disclosure, not only the direction of the discharged airflow but also the strength of the airflow and an operation state, etc. are visually expressed, thereby improving the user's satisfaction toward the air conditioner.

In the above, although few embodiments of the present disclosure have been shown and described, the present disclosure is not limited to the particular embodiments mentioned above. Various modifications are possible by those of ordinary skill in the art to which the present disclosure pertains without departing from the gist of the claims below, and the modified embodiments cannot be separately construed from the present disclosure.

What is claimed is:

1. An air conditioner comprising:
   a housing provided with a suction port and a discharge port;
   a main fan configured to flow air so that the air is drawn through the suction port and discharged through the discharge port;
   a first auxiliary fan configured to draw, through a first inlet provided near the discharge port, at least a portion of the air discharged through the discharge port by the main fan;
   a second auxiliary fan configured to draw, through a second inlet provided near the discharge port, at least a portion of the air discharged through the discharge port by the main fan; and
   a controller configured to control a rotation speed of the first auxiliary fan and a rotation speed of the second auxiliary fan so that a discharging direction of air by the first auxiliary fan is different from a discharging direction of an air by the second auxiliary fan,
   wherein the first auxiliary fan and second auxiliary fan are configured to pull an airflow of the air discharged by the main fan toward the first and second inlet, respectively.

2. The air conditioner according to claim 1, wherein the controller is configured to increase the rotational speed of the first auxiliary fan to pull the airflow of the air discharged through the discharge port by the main fan toward the first inlet and increase the rotational speed of the second auxiliary fan to pull the airflow of the air discharged through the discharge port by the main fan toward the second inlet.

3. The air conditioner according to claim 1, wherein the controller is configured to rotate the first auxiliary fan at a first rotational speed so that the air is discharged in a first direction and rotate the second auxiliary fan at a second rotational speed so that the air is discharged in a second direction.

4. The air conditioner according to claim 3, wherein the controller is configured to change the rotational speed of the first auxiliary fan from the first rotational speed to a third rotational speed while changing the rotational speed of the second auxiliary fan from the second rotational speed to a fourth rotational speed.

5. The air conditioner according to claim 3, wherein the controller is configured to change the rotational speed of the first auxiliary fan from the first rotational speed to the second rotational speed while changing the rotational speed of the second auxiliary fan from the second rotational speed to the first rotational speed.

6. The air conditioner according to claim 1, wherein the controller is configured to control the rotational speed of the first auxiliary fan so that the air is vertically discharged out of the housing and control the rotational speed of the second auxiliary fan such that the air is horizontally discharged out of the housing.

7. The air conditioner according to claim 1, wherein the controller is configured to rotate the first auxiliary fan and the second auxiliary fan alternately at a first rotational speed, while cyclically changing the rotational speed of the first auxiliary fan and the rotational speed of the second auxiliary fan.

8. The air conditioner according to claim 1, wherein the controller is configured to cyclically change the rotational speed of the first auxiliary fan and the rotational speed of the second auxiliary fan while rotating the first auxiliary fan at the rotational speed being different from the rotational speed of the second auxiliary fan.

9. The air conditioner according to claim 1, wherein the controller is configured to alternately stop a rotation of the first auxiliary fan and a rotation of the second auxiliary fan.

10. An air conditioner comprising:
- a housing provided with a suction port and a discharge port;
- a main fan configured to flow air so that the air is drawn through the suction port and discharged through the discharge port;
- a first auxiliary fan and a second auxiliary fan configured to pull an airflow of the air discharged by the main fan toward thea first inlet and thea second inlet, respectively, by drawing, through athe first inlet and athe second inlet provided near the discharge port, at least a portion of the air discharged through the discharge port by the main fan;
- a display disposed on the housing; and
- a controller configured to control a rotation speed of the first auxiliary fan and a rotation speed of the second auxiliary fan to control a direction in which the air is discharged, and display, on the display, information regarding the direction in which the air is discharged.

11. The air conditioner according to claim 10, wherein the controller is configured to display a first image which indicates that the air is discharged in a first direction while controlling the rotational speed of the first auxiliary fan so that the air is discharged in the first direction, and display a second image which indicates that the air is discharged in a second direction while controlling the rotational speed of the first auxiliary fan so that the air is discharged in the second direction.

12. The air conditioner according to claim 10, wherein the display includes a first indicator which indicates that the air is discharged in a first direction and a second indicator which indicates that the air is discharged in a second direction.

13. The air conditioner according to claim 12, wherein the controller is configured to turn on the first indicator while controlling the rotational speed of the first auxiliary fan so that the air is discharged in the first direction, and turn on the second indicator while controlling the rotational speed of the first auxiliary fan so that the air is discharged in the second direction.

14. The air conditioner according to claim 12, wherein the controller is configured to turn on the first indicator while controlling the rotational speed of the first auxiliary fan so that the air is vertically discharged, and turn on the second indicator while controlling the rotational speed of the first auxiliary fan so that the air is horizontally discharged.

15. The air conditioner according to claim 10, wherein the controller is configured to display a first image which indicates that the air is vertically discharged while controlling the rotational speed of the first auxiliary fan so that the air is vertically discharged, and display a second image which indicates that the air is horizontally discharged while controlling the rotational speed of the first auxiliary fan so that the air is horizontally discharged.

16. The air conditioner according to claim 10, wherein the display include a first indicator which indicates that the air is vertically discharged and a second indicator that the air is horizontally discharged, and
- the first indicator has a ring shape having a radius different from that of the second indicator.

17. The air conditioner according to claim 10, wherein the controller is configured to display a first image which indicates a discharging direction of the air by first auxiliary fan, and display a second image which indicates a discharging direction of the air by the second auxiliary fan.

18. The air conditioner according to claim 10, wherein the display include a first indicator which indicates a discharging direction of the air by first auxiliary fan and a second indicator which indicates a discharging direction of the air by the second auxiliary fan,
- each of the first indicator and the second indicator have an arc shape, and
- each of the first indicator and the second indicator is, on the display, arranged in a circumferential direction on a concentric circle.

19. The air conditioner according to claim 10, wherein the controller is further configured to display, on the display, information regarding a speed at which the air is discharged.

* * * * *

UNITED STATES PATENT AND TRADEMARK OFFICE
CERTIFICATE OF CORRECTION

PATENT NO. : 11,035,583 B2
APPLICATION NO. : 15/992699
DATED : June 15, 2021
INVENTOR(S) : Young-Jin Kim et al.

Page 1 of 1

It is certified that error appears in the above-identified patent and that said Letters Patent is hereby corrected as shown below:

In the Claims

Column 82, Line 20, In Claim 1, before "air" delete "an".

Column 83, Line 12, In Claim 10, delete "thea" (first occurrence) and insert -- a --, therefor.

Column 83, Line 12, In Claim 10, delete "thea" (second occurrence) and insert -- a --, therefor.

Column 83, Line 13, In Claim 10, delete "athe" (first occurrence) and insert -- the --, therefor.

Column 83, Line 13, In Claim 10, delete "athe" (second occurrence) and insert -- the --, therefor.

Signed and Sealed this
Third Day of August, 2021

Drew Hirshfeld
*Performing the Functions and Duties of the
Under Secretary of Commerce for Intellectual Property and
Director of the United States Patent and Trademark Office*